US012768463B2

(12) United States Patent
Chien et al.

(10) Patent No.: US 12,768,463 B2
(45) Date of Patent: Oct. 20, 2026

(54) FLOW CHANNEL FOR GLOBE VALVE

(71) Applicant: BUENO TECHNOLOGY CO., LTD., Tainan City (TW)

(72) Inventors: Huan-Jan Chien, Tainan City (TW); Po-Wen Chen, Tainan City (TW); Huan-Ciao Hong, Tainan City (TW)

(73) Assignee: Bueno Technology Co., Ltd., Tainan City (TW)

( * ) Notice: Subject to any disclaimer, the term of this patent is extended or adjusted under 35 U.S.C. 154(b) by 50 days.

(21) Appl. No.: 19/009,150

(22) Filed: Jan. 3, 2025

(65) Prior Publication Data

US 2026/0110363 A1 Apr. 23, 2026

(30) Foreign Application Priority Data

Oct. 21, 2024 (TW) ................................ 113140014
Dec. 5, 2024 (TW) ................................ 113147292

(51) Int. Cl.
*F16K 27/02* (2006.01)
*F16K 1/42* (2006.01)

(52) U.S. Cl.
CPC ................ *F16K 27/02* (2013.01); *F16K 1/42* (2013.01)

(58) Field of Classification Search
CPC ..... F16K 1/02; F16K 1/42; F16K 7/16; F16K 27/02; F16K 27/0236; F16K 1/06
See application file for complete search history.

(56) References Cited

U.S. PATENT DOCUMENTS 2,823,696 A * 2/1958 Detlefson ............. F16K 49/005 137/340
4,251,053 A * 2/1981 Wurzer ..................... F16K 7/16 137/859
9,441,752 B2 * 9/2016 Beck ................... F16K 27/0281
10,935,161 B2 * 3/2021 Junk ...................... F16K 27/041
11,204,101 B2 * 12/2021 Lee ...................... F16K 27/0236
11,519,516 B2 * 12/2022 Kennedy ................. F16K 41/12
(Continued)

FOREIGN PATENT DOCUMENTS

CN 2083665 U 8/1991
KR 20220078532 A * 6/2022 ............... F16K 1/52

OTHER PUBLICATIONS

Machine English translation of KR-20220078532-A (Year: 2026).*
(Continued)

*Primary Examiner* — Hailey K. Do
(74) *Attorney, Agent, or Firm* — Rosenberg, Klein & Lee

(57) ABSTRACT

An improved flow channel for a globe valve featuring low head loss includes a valve chamber, a ring-shaped ditch, an inlet passage, a valve inlet, a valve seat, an outlet passage, and a valve outlet. The ring-shaped ditch is installed at the periphery of the valve seat and formed with a bevel at its bottom. When a valve plug of the globe valve departs from the valve seat, the valve plug and the valve seat jointly define a radial passage. A fluid flowing in from the valve inlet and the inlet passage enters the radial passage as smooth streamlines, and the streamlines spread in the radial passage to enter the outlet passage as a rushing stream and a tranquil stream that flow independently. Thereby, the improved flow channel prevents generation of any circumfluence zone and flow interference and eventually reduces head loss.

19 Claims, 43 Drawing Sheets

(56) References Cited

U.S. PATENT DOCUMENTS

| | | | | |
|---|---|---|---|---|
| 12,060,949 | B2 * | 8/2024 | Lee | F16K 15/023 |
| 2014/0061527 | A1 * | 3/2014 | Hilsabeck | F16K 47/08 251/356 |

OTHER PUBLICATIONS

Donald S. Miller, Internal Flow Systems (2nd Edition), BHRA (Information Services) (1990).
Yelevant excerpts from Erwin Fried & I.E. Idelchik, Flow Resistance: a Design Guide for Engineers, Hemisphere Publishing Corporation (1989).
Dimensional Specification of a Diaphragm Valve for a Metric PFA Tube, Semi F99-0705, Semi (2005).
Catalogue entry for Ultrahigh-Purity Fluoropolymer Diaphragm Valves, MS-02-171, Swagelok (Mar. 2021).
Datasheet for Diaphragm Valve Types 514, 515, 517, 519, Georg Fischer Piping Systems Ltd. (Sep. 2020).
Catalogue entry for Weir Diaphragm Valve SWD/MWD Series, CKD Corporation (2022).
Flow Control catalogue, Bueno Technology Co., Ltd. (2024).

* cited by examiner

FLOW CHANNEL FOR GLOBE VALVE

BACKGROUND OF THE INVENTION

1. Technical Field

The present invention relates to valves, and more particularly to an improved flow channel for a globe valve. Globe valves have been extensively used for control in piping systems in virtue of their reliable sealing ability, easy flow-rate adjustment, and cleanness due to low retention. therein, diaphragm valves are more suitable for high-cleanness applications where control of the flow rate or the pressure in a piping system is desired. However, they disadvantageously require a relatively large pressure difference to achieve a given flow rate. Common values can be classified by their obturators. In the first type, valves employ elastic members that provide sealing when deforming under pressure. These valves include pinch valves and weir valves. Valves of the second type use rotating members to work as obturators, and include butterfly valves and ball valves. The third type is valves that incorporate sliding members as obturators, and these valves may be gate valves. The fourth type represents valves using covering members for sealing, such as globe valves and needle valves. Valves of the fifth type, such as gate valves, are those use domes for the same purpose. The five types of valves may have their flow performance expressed by dimensional low coefficient Cv and Kv, or by a dimensionless pressure loss coefficient value $\xi$. Definition of these terms can be found in Reference 2 (in Chapter 1, General information, 1-1 general guidelines term 8 and term 9, P. 2). Briefly, the higher the Cv value is, the higher the flow rate is and the lower the resistance is. On the other hand, the higher the $\xi$ value is, the higher the resistance is and the lower the flow rate is. Hereinafter, the Cv values each refer to the case where the relevant valve is a 2" valve of an inner diameter of 47 mm~57 mm and reaches its highest flow rate when the obturator is fully open:

Type 1: a pinch-valve typically has a flow coefficient value Cv of 170~280, and a weir-valve typically has a Cv value of 50~120;

Type 2: a butterfly-valve typically has a Cv value of 90~220, and a ball valve typically has a Cv value of 210~500. In a ball valve, the obturator is a ball that defines a center hole. The valve is referred to as a full port valve if its center hole has a diameter that is equal to those of the inlet and the outlet of the valve. Such a valve features a high value of the flow coefficient Cv. This is because the flow channel in the valve is a straight pipe, and a fluid flows therein as a straight line with the least, if not no interference. This is proven by the Cv ranging between 210 and 500, depending on the size of its center hole, which is proportional to the Cv value.

Type 3: a gate-valve typically has a flow coefficient value Cv of 100~300.

Type 4: a globe valve with a vertical shaft typically has a flow coefficient Cv value of 30~65. Therein, when the inlet and the outlet of the valve are in the same straight line, as shown in p. 2 of Reference 3, FIG. 1, the Cv value is of 40~60. If the inner diameter is of, for example, 52.5 mm, the head loss coefficient $\xi$ is of 4.5~10.13, and when the direction so the inlet and the outlet form a right angle, the Cv value is of 60~100.

The Cv value of each of the foregoing valves is affected by the actual pipe inner diameter, so the comparison among the valves shall be based on the actual measurements of their pipe inner diameters. Given that the pipe inner diameter is the same, difference in the Cv value indicates variation of the cross-sectional area of the flow channel and whether the streamline has been interfered. Particularly, the greater the radius of curvature of the streamline is, the greater the Cv value is. Besides, as valves can have structural differences for meeting their application-specific requirements, similar valves from different manufacturers always have different Cv values. Y-globe valves are not covered by the discussion.

Type 5: a gate alve typically has a flow coefficient Cv value of 50~116. Referring to Reference 5 and Reference 6, since a weir valve uses curves for sealing, its sealing performance is somehow compromised in terms of reliability. However, it allows both inlet and outlet passage to be designed as gentle curves, and can usually have a Cv value up to 60~80. The designs shown in Reference 5 and of Prior-Art Device 9 can even have their Cv values as high as 110~116, but this is achieved with a pipe diameter of 57 mm and leads to a head loss coefficient $\xi$ value of 1.7. The device of Reference 6 has a diameter of 47.8 mm and saw the head loss coefficient $\xi$ of 4.47.

The objective of the present invention is to improve the flow channel inside a vertical-shaft globe valve, and use the nondimensionalized head loss coefficient $\xi$ as an indicator of improvement instead of the conventionally used Cv value. For illustrating the improvement provided by the present invention over a conventional flow channel, the following description will be directed to an exemplificative use case with respect to a 2" globe valve having an inner diameter of 52.5 mm and having its inlet and outlet located in the same straight line. With the inner diameter of 52.5 mm and an inner diameter ratio $d_3/d_0=2.0$, the example implementing the present invention is expected to lead to a head loss coefficient value $\xi$, where $1.7\leq\xi\leq 3.0$, $100\geq C_v\geq 73.5$, making the valve using the improved flow channel superior to the conventional globe valves.

2. Description of Related Art

In the disclosure, the dimensional flow coefficient $C_v$ or $K_v$ is used as the reference indicator for evaluating improvement of the flow channel in a globe valve. The dimensionless head loss coefficient $\xi$ will also be mentioned for further describing the improvement by showing that valves having the same structure may have difference in the head loss coefficient $\xi$ because an increased pipe size can correspond to a gradually decreased $\xi$ value. The difference of the two flow coefficients lies upon units. $C_v$ is the standard flow rate Q under the pressure difference of 1 psig, and is in usgpm. $K_v$ is the metric flow rate Q under the pressure difference $\Delta P=1$ bar, and is in cmh, $$\frac{m^3}{hour}.$$

For conversion, the $C_v$ value is 1.156 times as much as the $K_v$ value. Both the $C_v$ and $K_v$ values are dimensional coefficients in positive correlation with the pipe cross-sectional area. This means that for two valves from different manufacturers, even if they are the same in terms of $C_v$ or $K_v$, they may have different values of the head loss coefficient $\xi$ when their pipe inner diameters are different. The one having the lower head loss coefficient $\xi$ value relates to not only lower head loss but also les energy consumed by fluid conveyance.

For consumers' easy selection, many valve makers show the $K_v$ value as $$\frac{m^3}{hr}.$$

The respective expressions are:

$$Q = K_v \times \sqrt{\Delta P}, \text{ and } Q = C_v \times \sqrt{\Delta P}.$$

The pressure difference ΔP existing between the inlet and the outlet of the valve body is also known as head loss. a high flow coefficient $C_v$ or $K_v$ value means that a high flow rate can be achieved under a given pressure difference, and is quite favorable to low-head, energy-saving conveyance that is desirable for piping systems.

The disclosure also introduces the use of the dimensionless head loss coefficient ξ for indicating improvement in the flow channel for the globe valve. A head loss coefficient ξ value is expressed with the pressure difference ΔP (pa) and the average flow rate V in the pipe:

$$\Delta P_L = \rho g \Delta H_L = \xi \times \frac{1}{2} \times \rho \times V^2; \Delta H_L = \xi \times \frac{1}{2g} \times V^2.$$

Therein, $\Delta H_L$(m) is the level difference used to describe the head loss, and ξ is a dimensionless coefficient known as the head loss coefficient, which is irrelevant to the size of the pipe and with its value exactly equal to that of the pressure loss coefficient ξ. This value reflects the pressure loss seen with the flow channel structure inside the valve body, and can be used as a criterion for comparing different in-valve flow channel structures. Specifically, flow channels having similar structures may have the same ξ value. The smaller the value is, the smaller the head loss is and the greater the flow rate is. The equation $$\frac{1}{2} \times \rho \times V^2 = P_d$$

produces the value of the in-pipe dynamic pressure $P_d$, which may be regarded as the average dynamic pressure in the streamline in the pipe. In other words, the size of the pressure difference ΔP (pa) may be expressed as a multiple of the dynamic pressure $P_d$ using ξ, and the level difference $\Delta H_L$(m) is exactly the head loss.

$$\frac{1}{2g} \times V^2 = H_d,$$

where $H_d$ is exactly the dynamic head.

In this way, the head loss $\Delta H_L$(m) may also be expressed as a multiple of the dynamic head $H_d$ using ξ. Every component forming the flow channel inside the valve body, such as a straight pipe, a non-right-angle bend, a right-angle bend, etc. has its own value of the head loss coefficient ξ. The greater the value of the head loss coefficient ξ is, the smaller the radius of curvature with respect to the streamline in the piping is, and the less smooth-going the flow in the piping is. For a series of piping components, the sum of their ξ values can be used to represent the head loss coefficient ξ of the piping as a whole. Detailed discussion on this can be found in Reference 1 published in 1978 and Reference 2 published in 1989 at sections about the flow loss coefficient. The head loss coefficient is symbolized as $K_b$ in Reference 1, and as ξ in both Reference 2 and the present disclosure.

While calculation of the head loss coefficient ξ is dimensionless and thus independent of the pipe diameter, how a fluid flows in a pipe does affect the head loss coefficient ξ because a laege size pipe has an increased radius of curvature $R_C$ of the streamline, and thus increase in pipe diameter leads to decrease in head loss coefficient ξ, as discussed in Reference 2, Chapter 9 Flow through pipe fittings and labyrinth seals, Resistance Coefficients of Throttling Devices, Valves, Plugs, and Labyrinth Seals, Diagram9-4, Standard globe valve with dividing wall, Dividing walls at angle 45°, curved line1, Table 1, $D_0$=13 mm, ξ=10.8, $D_0$=80 mm, ξ=4.0, p. 290.

The equation for calculating the value of the head loss coefficient ξ may be further used for conversion for the $C_V$ as below:

$$\Delta P = \xi \times \frac{1}{2} \rho \times V^2 \times \left(\frac{A}{A}\right)^2 = \xi \times \frac{1}{2} \rho \times \frac{(V \times A)^2}{A^2} = \frac{\xi \times \rho}{2A^2} \times Q^2$$

$$\frac{Q^2}{\Delta P} = \frac{2A^2}{\xi \times \rho}, C_V = \frac{Q}{\sqrt{\Delta P}} = \sqrt{\frac{A^2}{\xi \times \frac{\rho}{2}}}$$

$$C_V = \frac{A}{\sqrt{\xi \times \frac{\rho}{2}}}$$

It is clear from the above equations that the piping cross-sectional area A is a factor of the flow coefficient $C_V$ or $K_v$ value, and this provides an engineer selecting a valve with direct information about the flow capacity of the valve. However, the correct $C_V$ value and the true flow capacity can only be obtained when the pipe diameter $d_0$ is correctly indicated. On the other hand, the dimensionless head loss coefficient ξ is independent of the pipe diameter, and therefore better reflects both the actual flow capacity and the head loss ΔP. Hence, the present invention will refer to the head loss coefficient ξ for measuring improvement achieved by the disclosed flow channel.

Some conventional structures of flow channels in globe valves can be found in Reference 2 and Reference 3. For easy discussion, the structures mentioned in Reference 2 are hereinafter referred to as Structure C1, Structure C2, and Structure C3, while the structure described in Reference 3 is hereinafter referred to as Structure C4.

FIG. 13A schematically shows the conventional design of a flow channel, Structure C3, showing reference coordinate axes, coordinate points, and its inlet center line $S_1$, radial center line $S_{12}$, rushing stream $S_{121}$, tranquil stream $S_{122}$, and outlet center line $S_2$.

FIG. 13B schematically shows the placement angle, corner A, corner B, spread C, corner D, and corner E of the conventional flow channel of Structure C3.

FIG. 14A schematically shows the conventional design of a flow channel, Structure C4, showing reference coordinate axes, coordinate points, and its inlet center line $S_1$, radial center line $S_{12}$, rushing stream $S_{121}$, tranquil stream $S_{122}$, and outlet center line $S_2$.

FIG. 14B schematically shows the placement angle, corner A, corner B, spread C, corner D, and corner E of the conventional flow channel of Structure C4.

A conventional globe valve has a valve body that is typically shaped as a hollow ball or a hollow cylinder and contains therein a flow channel. the flow channel is typically formed by a valve chamber, a valve plug, an inlet passage, an outlet passage, and a partition that separates the inlet passage and the outlet passage. A valve seat mounted on the horizontal surface of the partition comprises a seal surface and a center hole. The inlet passage has a valve inlet communicated with the center hole. The valve chamber accommodates therein the valve plug concentric with a valve stem, and a sealing device. The partition and the valve seat connect the inlet passage and the outlet passage. The inner wall of the valve chamber is provided with an internal outlet. The outlet passage has a valve outlet communicated with the internal outlet. The valve inlet and the valve outlet are located at two sides of the valve body, respectively. When the outlet passage is implemented as a straight pipe or curved pipe that goes obliquely downward, the internal outlet is non-standard elliptic.

Also shown are the valve-chamber inner diameter $d_3$, the valve-plug outer diameter $d_2$, the valve-seat outer diameter $d_1$, the valve-inlet diameter do, and the valve-outlet diameter $d_0$.

The center hole has a center point $P_1$ at a height $LH_1$. The internal outlet has a center point $P_3$ at a height $LH_2$. The valve seat has the seal surface at a height $LH_3$. The seal surface has a center point $P_{DP}$. The valve inlet has a center point $P_2$. The valve outlet has a center point $P_4$.

A horizontal line $XL_1$ passes through the center point $P_1$ of the center hole and meets a circumference of the center hole at two intersections, i.e., a distal point $E_1$ and a proximal point $E_2$. The distal point $E_1$ is located near the valve inlet, and the proximal point $E_2$ is located near the valve outlet.

A channel axis $XL_2$ (i.e., the X axis) horizontally passes through the center point $P_2$ and the center point $P_4$. In the present disclosure, description of each of the heights is based on the channel axis $XL_2$ that connects the valve outlet and the valve inlet, and also defines the coordinate zero point of the Y. Locations with respect to the channel axis $XL_2$ may be described as positive values (>0), a zero value (=0) and negative values (<0).

A vertical line $YL_1$ passes through the center point $P_1$ and meets the channel axis $XL_2$ at an intersection $P_{11}$.

A vertical line $YL_2$ passes through the center point $P_4$, and meet the circumference of the valve outlet at two intersections, i.e., a distal point $E_5$ and a proximal point $E_6$. The distal point $E_5$ has a height of $d_0/2$, and the proximal point $E_6$ has a height of $-d_0/2$. The proximal point $E_6$ represents the lowest point of the outlet passage.

A vertical line $YL_3$ passing through the center point $P_3$ meets the channel axis $XL_2$ at an intersection $P_{31}$, and meets the circumference of the internal outlet at two intersections, i.e., a distal point $E_3$ and a proximal point $E_4$. The distal point $E_3$ has a height $LH_4$ and the proximal point $E_4$ has a height $LH_5$.

A vertical line $YL_4$ passes through the center point $P_2$ and meet the circumference of the valve inlet at two intersections, i.e., a distal point $E_7$ and a proximal point $E_8$. The distal point $E_7$ has a height of $d_0/2$, and the proximal point $E_8$ has a height of $-d_0/2$. The proximal point $E_8$ represents the lowest point of the inlet passage.

The center point $P_1$ is separated from the center point $P_2$ by a horizontal distance $L_1$, where $P_{11}P_2=L_1$. The center point $P_4$ is separated from the center point $P_1$ by a horizontal distance $L_2$, where $P_4P_{11}=L_2$. The center point $P_2$ is separated from the center point $P_4$ by a horizontal distance L, where $P_4P_2=L=L_1+L_2$.

The center point $P_4$ is separated from the center point $P_3$ by a horizontal distance $LL_2$, where $LL_2=L_2-d_3/2=P_{31}P_4$.

The valve plug is cylindrical in shape and at bottom formed with a plane. When the globe valve is closed, the valve plug engages with the seal surface for sealing. When the valve is fully open, the bottom plane of the valve plug and the seal surface jointly define a radial passage that has an opening $B_1$. The radial passage is structurally determined by the seal surface and in the form of a horizontal flow channel or a 45-degree upward conical flow channel. A Preferred Mode is a horizontal flow channel with $B_1/d_0=0.25$.

The inlet passage has the valve inlet, an inlet center line $S_1$, the center hole, an upper-edge line $S_{1a}$, and a lower-edge line $S_{1b}$. The inlet passage extends inward horizontally from the valve inlet and turns upward before terminating at the center hole as its outlet end. The inlet center line $S_1$ connects the center point $P_1$ and the center point $P_2$, and forms an included angle $\gamma_1$ with the vertical line $YL_1$ at the center point $P_1$. When the included angle $\gamma_1 \neq 0°$, the center hole is a non-standard elliptical hole that defines a major axis $a_x$ in the X-axis direction, where $a_x \geq d_0$, $a_x=E_1E_2$, $E_1P_1 \geq P_1E_2$, and a minor axis $b_z$ in the Z-axis direction, where $b_z=d_0$. When the included angle $\gamma_1=0°$, the center hole is a round hole with a diameter $d_0$. The upper-edge line $S_{1a}$ connects the distal point $E_1$ and the distal point $E_7$. The lower-edge line $S_{1b}$ connects the proximal point $E_2$ and the proximal point $E_8$.

The radial passage has a radial center line $S_{12}$ and opening $B_1$. The radial passage comprises segments extending in the radial direction and encircling the center hole and has a height $LH_6$, where $LH_6=LH_3+B_1$. The radial center line $S_{12}$ connects the center point $P_1$ and the center point $P_3$. These segments extend outward from the center point $P_1$ in various directions and finally reach the center point $P_3$.

The outlet passage comprises the internal outlet, the valve outlet, an outlet center line $S_2$, an upper-edge line $S_{2a}$, and a lower-edge line $S_{2b}$. The outlet center line $S_2$ connects center point $P_3$ and the center point $P_4$, and forms an included angle $\gamma_2$ with the vertical line $YL_3$ at the center point $P_3$, where $0° < \gamma_2 < 90°$. The internal outlet is a non-standard elliptical hole that defines a major axis $a_y$ in the Y-axis direction, where $a_y \geq d_0$, $a_y=E_3E_4$, $E_3P_3 \geq P_3E_4$, and defines a minor axis $b_z$ in the Z-axis direction, where $b_z=d_0$. When the outlet passage is a horizontal, straight pipe, the included angle is $\gamma_2$, where $\gamma_2=90°$, $a_y=d_0$. The upper-edge line $S_{2a}$ connects the distal point $E_3$ and the distal point $E_5$, The lower-edge line $S_{2b}$ connects the proximal point $E_4$ and the proximal point $E_6$. The distal point $E_3$ has a height difference $H_1$ with respect to the seal surface, where $H_1=LH_4-LH_3$. When the distal point $E_3$ is higher than the seal surface, $H_1 \geq 0$; otherwise, $H_1 \leq 0$. The internal outlet center point $P_3$ has a height difference $H_3$ with respect to the seal surface, where $H_3=LH_2-LH_3$. When the $P_3$ point is higher than the seal surface, $H_3 \geq 0$; otherwise $H_3 \leq 0$.

A radial gap $B_3$ is located between the outer diameter $d_2$ of the valve plug and the inner diameter $d_3$ of the valve chamber, where $$B_3 = \frac{d_3 - d_2}{2},\ 0.2 \leq \frac{B_3}{d_0} \leq 0.4.$$

When $$\frac{B_3}{d_0}$$

is unduly small, the space in the valve chamber over the valve plug can act as a stagnation space where particle agglutination happens. An annular space $B_2$ is located between the outer diameter $d_1$ of the valve seat and the inner diameter $d_3$ of the valve chamber, where $B_2=(d_3-d_1)/2$, $0.25 \leq B_2/d_0 \leq 0.4$. An inner diameter ratio $d_3/d_0$ is the ratio between the inner diameter $d_3$ of the valve chamber and the diameter $d_0$ of the valve inlet, where $1.75 \leq d_3/d_0 \leq 2.2$. The size of the valve body is in positive correlation with the inner diameter ratio $d_3/d_0$, and the greater the inner diameter ratio $d_3/d_0$ is, the greater the radius of curvature of the fluid is, yet the resulting bulkiness and costs are issues to concern.

For describing the flow channel and how a fluid flowing therein, the term “turn” or “bend” will be used to indicate a change in flowing direction of a streamline S. Hereinafter, streamlines will be described with respect to the three center lines, namely the inlet center line $S_1$, the radial center line $S_{12}$, and the outlet center line $S_2$. Meanwhile, description of cornering angles of these streamlines is made with reference to deducible geometric shapes and further details may be obtained using complex 3D-CFD computing.

The inlet center line $S_1$ may be a single line segment or a combination of different kinds of line segments, such as curved lines, vertical line segments, oblique line segment, horizontal line segment, etc. Therein, the vertical line segment is coaxial with vertical line $YL_1$, and the horizontal line segment is coaxial with channel axis $XL_2$. The inlet center line $S_1$ includes a corner A. On the channel axis $XL_2$ there is a point $P_{12}$, at which one end of the oblique line segment or of the curved line meets the channel axis $XL_2$. The curved line has its one end tangent to the channel axis $XL_2$ at the point $P_{12}$. The combination of line segments is formed through casting or forging, where applicable. If the inlet center line $S_1$ is a single curved line or a single horizontal straight line, injection molding may be alternatively used. On a vertical line $YL_6$ passing through the point $P_{12}$, one point $P_0$ is located so that the line segment $P_0P_{12}$ and the line segment $P_0P_1$ are isometric in length. The included angle $2\theta_1$ included by the line segment $P_0P_{12}$ and the line segment $P_0P_1$ is equal to the corner A. The placement angle $\theta_1$ is equal to the angle of the line segment $P_1P_{12}$ with respect to the horizon. When the point $P_{12}$ and the point $P_2$ coincide with each other, it means that the inlet passage is a single curved line or a single oblique line segment.

In the radial center line $S_{12}$, all streamlines of the fluid coming out from the center hole will flow outward radially in various directions and enter the radial passage. The corner B is a transition from the inlet center line $S_1$ to the radial center line $S_{12}$. All the streamlines will pass through the radial passage and the annular space $B_2$ to make spread C, and, after turns, eventually flow toward the internal outlet. In the radial center line $S_{12}$, the fluid that has passed through the spread C becomes slow after making the corner B due to the increase of the area of the radial passage, and becomes fast again after turning to the internal outlet due to the reduction of the area. The radial center line $S_{12}$ is affected by the relative locations of the seal surface and the internal outlet, and may be a straight line or a curved line or a multi-curve line.

As to the radial center line $S_{12}$, since the fluid is driven by the pressure difference between the valve inlet and the valve outlet, it flows along the radial center line $S_{12}$ and reaches the spread C with rushing stream $S_{121}$ and the tranquil stream $S_{122}$. The high-intensity streamlines receiving the high pressure-difference gradient are the rushing stream $S_{121}$ that flows fast, and the low-intensity streamlines receiving the low pressure-difference gradient are the tranquil stream $S_{122}$ that flows slowly. In the radial center line $S_{12}$, the streamlines fan out at the spread C in circumferential directions, and then, due to the corner B, the rushing stream $S_{121}$ fans out toward the internal outlet, and the tranquil stream $S_{122}$ fans out at circumferential angles other than the fanning out angles of the rushing stream. A part of the rushing stream $S_{121}$ will directly flow into the internal outlet, while the remaining of the rushing stream $S_{121}$ and the tranquil stream $S_{122}$ will roll in the valve chamber as two parts while they enter the internal outlet along the inner wall of the valve chamber. In the radial center line $S_{12}$, before the rushing stream $S_{121}$ and the tranquil stream $S_{122}$ make the spread C and flow into the internal outlet, they make turns at the corner D in different angles, respectively, i.e., the corner D1 for the rushing stream $S_{121}$, and the corner D2 for the tranquil stream $S_{122}$. The rushing stream $S_{121}$ and the tranquil stream $S_{122}$ can suffer from different levels of flow interference depending on the internal structure of the valve chamber, and such flow interference can lead to increased head loss.

The outlet center line $S_2$ may be a single line segment or a combination of different kinds of line segments, such as curved lines, vertical line segments, oblique line segment, horizontal line segment, etc. Therein, the horizontal line segment is coaxial with the channel axis $XL_2$. In the outlet center line $S_2$, the corner D is the transition between the radial center line $S_{12}$ and the outlet center line $S_2$. After making the corner E in the internal outlet and the outlet passage, the fluid flows out the valve outlet. The turn at the corner D causes head loss, and serious head loss will cause flow interference between the rushing stream $S_{121}$ and the tranquil stream $S_{122}$ at the internal outlet. In the outlet center line $S_2$, a point $P_{34}$ on the channel axis $XL_2$ is where one end of an oblique line segment meets the channel axis $XL_2$, or one end of a curved line tangent to the channel axis $XL_2$. Only a curved line and an oblique line segment can have such a corner E. The line segment combination is formed through casting or forging, where applicable. If the outlet center line $S_2$ is a single curved line or horizontal straight line, injection molding is suitable. On a vertical line $YL_5$ passing through the point $P_{34}$, one point $P_5$ is located so that the line segment $P_5P_{34}$ and line segment $P_5P_3$ are isometric in length, and the included angle $2\theta_2$ between the line segment $P_5P_{34}$ and the line segment $P_5P_3$ is equal to the corner E, while the placement angle $\theta_2$ is equal to the angle of the line segment $P_3P_{34}$ with respect to the horizon. Since head loss caused by a curve is always smaller than that caused by an oblique line with a turn, the oblique line segment for a large horizontal elbow angle $\theta_2$ at the point $P_{34}$, thereby adding some head loss and small circumfluence zones. When the point $P_{34}$ and point $P_4$ coincide with each other, it means that the inlet passage is a single curved line or a single oblique line segment.

The corner A is the cornering angle of the inlet center line $S_1$. The fluid flows in from the horizontal valve inlet, and follows the corner A to go upward and enter the center hole. When the corner A is a right angle, the head loss coefficient can be as high as $\xi=1.0$, as discussed in Reference 2, page169, diagram 6-5, Elbow without recess. The right-angle corner A causes a plurality of circumfluence zones N in the inlet passage. Specifically, large circumfluence zones N can form near the center hole and reduce the effective cross-sectional area of the flow channel, leading to significant increase in head loss. When the corner A<90 degrees, the included angle $\gamma_1$>0, and the center hole forms a non-standard ellipsoid in the horizontal seal surface of the valve seat. When the diameter of the center hole is corrected to do, the major axis ax has a reduction ratio of $d_0/a_x$, where $d_0/a_x$<1.0.

The corner B is the cornering angle between the inlet center line $S_1$ and the radial center line $S_{12}$. The fluid flowing upward from the center hole follows the corner B to enter the horizontal radial passage and then flows in the radial direction toward the circumference. In the radial passage, the fluid mainly flows toward the internal outlet. When the included angle $\gamma_1$>0 degree, and the corner B<90°, the effective cross-sectional area of the flow channel decreases and the $C_V$ value reduces. The corner B is influenced by the corner A. Particularly, the large circumfluence zones N existing in the inlet passage will diverge the streamline and thereby change the angle of corner B. corner B. When the seal surface is an obliquely upward conical surface, such as the case where corner B=45°, the radial passage is a conical flow channel. Consequently, the rushing stream $S_{121}$ flows obliquely upward to enter the large valve chamber, and it has to make more turns in the spread C to enter the internal outlet. This causes significant head loss and leads to flow interference in the valve chamber.

The spread C represents distribution and flow variation of the streamlines S when the fluid in the radial center line $S_{12}$ passes through the radial passage and the annular space $B_2$. Its rushing stream $S_{121}$ enters the radial passage through the center hole at the side near the internal outlet and makes fa∩-shaped spread in circumferential directions. The tranquil stream $S_{122}$ flows out from the center hole in the other circumferential directions and enter the radial passage to make fa∩-shaped spread in circumferential directions. The tranquil stream $S_{122}$ splits into two parts in the valve chamber and the two parts make spiral rolling while flowing in counter-circumferential directions along the inner circumferential wall of the valve chamber before entering the internal outlet, respectively. A part of the rushing stream $S_{121}$ flow directly to the internal outlet, and the remaining of the rushing stream $S_{121}$ also splits into two parts that flow toward the internal outlet along the inner circumferential wall of the valve chamber circumference. The rushing stream $S_{121}$ and the tranquil stream $S_{121}$ interfere each other while flowing in the valve chamber, leading to additional head loss. At the spread C, when the corner B is 45° obliquly upward, the rushing stream $S_{121}$ makes multiple turns before entering the internal outlet, also leading to additional head loss. If the inner diameter ratio $d_3/d_0$ is excessively small, the rushing stream $S_{121}$ and the tranquil stream $S_{121}$ interfere each other while flowing in the valve chamber, leading to additional head loss. When the radial passage is horizontal, the linear increase in cross-sectional area of the radial passage and the annular space makes the fluid decelerate slowly, and the fluid is redirected when hitting the inner wall of the valve chamber.

The corner D is the transition between the radial center line $S_{12}$ and the outlet center line $S_2$. Thus, the corner D between the radial center line $S_{12}$ and the outlet center line $S_2$ may be described as$2\theta_2$, where $2\theta_2=90°-\gamma_2$. The streamlines from the spread C make turns as they pass through the radial passage and the annular space. Before entering the internal outlet, the steamlines can make one or several large turns, including the corner D1 for the rushing stream $S_{121}$ and the corner D2 for the tranquil stream $S_{121}$. The corner D1 is the cornering angle between the streamlines of the rushing stream $S_{121}$ and the outlet center line $S_2$ of the internal outlet, including the cornering angle at which the rushing stream $S_{121}$ turns to the internal outlet at the spread C, and the cornering angle at which a part of the rushing stream $S_{121}$ passing directly through the internal outlet flows toward the valve outlet. The corner D2 is the cornering angle between the streamlines of the tranquil stream $S_{122}$ and the outlet center line $S_2$ of the internal outlet, including cornering angle at which the tranquil stream $S_{122}$ turns to the internal outlet at the spread C. As to the corner D, if the outlet center line $S_2$ is an oblique line, the corner D is $\theta_2$. If the outlet center line $S_2$ is a curved line, the corner D=$2\theta_2$. The corner D can cause head loss related to the rushing stream $S_{121}$. As to the corner D, when the included angle $\alpha_1$ included by the rushing stream $S_{121}$ and the outlet center line $S_2$, the included angle $\alpha_2$ included by the tranquil stream $S_{122}$ and the outlet center line $S_2$, and the streamline included angle $\alpha_3$ included by the rushing stream $S_{121}$ and the tranquil stream $S_{122}$, included angle $\alpha_1$, included angle $\alpha_2$, included angle $\alpha_3$ are small, the head loss coefficient $\xi$ is small. The larger the included angle $\alpha_3$ is, the greater the loss related to flow interference between the rushing stream $S_{121}$ and the tranquil stream $S_{122}$ at the internal outlet is. Description about the included angle $\alpha_1$, the included angle $\alpha_2$, and the included angle $\alpha_3$ is herein briefed using a geometric structure as it is difficult to quantify such a 3D streamline structure with exact values. More detailed description will be available with 3D-CFD computing software.

As to the corner D, when the center point $P_3$, the seal surface, and the channel axis $XL_2$ are at the same height and the outlet passage is a horizontal, straight pipe, corner D1=0°. The rushing stream $S_{121}$ enters the internal outlet directly and flows horizontally toward the center point $P_4$. Therein, $H_1$>0, $H_3$=0, $LH_3$=$LH_2$=0. This is Structure C2.

As to the corner D, when the proximal point $E_4$, the seal surface and channel axis $XL_2$ are at the same height and the outlet passage is an obliquely downward bend, and the corner D1=0°. The rushing stream $S_{121}$ enters the internal outlet directly and flows horizontally toward the distal point $P_4$. Therein, $H_1$>0, $H_3$>0, $LH_3$=0, $LH_2$>$LH_3$. This is Structure C1.

As to the corner D, when the proximal point $E_4$ and the seal surface are at the same height and higher than the channel axis $XL_2$, the outlet passage is an obliquely downward bend, and the corner D1=90−$\gamma_2$. therein, $H_1$>0, $H_3$>0, $LH_3$>0, $LH_2$>$LH_3$. This is Structure C3.

As to the corner D, when the partition of the valve body is a ring-shaped ditch, the ring-shaped ditch is located below the annular space and the internal outlet is located on the inner wall of the ring-shaped ditch, the outlet passage is a horizontal, straight pipe. The distal point $E_3$ is lower than the seal surface. The center point $P_3$ and the valve outlet center point $P_4$ are at the same height. The rushing stream $S_{121}$ makes the first turn downward at the corner D1=90° to enter the ring-shaped ditch, and when entering the internal outlet, make the second turn at the corner D1=90° to flow horizontally toward the center point $P_4$. Therein, $H_1$<0, $H_3$<0, $LH_1$>0, $LH_2$=0. This is Structure C4.

The corner E represents where the outlet center line $S_2$ make turns, including the turn the rushing stream $S_{121}$ and the tranquil stream $S_{122}$ make following the corner D1 and the corner D2 to enter the outlet passage, and the turn their mixture makes in the outlet passage before flowing out through the valve outlet. When the fluid entering the internal outlet flows toward the valve outlet, the rushing stream $S_{121}$ and the tranquil stream $S_{122}$ also interfere with each other in the outlet passage and cause some head loss. If the outlet center line $S_2$ is an oblique line, the corner E=$\theta_2$. If the outlet center line $S_2$ is a curved line, the corner E=$2\theta_2$. If the outlet passage is a horizontal, straight pipe, the corner E=0. Since head loss caused by a curve is always smaller than that caused by an oblique line with a turn, the oblique line segment for a large horizontal elbow angle $\theta_2$ at the point $P_{34}$, thereby adding some head loss and small circumfluence zones.

The form of the valve chamber is determined by the location of the seal surface and the form of the partition, and there are four conventional structures, herein defined as Structure C1, Structure C2, Structure C3, and Structure C4. Each of the four structures uses a partition that has a horizontal surface on which a valve seat can be mounted. The flow patterns generated by Structure C1, Structure C2, and Structure C3 can be found in Reference 2, Chapter 9 Flow through pipe fittings and labyrinth seals, Resistance Coefficients of Throttling Devices, Valves, Plugs, and Labyrinth Seals, FIG. 9-1 Flow pattern in throttling and device, (d) globe valve, p. 284. Data mentioned below are proportional estimates made according to these reference drawings.

As to Structure C1, referring to Reference 2, Chapter 9, Flow through pipe fittings and labyrinth seals, Resistance Coefficients of Throttling Devices, Valves, Plugs, and Labyrinth Seals, Diagram9-4, Standard globe valve with dividing wall, Dividing walls at angle 45°, p. 290, the partition around the valve seat is inclined at 45 degrees, and has a large inner diameter ratio $d_3/d_0$, about 2.0, which causes a relative small value of head loss coefficient $\xi$, 4.6. When the proximal point $E_4$, the seal surface, and the channel axis $XL_2$ are at the same height and the outlet passage is an obliquely downward bend, the radial passage is a horizontal flow channel. Therein, $H_1>0$, $H_3>0$, and the included angles $\gamma_1=0°$, and $\gamma_2=45°$. For this structure, metal casting is suitable, while metal forging and plastic injection molding are not applicable.

As to Structure C2, referring to Reference 2, Chapter 9 Flow through pipe fittings and labyrinth seals, Resistance Coefficients of Throttling Devices, Valves, Plugs, and Labyrinth Seals, Diagram9-4, Standard globe valve with dividing wall, Vertical dividing walls, p. 290, the partition around the valve seat is vertical, and has a small inner diameter ratio $d_3/d_0$, about 1.29, which causes a relatively great value of the head loss coefficient $\xi$, 6.9. When the center point $P_3$, the seal surface, and the channel axis $XL_2$ are at the same height, and the outlet passage is a horizontal, straight pipe, the radial passage is a 45-degree conical flow channel. Therein, $LH_3=0$, $H_1>0$, $H_3=0$, and the included angles $\gamma_1=0°$, and $\gamma_2=90°$. For this structure, metal casting is suitable, while metal forging and plastic injection molding are not applicable.

As to Structure C3, referring to Reference 2, Chapter 9 Flow through pipe fittings and labyrinth seals, Resistance Coefficients of Throttling Devices, Valves, Plugs, and Labyrinth Seals, Diagram9-1, Various globe and gate valves, "Rey" type globe valve, p. 287, the partition around the valve seat is ball like, and has an inner diameter ratio $$\frac{d_3}{d_0}$$

of about 2.0. The resulting head loss coefficient $\xi$, $\xi=3.4$ is smaller than that of Structure C1. As the drawing of the "Rey" type globe valve of Reference 2, the proximal point $E_4$, the seal surface, and the channel axis $XL_2$ are at the same height and the outlet passage is an obliquely downward bend, while the radial passage is a horizontal flow channel. Therein, $LH_3=0$, $H_1>0$, $H_3>0$, and the included angles $\gamma_1$, $\gamma_1=45°$, and the included angles $\gamma_2$, $\gamma_2=45°$. For this structure, metal casting is suitable, while metal forging and plastic injection molding are not applicable. Another globe valve that is structured similarly but with is formation limited to metal forging is seen in Reference 2, Chapter 9 Flow through pipe fittings and labyrinth seals, Resistance Coefficients of Throttling Devices, Valves, Plugs, and Labyrinth Seals, Diagram9-1, Various globe and gate valves, Forged globe valve, p. 287. The known globe valve is limited to post-forging processing. Its inlet passage is a straight pipe, and the corner A has two turns, one for going 45-degree obliquely downward and the other for turning upward. Therein, $\gamma_1=0°$. Its outlet passage is an obliquely downward straight pipe. Therein, $\gamma_2=45°$. This leads to a value of the head loss coefficient $\xi$ up to 7.8, which is much higher than that of "Rey" type globe valve.

Structure C4 is as shown in FIG. 1 of Reference 3 (p. 2) and drawings of Reference 7 (p. 42). The valve chamber is internally formed with a ring groove, instead of the partition, for communicating the outlet passage. Both the inlet passage and the outlet passage are straight and extend horizontally. The seal surface is such located that is separated from the channel axis by height difference $LH_3$. The radial passage is a horizontal flow channel. Therein, $LH_3>d_0/2$. In other words, the horizontal location of the seal surface is not lower than the outer rims of the inlet and the outlet. Therein, $H_1<0$, $H_3<0$. At the lower part of the annular space, there is the ring groove having a width $B_2$. The seal surface is locationally higher than the distal point $E_3$ of the internal outlet, so the fluid coming out of the center hole makes a ∩-shaped return. In the conventional Structure C4, the corner A in the inlet passage is a right-angle bend, leading to a relatively great value of the head loss coefficient $\xi$, where $\xi=1.0$, $\gamma_1=0°$, as shown in FIG. 9.2 of Reference 1 (p 207). Structure C4 has a relatively great inner diameter ratio, and has a value of the head loss coefficient $\xi$ about 4.0~6.0, lower than that of Structure C2, while the included angles $\gamma_1=0°$, $\gamma_2=90°$. For this structure, plastic injection molding is suitable. While this flow channel structure is designed for high-cleanness fluid conveyance in the semiconductor industry, undesired condensation can happen when it is used for particle-carrying fluid conveyance. This structure can be made through both metal casting and metal forging.

In Structure C1, Structure C2, and Structure C3, the inlet passage extends horizontally and then turns downward before making a U-turn to go upward. The corner A is of 90 degrees and the flow channel is shaped by the partition structure. The corner A of the inlet center line $S_1$ includes three turning angles. The first corner A is of roughly downward 45 degrees. The second corner A turns to the horizontal direction. The third angle is to make a U-turn and go upward. The third corner A of Structure C3 is a U-turn to go 45-degree upward. In Structure C2, the inlet passage upstream the center hole inlet is affected by the partition so its cross-sectional area reduces sharply, making head loss increase sharply. In Structure C1, the inlet passage includes a large space upstream the center hole, so its head loss is the second largest. In Structure C3, the inlet passage has a constant cross-sectional area and the inlet center line $S_1$ has a smoothly curved profile, so its head loss is the least.

In Structure C2, the internal outlet is located in the upper-half space of the outlet passage. When the rushing stream $S_{121}$ rushes into the internal outlet, significant circumfluence can occur in the lower half of the outlet passage, which lead to considerable head loss and particle agglutination.

As to Structure C1 and Structure C3, when the valve seat is fully open, the fluid passes through corner B and horizontally disembogue in the radial passage. The corner D1 is of 0 degree. The streamlines of the rushing stream $S_{121}$ having the opening $B_1$ converge toward the internal outlet from the spread C, and flow in horizontally along the bottom of the internal outlet bottom. The flow then forms a 45-degree included angle $\alpha_1$ with the outlet center line while flowing toward the valve outlet. Thus, the rushing stream $S_{121}$ will be confined in the area at the bottom of the elliptical major axis that has the same height $B_1$, and additional head loss can be caused. The rushing stream $S_{121}$ and the tranquil stream $S_{122}$ in the valve chamber are combined together without the possibility of separation, and flow interference can happen therebetween. The combination of the two then follows the corner D2 to go obliquely downward at 45 degrees to enter the upper half of the elliptical internal outlet. Therein, $\alpha_2=0°$. The flow interference happening between the rushing stream $S_{121}$ and the tranquil stream $S_{122}$ is strong and of a large angle, $\alpha_3=45°$. The flow combination entering the internal outlet then spread in the outlet passage and follows the corner E before flowing out.

In Structure C1, the corner D of the rushing stream $S_{121}$ is of 0 degree but can cause generation of open stagnation zones in the elbow area at the lower edge of the outlet passage.

In Structure C2, the conical, 45-degree upward, radial passage subjects the rushing stream $S_{121}$ to significant change in cross-sectional area of the flow channel, and leads to huge head loss. The rushing stream $S_{121}$ at the spread C has to corner to enter the upper-half space of internal outlet of the horizontal outlet passage. However, the rushing stream $S_{121}$ can induce open stagnation zones at the lower half of the outlet passage. The tranquil stream $S_{122}$ flows conically in the other circumferential directions of the valve seat. This, plus the unduly small $d_3/d_0$ value, leads to intense flow interference between the rushing stream $S_{121}$ and the tranquil stream $S_{122}$ in the valve chamber. The area of the internal outlet is equal to 50% of the area of the outlet passage, and this brings about loss related to abrupt spread and generation of open stagnation zones that may cause undesired particle agglutination.

In Structure C3, when the valve seat is fully open, the corner B is of 45°, urging the rushing stream $S_{121}$ at the spread C to flow toward the internal outlet. A part of the rushing stream $S_{121}$ spouts horizontally and form a 45-degree included angle $\alpha_1$ with the outlet center line while entering the internal outlet and crossing the outlet passage. Consequently, flow interference between the rushing stream $S_{121}$ and the tranquil stream $S_{122}$ happens at the internal outlet. This can also cause circumfluence in the lower half of the outlet passage. The remaining of the rushing stream $S_{121}$ and the tranquil stream $S_{122}$ roll along the inner wall of the valve chamber. As they are not separated, flow interference also happens therebetween.

In Structure C3, the radial gap ratio $B_3/d_0$ of the valve plug is of about 0.07, making the space of the valve chamber over the valve plug act as a stagnation zone.

In Structure C4, when the valve seat is fully open, the rushing stream $S_{121}$ and the tranquil stream $S_{122}$ upon hitting the inner wall of the valve chamber fan out extensively. Additionally, the fluid after flowing around the valve seat as a whole follows the corner D to make a downward 90-degree turn at the ring-shaped ditch. From the corner B to the corner D, the streamlines make a ∩-shaped turn to enter the ring-shaped ditch and then flow toward the internal outlet. A part of the rushing stream $S_{121}$ and the tranquil stream $S_{122}$ make spiral rolling in the ring-shaped ditch without separation can see flow interference, and flow toward the internal outlet at an angle β along the bevel of the ring-shaped ditch. Afterward, they make the second corner D2 to enter the internal outlet. a part of the rushing stream $S_{121}$ makes the second corner D1 at 90 degrees to proceed horizontally to enter the internal outlet. As a result, circumfluence zones can occur at near the upper edge of the outlet passage at the internal outlet to bring about the risk of particle agglutination. Besides, a part of the rushing stream $S_{121}$ and the tranquil stream $S_{122}$ suffer from serious flow interference at the internal outlet due to the unduly large included angle $\alpha_3$. Then they enter the internal outlet and follow the corner E to proceed at 0 degree before flowing out along the horizontal channel.

It is believed that various configurations and their resulting performance in head loss coefficient ξ of conventional valve chambers have been summarized by the foregoing four structures. Meanwhile, various means for minimizing the head loss coefficient ξ. Therein, the flow channel structure of Structure C3 has disclosed more means and features for minimizing the head loss coefficient ξ, and has been proven effective by the relatively low value of head loss coefficient ξ, 3.4. Nevertheless, the inventor believes there is still room for innovative improvement, and hence devises the present invention.

While seeking for desired innovation, the present invention is designed to meet the following requirements:

- Requirement 1: the valve seat has to provide highly reliable sealing performance.
- Requirement 2: the inlet and the outlet have to be located on the same straight line for easy piping construction.
- Requirement 3: the valve body has to be free of issues about cleanness, and has to eliminate occurrence of any closed stagnation zone, open stagnation zone, residual zone, or circumfluence zone, so as to prevent particle agglutination and liquid residues.
- Requirement 4: the valve body has an inner diameter ratio $1.75 \le d_3/d_0 \le 2.8$.
- Requirement 5: for the improved flow channel of the valve body, the manufacturing method and material selection are specified. This is because the manufacturing method has significant influence on the head loss coefficient ξ of the resulting flow channel. In other words, to fairly prove the improvement achieved by the inventive flow channel, limits from the manufacturing method have to be considered for comparison with the prior-art devices. As the innovation provided by the invention also relies on proper selection of the manufacturing method and material, all these details have to be expounded in description of embodiments.

Explanation of Requirements:

Requirement 1 is a reason why the present invention is applied to a globe valve. While there are so many existing ways to improve the $C_v$ or $K_v$ value, none of them is able to ensure high and reliable performance of sealing. For example, existing pinch valves, weir valves, and butterfly valves are somehow inadequate in terms of sealing reliability. Drawbacks of pinch valves and weir valve are mainly about uneven loading on the diaphragm, and shortcomings of butterfly valves are usually issues about sliding friction between the disc rim and the valve body. With Structure C1, Structure C2, and Structure C3, reliable sealing performance can only be achieved when they are made of metal materials. If they are formed from plastic materials, additional efforts are required for structural reinforcement. Structure C4, on the other hand, has been proven to have reliable sealing performance no matter it is made of plastic or metal.

Requirement 2 is another reason why the present invention is applied to a globe valve. As to manufacturing of valves, the structure that has the inlet and the outlet located on the same straight line is the most favorable option for easy fabrication. Structure C1, Structure C2, Structure C3, and Structure C4 all satisfy this requirement.

Requirement 3 is also a requisite in light of the objective of the present invention. A stagnation space refers to a zone in which an incoming fluid stays still without flowing. The stagnation space can bring about issues about residue-incurred contamination and particle agglutination. The radial gap $B_3$ that is unduly small tends to lead to generation of open stagnation spaces and in turn agglutination of particles. While agglutinated particles will eventually be discharged by the fluid, they have negative impact on downstream procedures. A fluid flowing into a residual zone can still flow but once it stops flowing, some liquid will remain in this region, making subsequent cleaning works much more time- and energy-consuming.

As to Requirement 3, with Structure C3, the horizontal rushing stream $S_{121}$ at the valve seat flows toward the center line of the outlet passage along the bottom near the internal outlet. Thereby, the structure prevents generation of circumfluence zone and thus particle agglutination. The stagnation zone formed over the valve plug, however, can cause residual of the fluid in the inlet passage.

As to Requirement 3, with Structure C4, the horizontal rushing stream $S_{121}$ from the valve seat, after making a 90-degree, downward turn at the ring-shaped ditch, forms a 90-degree included angle with the outlet center line of the outlet passage at the internal outlet. Consequently, circumfluence zones may occur at the inner, upper edge of the outlet passage and lead to particle agglutination. Both the inlet passage and the outlet passage have no issues about liquid residue.

As to Requirement 4, Structure C4 has an inner diameter ratio $1.75 \le d_3/d_0 \le 2.8$. For an injection-molded plastic structure, $1.75 \le d_3/d_0 \le 2.2$ would be a reasonable range. For a precision-casted metal structure that has lining and is subject to a maximum thickness, $2.0 \le d_3/d_0 \le 2.8$ would be a reasonable range. Unlined cast-iron parts or forged parts usually have thickness close to $2.0 \le d_3/d_0 \le 2.8$. the size of a metal structure is a determinant for selection of a way to form the structure. The smaller the size is, the greater the inner diameter ratio is. Both Structure C1 and Structure C3 have a proper inner diameter ratio, 2.0. Structure C2 has an unduly small inner diameter ratio, 1.29, so the resulting head loss is undesirably high. Between structures with inner diameter ratios 1.8 and 2.1, the later can be up to 1.59 times of the former. A well-designed inner diameter ratio helps to keep the valve body compact while still allowing streamlines of the rushing stream $S_{121}$ to fan out desirably to keep head loss of the rushing stream $S_{121}$ low.

As to Requirement 4, the innovative structure of the present invention is superior to the conventional structures for its ability to reach a lower value of the head loss coefficient $\xi$ with the same inner diameter ratio $d_3/d_0$. In an example where $d_0$=52.5 mm, a Preferred Mode achieves a desired range of the head loss coefficient $\xi$, where $1.7 \le \xi \le 3.0$. Reference 4 has disclosed the connection between a high inner diameter ratio and a low head loss coefficient $\xi$ value. Bulkness, however, is an undesirable consequence of such a high inner diameter ratio.

As to Requirement 5, Structure C1, Structure C2, and Structure C3 are typically made of iron, copper, or stainless steel through casting, as plastic injection molding or extrusion and metal forging are not suitable. Whereas, Structure C4 can be made through plastic injection molding or extrusion, or even casting or forging, yet the material and the exact flow channel structure have to be selected specific to the desired structural strength and further explained with reference to relevant embodiments. When Structure C3 is made through metal forging, as discussed in Reference 2, Chapter 9 Flow through pipe fittings and labyrinth seals, Resistance Coefficients of Throttling Devices, Valves, Plugs, and Labyrinth Seals, Diagram 9-1, Various globe and gate valves, Forged globe valve, p. 287, the head loss coefficient $\xi$ can be as high as 7.8. This is because smoothness and radius of curvature of streamlines at the corner B, the spread C, the corner D are limited in this case.

Among the above-indicated five requirements, Requirement 2 can be easily achieved yet adds difficulty in innovation of the flow channel structure. As to the head loss coefficient $\xi$, Structure C3 is the lowest or the best; Structure C1 takes the second place; Structure C4 has mediocre performance; and Structure C2 is inferior to the previous three. Requirement 1 can be easily satisfied with metal valves, but when being implemented using plastic, the obliquely upward-facing center hole requires additional reinforcement at the valve seat. Requirement 3 is difficult to Structure C1, Structure C2, and Structure C3. Structure C4 inherently meets Requirement 3 to a certain extent because it is originally designed for high-cleanness liquid conveyance but needs improvement specific to conveyance of liquid with suspended particles. Requirement 4 is achievable to a valve body of any of the mentioned structures, yet Structure C2 is relatively unfavorable to Requirement 4. Requirement 5 is essential to the present invention, and suitable manufacturing methods have to be specified in all innovative embodiments.

The objective of the present invention is to make innovation of a flow channel in a valve body based on the teaching of Structure C4 by improving its flow channel structure for high-cleanness fluid conveyance, with the aim to achieve an improved range of the head loss coefficient $\xi$, $1.7 \le \xi \le 3.0$ without changing the inner diameter ratio $d_3/d_0$.

In addition to the features for lowering the head loss coefficient $\xi$ disclosed by the four structures described previously, the structure of present invention further improves details of the corner A, the corner B, the spread C, the corner D, and the corner E for smoother streamlines. Particularly, cornering of the streamlines of the rushing stream $S_{121}$ around the spread C and the corner D is most critical. The objective of the invention is achieved when the proposed solutions for smoothening the streamlines satisfy the following goals:

Goal 1: ensuring the streamlines smooth and have desirable radiuses of curvature from the inlet passage through the outlet passage; and Goal 2: narrowing the included angle $\alpha_1$ between the streamlines of the rushing stream $S_{121}$ and the outlet center line, where $\alpha_1=(90-\gamma_2)$, narrowing the included angle $\alpha_2$ between the streamlines of the tranquil stream $S_{122}$ and the outlet center line, and keeping the included angle $\alpha_3$ between streamlines of the rushing stream $S_{121}$ and tranquil stream $S_{122}$ small.

Explanation of Goals:

As to Goal 1, streamlines in the inlet passage and the outlet passage are considered smooth when there are no right angles or small radiuses of curvature along the flow channel, no sharp changes in the cross-sectional area throughout the flow channel, no circumfluence zones formed, and no remaining liquid residue. Structure C1, Structure C2, and Structure C3 all see liquid residue in the inlet passage. Besides, the streamlines of the rushing stream $S_{121}$ from the corner B, the spread C to the corner D shall not be subject to abrupt increase of the cross-sectional area of the flow channel or blockage or sharp turns caused by unduly small inner diameter ratios so as to ensure desired fanning out of the streamlines of the rushing stream $S_{121}$ between the spread C and the corner D, thereby minimizing head loss.

As to Goal 1, with Structure C3, when the inlet center line $S_1$ enters the center hole of the valve seat, the included angle γ1 between the inlet center line $S_1$ and the vertical line $YL_1$ shall remain small or the major-axis reduction ratio $d_0/a_x$ of the center hole and in turn the cross-sectional area of the inlet passage will be unduly small, preventing fluid coming out from the center hole from being well distributed at the corner B in the circumferential directions of the valve seat.

As to Goal 1, while in Structure C2 the rushing stream $S_{121}$ at the spread C flows along the 45-degree corner B, and makes another 45-degree turn at the corner D before flowing toward the internal outlet, its less constant cross-sectional area of the flow channel and unduly small inner diameter ratio lead to considerable head loss. Therein, the 45-degree obliquely upward rushing stream $S_{121}$ at the spread C will face a huge change in the cross-sectional area of the flow channel that causes huge head loss. Besides, the rushing stream $S_{121}$ at the spread C has to immediately make a turn along the corner D and enter the internal outlet 45 degrees before it can enter the upper-half space of the horizontal outlet passage. Moreover, the unduly small inner diameter of the valve chamber can cause the rushing stream $S_{121}$ and the tranquil stream $S_{122}$ to interfere with each other in the valve chamber.

As to Goal 1, in Structure C4, since the inlet passage is a horizontal, straight pipe, and the seal surface of the valve seat is locationally higher than the outer rim of inlet passage, the fluid horizontally coming follows the right-angle path to go upward to the center hole of the valve seat, and this can cause blockage related to circumfluence zones and also cause the radius of curvature of the streamlines to be undesirably small.

As to Goal 1, in Structure C4, the rushing stream $S_{121}$ at the spread C has to make a 90-degree downward turn at the corner D1 to enter the ring-shaped ditch, and then make another 90-degree downward turn at the second corner D1 before it can flow toward the horizontal internal outlet. The repeated turns of the streamlines of the rushing stream $S_{121}$ can cause head loss, and incur concerns about the unduly small radius of curvature of the streamline.

As to Goal 2, reducing the included angle $\alpha_1$ between the streamlines of the rushing stream $S_{121}$ and the outlet center line of the internal outlet can be achieved by making the streamlines of the rushing stream $S_{121}$ follow the corner B to go out of the center hole and pass through the radial passage before making the fa∩-shaped spread C and the corner D successively to finally flow toward the internal outlet, whether by directly flowing into the internal outlet or by making a small-angle turn and then flowing into the internal outlet. In Structure C1 and Structure C3, the corner D1 the rushing stream $S_{121}$ follows is of zero degree. This means that the included angle $\alpha_1$ between the rushing stream $S_{121}$ and the outlet center line $S_2$ is of ≃45°, and the streamlines in the internal outlet can flwo along the outlet center line $S_2$ toward the valve outlet. However, such a large included angle $\alpha_1$ can lead to flow interference and additional head loss.

As to Goal 2, in Structure C2, the rushing stream $S_{121}$ spurts obliquely upward at 45 degrees and then makes several turns along the bends D1 before entering the horizontal internal outlet, and since its corner E is of zero degree, the included angle $\alpha_1$ at the internal outlet is still undesirably large, where $\alpha_1 \simeq 45°$. This plus the sharp change in area between the internal outlet and the outlet passage causes high head loss.

As to Goal 2, although Structure C4 incorporates the ring-shaped ditch, the rushing stream $S_{121}$ makes a 90-degree turn at the corner D1 to flow downward along the axis downward, and then makes the second turn at the corner D1. The included angle $\alpha_1$ between the rushing stream $S_{121}$ and the outlet center line $S_2$ is high as ≃90°.

As to Goal 2, the included angle $\alpha_2$ between the streamlines of the tranquil stream $S_{122}$ and the outlet center line of the internal outlet is desired to be small. The streamlines of the tranquil stream $S_{122}$ coming out from the center hole proceed in circumferential directions other than those the rushing stream $S_{121}$ takes and make spiral rolling as two parts along the inner wall of the valve chamber to flow in counter-circumferential directions before entering the internal outlet. The included angle $\alpha_2$ related to the streamlines of the tranquil stream $S_{122}$ is a three-dimensional angle, which includes factors like turning in circumferential directions and turning obliquely downward while flowing, and thus is difficult to be quantified. Instead, improvement in the included angle $\alpha_2$ can be described using geometric shapes related to the valve chamber.

As to Goal 2, the effect of keeping the included angle $\alpha_3$ between streamlines of the rushing stream $S_{121}$ and tranquil stream $S_{122}$ small is to reduce mixed loss caused by mutual interference between the rushing stream $S_{121}$ and the tranquil stream $S_{122}$ due to their angle difference. In Structure C1 and Structure C3, the rushing stream $S_{121}$ flows toward the valve outlet horizontally, and the tranquil stream $S_{122}$ in the valve chamber follows the 45-degrees corner D and flows obliquely downward along the outlet center line $S_2$ into the internal outlet. The included angle $\alpha_3$ between the rushing stream $S_{121}$ and the tranquil stream $S_{122}$ is of 45°. The two have intensive flow interference at the internal outlet, and strongly mix with each other in the outlet passage, leading to increased head loss.

As to Goal 2, in Structure C2, due to the 45-degree corner B and the undesirably small inner diameter ratio, the rushing stream $S_{121}$ in the valve chamber receive serious interference from the tranquil stream $S_{122}$. Although the rushing stream $S_{121}$ that has made several turns at the corner D in the valve chamber to finally becomes horizontal, the included angle $\alpha_3$ is varying and hard to estimate.

As to Goal 2, while Structure C4 incorporates a ring groove structure to guide the tranquil stream $S_{122}$ to flow along the bevel in order to reduce not only the angle of the second corner D2 but also the included angle $\alpha_2$, since the second corner D1 along which the rushing stream $S_{121}$ flows downward in the Y-axis direction is still of 90 degrees, the included angle $\alpha_1$ remains large. Meanwhile, the tranquil stream $S_{122}$ flows along the bottom bevel of the ring-shaped ditch at an angle β, so there is still a large included angle $\alpha_3$ between the rushing stream $S_{121}$ and the tranquil stream $S_{122}$, where $\alpha_3 \geq 45°$, leading to flow interference and significant increase in head loss.

As discussed previously about Goal 1 and Goal 2, it is desired that none of the inlet center line $S_1$, the radial center line $S_{12}$, and the outlet center line $S_2$ has any large bend, and that each of the corner B, spread C, and corner D guiding the streamlines has to keep a reasonable radius of curvature in order to minimize flow interference happening in the valve chamber between the rushing stream $S_{121}$ and the tranquil stream $S_{122}$ from the spread C. While the corner B is a 90-degree corner, it also leads a 360-degree radial spread that reduces head loss. Both the rushing stream $S_{121}$ and the tranquil stream $S_{122}$ at the corner D shall not cause flow interference at the internal outlet. Therein, the included angle $\alpha_1$, the included angle $\alpha_2$, and the included angle $\alpha_3$ related to the streamlines shall not be unduly large. Among the conventional structures described previously, only Structure C3 creates a flow field that partially meets these requirements, whereas it fails to achieve the innovation objective in terms of head loss. Hence, there is a need for a more advanced, comprehensive scheme to ensure accomplishment of the desired low head loss coefficient $\xi$. In addition to the conventional schemes discussed previously, some relevant literatures and prior-art devices are mentioned herein for reference.

Reference 1

D. S. MILLER (1978). Internal flow system ($2^{nd}$ ed.), TREX-130713.0001, BHRA.

Reference 2

Erwin Fried and I. E. Idelchik (1989). Flow Resistance: A Design Guide for Engineers, ISBN: 0-89116-435-9, Hemisphere Publishing Corporation.

Reference 3

SEMI F99-Dimensional Specification of a Diaphragm Valve for a Metric PFA Pipe (2005). EMI.

Reference 4

SWAGELOK (2021). Ultrahigh-Purity Fluoropolymer Diaphragm Valves, MS-02-171, RevI, March 2021. In page 5 of catalog discussing Flow Data Flow Coefficients, a chart titled Fine Thread Flare End Connections is provided for exemplification. Therein, a 1" valve has a Cv value of 3.6 with a medium-size 2-way valve body, or of 10.2 with a large-size 2-way valve body, and a ½" valve has a Cv value of 0.8 with a small-size 2-way valve body, or 2.6 with a medium-size 2-way valve body. The data demonstrate that the inner diameter ratio $$\frac{d_3}{d_0}$$

of thevalve body is in positive correlation with the Cv value. The greater the inner diameter ratio $$\frac{d_3}{d_0}$$

is, the greater the radius of curvature of the valve chamber space is, and the higher the Cv value related to streamlines is. However, for an inner diameter ratio $$\frac{d_3}{d_0} > 2.5,$$

the size of the valve body may be undesirably large. To state differently, the head loss coefficient $\xi$ and the inner diameter ratio $$\frac{d_3}{d_0}$$

between the inner diameter $d_3$ of the valve chamber and the inner diameter $d_0$ of the center hole are in inverse relationship. The greater the inner diameter ratio $$\frac{d_3}{d_0}$$

is, the lower the head loss coefficient $\xi$ is. The smaller the inner diameter ratio $$\frac{d_3}{d_0}$$

is, the higher head loss coefficient $\xi$ is. Briefly, an unduly small inner diameter ratio $$\frac{d_3}{d_0}$$

will generate an unduly great value of the head loss diameter ratio coefficient $\xi$.

Reference 5

GF Piping Systems—Industrial Piping Systems (2020). handbediende-membraanafsluiters-type-514.pdf, page 3, Table Kv 100 values (flow characteristics) Type 514-517. therein, DN50 has an actual inner diameter of 57 mm and has Cv value is of 116 cmh, and the head loss coefficient $\xi$ of 1.7.

Reference 6

CKD-Weir Diaphragm Valve SWD/MWD Series Catalog CC-1096T 8 (2022), page 1, Specification Sheet for Pneumatic weir diaphragm valves, SWD Series. The product modeled SWD5·X-50 has a Cv value of 50, and a diameter of 47.8 mm, and the head loss coefficient $\xi$ is 4.47.

Reference 7

Bueno Catalog from Bueno Technology Co., Ltd. (2024)/ Flow control, KH200, page 57. All the flow channel structures shown are of the type of Structure C4, including KH200-19P, diameter: 16 mm, inner diameter ratio: 2.09, Cv: 4.5, head loss coefficient $\xi$: 5.18; KH200-25P, diameter: 22 mm, inner diameter ratio: 1.88, Cv: 9.1, head loss coefficient $\xi$: 6.04; and KH200-40P, diameter: 33.7 mm, inner diameter ratio: 1.87, Cv: 0.9, head loss coefficient $\xi$: 6.30.

Prior Art 1

A valve of U.S. Pat. No. 606,867(A) issued in1989, as shown in FIG. 1 of the issued patent, has a structure similar to Structure C2, and thus has the same weakness about the flow channel. Therein, the corner B is of 90 degrees, and the horizontal rushing stream $S_{121}$ flows toward the axis of the outlet passage. The corner D and the corner E of the rushing stream $S_{121}$ are both of 0 degree, but the small radial width ratio $$\frac{B_2}{d_0}$$

and radial gap ratio $$\frac{B_3}{d_0}$$

force streamlines from the spread C to make numerous turns in the radial passage, leading to flow interference between the rushing stream $S_{121}$ and the tranquil stream $S_{122}$ in the valve chamber and causing high head loss. The shortcomings prevent the know structure from accomplishing Goal 1 and Goal 2. The radial gap ratio $$\frac{B_3}{d_0}$$

between the outer diameter of the valve plug and the inner diameter of the valve chamber is of about 0.025, and this turns the valve chamber space over the valve plug a stagnation zone. The inner diameter ratio $$\frac{d_3}{d_0}$$

of about 1.67 is unfavorable to reduction of head loss. This prior-art device may be manufactured through casting, whereas plastic injection molding and metal forging are not applicable.

To sum up, this prior-art device fails to meet Goal 1 and Goal 2, and also fails to meet Requirement 3 and Requirement 4. For Requirement 5, the prior-art device may be competent if a proper casting method is detailed. However, the head loss coefficient $\xi$ about the same as Structure C2 still prevents the prior-art device from meeting the innovation objective.

Prior Art 2

A valve of U.S. Pat. No. 1,647,823A issued in 1927, as shown in FIG. 1 of the issued patent, meets Requirement 1 and Requirement 2, but fails to meet Requirement 3. This prior-art structure is similar to Structure C4, but its inner diameter ratio $$\frac{d_3}{d_0}$$

of about 1.71 is slightly smaller than that of Requirement 4, resulting in slightly increased head loss. The corner A of the inlet passage is of 90° and extends into the valve chamber as an independent corner structure. As the radial gap ratio $$\frac{B_3}{d_0}$$

of the valve plug is of about 0.24, it is unlikely that a stagnation space can generate to cause particle agglutination. The relatively small radial width ratio $$\frac{B_2}{d_0},$$

which is of about 0.268, can only provide the streamlines from the spread C with turns having even smaller radiuses of curvature. The annular space and the space at the bottom of the valve chamber are communicated with each other. Consequently, an open stagnation zone can form in the space near the lower side of the independent corner at the bottom of the valve chamber, preventing the structure from meeting Requirement 3.

As to Goal 1, the inlet passage of this structure is a corner that has a constant cross-sectional area, and the corner A is of 90° while the radius of curvature of the streamlines is good. The outlet passage is a straight pipe that also has a constant cross-sectional area, and the corner B is of 90° while the radius of curvature of the streamlines is small. The streamlines of the rushing stream $S_{121}$ at the spread C of the radial passage tend to gather up at the side of the internal outlet. The streamlines from the spread C when hitting the inner wall of the valve chamber make the a downward 90-degree turn, the corner D, to enter the annular space. The streamlines of the tranquil stream $S_{122}$ after passing through the corner D2 flow downward along the bottom bevel of the ring-shaped ditch to proceed toward the internal outlet, and make the second corner D2 that is of about 30° to flow into the internal outlet. The rushing stream $S_{121}$ when passing through the distal point $E_3$ has to make a 90° turn at the second corner D1 to enter the internal outlet. The outlet passage is a horizontal, straight pipe, and the corner E is of 0°. However, the second corner D1 of the rushing stream $S_{121}$ can cause a circumfluence zone formed in the upper-edge space of the outlet passage. The tranquil stream $S_{122}$ flowing obliquely downward can cause an open stagnation zone to occur at the bottom of the valve chamber and form separation flow when passing through the independent bend.

As to Goal 2, since the streamlines of the rushing stream $S_{121}$ make a 90° downward turn at the second corner D to enter the internal outlet, and the included angle between the tranquil stream $S_{122}$ and the outlet center line is of about 30°. Although the outlet passage is a straight pipe so the corner E is of 0 degree, the included angle between the rushing stream $S_{121}$ and the tranquil stream $S_{122}$ is large. This can cause flow interference at the internal outlet, and leads to circumfluence zone and mixed spread in the outlet passage, further adding head loss.

To sum up, this prior-art device fails to meet Goal 1 and Goal 2, and fails to meet Requirement 3 and Requirement 4. Moreover, the head loss coefficient $\xi$ about the same as Structure C4 still prevents the prior-art device from meeting the innovation objective.

Prior Art 3

A diaphragm valve of U.S. Pat. No. 2,381,544A issued in 1945, as shown in FIG. 1 of the patent document, meets Requirement 2 and Requirement 4, but fails to meet Requirement 3. This prior-art structure is similar to Structure C4 for having the cylindrical valve chamber space, yet it employs a diaphragm for direct sealing instead of using a valve plug. the diaphragm provides good sealing performance and eliminates the risk of generating a stagnation space that causes particle agglutination. However, as the diaphragm is designed to bear pressure directly and thus is subject to relatively short service life, it is not ideal in light of Requirement 1. The known structure has an inner diameter ratio $$\frac{d_3}{d_0}$$

of about 1.91, and therefore meets Requirement 4. The corner A of the inlet passage is of 90° and extends into the valve chamber as an independent bend. The radial width ratio $$\frac{B_2}{d_0}$$

is of about 0.31, which is believed to provide the streamlines from the spread C with better cornering. Because the diaphragm centrally has a conical part, when it is fully open, the periphery forms a concave ring. The distal point $E_3$ of the internal outlet is lower than the seal surface of the valve seat. Thereby, a ∩-shaped guiding flow channel with gentle turns is formed in the valve chamber, so that the rushing stream $S_{121}$ and the tranquil stream $S_{122}$ smoothly make the first corner D1 and corner D2 to go downward to enter the ring-shaped ditch, and interfere with each other in the ring-shaped ditch. The rushing stream $S_{121}$ when passing through the distal point $E_3$ needs to make its second corner D1 at an angle of 90° so that it can enter the internal outlet. The outlet passage is a horizontal, straight pipe, and the corner E is of 0°. However, the second corner D1 of the rushing stream $S_{121}$ can cause a circumfluence zone to occur in the upper-edge space of the outlet passage.

As to Goal 1, the inlet passage is a corner that turns upward from the horizontal direction, and it has a relatively constant cross-sectional area. The outlet passage is also structured as a horizontal, straight pipe. The bottom of ring-shaped ditch is formed as a curved surface. The corner B, the spread C, and the corner D are all achieved by the conical structure and the concave ring guiding the fluid to conduct a gentle, ∩-shaped turn. This significantly improves the radius of curvature, and thus allows the fluid to make the first corner D as the gentle, ∩-shaped turn to flow downward into the ring-shaped ditch. The rushing stream $S_{121}$ and the tranquil stream $S_{122}$ therefore will not interfere with each other in the valve chamber. Besides, the tranquil stream $S_{122}$ when passing through the independent corner can cause separation flow outside the bottom of the valve seat and thereby form an open stagnation zone.

As to Goal 2, the rushing stream $S_{121}$ has to make the 90° corner D1 before entering the internal outlet, and the tranquil stream $S_{122}$ makes the corner D, which is of about 30°, at the internal outlet. although the outlet passage is a horizontal, straight pipe and the corner E is of 0 degree, the rushing stream $S_{121}$ and the tranquil stream $S_{122}$ can still suffer from flow interference due to the large included angle therebetween, and after they enter the horizontal internal outlet, their intermixture can lead to head loss.

To sum up, this prior-art device fails to meet Goal 1 and Goal 2, and also fails to meet Requirement 1 and Requirement 3. Moreover, the head loss coefficient about the same as Structure C4 still prevents the prior-art device from meeting the innovation objective.

Prior Art 4

A diaphragm valve of U.S. Pat. No. 2,638,307 issued in 1953, as shown in FIG. 1 of the patent document, meets Requirement 1, Requirement 2, and Requirement 4, but fails to meet Requirement 3. This prior-art structure is similar to Structure C4 for having the cylindrical valve chamber space, and it has a diaphragm and a valve plug that includes a ball-like curved surface. The diaphragm has good sealing performance, but the narrow space over the valve plug and the small radial gap ratio $$\frac{B_3}{d_0} \leq 0.125$$

can form stagnation space in which agglutination of particles tends to happen. The inner diameter ratio $$\frac{d_3}{d_0}$$

is of about 1.85 and thus satisfies Requirement 4. The corner A at the inlet passage is of 90 degrees, which is a right angle. The radial width ratio $$\frac{B_2}{d_0}$$

is of about 0.25, which is too small to make the streamlines from the spread C make turns smoothly. When it is fully open, the fluid flows out along the ball-like curved surface and follows the 45° corner B to form the conical spread C. The ring-shaped ditch has a downward oblique bevel and encircles the valve seat. The ring-shaped ditch is further connected to the bottom periphery of the valve seat and communicated with the internal outlet. The distal point $E_3$ of the internal outlet is higher than the seal surface of the valve seat, and the upper edge of the outlet passage is formed as a 45-degree oblique line segment. Moreover, the lower edge point $E_4$ of the internal outlet and the lower-edge point $E_6$ of the valve outlet are at the same level so that the internal outlet has a long major axis $a_y$. The main streamline of the rushing stream $S_{121}$ when hitting the inner wall of the valve chamber passes through the multi-turn corner D1 to finally flow into the 45° obliquely downward internal outlet and enter the upper-edge space of the outlet passage. The tranquil stream $S_{122}$ when hitting the inner wall of the valve chamber passes through the multi-turn corner D2 and turn downward at 90° to enter the ring-shaped ditch. The 45° conical spread C will cause flow interference between the rushing stream $S_{121}$ and the tranquil stream $S_{122}$ in the valve chamber.

The prior-art structure meets Requirement 1, Requirement 2, and Requirement 4, but when it is manufactured through injection molding, a sliding block has to be made for the internal outlet and causes additional costs.

As to Goal 1, the inlet passage is a right-angle bend, and has a constant cross-sectional area. However, the right-angle corner A brings about additional head loss. The outlet passage is a horizontal, straight pipe, and the bevel of the ring-shaped ditch is oblique at an angle β. The corner B is of 45 degrees, and significantly improves the radius of curvature. Since the proximal point $E_4$ of the internal outlet and the proximal point $E_6$ of the valve outlet are at the same level, the tranquil stream $S_{122}$ when departing from the angle $\beta$ has to make the second corner D2 to turn to the horizontal direction so that it can flow into the internal outlet. Consequently, the tranquil stream $S_{122}$ when passing through the periphery of the valve seat can cause separation flow at the bottom periphery of the valve seat. This can lead to generation of an open stagnation zone and also increase head loss.

As to Goal 2, the rushing stream $S_{121}$ when flowing obliquely downward along the ring-shaped ditch forms a 45-degree included angle with the outlet center line and has to make a 45-degree turn at the corner E before it can flow out horizontally. The tranquil stream $S_{122}$ also flows obliquely downward along the ring-shaped ditch to make a turn that is about 30 degrees at the corner D so as to enter the lower-half space of the internal outlet. However, a circumfluence zone can be formed at the proximal point $E_4$. The included angle between the rushing stream $S_{121}$ and the tranquil stream $S_{122}$ is relatively small and will not cause serious flow interference at the internal outlet, but the two can intermix in the outlet passage due to the corner E and cause more head loss.

To sum up, this prior-art device fails to meet Goal 1 and Goal 2, and also fails to meet Requirement 3. While it does make improvement in the head loss coefficient $\xi$ over Structure C4, this prior-art device still fails to accomplish the innovation objective.

Prior Art 5

A plastic control valve of US Patent, U.S. Pat. No. 5,002,086A issued in 1991, according to FIG. 1 of the patent document, meets Requirement 1 and Requirement 2. Nevertheless, its horizontal outlet passage can lead to formation of a circumfluence zone at the upper edge of the outlet passage of the internal outlet and cause particle agglutination, making the known valve fail to meet Requirement 3. The unduly high inner diameter ratio can significantly increase the volume of the valve, preventing it from meeting Requirement 4. This prior-art structure is similar to Structure C4. Its outlet passage and inlet passage are both horizontal, straight pipes. The prior-art device has its valve chamber space cylindrical in shape and has a diaphragm including a valve plug. The diaphragm has good sealing performance, and the cylindrical valve plug has the radial gap ratio $$\frac{B_3}{d_0}$$

of about 0.53, which prevents generation of any stagnation space and resultant particle agglutination. The inner diameter ratio $$\frac{d_3}{d_0}$$

of about 2.56, how ever, does not meet Requirement 4, and the undesirably high inner diameter ratio $$\frac{d_3}{d_0}$$

can led to bulkiness. The inlet passage corner A is of 90 degrees and forms the right angle, which leads to increased head loss. The radial width ratio $$\frac{B_2}{d_0}$$

is of about 0.44. The large ratio ensures that the streamline at the spread C has a reasonable radius of curvature and is allowed to corner properly. When the valve is open, the fluid follows the profile of the bottom of the valve plug to make the corner B, and flows out with the shape of spread C, i.e., a 45-degree conical shape. The bottom of the ring-shaped ditch is formed as an obliquely downward bevel. The bevel encircles the periphery of the valve seat and extends onto the undesirably internal outlet by crossing the bottom of the periphery of the valve seat. This prior-art devices solves the problem of particle agglutination due to a short bevel of the ring-shaped ditch that causes a circumfluence zone to form at the bottom of the periphery of the valve seat. However, the main streamlines of the rushing stream $S_{121}$ when flowing out from the spread C at a 45-degree conical angle has to make a larger corner D1 with an angle of ≥90° before it can go downward and enter the ring-shaped ditch. It is difficult to directly make a ∩-shaped turn and enter the ring-shaped ditch smoothly. The tranquil stream $S_{122}$ will become two streams of horizontally rolling fluid when flowing along the inner circumferential wall of the valve chamber. The streams then need to make the corner D2 at an angle of ≥90° before they can go downward and enter the ring-shaped ditch to flow along the bottom of the bevel at its angle $\beta$. The rushing stream $S_{121}$ and the tranquil stream $S_{122}$ in the valve chamber interfere with each other. This plus the unduly large angle of the corner D can significantly limit the flow rate of the rushing stream $S_{121}$.

As to Goal 1, the inlet passage is a right-angle corner that has a constant cross-sectional area. However, the 90-degree, right-angle corner A brings about additional head loss. The corner B is of 45 degrees so that the rushing stream $S_{121}$ and the tranquil stream $S_{122}$ both have to make the large first corner D1 and the corner D2 each at an angle of ≥90° before they can flow downward. The rushing stream $S_{121}$ when passing through the distal point $E_3$ needs to make its second corner D1 at an angle of 90° so that it can enter the internal outlet. The outlet passage is a horizontal, straight pipe, and the corner E is of 0°. However, the second corner D1 of the rushing stream $S_{121}$ can cause a circumfluence zone to occur in the upper-edge space of the outlet passage. The tranquil stream $S_{122}$ at the internal outlet has to make a turn of about 45° at the second corner D2 before it can enter the outlet passage. The tranquil stream $S_{122}$ when crossing the periphery of the valve seat flows along the obliquely downward extending bottom so it enters the internal outlet without causing any separation flow and any open stagnation zone.

As to Goal 2, the rushing stream $S_{121}$ flows obliquely downward along the ring-shaped ditch and departs from the outlet center line by 90 degrees, so it has to make the second corner D1 at an angle of 90°. The tranquil stream $S_{122}$ also flows obliquely downward along the ring-shaped ditch and departs from the outlet center line by about 45°. The tranquil stream $S_{122}$ thus turns of about 45° at the second corner D2. The unduly large included angle between the rushing stream $S_{121}$ and the tranquil stream $S_{122}$ causes flow interference at the internal outlet, leading to increased head loss.

As discussed previously, this prior-art device fails to meet Goal 1 and Goal 2, and also fails to meet Requirement 3 and Requirement 4. The head loss coefficient $\xi$ similar to that of Structure C4 is still unable to fulfill the innovation objective. Another C4-like prior-art device has been disclosed in a 2023 US Patent, U.S. Pat. No. 11,585,460B2, titled Diaphragm Valve Structure. It meets Requirement 1, Requirement 2, and Requirement 4. Since the obliquely downward extending bottom is also connected to the internal outlet directly, it helps reduce the convergence area in the horizontal outlet passage. The inner diameter ratio meets Requirement 4. While it contains some improvements in the right-angle structure of the inlet passage, the effect is trifling, leaving the problem of particle agglutination at the outlet passage of the internal outlet unsolved. Moreover, the head loss coefficient $\xi$ about the same as Structure C4 still prevents the prior-art device from meeting the innovation objective.

Prior Art 6

A 1991 China Patent, CN2083665U, titled Anti Corrosion Stop Valve, p. 5, meets Requirement 1 and Requirement 2. However, with the unduly low inner diameter ratio, it fails to meet Requirement 4. This prior-art device structure is a casted metal valve having anti-corrosion lining. Similar to Structure C3, it has a cylindrical valve chamber and is equipped with a valve plug and a diaphragm. The diaphragm has good sealing performance and shaped as a barrel. The radial gap ratio $$\frac{B_3}{d_0}$$

of the inner diameter of the valve chamber is of about 0.092, and is likely to bring about a stagnation space that leads to particle agglutination. The cylindrical valve plug has a radial gap ratio $$\frac{B_3}{d_0}$$

of about 0.13. It will not cause a stagnation space that can lead to particle agglutination. The inner diameter ratio $$\frac{d_3}{d_0}$$

or about 1.47 fails to meet Requirement 4. The unduly low inner diameter ratio $$\frac{d_3}{d_0}$$

will increase head loss. The inlet passage area is consistent and has a 90-degree corner A to form a curved channel. The valve plug has a bottom formed with a conical surface so that the corner B, which is of about 45 degrees, can form the spread C shaping conical streamlines. It is difficult for the main streamline of the rushing stream $S_{121}$ flows out from the spread C at the angle of 45 degrees to flow along the outlet center line of the outlet passage that extends obliquely downward at an angle of 60 degrees. As a result, the rushing stream $S_{121}$ enters the upper-half space of the internal outlet with a large radius of curvature and flows along the upper edge of the outlet passage. The tranquil stream $S_{122}$ rolls in cylindrical space of the valve chamber and then makes a turn at the corner D to enter the internal outlet.

As to Goal 1, the inlet passage has a consistent cross-sectional area and is curved. The outlet passage extends obliquely downward from the valve chamber and turns to the horizontal outlet. It has a consistent cross-sectional area. The corner B, the spread C, and the corner D are all limited to unduly small inner diameter ratios, leading to increased head loss. The rushing stream $S_{121}$ and the tranquil stream $S_{122}$ both need to flow across the conical spread C and are confined in the narrow valve chamber, so they are both subject to flow interference.

As to Goal 2, the rushing stream $S_{121}$ after making a turn at the corner D enters the upper-half space of the internal outlet to flow along the upper edge of the outlet passage. The tranquil stream $S_{122}$ rolls in the cylindrical space of the valve chamber and turns at the corner D to enter the internal outlet. The rushing stream $S_{121}$ and the tranquil stream $S_{122}$ have flow interference in the upper-edge space of the internal outlet that causes head loss.

To sum up, this prior-art device fails to meet Goal 1 and Goal 2 and also fails to meet Requirement 3 and Requirement 4. Its head loss coefficient $\xi$ is superior to Structure C3 but still fails to meet the innovation objective. Moreover, the head loss coefficient $\xi$ about the same as Structure C4 still prevents the prior-art device from meeting the innovation objective.

Prior Art 7

A 1991 US Patent, U.S. Pat. No. 5,083,750A, titled Membrane valve, as shown in its FIG. 1, meets Requirement 1 and Requirement 2, but the unduly high inner diameter ratio makes it fail to meet Requirement 4. This prior-art structure has an oblate elliptical valve chamber, which is sealed by a diaphragm of its valve plug. The valve plug has a radial gap ratio $$\frac{B_3}{d_0}$$

of about 3.57, which will not cause a stagnation space and resulting particle agglutination. The unduly large inner diameter ratio $$\frac{d_3}{d_0}$$

that is of about 4.88 does not meet Requirement 4. The high inner diameter ratio $$\frac{d_3}{d_0}$$

allows that the inlet passage and the outlet passage to be located on the plane of the partition and has low head loss. The inlet passage and the outlet passage are both have consistent sectional area and formed as curved channels, with the corner A and the corner E both being of 90 degrees. The valve plug has its bottom formed with a conical surface so that the corner B that is of about 45 degrees can form the spread C shaping conical streamlines. The rushing stream $S_{121}$ flows out from the spread C at 45 degrees and turns downward to enter the outlet passage. The rushing stream $S_{121}$ has a main streamline that makes a $\cap$-shaped turn to enter the internal outlet, but the remaining, fanned-out part has to flow further in the circumferential, horizontal direction before it can enter the internal outlet. These many turns lead to large head loss. The tranquil stream $S_{122}$ flows along other circumferential angles as a 45-degree conical streamline to enter the oblate elliptical valve chamber. The tranquil stream $S_{122}$ then splits into two parts to roll along the inner periphery of the valve chamber and flow downward in the circumferential, horizontal direction to enter the internal outlet. These many turns also lead to large head loss. The unduly large inner diameter ratio $$\frac{d_3}{d_0}$$

decrease the flow rate of the rolling tranquil stream $S_{122}$ and cause an open stagnation zone to form at the corner formed between the inner wall of the valve chamber and the partition, making it fail to meet Requirement 3.

As to Goal 1, since the streamline performs significant turns at the corner A and the corner B, the rushing stream $S_{121}$ and the tranquil stream $S_{122}$ have flow interference when flowing through the valve chamber in the circumferential, horizontal direction. The corner B, the spread C, and the corner D cannot be smooth.

As to Goal 2, the rushing stream $S_{121}$ has its main streamline flowing obliquely upward as a conical streamline at the 45-degree corner B, and then making a ∩-shaped turn to go downward and enter the internal outlet. From the corner B to the internal outlet, it has to turn for 135 degrees, and eventually becomes 0 degree with respect to the outlet center line at the internal outlet. At last, at the internal outlet, it generates flow interference with the tranquil stream $S_{122}$ flowing in the circumferential, horizontal direction.

To sum up, this prior-art device has a large inner diameter ratio $$\frac{d_3}{d_0}$$

and fails to meet the innovation objective. The flow interference as discussed with respect to Goal 1 and Goal 2 makes it obviously fail to meet the requirements.

Prior Art 8

A 2004 US Patent, U.S. Pat. No. 6,672,561B2, has disclosed a piston diaphragm with an integral seal. This known device meets Requirement 1, Requirement 2 and Requirement 3, but the unduly high inner diameter ratio prevents it from meeting Requirement 4. This prior-art structure may be regarded as a derivative of Structure C4 and has a valve chamber defining therein a bowl-shaped space. It has an outlet passage formed as a flow channel extending obliquely downward, which helps prevent particle agglutination as seen in Structure C4. The valve is sealed by the diaphragm in its valve plug. The unduly large inner diameter ratio $$\frac{d_3}{d_0}$$

of about 3.4 does not meet Requirement 4. The bowl-shaped space in the valve chamber is large enough to prevent generation of any stagnation space and consequent particle agglutination. The seal surface of the valve seat is located at the horizontal bottom surface of the valve chamber. The inlet passage has a constant diameter, and it extends horizontally from one side of the valve body and make a right-angle turn of 90 degrees at the corner A to go upward to enter the conical center hole. The outlet passage obliquely downward extends from the valve chamber at an angle of about 45 degrees and then makes a turn to go out at the other side as a horizontal, straight pipe. The internal outlet of the outlet passage is conical and has an opening whose lower rim is located in the horizontal bottom surface of the valve chamber. The cross-section of the complete internal outlet is in a vertical, oval shape. The constant-diameter horizontal piping of the outlet passage is connected to the conical pipe. When the valve is open, the fluid turns for about 90 degrees along the corner B at the center hole to enter the bowl-shaped radial passage. The rushing stream $S_{121}$ flows across the spread C at the bowl-shaped inner surface to go toward the internal outlet. The rushing stream $S_{121}$ turns about 45 degrees along the corner D at the internal inlet to enter the conical flow channel. The rushing stream $S_{121}$ after entering the outlet passage turns for about 45 degrees along the corner E and flows out through the horizontal, straight pipe. The tranquil stream $S_{122}$ flows in the remaining circumferential direction across the bowl-shaped inner surface to enter the valve chamber, where it makes spiral rolling along the bowl-shaped inner surface to go forward in the horizontal, circular direction. At last, its streamlines converge and make a turn at an angle of about 45 degrees along the corner D to flow obliquely downward into the internal outlet. The tranquil stream $S_{122}$ after entering the outlet passage makes a turn about 45 degrees corner E, so as to flow out through the horizontal, straight pipe.

As to Goal 1, since the corner A is of a right angle that increases head loss, the conical bevel of the center hole helps reduce head loss using the approximately 80-degree corner B. The fluid flows across the spread C along the bowl-shaped inner surface of the valve chamber with a high radius of curvature. This facilitates the rushing stream $S_{121}$ and the tranquil stream $S_{122}$ performing the corner D. Most of the rushing stream $S_{121}$ flows along the horizontal surface to enter the lower-half space of the elliptical internal outlet. The tranquil stream $S_{122}$ splits into two streams that perform spiral rolling along the bowl-shaped inner surface of the valve chamber and then flow obliquely downward along the 45-degree corner D to enter the upper-half space of the elliptical internal outlet.

As to Goal 2, after the rushing stream $S_{121}$ and the tranquil stream $S_{122}$ make a turn at the corner D, the rushing stream $S_{121}$ and the outlet center line include an angle of 45 degrees. The tranquil stream $S_{122}$ is parallel to the outlet center line, and the rushing stream $S_{121}$ and the tranquil stream $S_{122}$ have flow interference in the conical flow channel of the internal outlet, making it impossible to reduce head loss significantly.

To sum up, this prior-art device fails to meet Goal 1 and Goal 2, and also fails to meet Requirement 4.

Prior Art 9

A 2012 US Patent Application, US2012056120A1, has disclosed a diaphragm valve. The prior-art device fails to meet Requirement 1, Requirement 2, and Requirement 3. Its structure is different from globe valves. This prior-art device has an oval flow channel in the sealing weir. The major axis $a_Z$ of the flow channel has a length approximate to $2a_0$ so as to maintain the inlet passage area and the outlet passage area constant, making it possible to meet Requirement 4 according to practical needs. As to Requirement 5, the specification of the prior application provides nothing about how the device is made, but the related maker has produced the product through injection molding. As described in Reference 5, the device may alternatively made using casting, but forging is not applicable. This prior-art structure is a weir valve. Its sealing weir has an oval seal surface in the Z axis, so the diaphragm can only perform linear press sealing in the Z-axis direction. It is unable to seal a round hole with even deformation along the circular sealing line under pressure, making the sealing quality less reliable. Thus, the known device fails to meet Requirement 1. The two sides of the sealing weir are connected to the inlet passage and the outlet passage. The lower curved surfaces of the two passages are horizontally connected to each other directly at the weir. The inlet passage and the outlet passage both turn from the horizontal direction to get connected to the sealing weir in an obliquely upward direction. The cross-sections of the two passages are both isometric in area. When fluid flows therein, the radiuses of curvature of streamlines are reasonable. Besides, the flow channel formed on the weir is smooth. therefore, the only points to consider are the corner A and the corner E. When the diaphragm opens, a concave flow channel formed at the weir can satisfy the requirements of the corner B, the spread C, and the corner D completely. Streamlines in these parts have smooth turns, making the overall head loss quite low. This prior-art device is different from other globe valves as there is no fluid flowing in the valve chamber. In other words, the fluid only flows in the channels and passages formed by the diaphragm, making Requirement 4 irrelevant. In addition, the known deceive has very a smooth flow channel with constant cross-sections, and it achieves the lowest possible head loss coefficient ξ, making it well satisfy Goal 1 and Goal 2.

As to Goal 1, the round cross-section at the valve inlet gradually changes by expanding in the Z-axis direction and contracting in the Y-axis direction as the channel extends obliquely upward to become oblate elliptical at the weir. Afterward, it changes by contracting in the Z-axis direction and become round when it arrives at the valve outlet. In the process, the cross-section area of the flow channel remains constant, thereby ensuring smooth flow when fluid flows from the corner A, the corner B, the spread C, corner D to the corner E.

As to Goal 2, the rushing stream $S_{121}$ and the tranquil stream $S_{122}$ are in the same flow channel. The rushing stream $S_{121}$ fans out in the inlet passage, and starts to contract when it passes through the oblate elliptical part of the weir. This makes the rushing stream $S_{121}$ flows coaxially with the outlet center line. Like the rushing stream $S_{121}$, the tranquil stream $S_{122}$ also fans out in the inlet passage but this happens at the outer side of the rushing stream $S_{121}$. Similarly, it starts to contract when passing through the oblate elliptical part of the weir. This makes the tranquil stream $S_{122}$ flows almost coaxially with the outlet center line. As a result, the rushing stream $S_{121}$, the tranquil stream $S_{122}$, and their mixture all have low head loss.

To sum up, this prior-art device meets none of Requirement 1, Requirement 2, Requirement 3, and Requirement 4. Moreover, in Reference 5, DN50, with the actual inner diameter of 57 mm, has a Cv value of 116 cmh and a head loss coefficient ξ of 1.67, which are unlikely to achieve by a globe valve that has the complex corner B, spread C, and corner D. For example, Structure C3 has a head loss coefficient ξ of 3.4, which is much higher than that of the prior-art device. However, in similar devices from other manufacturers that seal with a weir, such as the device disclosed in Reference 6, the same weir valve structure also fails to meet Requirement 1 and has its head loss coefficient ξ as high as 4.47, which is much greater than the head loss coefficient ξ of the device of Reference 5, i.e., 1.7. This is because in the device of Reference 6, the cross-sectional area of the flow channel reduces at the weir, and the lower-edge line of the inlet passage and the lower-edge line of the outlet passage are not smooth as they have many turns. Consequently, streamlines at the corner B, the spread C, and the corner D around the sealing weir go through so many bends and the resulting smoothness is totally incomparable to the case of Reference 5. Besides, its head loss coefficient ξ is higher than that of Structure C3. It is thus clear that a conventional structure is not sufficient to guarantee a satisfying head loss coefficient ξ.

From the analysis of Structure C1, Structure C2, Structure C3, and Structure C4 as well as the 9 prior-art devices, it is clear that they as a whole at least partially answer to Requirement 1, Requirement 2, Requirement 3, Requirement 4, and Requirement 5, yet none of them can provide a complete solution. For Goal 1, the prior art has taught how to make flow channels smooth. However, Structure C3 features smooth flow channels but it fails to meet Goal 2 that requires decrease of the included angle $\alpha_1$ between the rushing stream $S_{121}$ and the outlet center line. The structure also sees flow interference between the rushing stream $S_{121}$ and the tranquil stream $S_{122}$ at the internal outlet, making it fail to meet Requirement 3. In other words, except for Prior Art 9, all of the prior-art flow channel structures fail to meet all the requirements. Nevertheless, Prior Art 9 is not the target of the present invention as it fails to meet Requirement 1. As to the structure disclosed in Reference 6, making streamlines at the corner B, the spread C, and the corner D smooth is quite a challenge. These known strategies can be used separately and individually in the prior art, but it would be a huge challenge to implement them together in a single flow channel structure for minimal head loss. Another key of Goal 2 is to decrease the included angle $\alpha_3$ between streamlines of the rushing stream $S_{121}$ and tranquil stream $S_{122}$, and this is not addressed by Structure C3. Furthermore, in Structure C2, the angle $\alpha_3$ of the streamline is of 0 degree, but the structure fails to satisfy Goal 1 and Goal 2. In other words, satisfying all Requirement 1, Requirement 2, Requirement 3, and Requirement 4 as well as Goal 1 and Goal 2 is the key to achieve the desired value of the head loss coefficient ξ. the overall solution as described previously requires a novel flow channel structure, which is referred to as Structure C5 hereinbelow to meet the need of innovation. In addition, different materials and manufacturing procedures for implementing the solution have to be specified using embodiments to properly disclose the details as provided in Requirement 5.

SUMMARY OF THE INVENTION

The present invention provides a flow channel structure, hereinafter referred to as Structure C5, with a target value of the head loss coefficient ξ, where 1.7≤ξ≤3.0, based on $d_0$=52.5 mm.

Structure C5 is an advancement of Structure C4 that exploit strengths and avoid weaknesses of Structure C4, with the attempt to achieve low head loss like that achieved by Reference 5. Structure C5 implements the following three innovative strategies:

1. Improving the inlet passage and using the curved segments to eliminate the possibility of generation of any circumfluence zone;
2. Improving the outlet passage and using the curved segments to eliminate the possibility of generation of any circumfluence zone; and 3. Making the rushing stream $S_{121}$ and the tranquil stream $S_{122}$ flow in a stratified manner, wherein curved segments of the flow channel eliminates the possibility of generation of circumfluence zone so that the flow direction of the rushing stream $S_{121}$ and the outlet center line include a relatively small included angle $\alpha_1$, and the streamlines of the rushing stream $S_{121}$ and tranquil stream $S_{122}$ also include a relatively small included angle $\alpha_3$ to minimize flow interference in the internal outlet. Features of Structure C5 will be further described below.

FIG. 1A and FIG. 1B depict a flow channel structure of Structure C5 and shows coordinate points as well as the inlet center line $S_1$, the radial center line $S_{12}$, the outlet center line $S_2$, and the corner A, the corner B, the spread C, the corner D, and the corner E.

FIG. 1C shows the placement angle θ and the corner 2θ of Structure C5, as well as various angles $\theta_1$, $\theta_2$, $\theta_{21}$, $\theta_{22}$, $2\theta_1$, $2\theta_2$, $2\theta_{21}$, and $2\theta_{22}$ based thereon.

The present invention will be further described with an example that is a globe valve having an inner diameter of 52.5 mm.

An improved flow channel structure of the globe valve, hereinafter referred to as Structure C5, comprises a valve chamber, a ring-shaped ditch, a valve seat, a valve plug, a seal surface, a valve inlet, an inlet passage, a center hole, a valve outlet, an outlet passage, and an internal outlet. Its sealing mechanism is supported by the valve plug and the diaphragm, for example.

The valve chamber has a valve-chamber inner diameter $d_3$. The valve plug has a valve-plug outer diameter $d_2$. The valve seat has a valve-seat outer diameter $d_1$. The valve inlet has a valve-inlet diameter $d_0$. The valve outlet has a valve-outlet diameter $d_0$.

The center hole has a center point $P_1$ that has a height $LH_1$. The internal outlet has center point $P_3$ that has a height $LH_2$. The valve seat has its seal surface that has a height $LH_3$. The seal surface has a center point $P_{DP}$. The valve inlet has a center point $P_2$. The valve outlet has a center point $P_4$.

A horizontal line $XL_1$ passes through the center point $P_1$ of the center hole. The horizontal line $XL_1$ intersects the circumference of the center hole at two intersections, i.e., a distal point $E_1$ and a proximal point $E_2$. The distal point $E_1$ is located neat the valve inlet, and the proximal point $E_2$ is located near the valve outlet.

A channel axis $XL_2$ (i.e., the X axis) horizontally passes through the center point $P_2$ and the center point $P_4$. All the heights mentioned in the disclosure are bases on the channel axis $XL_2$ that connects the valve outlet and the valve inlet. The channel axis $XL_2$ also defines the zero point of the Y axis. Locations with respect to the channel axis $XL_2$ may be described as positive values (>0), a zero value (=0), and negative values (<0).

A vertical line $YL_1$ passing through the center point $P_1$ intersects the channel axis $XL_2$ at a point $P_{11}$.

A vertical line $YL_2$ passing through the center point $P_4$ intersects the circumference of the valve outlet at two intersections, i.e., a distal point $E_5$ and a proximal point $E_6$. The distal point $E_5$ has a height of $$\frac{d_0}{2},$$

and the proximal point $E_6$ has a height of $$-\frac{d_0}{2}.$$

The proximal point $E_6$ is the nadir of the outlet passage.

A vertical line $YL_3$ passing through the center point $P_3$ of the internal outlet intersects the channel axis $XL_2$ at a point $P_{31}$. The vertical line $YL_3$ intersects the circumference of the internal outlet at two intersections, i.e., a distal point $E_3$ and a proximal point $E_4$. The distal point $E_3$ has a height $LH_4$ and the proximal point $E_4$ has a height $LH_5$.

A vertical line $YL_4$ passing through the center point $P_2$ intersects the circumference of the valve inlet at two intersections, i.e., a distal point $E_7$ and a proximal point $E_8$. The distal point $E_7$ has a height of $$\frac{d_0}{2}.$$

The proximal point $E_8$ has a height of $$-\frac{d_0}{2}.$$

The proximal point $E_8$ is the nadir of the inlet passage.

The center point $P_1$ and the center point $P_2$ are separated by a horizontal distance $L_1$, where $P_{11}P_2=L_1$. The center point $P_4$ and the center point $P_1$ are separated by a horizontal distance $L_2$, where $P_4P_{11}=L_2$. The center point $P_2$ and the center point $P_4$ are separated by a horizontal distance L, where $P_4P_2=L=L_1+L_2$.

The center point $P_4$ and the center point $P_3$ are separated by a horizontal distance $LL_2$, where $$LL_2 = L_2 - \frac{d_3}{2}.$$

The valve chamber contains there in the ring-shaped ditch and the valve seat, and has the valve plug and the valve stem with the seal surface installed therein. The valve plug, the valve stem, and the seal surface are concentric. The valve chamber connects the inlet passage and the outlet passage. The inlet passage extends from the valve inlet horizontally and then turns upward. It has outlet end that is right at the center hole of the valve seat. The internal outlet is installed on an inner periphery of the valve chamber for connecting the outlet passage. The valve inlet and the valve outlet are installed at two sides of the valve body, respectively. When the outlet passage is a straight pipe or a curved pipe that extends obliquely downward, the internal outlet is non-standard elliptical in shape.

The ring-shaped ditch is located on the inner wall of the valve chamber and encircles an outer periphery of the valve seat. The ring-shaped ditch has a bottom that is formed with a bevel oblique at an oblique angle β. The bevel has a higher side located near the inlet passage and has a lower side located near the outlet passage to be connected to the proximal point $E_4$ of the internal outlet.

The valve seat is installed at the outlet end of the inlet passage and provided with the seal surface.

The valve plug is cylindrical in shape and has a bottom formed with a plane. When the globe valve is closed, the valve plug is engaged with the seal surface for sealing. When the valve is fully open, a bottom surface of the valve plug and the seal surface jointly form a radial passage that has an opening $B_1$, where $$0.125 \le \frac{B_1}{d_0} \le 0.5.$$

Preferably, $$\frac{B_1}{d_0} = 0.25,$$

and $B_1 \approx 13.14$ mm.

The inlet passage has the valve inlet, an inlet center line $S_1$, the center hole, an upper-edge line $S_{1a}$, and a lower-edge line $S_{1b}$. The inlet center line $S_1$ connects the center point $P_1$, the center point $P_{DP}$, and the center point $P_2$. It forms an included angle γ1 with respect to the vertical line $YL_1$ at the center point $P_1$. When the included angle $\gamma_1 \neq 0°$, the center hole is a non-standard elliptical hole having a major axis $a_x$ in the X-axis direction, where $a_x > d_0$, and $a_x = E_1E_2$, $E_1P_1 \ge P_1E_2$. When the included angle $\gamma_1 = 0°$, the center hole is a round hole having a diameter $d_0$ and has a minor axis $b_z$ in the Z-axis direction, where $b_z = d_0$. The upper-edge line $S_{1a}$ connects the distal point $E_1$ and the distal point $E_7$. The lower-edge line $S_{1b}$ connects the proximal point $E_2$ and the proximal point $E_8$.

The radial passage comprises a radial center line $S_{12}$ and the opening $B_1$. When the valve plug is open, the bottom surface of the valve plug and the seal surface jointly form the radial passage with the opening $B_1$. The radial passage is a channel encircling the center hole. The radial passage has a height $LH_6$, where $LH_6 = B_1 + LH_3$. The radial center line $S_{12}$ connects the center point $P_1$ and the center point $P_3$. The radial passage extends radially from the center point $P_1$ toward the center point $P_3$ in various directions.

The outlet passage comprises the internal outlet, the valve outlet, an outlet center line $S_2$, an upper-edge line $S_{2a}$, and a lower-edge line $S_{2b}$. The outlet center line $S_2$ connects the center point $P_3$ and center point $P_4$, and forms an included angle $\gamma_2$ with respect to the vertical line $YL_3$ at the center point $P_3$, where $0° \le \gamma 2 < 90°$. The internal outlet is a non-standard elliptical hole. It has a major axis $a_y$ in the Y-axis direction, where $a_y \ge d_0$, and $a_y = E_3E_4$, $E_3P_3 \ge P_3E_4$ and has a minor axis $b_z$ in the Z-axis direction, where $b_z = d_0$. When the included angle $\gamma_2 = 90°$, the outlet passage is a horizontal, straight pipe and $a_y = d_0$. The upper-edge line $S_{2a}$ connects the distal point $E_3$ and the distal point $E_5$. The lower-edge line $S_{2b}$ connects the proximal point $E_4$ and the proximal point $E_6$. The distal point $E_3$ and the seal surface have a height difference $H_1$, where $LH_4 - LH_3 = H_1$. When the distal point $E_3$ is higher than the seal surface, $H_1 \ge 0$. Otherwise, $H_1 \le 0$. The internal outlet center point $P_3$ and the seal surface have a height difference $H_3$, where $LH_2 - LH_3 = H_3$. When $P_3$ is higher than the seal surface, $H_3 \ge 0$. Otherwise, $H_3 \le 0$.

A radial gap $B_3$ is located at the valve-plug outer diameter $d_2$ and the valve-chamber inner diameter $d_3$, where $$B_3 = (d_3 - d_2)/2,\ 0.2 \le \frac{B_3}{d_0} \le 0.4.$$

An annular space $B_2$ is defined between the valve-seat outer diameter $d_1$ and valve-chamber inner diameter $d_3$, where $$B_2 = (d_3 - d_1)/2,\ 0.2 \le \frac{B_2}{d_0} \le 0.4.$$

An inner diameter ratio $$\frac{d_3}{d_0}$$

is the ration between the valve-chamber inner diameter $d_3$ and the valve-inlet diameter $d_0$, where $$1.75 \le \frac{d_3}{d_0} \le 2.5.$$

In the following description, streamlines will be described with respect to the three center lines, i.e., the inlet center line $S_1$, the radial center line $S_{12}$, and the outlet center line $S_2$. Meanwhile, description of cornering angles of these streamlines is made with reference to deducible geometric shapes and further details may be obtained using complex 3D-CFD computing.

The inlet center line $S_1$ may be a single line segment or a combination of different line segments, which include any one or more of curved lines, vertical line segments, oblique line segments, and horizontal line segments. Therein, a vertical line segment is coaxial with vertical line $YL_1$, and a horizontal line segment is coaxial with channel axis $XL_2$, while the corner A is a cornering angle along which the inlet center line $S_1$ turns from the valve inlet to the center hole.

Along the radial center line $S_{12}$, all of the streamlines of the fluid coming out the center hole flow radially in the various directions in the radial passage. The corner B is a corner along which the fluid turns from the inlet center line $S_1$ to the radial center line $S_{12}$. All of the streamlines horizontally, radially pass through a spread C with turns while flowing toward the internal outlet. As to the radial center line $S_{12}$, the fluid in the spread C has a flowing rate that decreases after the corner B due to increase in an area of the radial passage and increases as the area decreases while the fluid makes turns and flows toward the internal outlet. The radial center line $S_{12}$ is a straight line or a curved line or a multi-curve line depending on relative positions of the seal surface and the internal outlet.

Along to the radial center line $S_{12}$, the streamlines of fluid at the spread C in the radial center line $S_{12}$ is driven by a pressure difference formed between the valve inlet and the valve outlet, and split up as a rushing stream $S_{121}$ and a tranquil stream $S_{122}$. The rushing stream $S_{121}$ is formed by some of the streamlines that are affected by a relatively high pressure-difference gradient to have a relatively high streamline density and has a relatively high flow rate. The tranquil stream is formed by some of the streamlines that are affected by a relatively low pressure-difference gradient to have a relatively low streamline density and has a relatively low flow rate. the streamlines fan out across of the spread C, and, due to the corner B, the rushing stream $S_{121}$ fans out at a circumferential angle toward the internal outlet, and the tranquil stream $S_{122}$ fans out at circumferential angles other than the circumferential angle at which the rushing stream fans out. A part of the rushing stream $S_{121}$ flows directly into the internal outlet, while the remaining rushing stream $S_{121}$ and the tranquil stream $S_{122}$ separate in the valve chamber as two flows to flow and roll along the inner wall as they enter the internal outlet. In the radial center line $S_{12}$, the rushing stream $S_{121}$ and the tranquil stream $S_{122}$ in the radial passage make the fluid in the annular space $B_2$ of the radial gap $B_3$ form two vortexes. The flow shear force of rushing stream $S_{121}$ and the tranquil stream $S_{122}$ pushes the two vortexes to spread out and eventually flow into the internal outlet. In most cases, the two vortexes in the annular space $B_2$ do not cause particle agglutination unless the radial gap $B_3$ is excessively narrow or there is any recessed structure. Along the radial center line $S_{12}$, before the rushing stream $S_{121}$ and the tranquil stream $S_{122}$ flow into the internal outlet, they turn at the corner D, respectively. Particularly, the rushing stream $S_{121}$ turns for the corner D1, and the tranquil stream $S_{122}$ turns for the corner D2. When the rushing stream $S_{121}$ crosses the annular space $B_2$, its $\alpha_1$ angle starts to change and further decreases as it enters the internal outlet. This also means decrease of the angle of the corner D1.

Along the outlet center line $S_2$, the outlet center line may be a single line segment or a combination of different kinds of line segments, such as curved lines, vertical line segments, oblique line segment, horizontal line segment, etc., Therein, the horizontal line segment is coaxial with channel axis $XL_2$. Along the outlet center line $S_2$, the corner D represents a transition between the radial center line $S_{12}$ and the outlet center line $S_2$. The fluid turns for the corner E between the internal outlet and the outlet passage and then flows out the valve outlet.

Some embodiments will be described below to explain characteristics of the present invention. Each of these embodiments is based on the same inner diameter ratio $$\frac{d_3}{d_0},$$

where $$1.75 \leq \frac{d_3}{d_0} \leq 2.8.$$

Embodiment 1

FIG. 1A through FIG. 1C and FIG. 2A show structural and dimensional details of a flow channel according to Embodiment 1 of Structure C5. Therein, the inlet center line $S_1$ comprises a horizontal line segment and a curved line. The outlet center line $S_2$ comprises a horizontal line segment and a curved line. The inlet passage starts form the circumference of the valve inlet and extends along the inlet center line $S_1$ to reach the round center hole. It has a diameter do. In the 3D surface plot of the inner wall of the inlet passage, there are an upper-edge line $S_{1a}$ and lower-edge line $S_{1b}$.

The present invention features the following inventive characteristics.

The inlet center line $S_1$ comprises a straight-line segment and a curved line. A tangent point $P_{12}$ is located on the channel axis $XL_2$. The curved line has one end point that is the center point $P_1$ and an opposite end point that is the tangent point $P_{12}$. The curved line is tangent to the channel axis $XL_2$ at the tangent point $P_{12}$. The curved line extends for a horizontal distance $L_{11}=P_{11}P_{12}$. The straight-line segment has one end that is the tangent point $P_{12}$ and an opposite end point that is the center point $P_2$, with a $P_{12}P_2$ horizontal distance$=L_1-L_{11}$. On a vertical line $YL_6$ passing through the point $P_{12}$, a point $P_0$ is located so that the line segment $P_0P_{12}$ and the line segment $P_0P_1$ are isometric in length, and the included angle $2\theta_1$ between the line segment $P_0P_{12}$ and the line segment $P_0P_1$ is equal to corner A, and the placement angle $\theta_1$ is equal to the angle of the line segment $P_1P_{12}$ with respect to the horizon. At the center point $P_1$ of the center hole, the curved line and vertical line $YL_1$ include an included angle $\gamma_1$, where $\gamma_1=90°-2\theta_1$.

When the included angle $\gamma_1$+0°, the center hole is narrowed from the non-standard oval hole to a round hole having a diameter $d_0$. The original major axis $a_x$, where $a_x=E_1E_2$, is now reduced to $d_0$. Such reduction is achieved by locating a distal point $$E_1^*$$

on the major axis to replace the distal point $E_1$, and locating a proximal point $$E_2^*$$

on the major axis to replace the proximal point $E_2$, where $$E_1^*P_1 = P_1E_2^* = \frac{d_0}{2}.$$

The major axis $a_x$ has length $$\frac{d_0}{a_x},$$

reduction ratio $$\frac{d_0}{a_x} = \frac{d_0}{E_1E_2}.$$

where

The corner A has an angle $2\theta_1$, where $55° \leq 2\theta_1 \leq 105°$.

The major axis $a_x$ has a length reduction ratio $$\frac{d_0}{a_x},$$

where $$0.7 \leq \frac{d_0}{a_x} \leq 1.0.$$

A part of the rushing stream $S_{121}$ flows along the upper-half space of the ring-shaped ditch. The tranquil stream $S_{122}$ flows in the lower-half space of the ring-shaped ditch along the bevel. The key for the rushing stream $S_{121}$ and the tranquil stream $S_{122}$ to flow in a stratified manner is the corner E at the upper-edge line $S_{2a}$ of the outlet passage. The corner E has an angle $2\theta_{21}$, where $30° \leq 2\theta_{21} \leq 90°$. The tranquil stream $S_{122}$ flows into the lower-half space of the ring-shaped ditch. The rushing stream $S_{121}$ flows into the upper-half space of the ring-shaped ditch. The distal point $E_3$ has a height $LH_4$. The distal point $E_3$ and the seal surface have a height difference $H_1$. The proximal point $E_4$ has a height $LH_5$ and is connected to the bottom of the bevel of the ring-shaped ditch, where $$-0.4 \leq \frac{LH_5}{d_0} < 0.4.$$

The line segment $E_3E_4$ is the major axis $a_y$ of the internal outlet in the Y-axis direction, where $a_y = E_3E_4$.

The outlet center line $S_2$ comprises a straight-line segment and a curved line. A tangent point $P_{34}$ is located on the channel axis $XL_2$. the curved line has one end point that is the center point $P_3$ and an opposite end point that is the tangent point $P_{34}$. The curved line is tangent to the channel axis $XL_2$ at the tangent point $P_{34}$. The curved line extends for a horizontal distance $LL_{21} = P_{31}P_{34}$. The straight line segment has one end that is the tangent point $P_{34}$ and an opposite end point that is the center point $P_4$, with a $P_{34}P_4$ horizontal distance$=LL_2-LL_{21}$. On a vertical line $YL_5$ passing through the point $P_{34}$, a point $P_5$ is located so that the line segment $P_5P_{34}$ and the line segment $P_5P_3$ are isometric in length. The included angle $2\theta_2$ between the line segment $P_5P_{34}$ and the line segment $P_5P_3$ is equal to the corner E. The placement angle $\theta_2$ is equal to the angle of the line segment $P_3P_{34}$ with respect to the horizon. The curved line and vertical line $YL_3$ include an included angle $\gamma_2$ at the center point $P_3$, where $\gamma_2 = 90° - 2\theta_2$.

The outlet passage has a constant diameter and a constant cross-sectional area throughout a length thereof. Its upper-edge line $S_{2a}$, lower-edge line $S_{2b}$ and the outlet center line $S_2$ are parallel to each other. The three curved lines share a common center point $P_5$ and the internal outlet is non-standard oval. The non-standard oval outlet has a major axis $a_y = E_3E_4$, where $E_3P_3 > P_3E_4$, and a minor axis $b_z = d_0$.

The upper-edge line $S_{2a}$ intersects the vertical line $YL_5$ at a tangent point $E_{35}$. The tangent point $E_{35}$ has a height of $d_0/2$. The line segment $P_5E_{35}$ and the line segment $P_5E_3$ include an included angle that is of $2\theta_{21}$. The curved line and vertical line $YL_3$ include an included angle $\gamma_{21}$ at the distal point $E_3$, where $\gamma_{21} = 90° - 2\theta_{21}$. When the $2\theta_{21}$ is equal to 90 degrees, it means that the internal outlet passage has the maximum major axis $a_y$. Through the upper-edge line $S_{2a}$, the value of the height $LH_4$ of the distal point $E_3$ can be obtained. The placement angle is 021.

When the height difference ratio $H_1/d_0 \leq 0.5$, the height of the distal point $E_3$ is less impactful on reduction of head loss. The greater the major axis ratio $a_y/d_0$ is, the more it capable of reducing head loss is. When $2\theta_{21}$ is equal to 90 degrees, it means that the internal outlet has the maximum major axis $a_y$. Similarly, the longer $LL_{21}$ is, the loner the major axis $a_y$ is, and the larger the valve body is.

Since the rushing stream $S_{121}$ flows out the radial passage horizontally, the valve opening $B_1$ has a height $LH_6$, $LH_6 \approx LH_3 + B_1$. A virtual mapping point $$E_3^*$$

can be located on the major axis $a_y$ with a height approximate to $LH_6$. The mapping point $$E_3^*$$

all the seal surface of the valve seat have a height difference $$H_1^*,$$

where $$H_1^* \approx B_1.$$

Also obtained is a placement angle $$\theta_{21}^*$$

equal to the angle of the line segment $$E_3^*E_{35}$$

with respect to the horizon. The line segment $$E_3^*E_4$$

forms a new major axis $$a_y^*.$$

The line segment $$E_3^*E_{35}$$

and the horizontal line include an included angle that is the placement angle $$\theta_{21}^*,$$

where $$\theta_{21}^* \leq \theta_{21}.$$

Since a part of the rushing stream $S_{121}$ enters the internal outlet from the radial passage directly, it is proper that the placement angle $$\theta_{21}^{*}$$

is used to describe the corner D along which the rushing stream $S_{121}$ flows directly into the internal outlet. Since the streamlines of this part of the rushing stream $S_{121}$ after passing the annular space start to turn in order to flow into the internal outlet smoothly, the above description about the rushing stream $S_{121}$ that directly enters the internal outlet helps correct understanding of the $\alpha_1$ angle and of that the actual $\alpha_1$ angle will be further decreased.

The lower-edge line $S_{2b}$ intersects the vertical line $YL_5$ at a tangent point $E_{46}$. The tangent point $E_{46}$ has a height of $$-\frac{d_0}{2}.$$

The included angle between the line segment $P_5E_{46}$ and the line segment $P_5E_4$ is $2\theta_{22}$. At the proximal point $E_4$, the lower-edge line $S_{2b}$ and the vertical line $YL_3$ include an included angle $\gamma_{22}$, where $\gamma_{22}=90°-2\theta_{22}$. Through the lower-edge line $S_{2b}$, the value of the height $LH_5$ of the proximal point $E_4$ can be obtained. The placement angle is $\theta_{22}$.

The corner E at the upper-edge line $S_{2a}$ of the outlet passage has an angle of $2\theta_{21}$, where $30°\leq 2\theta_{21}\leq 90°$. The distal point $E_3$ and the valve seat have a height difference $H_1$, where $$-0.6 \leq \frac{H_1}{d_0} \leq 0.68.$$

The proximal point $E_4$ and the bottom of the bevel are communicated with each other and the proximal point $E_4$ has a height $LH_5$, where $-0.4\leq LH_5/d_0\leq 0.4$. The oblique angle $\beta$ of the bevel of the ring-shaped ditch is approximate to the included angle $\theta_{22}$, where $8°\leq\beta\leq 20°$.

As desired, for further strengthening the valve seat, a vertical rib plate is provided at the outer periphery of the valve seat, the vertical rib plate being located near the internal outlet and having a lower end connected to a bottom of the ring-shaped ditch, the vertical rib plate having two laterals each formed as a vertical, curved surface, each of the lateral curved surfaces having one side tangent to the outer periphery of the wide bottom of the valve seat, and an opposite side connected mutually to form an end with a small rounded corner, the vertical rib plate serving to guide the two streamlines in the ring-shaped ditch to flow toward the internal outlet.

In Preferred Mode A, when $2\theta_{21}$ is equal to 90 degrees, the parameters apply.

When the outlet center line $S_2$ has a horizontal length $LL_{21}$, where $2.0\geq LL_{21}/d_0\geq 0.5$, the ratio between the major axis $a_y$ and the diameter $d_0$ is $$\frac{a_y}{d_0},$$

where $$1.4 \leq \frac{a_y}{d_0} \leq 2.2.$$

$\theta_2$ and $\theta_{22}$ are in the following ranges. The corner E of the outlet passage is at an angle $2\theta_2$, where $30\leq 2\theta_2\leq 74$. The corner E at the lower-edge line S2*b* of the outlet passage is at an angle $2\theta_{22}$, where $14°\leq 2\theta_{22}\leq 54°$.

In Preferred Mode B, when $2\theta_{21}$ is equal to 30 degrees, the parameters apply.

When the outlet center line $S_2$ has a horizontal length $LL_{21}$, where $2.0\geq LL_{21}/d_0\geq 0.5$, the ratio between the major axis $a_y$ and the diameter $d_0$ is $$\frac{a_y}{d_0},$$

where $$1.06 \leq \frac{a_y}{d_0} \leq 1.12.$$

$\theta_2$ and $\theta_{22}$ are in the following ranges. The corner E of the outlet passage is at an angle $2\theta_2$, where $20°\leq 2\theta_2\leq 28°$. The corner E at the lower-edge line $S_{2b}$ of outlet passage is at an angle $2\theta_{22}$, where $15°\leq 2\theta_{22}\leq 26°$.

Embodiment 2

FIG. 1A through FIG. 1C and FIG. 2B show structural and dimensional details of a flow channel according to Embodiment 2 of Structure C5. The inlet center line $S_1$ comprises a horizontal line segment and a curved line. The outlet center line $S_2$ comprises a horizontal line segment and an oblique line segment.

The present invention features the following characteristics.

In the present embodiment, the outlet passage is built according to Embodiment 1 and the internal outlet remains non-standard elliptical, but the outlet center line $S_2$, the upper-edge line $S_{2a}$, the lower-edge line $S_{2b}$ of an outlet passage are changed to a combination of straight-line segments. The line segment $P_3P_{34}$ connects the center point $P_3$ and the tangent point $P_{34}$. The line segment $E_3E_{35}$ connects the distal point $E_3$ and the tangent point $E_{35}$. The line segment $E_4E_{46}$ connects the proximal point $E_4$ and the tangent point $E_{46}$. In a 3D surface plot of the inner wall of the straight-line outlet passage that covers the range starting from the non-standard elliptical circumference of the internal outlet and ending at the round valve outlet through the outlet center line $S_2$, there are an upper-edge line $S_{2a}$ and a lower-edge line $S_{2b}$.

On a vertical line $YL_5$ passing through the point $P_{34}$, a point $P_5$ is located so that the line segment $P_5P_{34}$ and the line segment $P_5P_3$ are isometric in length, and the included angle $2\theta_2$ between the line segment $P_5P_{34}$ and the line segment $P_5P_3$ is equal to the corner E of the line segment $P_3P_{34}$, and the placement angle $\theta_2$ is equal to the angle of the line segment $P_3P_{34}$ with respect to the horizon.

The line segment $P_3P_{34}$ has a placement angle $\theta_2$ and the corner D at the center point $P_3$ is $\theta_2$, where $$\theta_2 = A\tan\left(\frac{LH_2}{LL_{21}}\right).$$

The line segment $E_3E_{35}$ has a placement angle $\theta_{21}$ and the corner D at the distal point $E_3$ is $\theta_{21}$, where $$\theta_{21} = A\tan\left(\frac{LH_4 - \frac{d_0}{2}}{LL_{21}}\right).$$

The line segment $E_4E_{46}$ has a placement angle $\theta_{22}$ and the corner D at the proximal point $E_4$ is $\theta_{22}$, where $$\theta_{22} = A\tan\left(\frac{LH_5 + \frac{d_0}{2}}{LL_{21}}\right).$$

The outlet center line $S_2$ corners once for the corner E at the tangent point $P_{34}$, where the corner $E=\theta_2$.

The upper-edge line $S_{2a}$ corners once for the corner E at the tangent point $E_{35}$, where the corner $E=\theta_{21}$.

The lower-edge line $S_{2b}$ corners once for the corner E at the tangent point $E_{46}$, where the corner $E=\theta_{22}$.

At the distal point $E_3$, the corner $D=\theta_{21}$, where $14°\leq\theta_{21}\leq 45°$.

At the tangent point $E_{35}$, the corner $E=\theta_{21}$, where $14°\leq\theta_{21}\leq 45°$.

At the proximal point $E_4$, the corner $D=\theta_{22}$, where $7°\leq\theta_{22}\leq 20°$.

At the tangent point $E_{46}$, the corner $E=\theta_{22}$, where $7°\leq\theta_{22}\leq 20°$.

Embodiment 3

FIG. 1A through FIG. 1C and FIG. 2C show structural and dimensional details of a flow channel according to Embodiment 3 of Structure C5. The inlet center line $S_1$ comprises a horizontal line segment and a curved line. The outlet center line $S_2$ comprises a horizontal line segment and an oblique line segment.

The present invention features the following inventive characteristics.

In the present embodiment, the outlet passage is built according to embodiment 1 and Embodiment 2, and the internal outlet remains non-standard elliptical, while the internal outlet is in a rectangular shape instead of the non-standard elliptical shape, wherein the non-standard ellipse is inscribed to the rectangle, and the two share the common major axis $a_y$ and minor axis $b_z$ as well as the common distal point $E_3$ and proximal point $E_4$. The four right-angle corners of the rectangle are modified into four small rounded corners. The outlet center line $S_2$, the upper-edge line $S_{2a}$, and the lower-edge line $S_{2b}$ of the outlet passage are changed to a combination of straight-line segments. The line segment $P_3P_{34}$ connects the center point $P_3$ and the tangent point $P_{34}$. The line segment $E_3E_{35}$ connects the distal point $E_3$ and the tangent point $E_{35}$. The line segment $E_4E_{46}$ connects the proximal point $E_4$ and the tangent point $E_{46}$. In a 3D surface plot of the inner wall of the straight-line outlet passage that covers the range starting from the rectangular circumference of the internal outlet and ending at the round valve outlet through the outlet center line $S_2$, there are an upper-edge line $S_{2a}$ and a lower-edge line $S_{2b}$.

On a vertical line $YL_5$ passing through the point $P_{34}$, a point $P_5$ is located so that the line segment $P_5P_{34}$ and the line segment $P_5P_3$ are isometric in length, and the included angle $2\theta_2$ between the line segment $P_5P_{34}$ and the line segment $P_5P_3$ is equal to the corner E of the line segment $P_3P_{34}$, while the placement angle $\theta_2$ is equal to the angle of the line segment $P_3P_{34}$ with respect to the horizon.

The line segment $P_3P_{34}$ has a placement angle $\theta_2$ and the corner D at the center point $P_3$ is $\theta_2$, where $$\theta_2 = A\tan\left(\frac{LH_2}{LL_{21}}\right).$$

The line segment $E_3E_{35}$ has a placement angle $\theta_{21}$ and the corner D at the distal point $E_3$ is $\theta_{21}$, where $$\theta_{21} = \mathrm{Atan}\left(\frac{LH_4 \frac{d_0}{2}}{LL_{21}}\right).$$

The line segment $E_4E_{46}$ has a placement angle $\theta_{22}$ and the corner D at the proximal point $E_4$ is $\theta_{22}$, where $$\theta_{22} = \mathrm{Atan}\left(\frac{LH_5 + \frac{d_0}{2}}{LL_2}\right).$$

The outlet center line $S_2$ corners once for the corner E at the tangent point $P_{34}$, where the corner $E=\theta_2$.

The upper-edge line $S_{2a}$ corners once for the corner E at the tangent point $E_{35}$, where the corner $E=\theta_{21}$.

the lower-edge line $S_{2b}$ corners once for the corner E at the tangent point $E_{46}$, where the corner $E=\theta_{22}$.

At the distal point $E_3$, the corner $D=\theta_{21}$, where $14°\leq\theta_{21}\leq 45°$.

At the tangent point $E_{35}$, the corner $E=\theta_{21}$, where $14°\leq\theta_{21}\leq 45°$.

At the proximal point $E_4$, the corner $D=\theta_{22}$, where $7°\leq\theta_{22}\leq 20°$.

At the tangent point $E_{46}$, the corner $E=\theta_{22}$, where $7°\leq\theta_{22}\leq 20°$.

Embodiment 4

FIG. 1A through FIG. 1C and FIG. 2D show structural and dimensional details of a flow channel according to Embodiment 4 of Structure C5. The inlet center line $S_1$ comprises a horizontal line segment and a curved line. The outlet center line $S_2$ comprises a horizontal line segment and a curved line.

The present invention features the following inventive characteristics.

In the present embodiment, the outlet passage is built according to embodiment 1 and the internal outlet remains non-standard elliptical. When the distal point $E_3$ is higher than the seal surface of the valve seat, it is possible to adjust the height of the distal point $E_3$ by making a curve $S_3$ that is tangent to the upper-edge line $S_{2a}$ and intersect a new distal point $$E_3^{**},$$

so that the distal point $$E_3^{**}$$

and the valve seat have a height difference $$H_1^{**},$$

where $$H_1^{} \geq B_1,\ 0.25 \leq \frac{H_1^{}}{d_0} \leq 0.5.$$

The line segment $$E_3^{**}E_4$$

forms a new major axis $$a_y^{**}.$$

A tangent curved surface SS is made along the curve $S_3$ and an inner periphery of the outlet passage. The included angle $$\gamma_{21}^{**}$$

between the curve $S_3$ and the vertical line $YL_3$ at the distal point $$E_3^{**}$$

has a relatively large angle, where $$30\cdot \leq \gamma_{21}^{} \leq 90\cdot,\ \theta_{21}^{} = 90\cdot - \gamma_{21}^{**}.$$

As a result, the part of the rushing stream $S_{121}$ entering the internal outlet directly can flow along the curved surface SS with reduced angle of the corner D1. The purpose of this advancement of the upper-edge line $S_{2a}$ of the outlet passage is to make the valve chamber have a proper height and also to maintain flow capacity of the flow channel.

The corner D at the distal point $$E_3^{**}$$

is at an angle $$\theta_{21}^{**},$$

where $$0° \leq \theta_{21}^{**} \leq 60°.$$

The new elliptical major axis is $$a_y^{**},$$

where $$2d_0 \geq a_y^{**} \geq 1.3d_0.$$

Embodiment 5

FIG. 1A through FIG. 1C and FIG. 2E show structural and dimensional details of a flow channel according to Embodiment 5 of Structure C5. The inlet center line $S_1$ comprises a horizontal line segment and a curved line. The outlet center line $S_2$ comprises a horizontal line segment and a curved line.

The present invention features the following inventive characteristics.

In the present embodiment, the inlet passage and the outlet passage are built according to embodiment 1, and the valve chamber, along with its inner diameter $d_3$ and the valve-seat outer diameter $d_1$, is of an eccentric design so that the valve chamber is a hollow, round, eccentric structure. The valve chamber structurally includes a valve plug room having a diameter of $1.8d_0$ and an annular chamber having a diameter of $2.2d_0$. the valve plug room and the annular chamber have their centers of circle off from each other by $0.2d_0$. The annular chamber has a ceiling that has a height $LH_7$. The valve plug room and the valve seat are concentric and have a vertical line $YL_1$ passing therethrough. The valve plug room is for receiving the valve plug. Therein, the center point $P_1$ of the valve seat near the valve inlet and the inner wall of the annular chamber have a horizontal distance of $0.9d_0$. The center point $P_1$ of the valve seat and the inner wall of the annular chamber near the internal outlet have a horizontal distance of $1.3d_0$. The annular chamber contains the annular space and the ring-shaped ditch. The ring-shaped ditch has a width $B_2$ that is variable due to the eccentric design and reaches its maximum at the side of the internal outlet. The ceiling of the annular chamber and the seal surface of the valve seat have a height difference $H_5$, where $H_5=LH_7-LH_3$, and $0.6 \geq H_5/d_0 \geq 0.25$. The major axis $a_y$ of the internal outlet is greater than the diameter $d_0$ of the center hole, where $2.2 \geq a_y/d_0 \geq 1.3$. While these values may be easily determined for drawing and computing, the exact parameters have to be tunned according to Embodiment 5 to produce a real-world flow channel as needed.

Since the height $LH_4$ of the distal point $E_3$ may also be higher than the height $LH_7$, $LH_4 > LH_7$, a new distal point $$E_3^{**}$$

has to be located on the major axis $a_y$ to replace the distal point $E_3$. Further, from the star point $$E_3^{**},$$

a curve $S_3$ tangent to the upper-edge line $S_{2a}$ is made so that the distal point $$E_3^{**}$$

and the valve seat have a height difference $$H_1^{**},$$

where $$0.25d_0 \leq H_1^{**} \leq 0.5d_0.$$

The line segment $$E_3^{**}E_4$$

forms a new major axis $$a_y^{**}.$$

A tangent curved surface SS tangent to the inner periphery of the outlet passage is made along the curve $S_3$. At the distal point $$E_3^{**},$$

the curve $S_3$ and the vertical line $YL_3$ include an included angle $$\gamma_{21}^{**}$$

that is relatively large, where $$30° \leq \gamma_{21}^{**} \leq 90°.$$

The corner D at the distal point $$E_3^{**}$$

is at an angle $$\theta_{21}^{**},$$

where $$0° \leq \theta_{21}^{**} \leq 60°.$$

The new elliptical major axis is $$a_y^{**},$$

where $$0d_0 \geq a_y^{**} \geq 1.3d_0.$$

A concave curve $S_3$ and a tangent curved surface SS like those in Embodiment 4 are formed.

Embodiment 6

FIG. 1A through FIG. 1C, and FIG. 2F shows structural and dimensional details a flow channel according to Embodiment 6 of Structure C5. The inlet center line $S_1$ comprises a horizontal line segment and a curved line. The outlet center line $S_2$ comprises a horizontal line segment and a curved line.

The present invention features the following inventive characteristics.

In the present embodiment, the inlet passage and the outlet passage are built according to embodiment 1, with the seal surface of the valve seat located at the outer side of the center hole and with a conical pipe installed above the center hole. A conical pipe is coaxial with the vertical line $YL_1$ and has a center point $P_{DP}$. The seal surface of the valve seat has a height $LH_3$, and the center hole has a height $LH_1$. The height h of the conical pipe has a conical angle $\phi$, where $LH_3=LH_1+h$. The conical pipe serves to help the fluid and its inlet streamline $S_1$ spread to turn at the corner B more smoothly before entering the radial passage. This helps further reduce head loss. Besides, the conical pipe enhances the structural strength of the valve seat and improves reliability of sealing performance.

The conical pipe has a height h, where $$0.06 \leq \frac{h}{d_0} \leq 0.2.$$

The conical pipe has a conical angle, where $\phi$, $15° \leq \phi \leq 60°$.

The six embodiments as described above perform differently in meeting the foregoing requirements.

As to Requirement 1, the valve seat provides reliable sealing. In each of Embodiment 1 through Embodiment 6 of Structure C5, the corner A has the angle $2\theta_1$, where $55° \leq 2\theta_1 \leq 105°$, so the valve seat is of high strength. In Embodiment 6, the conical pipe has the height h, where $$0.06 \leq \frac{h}{d_0} \leq 0.2,$$

and this helps further strengthen the valve seat. A vertical rib plate may be additionally mounted around the periphery of the valve seat to even further strengthen the valve seat and ensure satisfying sealing performance.

As to Requirement 2, the inlet and the outlet are colinear. In each of Embodiment 1 through Embodiment 6 of Structure C5, the channel axis $XL_2$ passes through the center point $P_2$ of the valve inlet and the center point $P_4$ of the valve outlet.

As to Requirement 3, the valve body shall be free of any cleanness issue. In each of Embodiment 1 through Embodiment 6 of Structure C5, the inlet passage and the outlet passage are both smooth curved pipes or oblique pipes and the valve chamber is free of any closed stagnation zone, open stagnation zone or circumfluence zone, not to mention problems like particle agglutination, liquid residue, etc. Therein, the internal outlet is such located that it covers the radial passage and the distal point $E_3$ of the internal outlet. The proximal point $E_4$ has a height $LH_5$, where $-0.4 \leq LH_5/d_0 < 0.4$. This reduces the drop of the fluid as it flows obliquely downward so that the fluid flowing into the ring-shaped ditch and entering the internal outlet rolls in the outlet passage, thereby preventing generation of any circumfluence zone and eliminating problems like particle agglutination, liquid residue, etc.

As to Requirement 4, the valve body has the inner diameter ratio that $1.75 \leq d_3/d_0 \leq 2.8$. In the most preferred embodiment of Structure C5, the inner diameter ratio is of 2.0, thereby avoiding bulkiness. In Embodiment 5, the valve chamber is of the eccentric design, with the inner diameter ratio of the annular chamber being 2.2 and the inner diameter ratio of the valve plug room being 1.8, so it is also free of bulkiness.

As to Requirement 5, the inventive flow channel of the valve body shall be implementable with various manufacturing methods and materials. Embodiment 1 through Embodiment 6 of Structure C5 can all be manufactured using metal casting. Injection molding is applicable to Embodiment 1 only when the outlet center line and the inlet center line are each with a single curve. Embodiment 4 cam be made using injection molding. Embodiment 5 and Embodiment 6 may also be made using injection molding according to their actual applications.

The aforementioned six embodiments address issues of the prior art with the solutions discussed below.

As to the inventive characteristics of Structure C5, the inlet streamline and the outlet streamline are both based on curved passages. The inlet center line is a curved line, and the outlet center line is a curved line or an obliquely downward straight line. The distal point $E_3$ has a height $LH_4$ that is higher than the valve seat. The proximal point $E_4$ has a height $LH_5$, where $$-0.4 \leq \frac{LH_5}{d_0} < 0.4.$$

The rushing stream $S_{121}$ enters the upper-half space of the ring-shaped ditch, and the tranquil stream $S_{122}$ flows into the lower-half space of the ring-shaped ditch. As the rushing stream $S_{121}$ and the tranquil stream $S_{122}$ flow in the ring-shaped ditch in a stratified manner, the inlet streamline, the radial streamline, and the outlet streamline can all achieve the greatest possible radiuses of curvature without having flow interference in either the valve chamber or the internal outlet. This ensures smoother turns of the streamlines when passing the corner B, the spread C, and the corner D, while minimizing the head loss coefficient $\xi$, where $1.7 \leq \xi \leq 3.0$, $C_v \geq 73.5$.

As to Goal 1, when the distal point $E_3$ has the height difference ratio $H_1/d_0 \geq 0.5$, the space between the distal point $E_3$ and the corresponding point $$E_3^*$$

is not an effective flows space and can bring about additional head loss. The larger the $$E_3E_3^*$$

space is, the snorter the new major axis $$a_y^*$$

is, and the smaller the effective flow area in the internal outlet is.

As to Goal 1, when the new major axis $$a_y^2$$

or the major axis ratio $$a_y^*/d_0$$

is greater, it means that the rushing stream $S_{121}$ and the tranquil stream $S_{122}$ are more capable of flowing in the ring-shaped ditch as stratified flows and this leads to less flow interference and less head loss.

As to Goal 1, the $$E_3^*E_{35}$$

placement angle $$\theta_{21}^*$$

of the mapping point $$E_3^*$$

is smaller than or equal to me placement angle $\theta_{21}$ of the line segment $E_3E_5$. The placement angle $$\theta_{21}^*$$

means that the rushing stream $S_{121}$ is closer to the physical corner D, and the rushing stream $S_{121}$ flows into the flow channel space between the mapping point $$E_3^*$$

and the center point $P_3$ in the internal outlet. When the height difference ratio $H_1/d_0$ is unduly large and the new major axis $$a_y^*$$

or the major axis ratio $$a_y^*/d_0$$

becomes unduly small, the rushing stream $S_{121}$ has its radius of curvature reduced, and this causes additional head loss.

As to Goal 1, Embodiment 2 and Embodiment 3 use straight passages to achieve the same effect. Embodiment 4 provides a remedy for an unduly high distal point $E_3$. In Embodiment 5, the valve chamber uses the eccentric design to make the streamlines of the rushing stream $S_{121}$ have better radiuses of curvature. In Embodiment 6, the conical pipe is installed above the center hole to facilitate spread and decrease the angel of the corner B for the rushing stream $S_{121}$. These embodiments can all achieve the same effect.

As to Goal 1, the streamlines of the rushing stream $S_{121}$ flow smoothly with desired radiuses of curvature throughout the path from the inlet passage to the outlet passage. According to Preferred Mode A of Embodiment 1 of Structure C5, the corner E at the upper-edge line $S_{2a}$ of the outlet passage is at an angle $2\theta_{21}$, where $2\theta_{21}=90°$. The distal point $E_3$ has a height $LH_4$, where $LH_4>LH_3$. The major axis ratio is $$\frac{a_y}{d_0},$$

where $1.3\leq a_y/d_0\leq 2.2$. The area of the internal outlet fully covers the radial passage and the upper-half area of the internal outlet is greater than the lower-half area. When the rushing stream $S_{121}$ fans out in the radial passage and crosses the ring-shaped ditch, it can flow obliquely downward toward the upper-half opening of the internal outlet more smoothly, so that the streamlines of the rushing stream $S_{121}$ can enter the internal outlet with large radiuses of curvature.

As to Goal 1, the streamlines of the rushing stream $S_{121}$ flow smoothly with desired radiuses of curvature throughout the path from the inlet passage to the outlet passage. In Preferred Mode B of Embodiment 1 of Structure C5, the corner E at the upper-edge line $S_{2a}$ of the outlet passage is at the angle $2\theta_{21}$, where $2\theta_{21}=30°$. The distal point $E_3$ has a height $LH_4$, where $LH_4<LH_3$. The major axis ratio is $$\frac{a_y}{d_0},$$

where $1.06\leq a_y/d_0\leq 1.12$. The rushing stream $S_{121}$ coming from the spread C makes the first corner D1 at 90 degrees, and makes the second corner D1*a* at 60° about the distal point $E_3$. The corner E at the lower-edge line $S_{2b}$ of outlet passage is at an angle $2\theta_{22}$, where $14°\leq 2\theta_{22}\leq 26°$. The tranquil stream $S_{122}$ when flowing along the According bevel of the ring-shaped ditch, makes the second corner D2 while flowing into the proximal point $E_4$ with a significantly decreased angle, so that the streamlines of the rushing stream $S_{121}$ can avoid the streamlines of the tranquil stream $S_{122}$ and maintain stratification in the ring-shaped ditch while reducing flow interference at the internal outlet.

As to Goal 1, the proximal point $E_4$ has a height $LH_5$, where $-0.4\leq LH_5/d_0<0.4$, and the corner D at the proximal point $E_4$ is approximate to the bevel angle of the ring-shaped ditch. When the tranquil stream $S_{122}$ fans out in the radial passage it does not interfere with the rushing stream $S_{121}$, so that a larger part of the tranquil stream $S_{122}$ can be guided by the bevel of the According ring-shaped ditch toward the lower-half opening of the internal outlet.

As to Goal 1, the streamlines of the rushing stream $S_{121}$ flow smoothly with desired radiuses of curvature throughout the path from the inlet passage to the outlet passage. In Structure C5, the inlet passage is a smooth passage with the corner A at the angle $2\theta_1$, where e $55°\leq 2\theta_1\leq 105°$. This helps keep the inlet streamline smooth. Particularly, the fluid after passing the corner B enters the radial passage and makes the more smoothly before reaching the spread C in the valve chamber.

As to Goal 1, in Embodiment 5, the center point $P_1$ of the valve seat near the internal outlet and the inner wall of the annular chamber have the horizontal distance of $1.3d_0$, and this provides an abundant space for streamlines to make turns and enters the internal outlet.

As to Goal 1, in Embodiment 6, the height h of the a conical has a conical angle $\phi$ that facilitate spread. This provides the fluid flowing out the center hole with better chance to spread and have an increased radius of curvature, thereby decreasing the angle of corner B and the head loss coefficient $\xi$.

As to Goal 1, in each of Embodiment 1 and Embodiment 2, the outlet passage turns at an angle of $2\theta_2$. In Embodiment 1, the flow channel is a smooth, curved flow channel with the corner D of $2\theta_2$. While loss may happen when the fluid enters the internal outlet, the corner E, which is also of $2\theta_2$, will not cause additional some loss and contributes to a low head loss coefficient $\xi$. In Embodiment 2, the corner D of $\theta_2$ helps reduce loss of the rushing stream, but since the outlet passage has an obtuse corner, the corner E of angle $\theta_2$ will cause relatively high head loss. Overall, the outlet passage maintains a low head loss coefficient $\xi$.

As to Goal 1, the center hole is reduced to the round hole having the diameter $d_0$ from the non-standard oval hole. The length reduction ratio of the major is axis $a_x$, where $$0.7\leq\frac{d_0}{a_x}\leq 1.0.$$

This helps prevent the effective cross-sectional area of the center hole of the inlet passage from being too small to cause a high loss coefficient $\xi$. With sufficient space, the flow channel allows streamlines to spread reasonably and allows the fluid to rush out the center hole with a more desirable corner B.

As to Goal 2, reduction of the included angle between the direction of the rushing stream $S_{121}$ and the outlet center line $S_2$ allows the rushing stream $S_{121}$ at the spread C to have its streamlines well fanning out. The streamlines fan out at the side of the internal outlet. The rushing stream $S_{121}$ flows into the ring-shaped ditch and then flows obliquely downward toward the internal outlet. The obliquely downward flow of the rushing stream $S_{121}$ significantly reduces the included angle $\alpha_1$ between it and the outlet center line $S_2$, opposite to the high angle or 90 degrees at the original distal point $E_3$, where $$\alpha_1 = (90 - \gamma_2).$$

As to Goal 2, the included angle between the direction of the rushing stream $S_{121}$ and the axis $XL_2$ of the outlet passage is reduced. In Preferred Mode A of Embodiment 1, the height $LH_4$ of the distal point $E_3$ of the internal outlet is higher than the height $LH_3$ of the seal surface of the valve seat, i.e., $LH_4 > LH_3$. The ratio between the major axis $a_y$ and the diameter do is $1.3 \leq a_y/d_0 \leq 2.2$, so that the rushing stream $S_{121}$ in the with radial passage when spreading at the spread C crossing the ring-shaped ditch is provided with sufficient space to flow obliquely downward, thereby reducing the included angle $\alpha_1$ between it and the outlet center line $S_2$ to enter the upper-half area of the internal outlet, thereby significantly decreasing the head loss coefficient $\xi$.

As to Goal 2, the included angle between the direction of the rushing stream $S_{121}$ and the axis $XL_2$ of the outlet passage is reduced. In Preferred Mode B of Embodiment 1, the height $LH_4$ of the distal point $E_3$ of the internal outlet is higher than the height $LH_3$ of the seal surface of the valve seat, i.e., $LH_4 > LH_3$. The ratio between the major axis $a_y$ and the diameter do is $1.06 \leq a_y/d_0 \leq 1.12$, so that the rushing stream $S_{121}$ when spreading at the spread C crossing the ring-shaped ditch turns downward for 90 degrees for the first corner D1, and makes the second corner D1 at the angle $\gamma_{21}$ before passing through the distal point $E_3$, where $0° \leq \gamma_{21} \leq 60°$. This reduces the included angle $\alpha_1$ between the rushing stream $S_{121}$ and the outlet center line $S_2$ in order to lower the head loss coefficient $\xi$.

As to Goal 2, the included angle $\alpha_2$ between the streamlines of the tranquil stream $S_{122}$ and the outlet center line $S_2$ of the internal outlet is reduced. The streamlines of the tranquil stream $S_{122}$ cross the valve seat in circumferential directions other than those at which the rushing stream $S_{121}$ fans out and enter the ring-shaped ditch. In Embodiment 1, the proximal point $E_4$ has a heightLH$_5$, where $$-0.4 \leq \frac{LH_5}{d_0} < 0.4,$$

and the proximal point $E_4$ is connected to the bottom of bevel at the bottom of the ring-shaped ditch. The angle difference between the oblique angle $\beta$ of the bevel and the corner D at the proximal point $E_4$ is relatively small. When the tranquil stream $S_{122}$ turns obliquely downward along the ring-shaped ditch as a 3D movement to enter the internal outlet, the included angle $\alpha_2$ is reduced, so the streamlines of the tranquil stream $S_{122}$ can have greater radiuses of curvature.

As to Goal 2, the included angle $\alpha_3$ between streamlines of the rushing stream $S_{121}$ and tranquil stream $S_{122}$ remains small. In Embodiment 1, the rushing stream $S_{121}$ after fanning out crosses the ring-shaped ditch, most of the streamlines of the rushing stream $S_{121}$ flow toward the upper-half area of the internal outlet. The tranquil stream $S_{122}$ fans out at circumferential directions other than those at which the rushing stream $S_{121}$ fans out and flows into the ring-shaped ditch. Most of the streamlines of the tranquil stream $S_{122}$ flow along the bevel of the ring-shaped ditch and enter the lower-half area of the internal outlet. There is no strong interference between the rushing stream $S_{121}$ and the tranquil stream $S_{122}$ before they enter the internal outlet. In other words, the included angle $\alpha_3$ between streamlines of the rushing stream $S_{121}$ and tranquil stream $S_{122}$ is kept relatively small and this prevents flow interference at the internal outlet. The rushing stream $S_{121}$ and the tranquil stream $S_{122}$ roll mutually after entering the internal outlet. This significantly reduces circumfluence in the outlet passage and effectively prevents particle agglutination.

To sum up the description about Structure C5, the key is to keep the distal point $E_3$ of the internal outlet higher than the seal surface and to have the height difference $H_1$. The proximal point $E_4$ has a height $LH_5$, where $-0.4 \leq LH_5/d_0 < 0.4$, so that the $E_4E_{46}$ line segment of the internal outlet has a placement angle $\theta_{22}$, where $7° \leq \theta_{22} \leq 20°$. The corner D2 for the tranquil stream $S_{122}$ to enter the internal outlet can be significantly reduced. Clearly Structure C5 can achieve the innovative goal with a head loss coefficient $\xi$, where $e\xi \leq 3.0$. The comparison is based on $$\frac{B_1}{d_0} = 0.25, \frac{d_3}{d_0} = 2.0,$$

and $d_0$=52.5 mm.

DETAILED DESCRIPTION OF THE INVENTION

Figure 6A:
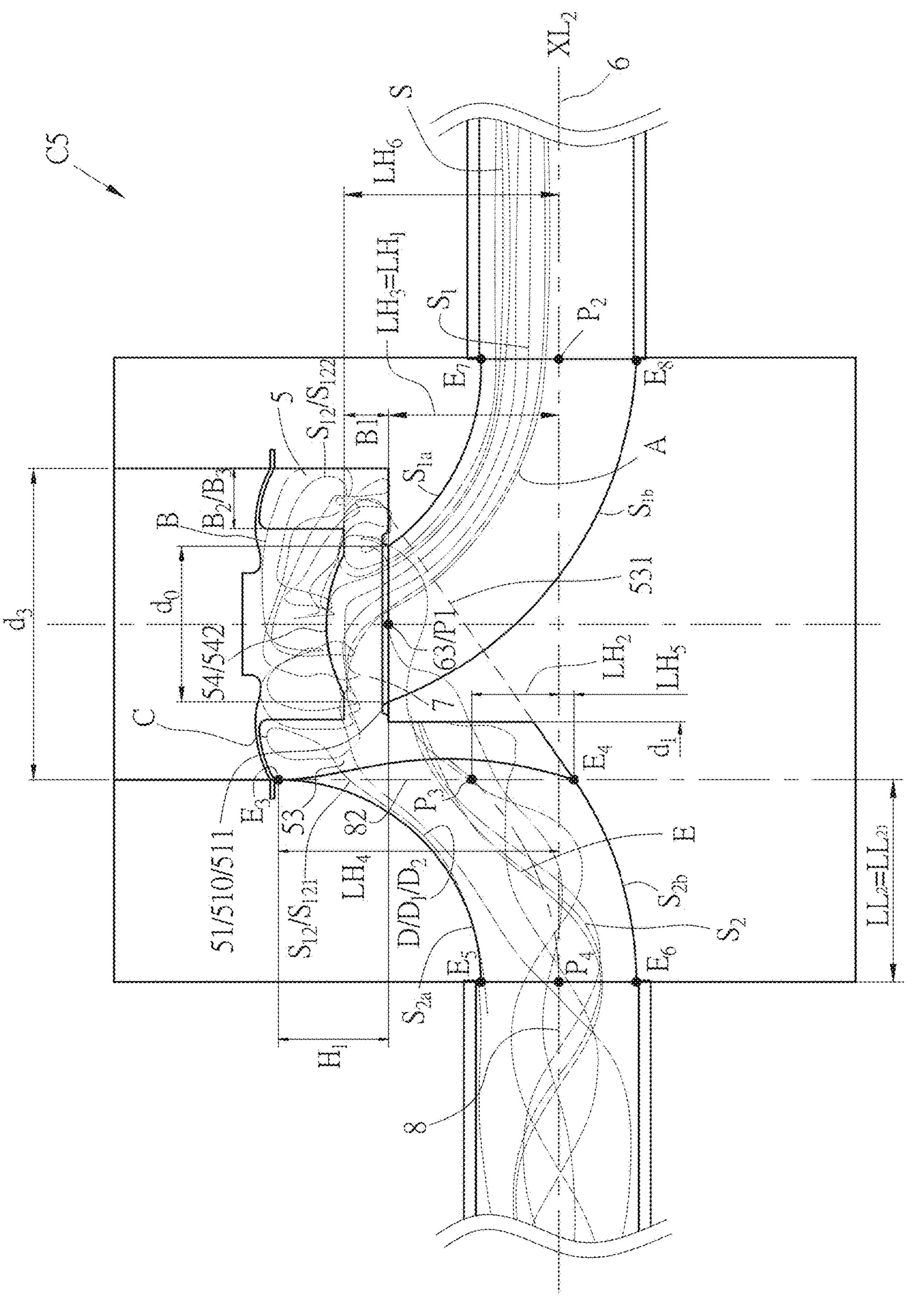
FIG. 6A shows the cross-sectional structure and the streamline distribution of Preferred Mode A of Embodiment 1 of Structure C5 according to the present invention.

The structure of the present invention, i.e., Structure C5, features a flow channel structure comprising (as shown in FIG. 6A): a smoothly curved inlet passage 6, a valve chamber 5, a horizontal radial passage 7, a ring-shaped ditch 53 with a bevel 531 at its bottom, and a smoothly curved outlet passage 8. The radial passage 7 is defined by a concave surface 542 at the bottom of the valve plug 54 and a seal surface 510 of the valve seat 51, and has a flow channel height $B_1$. The outlet passage 8 has an internal outlet 82 whose distal point $E_3$ is higher than the valve seat 51 and proximal point $E_4$ is lower than the valve seat 51. The valve chamber 5 has an inner diameter $d_3$. An inner diameter ratio $d_3/d_0$ of the inner diameter $d_3$ to a valve-inlet diameter $d_0$ is $1.75 \leq d_3/d_0 \leq 2.8$.

Figure 12A:
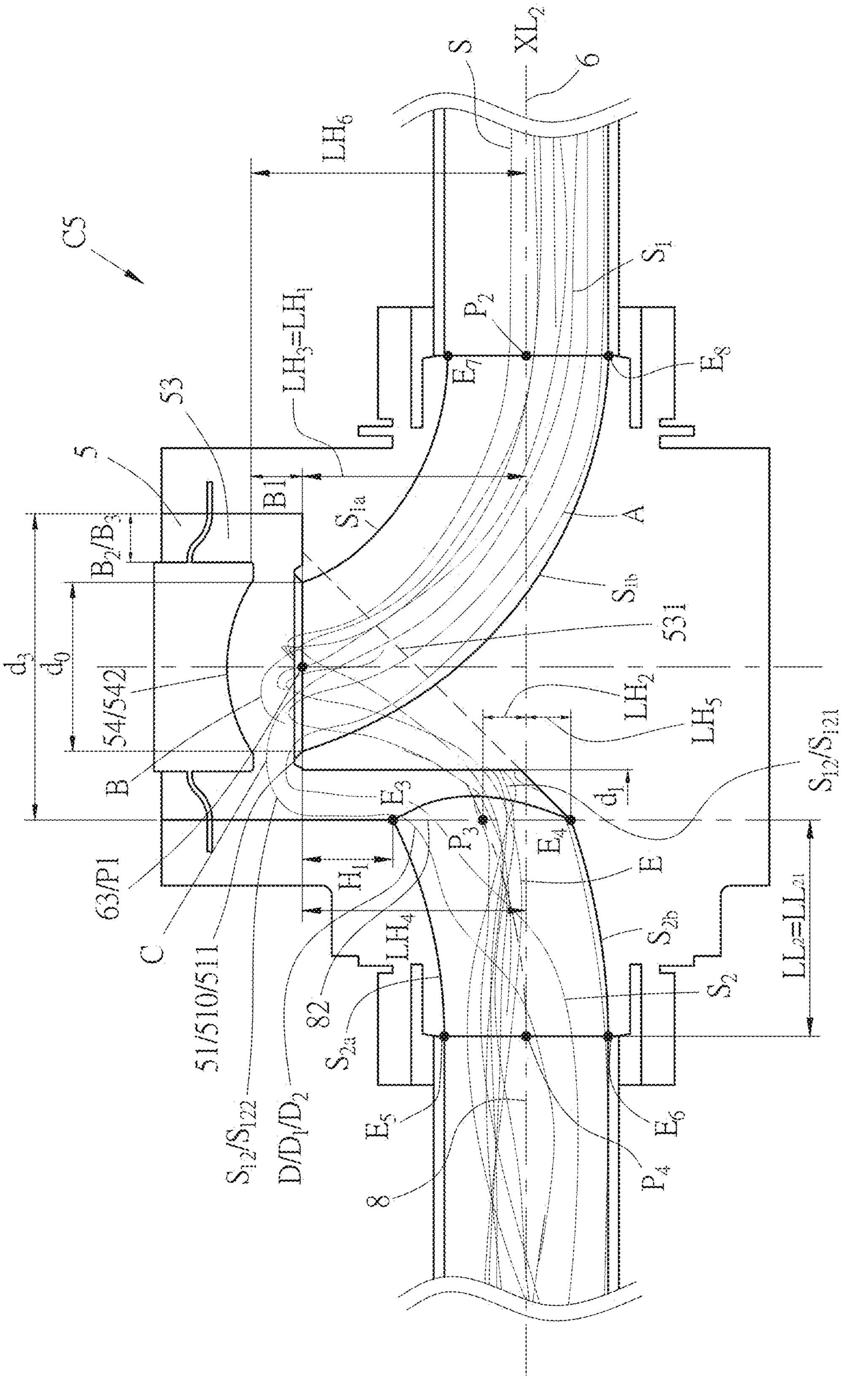
FIG. 12A shows the cross-sectional structure and the streamline distribution of Preferred Mode B of Embodiment 1 of Structure C5 according to the present invention.

Structure C5 of the present invention provides the following advantages. The smoothly curved the inlet passage 6 has a corner A (indicated by the inlet streamline $S_1$), and there is not any circumfluence zone N formed. A corner B at the center hole 63 contributes to reasonable distribution of a rushing stream $S_{121}$ and a tranquil stream $S_{122}$ in the circumferential direction. When the fluid passes through the radial passage 7, the rushing stream $S_{121}$ fans out to form a spread C (indicated by the radial streamline $S_{12}$) so that the rushing stream $S_{121}$ and the tranquil stream $S_{122}$ flowing into the ring-shaped ditch 53 as separate layers will not cause flow interference within the valve chamber 5. A corner D guiding the fluid to enter the internal outlet 82 comprises a corner D1 for the rushing stream $S_{121}$ and a corner D2 for the tranquil stream $S_{122}$, and prevents flow interference in the internal outlet 82. In Preferred Mode A, the internal outlet 82 has a relatively long major axis ay (as shown in FIG. 6A), where $$1.3 \leq \frac{a_y}{d_0} \leq 2.2,$$

which provides sufficient space for the rushing stream $S_{121}$ and the tranquil stream $S_{122}$ to flow into the internal outlet 82. The smoothly curved the outlet passage 8 has a corner E (indicated by the outlet streamline $S_2$), and there is not any circumfluence zone N formed therein. The internal outlet 82 has its major axis ay high enough to fully cover the valve seat 51, so that the rushing stream $S_{121}$ and the tranquil stream $S_{122}$ are allowed to flow separately in the space defined by the ring-shaped ditch 53. In Preferred Mode B, the internal outlet 82 has a major axis ay (as shown in FIG. 12A), where $$1.06 \le \frac{a_y}{d_0} \le 1.12,$$

and this prepares the rushing stream $S_{121}$ for the second corner D1 in advance when it flows through the distal point $E_3$, so that the rushing stream $S_{121}$ and the tranquil stream $S_{122}$ can flow separately in the space defined by the ring-shaped ditch 53. Structure C5, with an inner diameter of 52.5 mm, has a head loss coefficient ξ, where $C_v \ge 73.5$, $1.7 \le \xi \le 3.0$.

To demonstrate the benefits of the present invention, four flow channel structures with the same given specifications, including do-52.5 mm, $d_3/d_0=2$, $B_1=0.25d_0=13.14$ mm, and $L_1=L_{12}=90$ mm, were compared. For this purpose, their flow fields were analyzed using 3D Computational Fluid Dynamics (CFD) software to get the estimated $C_v$ values. the simplified streamline diagrams of flow-field analysis are extracted from the charts obtainable using the flow-field analysis software. For each of the shown cases, eight streamlines are depicted to illustrate the streamline distribution.

Figure 3A:
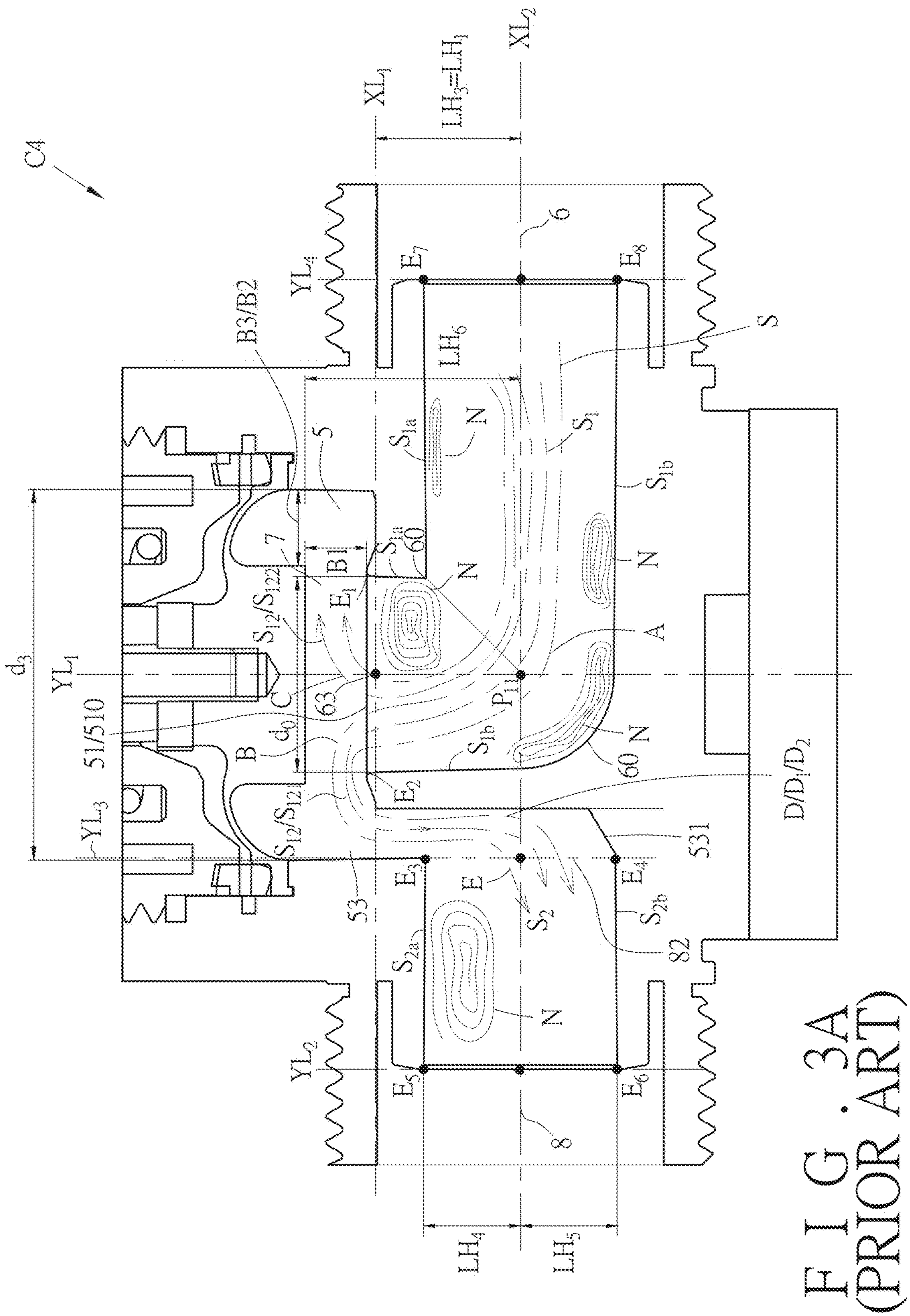
FIG. 3A (PRIOR ART)
FIG. 3A shows the cross-sectional structure and the streamline distribution in Structure C4 as a prior art.

Case A is a conventional structure, i.e., Structure C4, with the result of its low-field analysis shown in FIG. 3A.

Figure 4A:
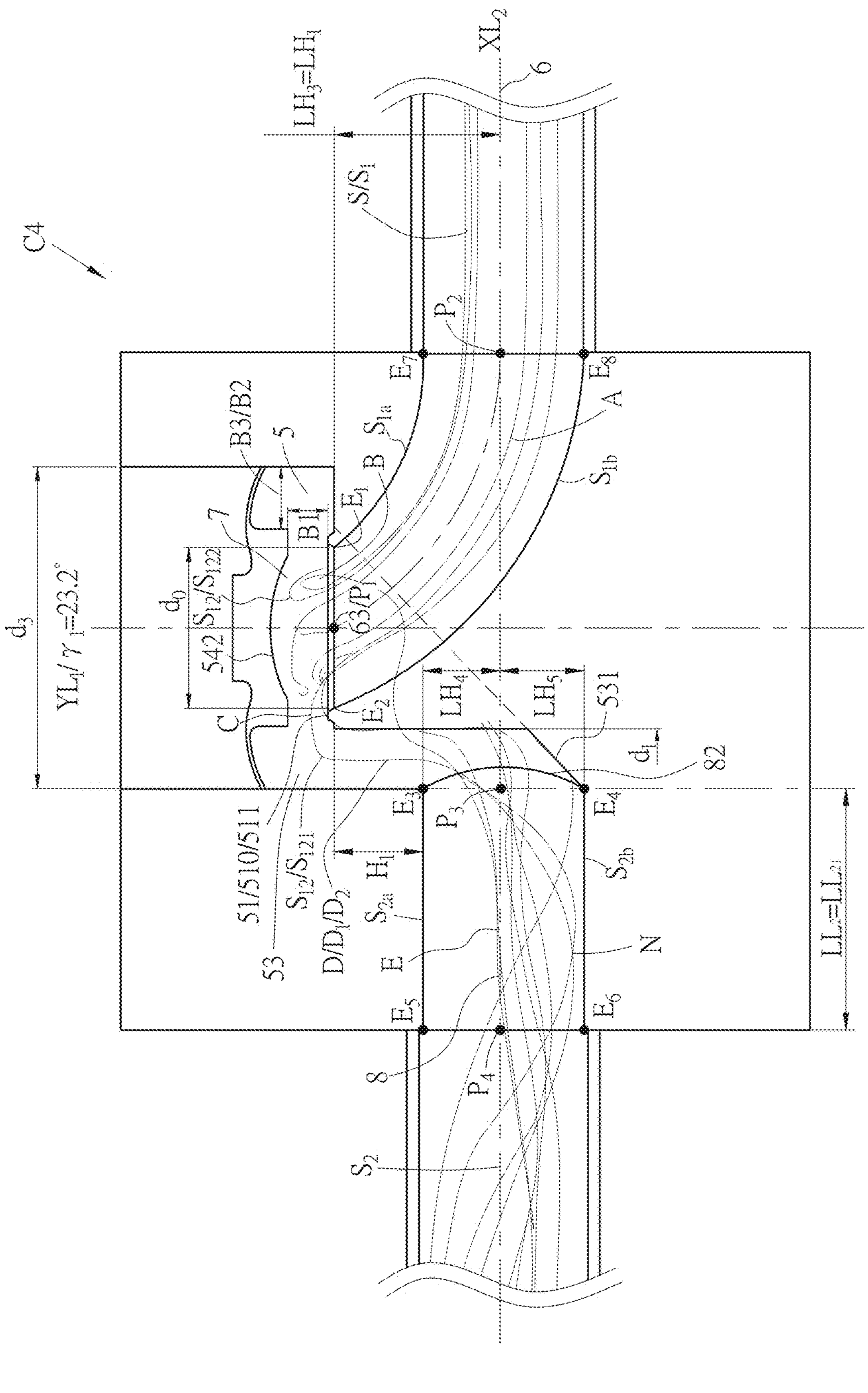
FIG. 4A shows the cross-sectional structure and the streamline distribution of Refinement 1 of Structure C4.

Case B is a conventional structure, i.e., Refinement 1 of Structure C4, with the result of its low-field analysis shown in FIG. 4A. Herein, Refinement 1 features local improvements in the flow channel of the present invention.

Figure 5A:
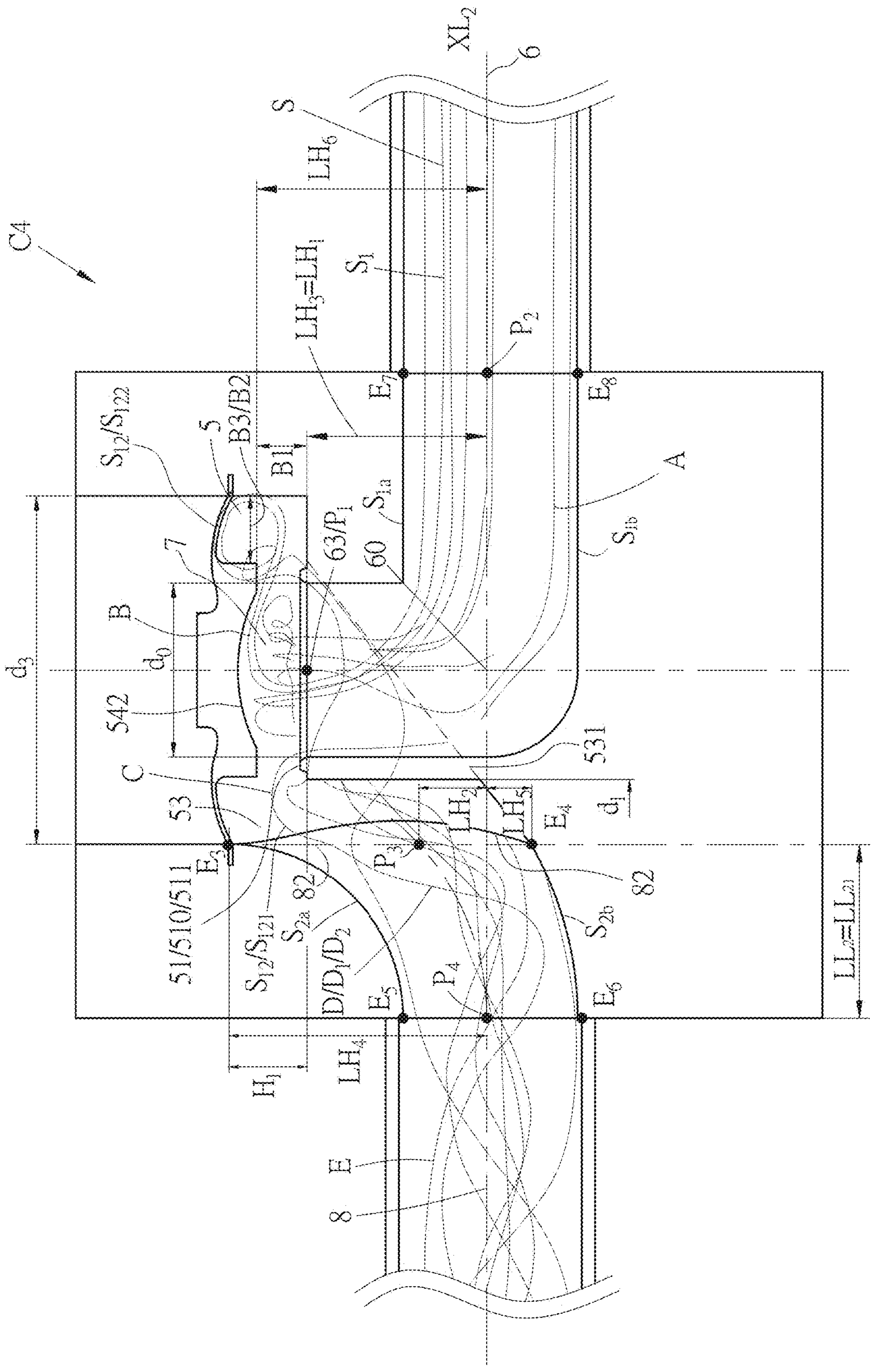
FIG. 5A shows the cross-sectional structure and the streamline distribution of Refinement 2 of Structure C4.

Case C is a conventional structure, i.e., Refinement 2 of Structure C4, with the result of its low-field analysis shown in FIG. 5A. Herein, Refinement 2 features other local improvements in the flow channel of the present invention.

Case D is a detailed structure of the present invention, i.e., Structure C5, with the result of its low-field analysis shown in FIG. 6A. Structure C5 is also referred to as Embodiment 1 of the present invention.

Figure 7A:
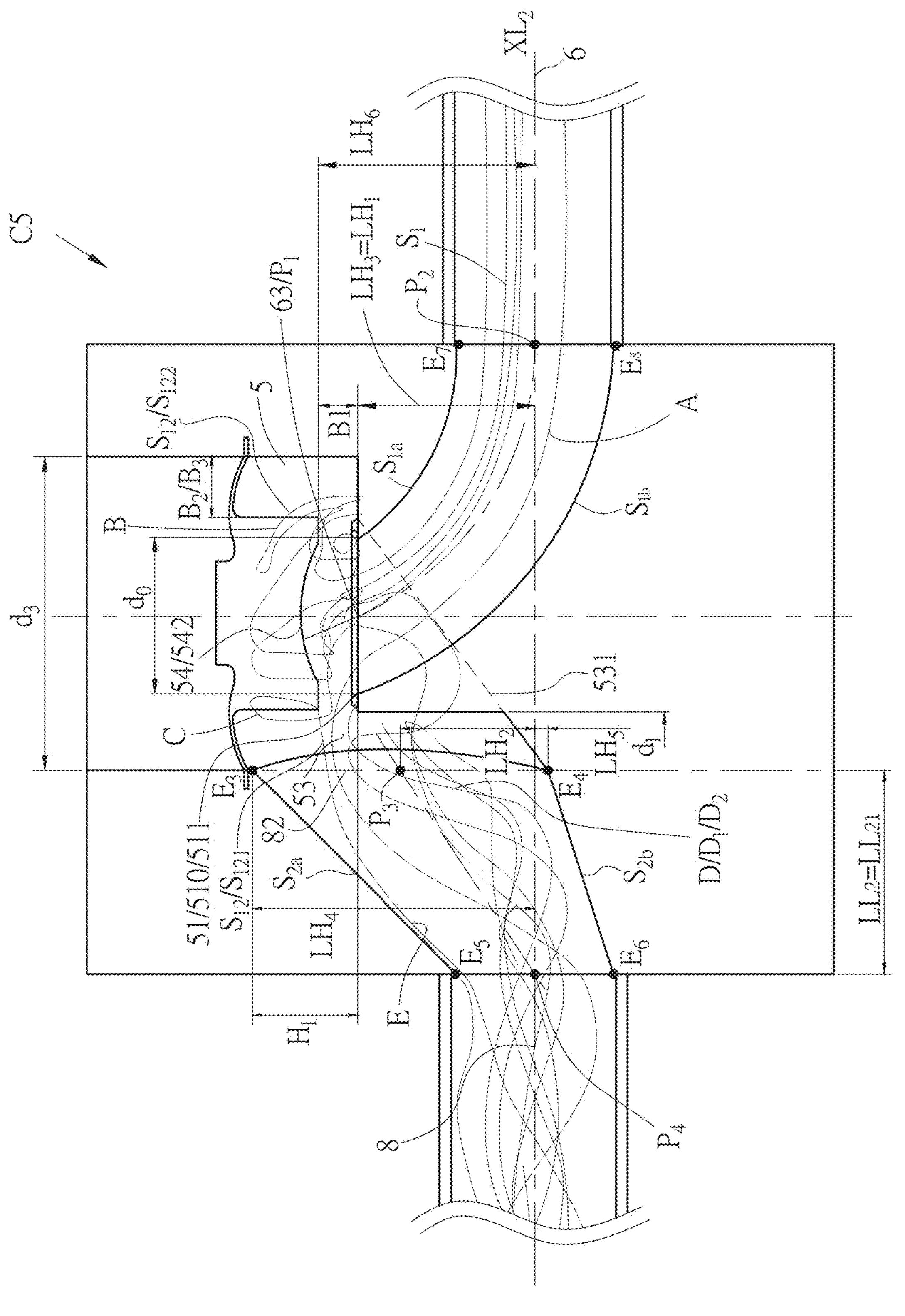
FIG. 7A shows the cross-sectional structure and the streamline distribution of Embodiment 2 of Structure C5 according to the present invention.
Figure 8A:
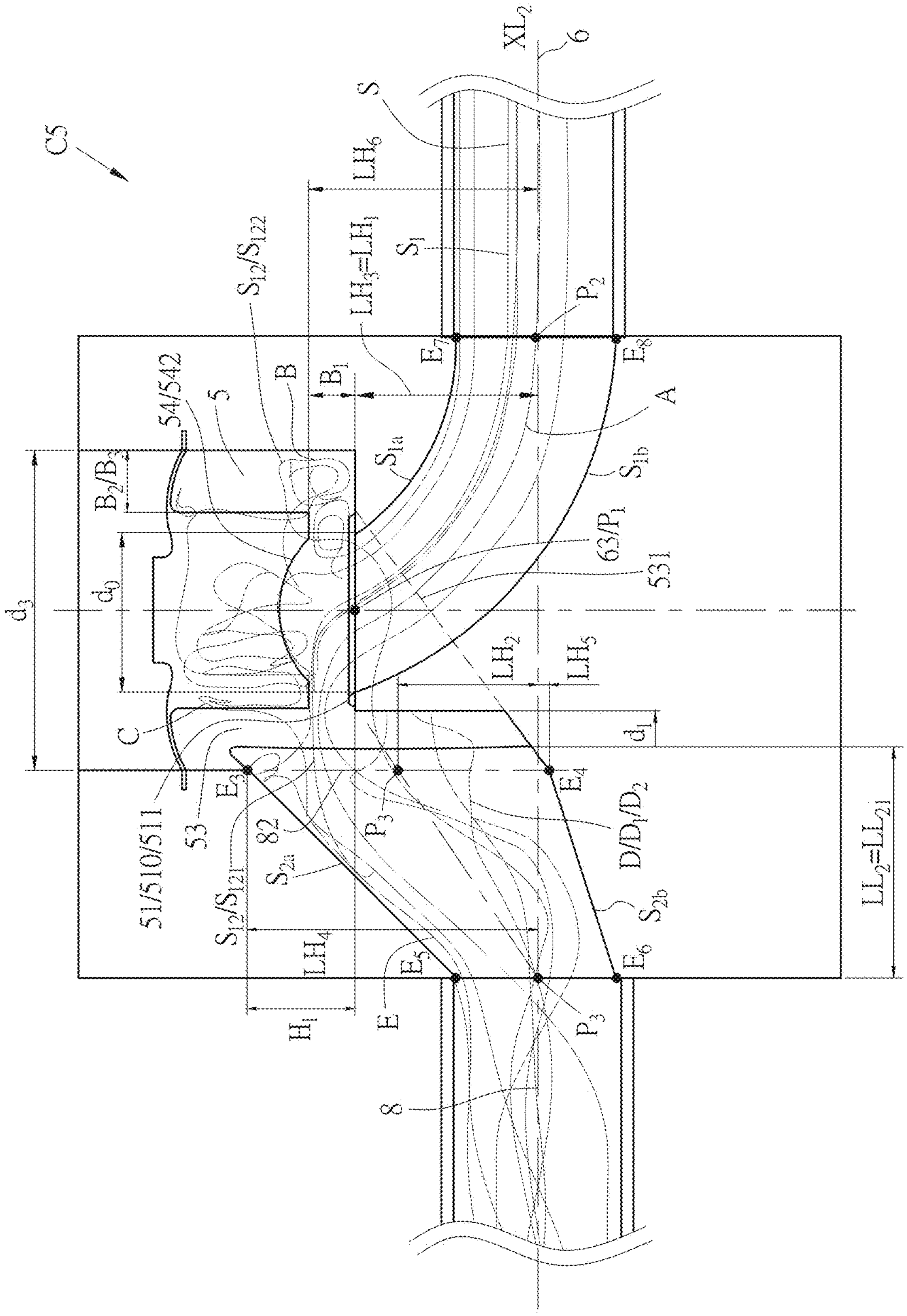
FIG. 8A shows the cross-sectional structure and the streamline distribution of Embodiment 3 of Structure C5 according to the present invention.
Figure 9A:
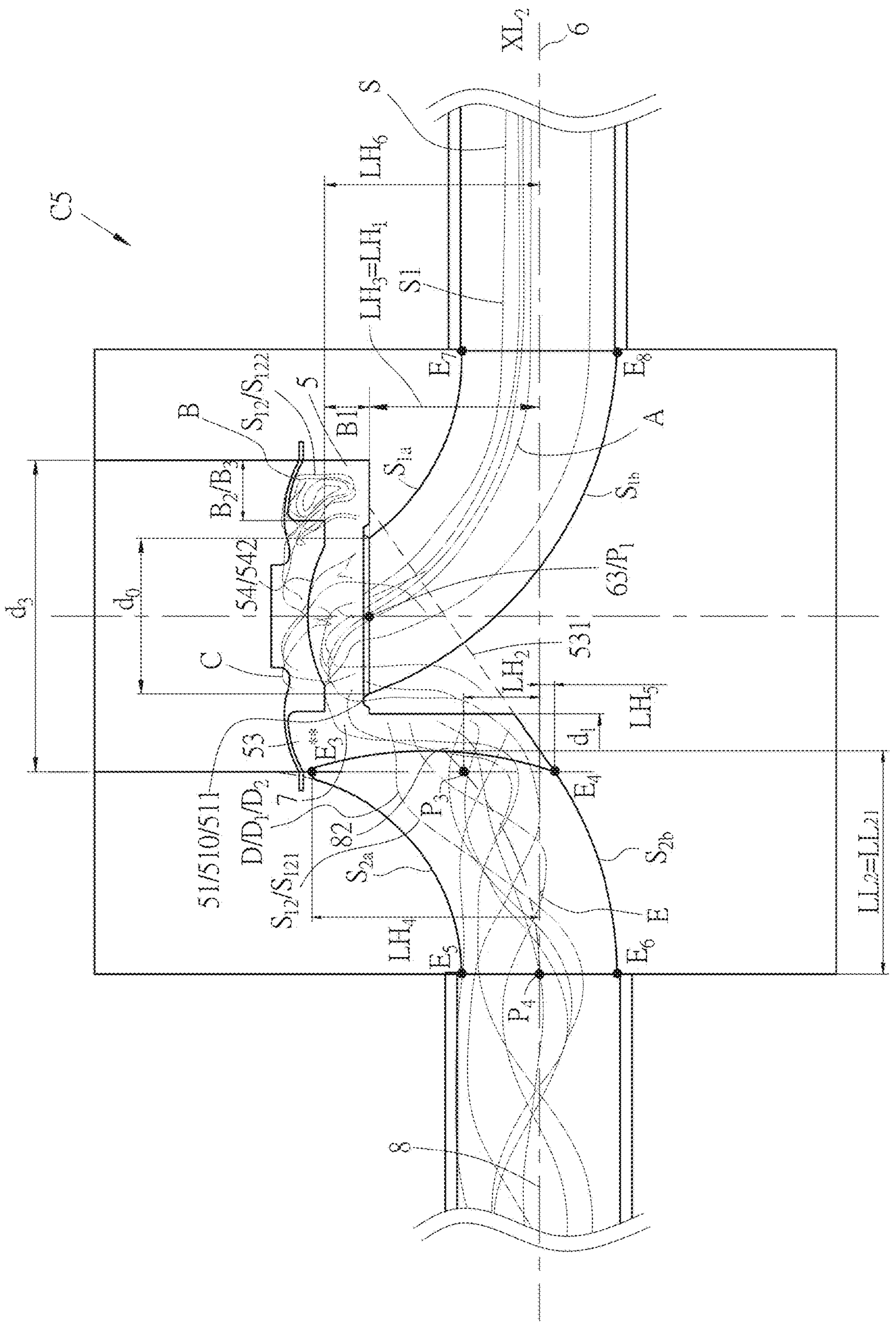
FIG. 9A shows the cross-sectional structure and the streamline distribution of Embodiment 4 of Structure C5 according to the present invention.
Figure 10A:
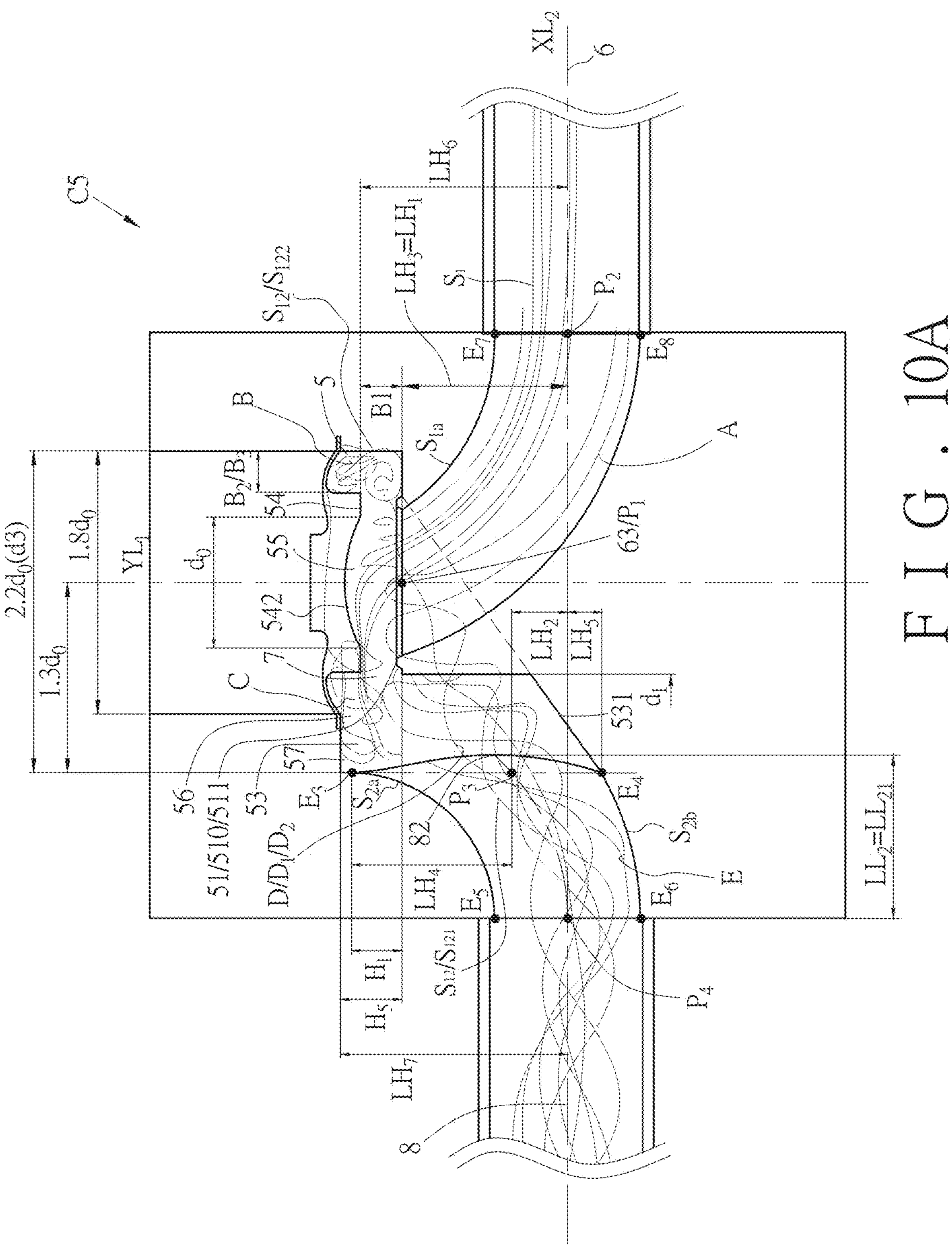
FIG. 10A shows the cross-sectional structure and the streamline distribution of Embodiment 5 of Structure C5 according to the present invention.
Figure 11A:
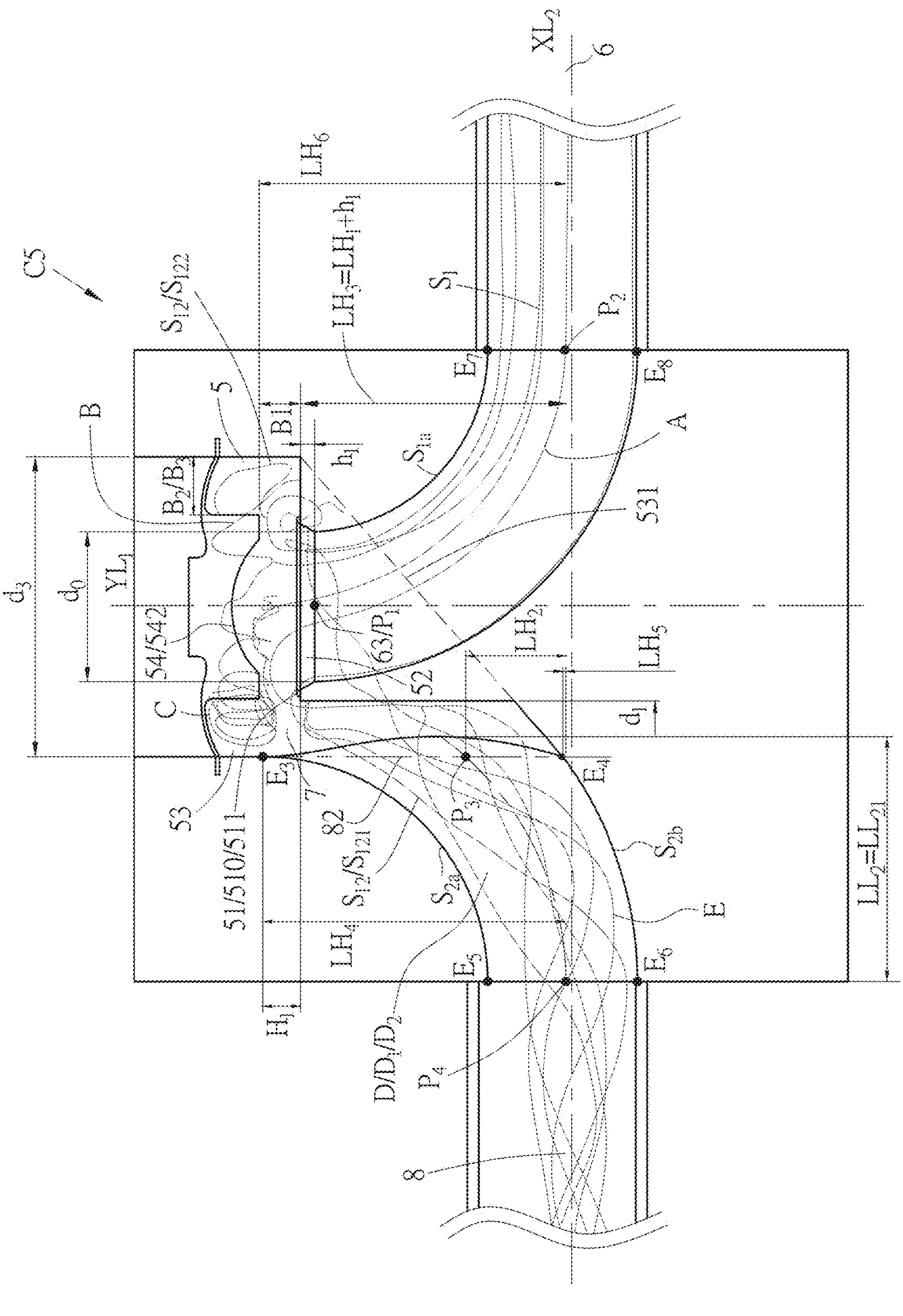
FIG. 11A shows the cross-sectional structure and the streamline distribution of Embodiment 6 of Structure C5 according to the present invention.

More analysis of flow channels based on Structure C5 of the present invention will also be discussed, including: Case E, i.e., Embodiment 2, as shown in FIG. 7A; Case F, i.e., Embodiment 3, as shown in FIG. 8A; Case G, i.e., Embodiment 4, as shown in FIG. 9A; Case H, i.e., Embodiment 5, as shown in FIG. 10A; and Case I, i.e., Embodiment 6, as shown in FIG. 11A.

Figure 1A:
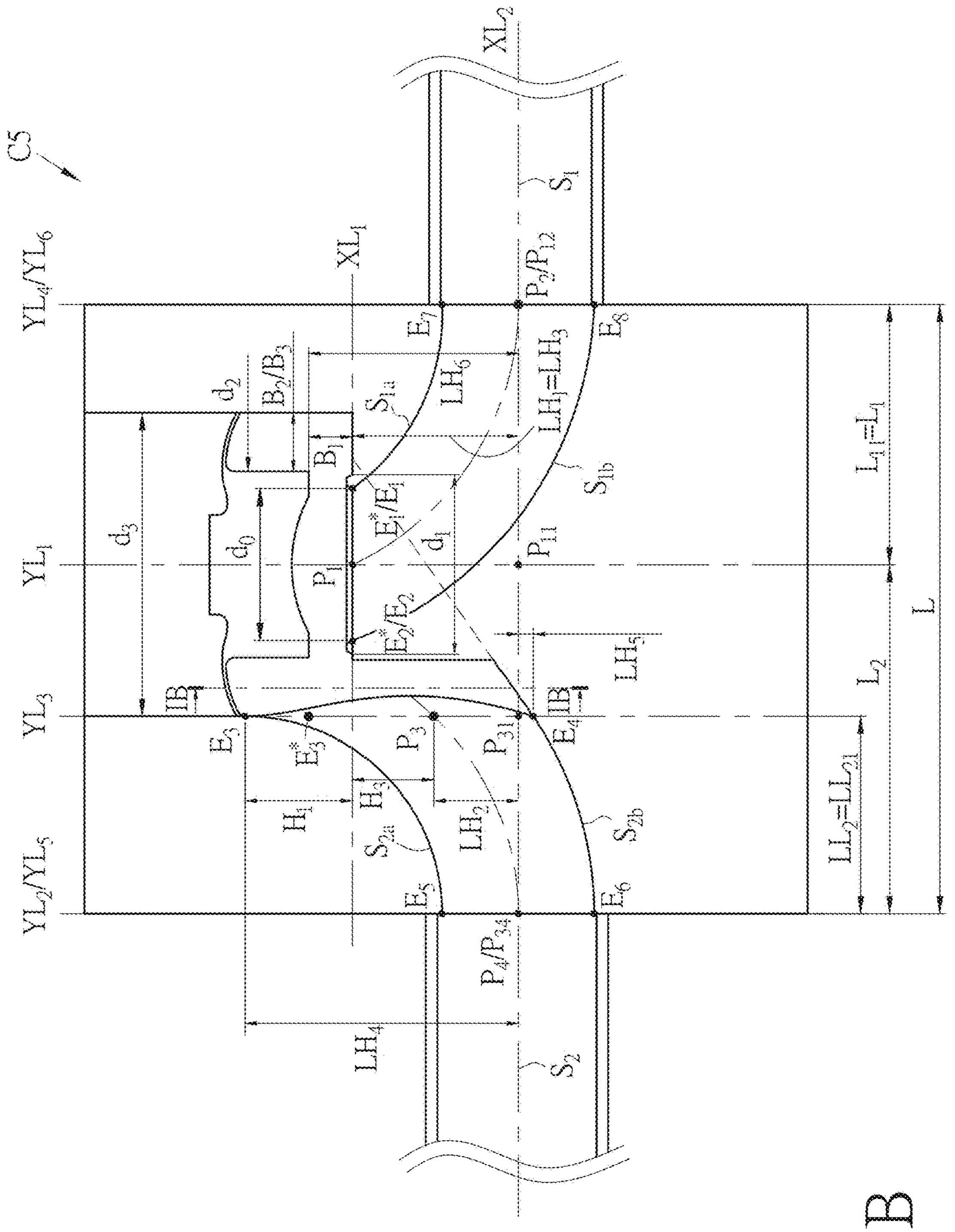
FIG. 1A schematically illustrates Structure C5, showing the flow channel structure and coordinate points.
Figure 1B:
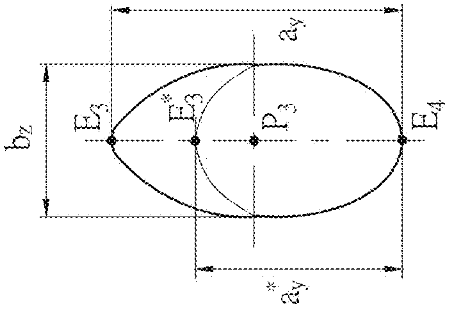
FIG. 1B is a cross-sectional view taken along Line IB-IB of FIG. 1A.
Figure 1C:
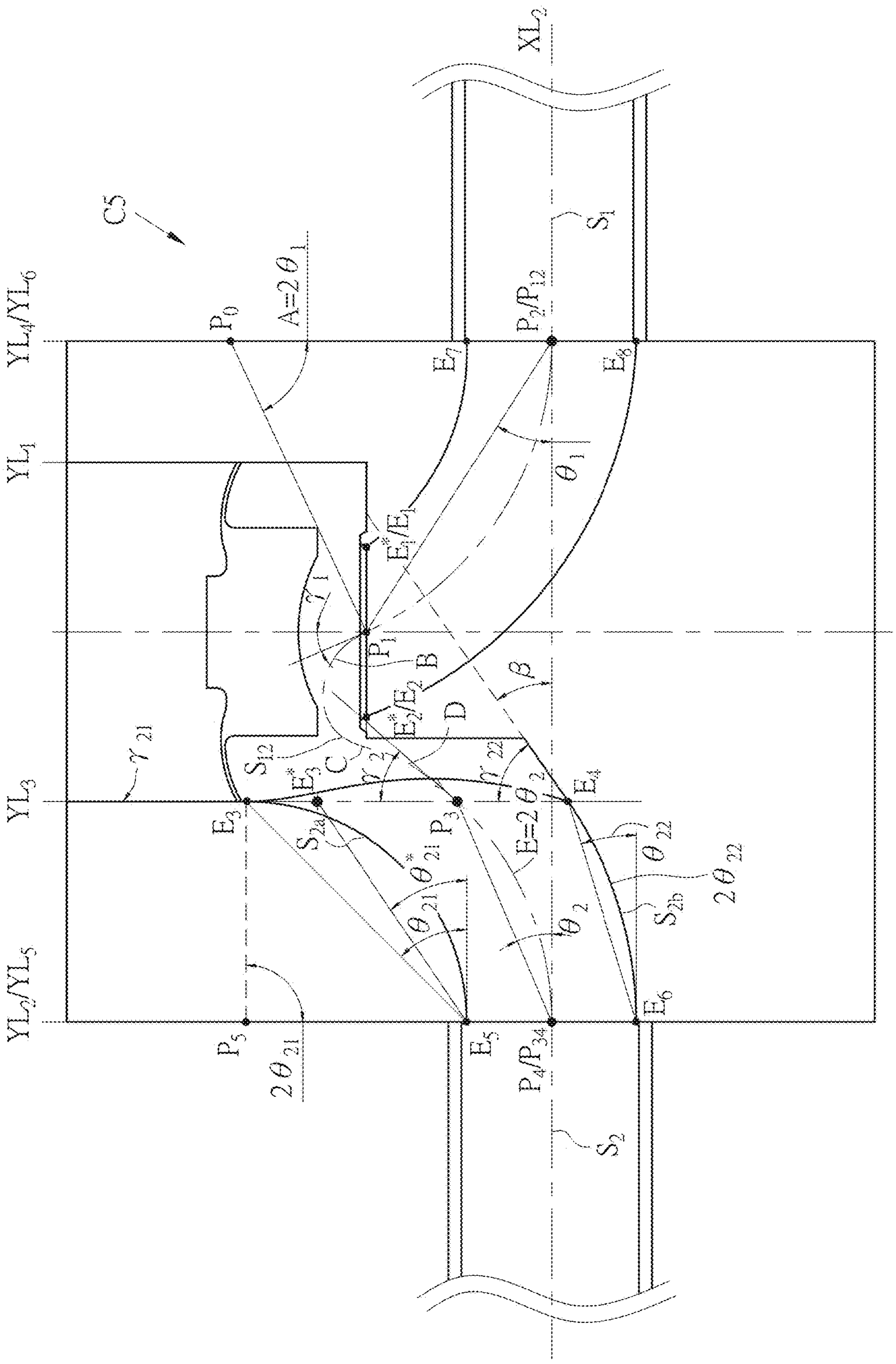
FIG. 1C schematically illustrates Structure C5, showing the placement angle $\theta$; bends $2\theta$, $\theta_1$, $\theta_2$, $\theta_{21}$, $\theta_{22}$, $2\theta_1$, $2\theta_2$, $2\theta_{21}$, $2\theta_{22}$; streamlines $S_1$, $S_{12}$, $S_2$, bends A, B, D, E; and the spread C.
Figure 2A:
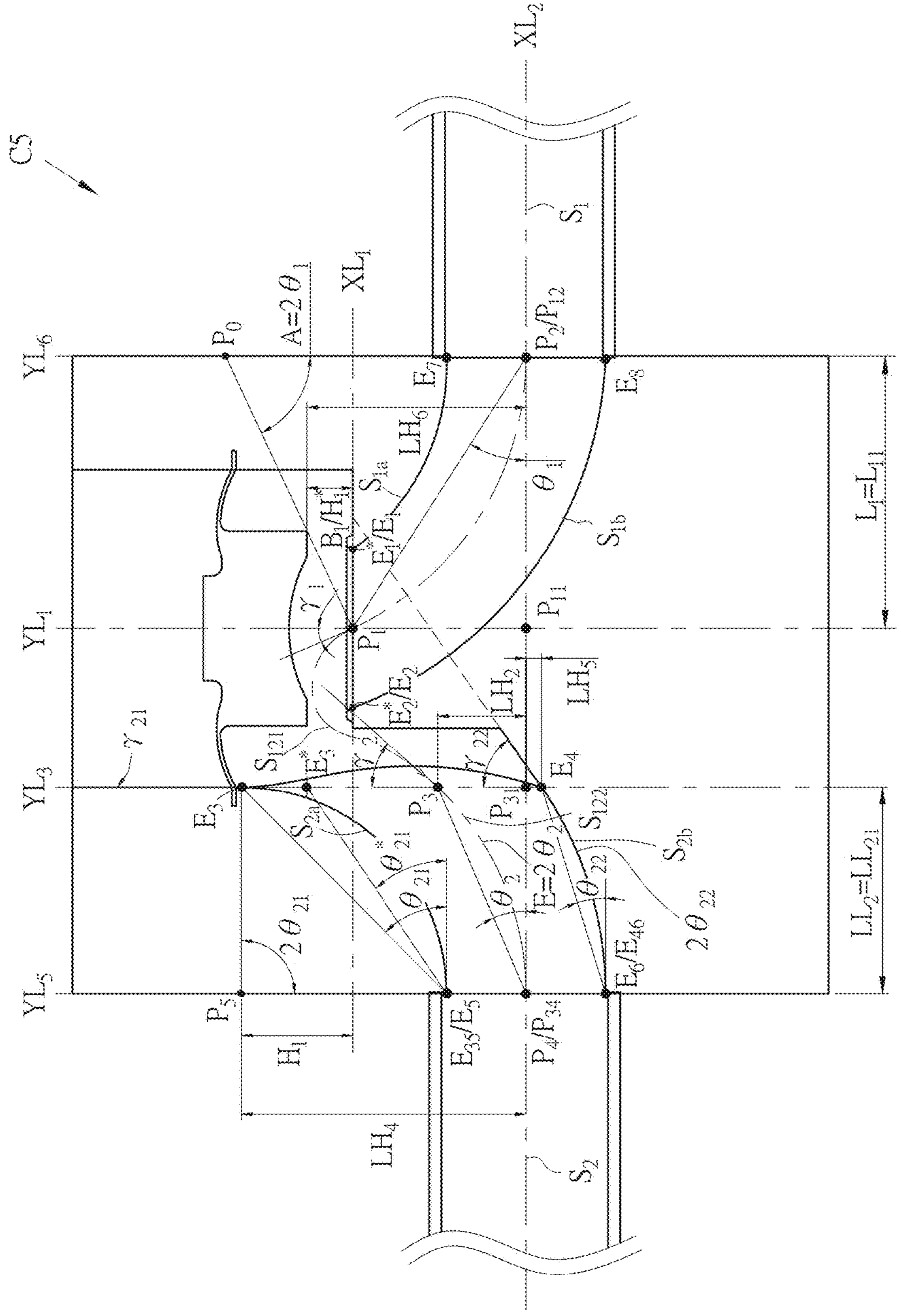
FIG. 2A schematically illustrates Embodiment 1 of Structure C5, showing the flow channel structure.
Figure 2B:
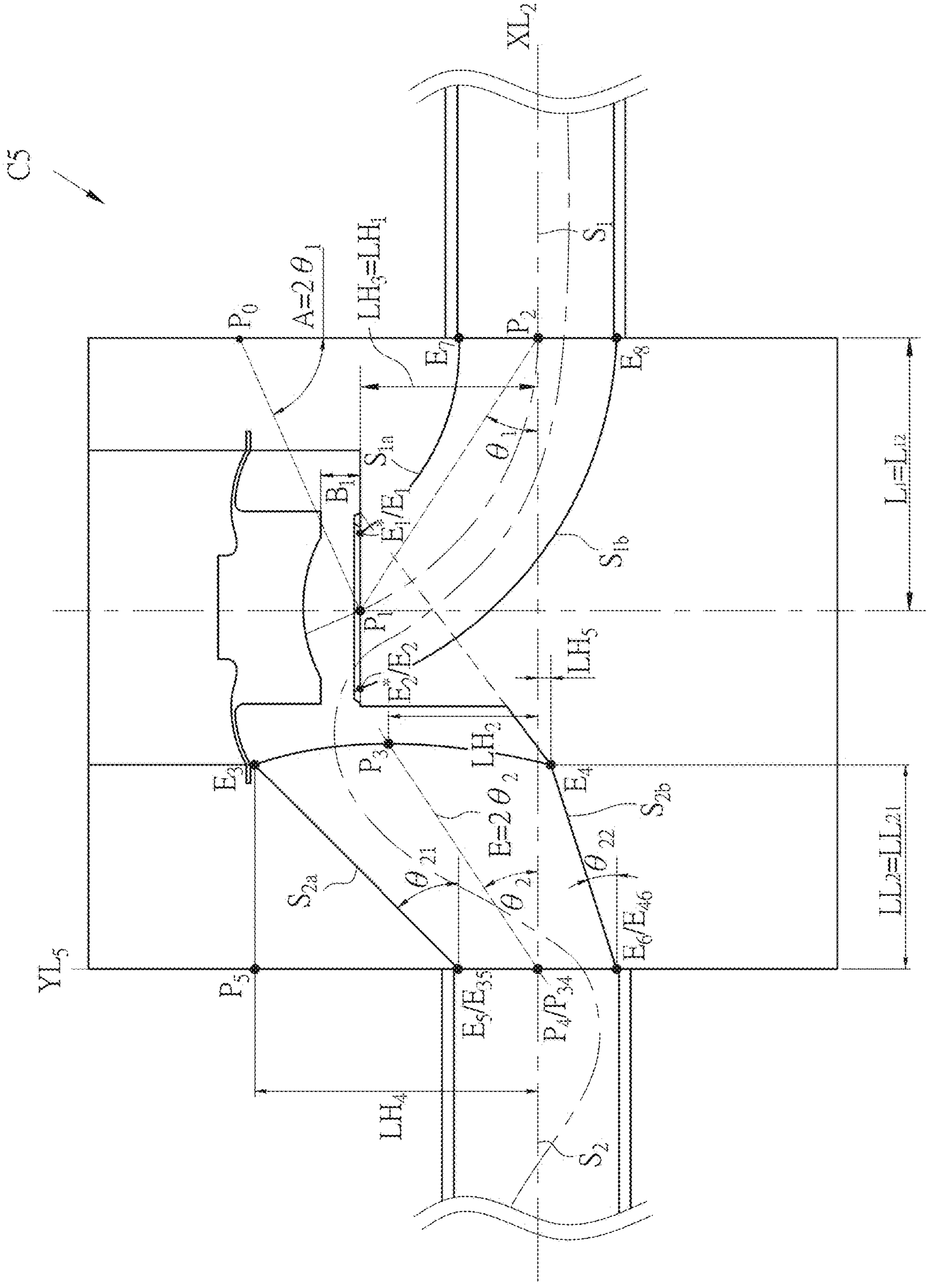
FIG. 2B schematically illustrates Embodiment 2 of Structure C5, showing flow channels.
Figure 2C:
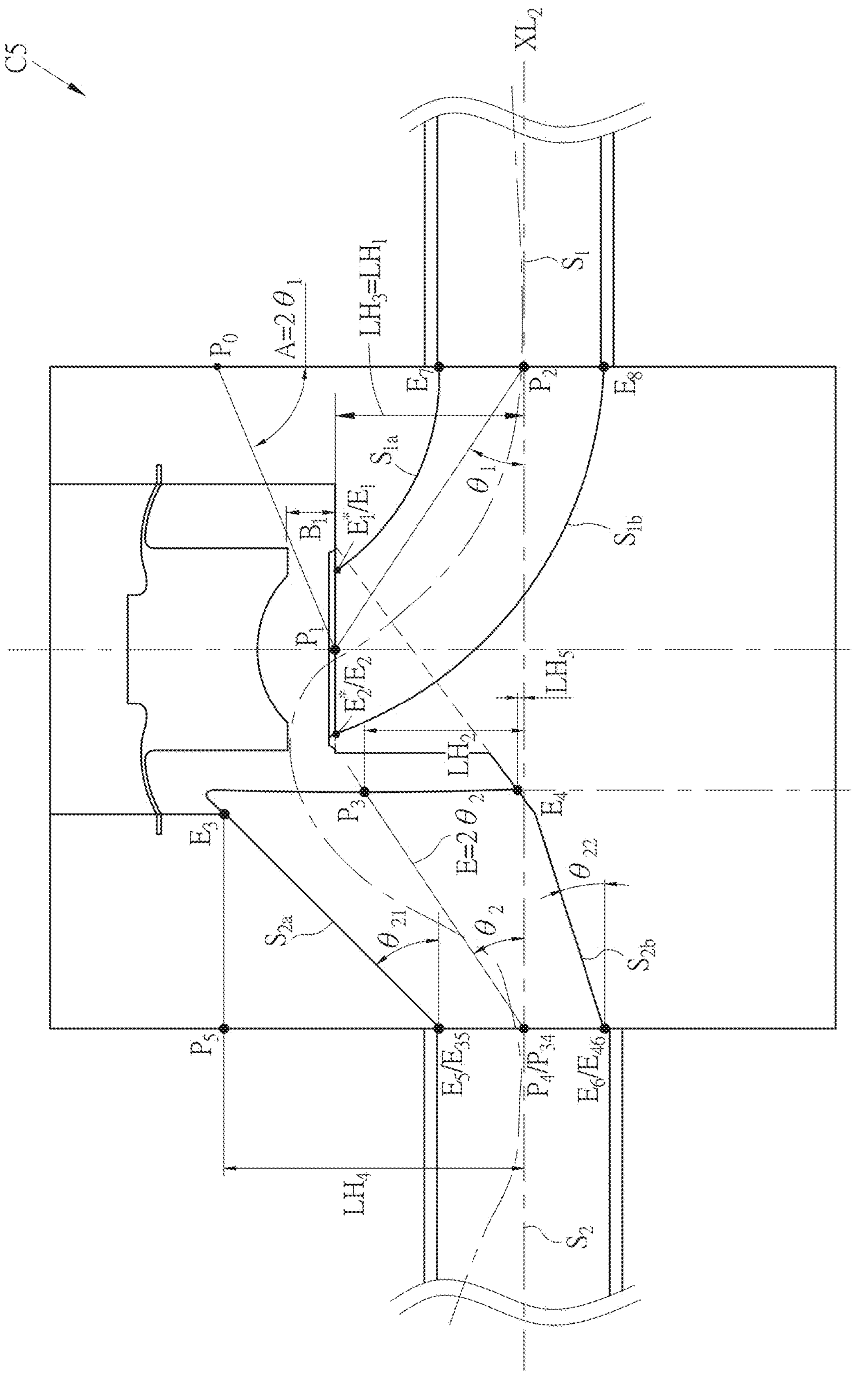
FIG. 2C schematically illustrates Embodiment 3 of Structure C5, showing the flow channel structure.
Figure 2D:
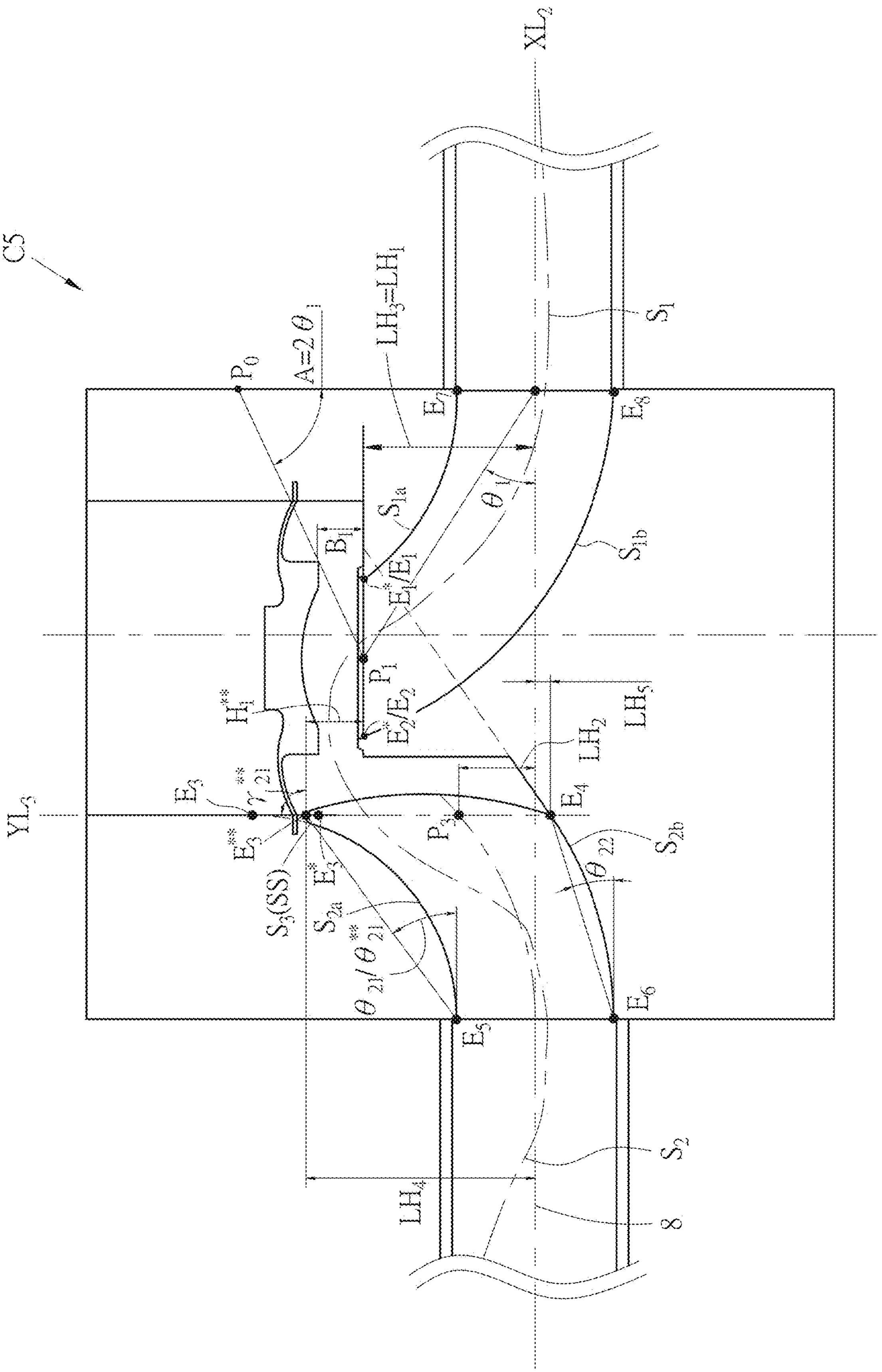
FIG. 2D schematically illustrates Embodiment 4 of Structure C5, showing
Figure 2E:
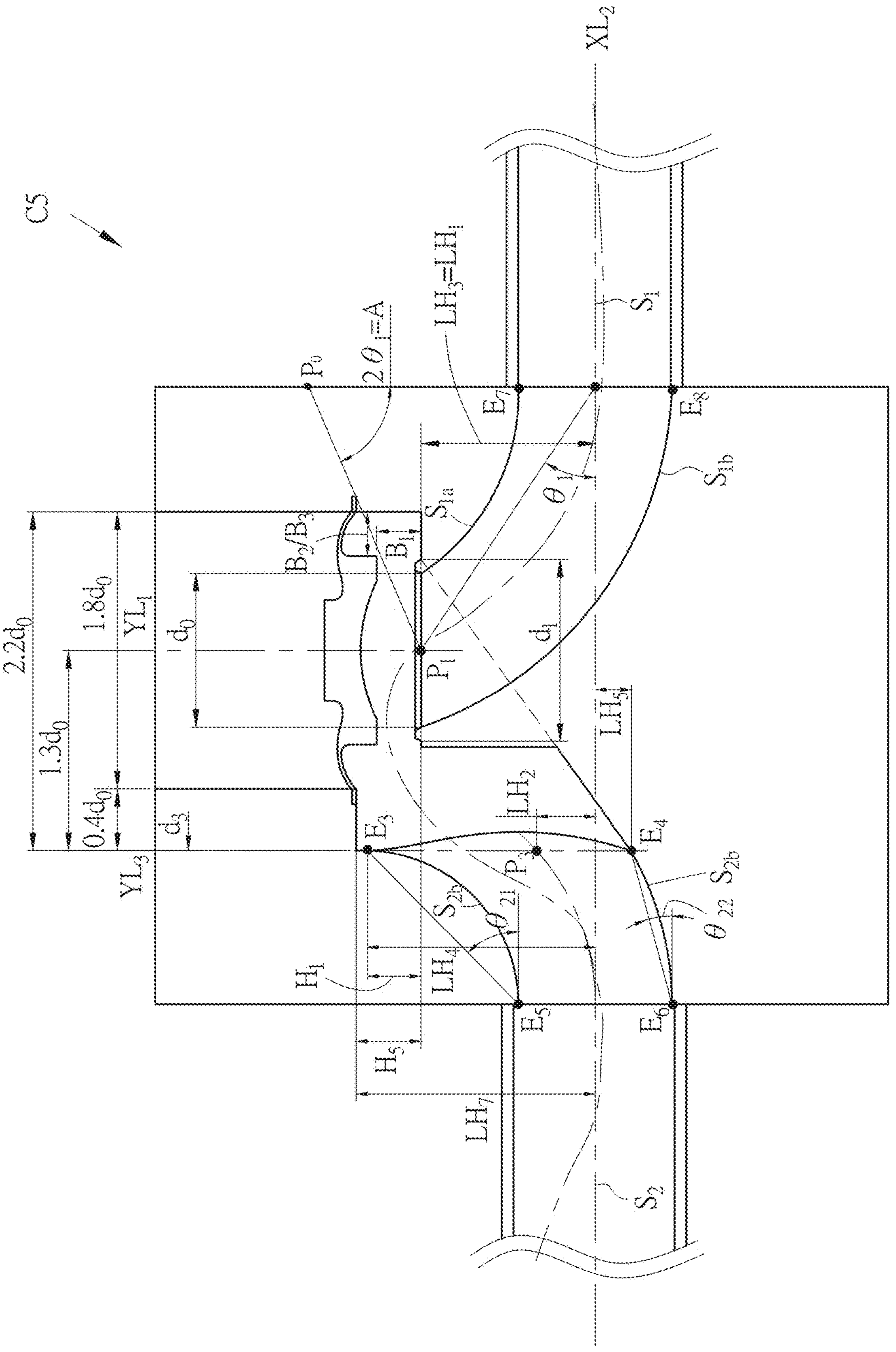
FIG. 2E schematically illustrates Embodiment 5 of Structure C5, showing.
Figure 2F:
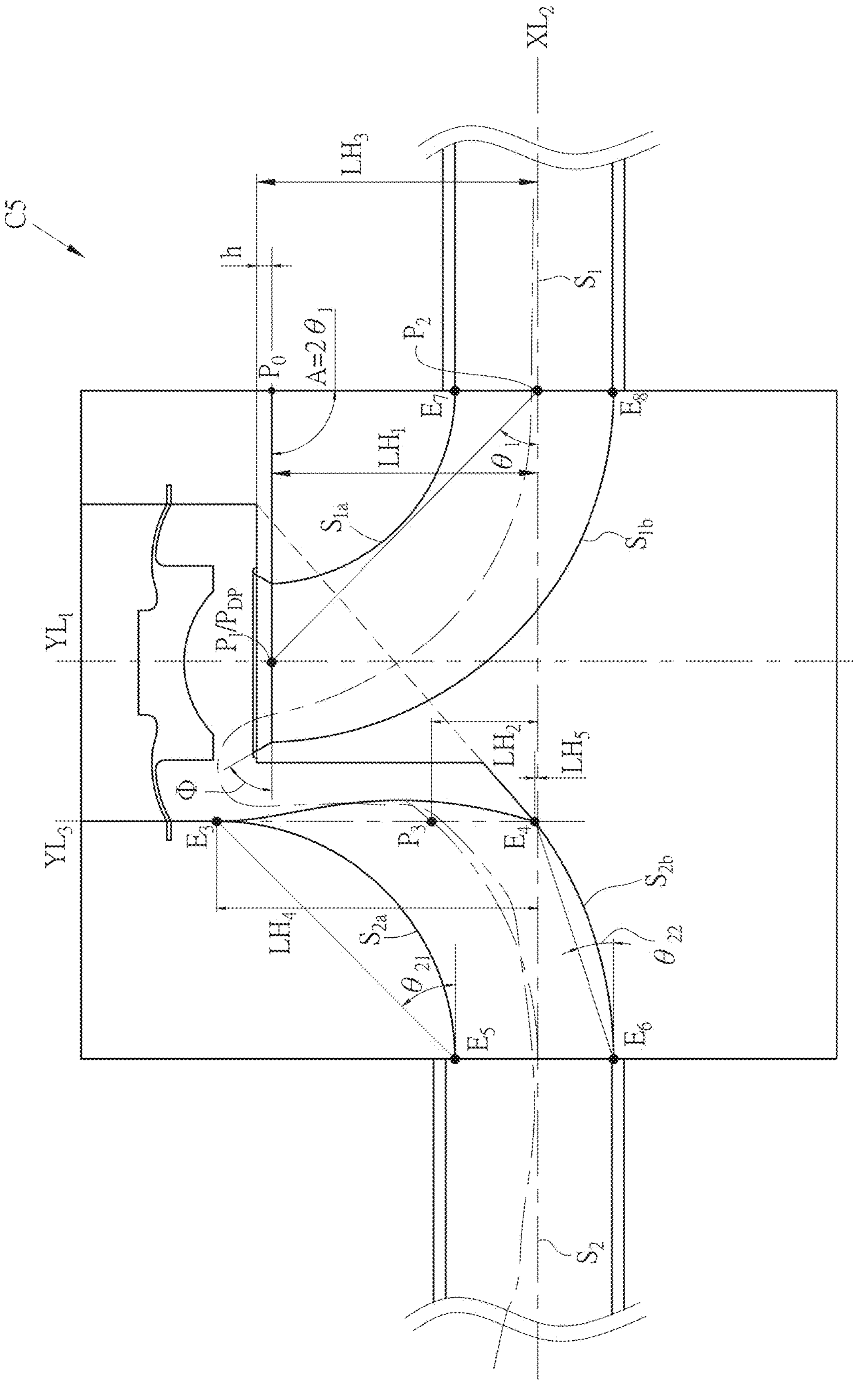
FIG. 2F schematically illustrates Embodiment 6 of Structure C5, showing.

Some structural parameters used to describe the cases are: for the center hole 63, a major axis $a_x$ (indicated by $E_1E_2$ in FIG. 1A) and a height $LH_1$; for the seal surface 510 that is installed at the periphery of the center hole 63 and has a sealing ring 511, a height $LH_3$; an included angle $\gamma_1$ between the inlet center line $S_1$ at the center hole 63 and the vertical line $YL_1$ (as shown in FIG. 1C); the radial passage opening $B_1$; the radial passage height $LH_6$; for the center point $P_3$, a height $LH_2$; for the distal point $E_3$, a height $LH_4$; for the proximal point $E_4$, a height $LH_5$; a placement angle $\theta_{21}$ of the $E_3E_5$ line segment; a placement angle $\theta_2$ of the $P_3P_4$ line segment; a placement angle $\theta_{22}$ of the $E_4E_6$ line segment; for the internal outlet, a major axis $a_y$, and a major axis $$a_y^*,$$

which is the line segment $$E_3^*E_4$$

defined by the mapping point $$E_3^*$$

on the major axis $a_y$; and a placement angle $$\theta_{21}^*$$

of the $$E_3^*E_5$$

line segment (as shown in FIG. 1B, FIG. 1C).

The analysis of the conventional flow channel of Case A (i.e. Structure C4) is as below.

Figure 3B:
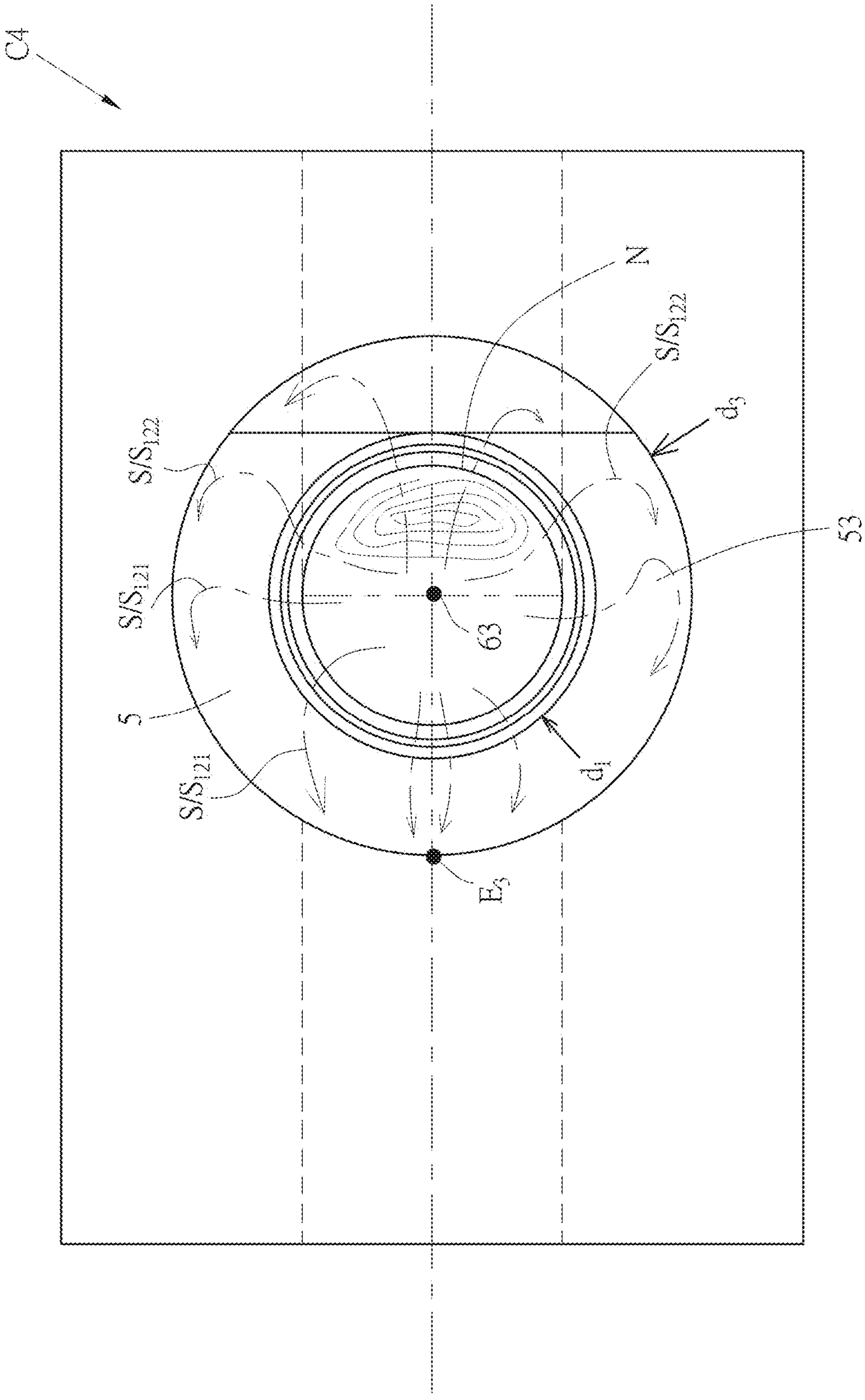
FIG. 3B (PRIOR ART)
FIG. 3B is a top view of Structure C4, showing streamlines fanning out in the valve chamber.
Figure 3C:
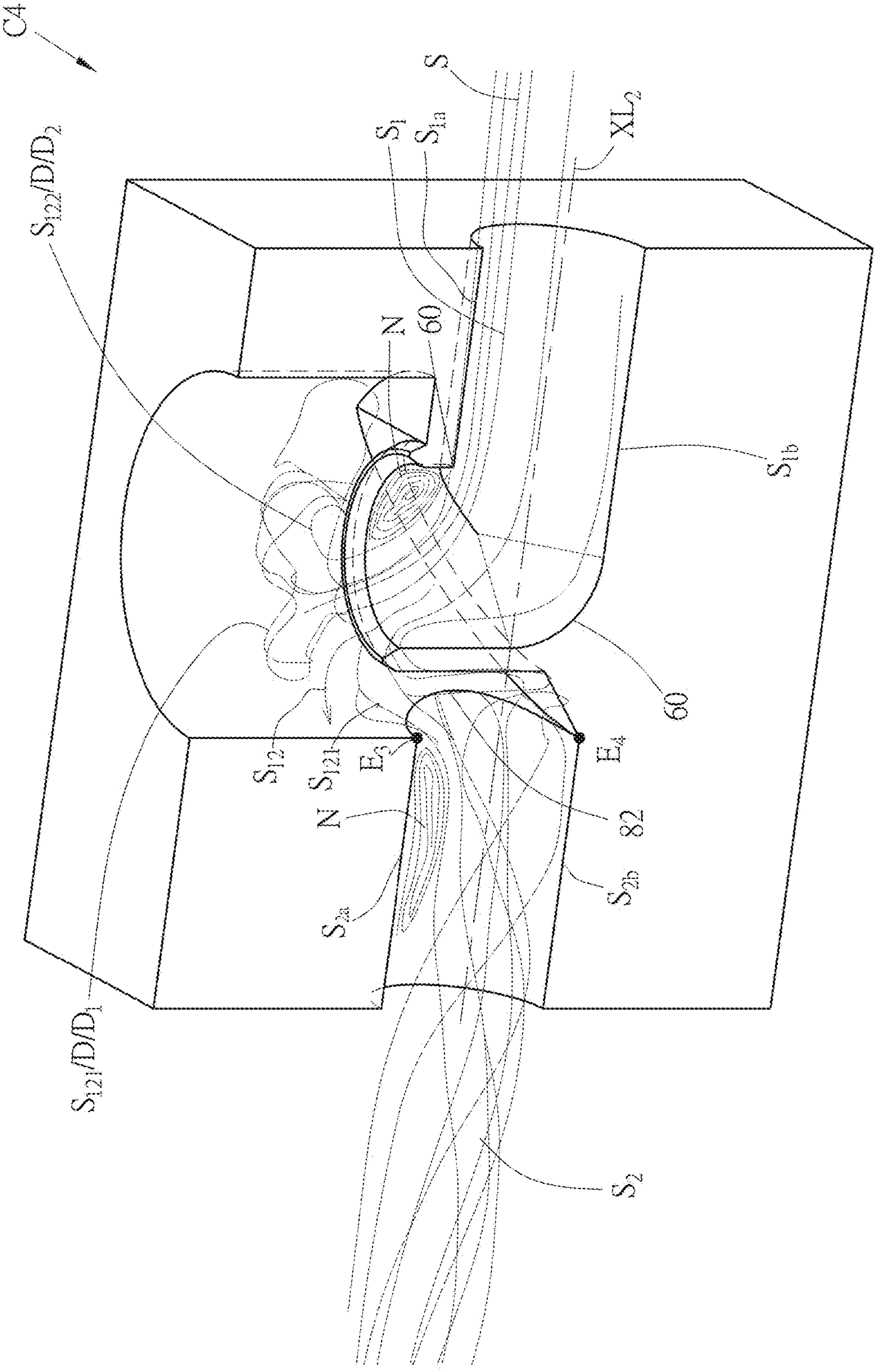
FIG. 3C (PRIOR ART)
FIG. 3C is a 45-degree view of the flow channel of Structure C4.

FIG. 3A shows the cross-sectional structure and the streamline distribution of the conventional structure based on Structure C4. FIG. 3B is a top view showing the streamlines fanning out in the valve chamber 5 of the same structure. FIG. 3C is a 45-degree view showing the radial center line $S_{12}$ at the corner D of the internal outlet 82 (referring to FIG. 1A through FIG. 1C).

$C_v$ value, $C_v \approx 61.89 < 73.5$, $\xi \approx 4.23 > 3.0$.

The inlet passage 6 is a horizontal, straight pipe, and has a right-angle corner 60 that guide the fluid to flow upward to then flow out through the center hole 63 of the valve seat 51, wherein $LH_3=LH_1=36$ mm, $\gamma_1=0°$, and $a_x=d_0$.

The ring-shaped ditch 53 is arranged between the outer diameter $d_1$ of the valve seat 51 and the inner diameter $d_3$ of the valve chamber 5, with the bottom of its bevel 531 at the same hight as the proximal point $E_4$.

The radial passage 7 is a ring-shaped, horizontally-diverging ditch that has a valve opening $B_1$.

The outlet passage 8 is a horizontal, straight pipe. The internal outlet 82 has a distal point $E_3$ lower than the seal surface 510 of the valve seat 51, i.e., $$LH_4 < LH_3;\ LH_6 = 49.14 \text{ mm},\ LL_2 = LL_{21} = 78.75 \text{ mm},$$
$$LH_4 = 26.25 \text{ mm},\ H_1 = -9.75 \text{ mm},\ LH_2 = 0 \text{ mm},\ LH_5 = -26.25 \text{ mm},$$
$$a_y = 52.5 \text{ mm},\ a_y^* = 52.5 \text{ mm},\ \theta_{21} = 0°,\ \theta_{21}^* = 0°,\ \theta_2 = 0°,\ \theta_{22} = 0°.$$

As to the corner A and the inlet center line $S_1$, the inlet center line $S_1$ in the inlet passage 6 was obviously affected by the right-angle corner 60 and some circumfluence zones N were generated as shown. Particularly, there was a large circumfluence zone N generated along the upper-edge line $S_{1a}$ and close to the center hole 63. This circumfluence zone N would make distribution of the streamline S unreasonably bend toward the lower-edge line $S_{1b}$, and reduce the effective area of the inlet passage 6.

As to the corner B, when the fluid near the lower-edge line $S_{1b}$ flows out through the center hole 63, a part of the streamline would cross the circumfluence zone N in the inlet passage 6 and close to the center hole 63 and spurt toward the distal point $E_1$ so as to flow into the radial passage 7 as the tranquil stream $S_{122}$. The corner B has an angle that is smaller than 90 degrees. Another part of the streamline S would spurt upward along the inner wall of the lower-edge line $S_{1b}$ and flow into the radial passage 7 as the rushing stream $S_{121}$. The corner B has an angle approximate to 90 degrees. As shown, the circumfluence zones N took up space in the flow channel and decreased the capacity of the inlet passage 6 while preventing the fluid from flowing into the radial passage 7 at a smaller cornering angle at the corner B.

As to the spread C, although the annular space $B_2$ of the radial gap $B_3$ caused two obvious vortexes, no particle agglutination was observed.

As to the spread C, the radial center line $S_{12}$, and fanning out, the height $LH_4$ of the distal point $E_3$ is lower than the height $LH_3$ of the seal surface 510 of the valve seat 51, i.e., $LH_4<LH_3$. The rushing stream $S_{121}$ was hindered by the inner wall of the valve chamber 5 and prevented from rushing into the internal outlet 82. The streamlines S of the rushing stream $S_{121}$ would fan out at the radial passage 7 with an angle greater than 180 degrees, and the tranquil stream $S_{122}$ would fan out in the remaining circumferential angles, as shown in to FIG. 3B.

The corner D includes the corner D1 for the rushing stream $S_{121}$ and the corner D2 for the tranquil stream $S_{122}$. The rushing stream $S_{121}$ and the tranquil stream $S_{122}$ both had to turn downward for 90 degrees before they could flow into the ring-shaped ditch 53. This is the first cornering at the corner D.

As to the corner D and the flow interference between the rushing stream $S_{121}$ and the tranquil stream $S_{122}$ in the valve chamber 5, the streamlines S of the rushing stream $S_{121}$ and tranquil stream $S_{121}$, during their first cornering at the corner D, had to turn downward for 90 degrees before they could enter the remaining ring-shaped ditch 53. Therein, a part of the streamlines S of the rushing stream $S_{121}$ would directly enter the internal outlet 82 with a shortest flowing distance. The tranquil stream $S_{122}$ had a longer flowing distance, and its 90-degree, downward cornering at the corner D would disturb the stratified flow of the rushing stream $S_{121}$ and the tranquil stream $S_{122}$ in the space of the ring-shaped ditch 53. The 90-degree, downward cornering at the corner D significantly increased flow interference within the valve chamber 5.

As to the corner D and the flow interference between the rushing stream $S_{121}$ and the tranquil stream $S_{122}$ at the internal outlet 82, the main streamline S of the rushing stream $S_{121}$ after being hindered by the inner wall of the valve chamber 5 turned downward to enter the ring-shaped ditch 53. After passing through the distal point $E_3$, it made the second cornering at the corner D1 in the horizontal outlet passage 8 with a turning angle also approximate to 90 degrees, i.e., $\alpha_1 \approx 90°$. The rushing stream $S_{121}$ had to flow with a relatively small radius of curvature $R_C$ rather than entering the upper-half space of the internal outlet 82 directly and reaching the lower-half space of the internal outlet 82. However, such a radius of curvature $R_C$ made the streamline S of the rushing stream $S_{121}$ have to cross the channel axis $XL_2$ to flow into the lower-half space of the internal outlet 82. This led to a circumfluence zone N formed by the inner periphery of the upper-edge line $S_{2a}$ in the outlet passage 8, and particle agglutination would happen here.

As to corner D, the streamline S of the tranquil stream $S_{122}$ would flow along the remaining bevel 531 at the bottom of the ring-shaped ditch 53, where $\alpha_2 \approx \beta$, and, before the proximal point $E_4$, make a turn at the second corner D2 to change its pose from being at the oblique angle $\beta$ to horizontal so that it could enter the lower-half space of the internal outlet 82. At this time, the tranquil stream $S_{122}$ and the rushing stream $S_{121}$ entering the lower-half space of the internal outlet would directly see flow interference, where $\alpha_3 \approx 90°-\beta$.

As to the corner E, the outlet passage 8 is a horizontal, straight pipe, and has its installation angle E of 0 degree. However, the rushing stream $S_{121}$ and the tranquil stream $S_{122}$ when entering the internal outlet 82 would have serous interference and there was a circumfluence zone N generated. Thus, the fluid had to spread inside the outlet passage 8 and this would increase head loss.

A summary of the conventional flow channel of Structure C4 is herein provided with reference to FIG. 3A. The corner A has the right-angle corner 60 that is a major source of head loss and reduces the effective area of the flow channel. The flow interference generated in the circumfluence zone N at the center hole 63 can make the streamlines S pass the angle of corner B at angles all approximate to 90 degrees. This is also a source of head loss. Since the outlet passage 8 is a horizontal, straight pipe, the distal point $E_3$ is lower than the seal surface 510 of the valve seat 51. Consequently, when the streamlines S in the radial passage 7 spread out radially, the streamlines of the rushing stream $S_{121}$ is hindered by the inner wall of the valve chamber 5 and forced to turn downward for 90 degrees to flow into the ring-shaped ditch 53. After the first corner D1 and the corner D2, the part of the rushing stream $S_{121}$ directly flowing toward the internal outlet 82 actually makes a ∩-shaped turn. This is also a source of head loss. The rushing stream $S_{121}$ when entering the internal outlet 82 has to make an almost 90-degree turn as the second remaining corner D1. This further adds head loss. At last, the rushing stream $S_{121}$ and the tranquil stream $S_{122}$ have serious interference in the internal outlet 82 and this also cause head loss. As a result, the flow channel of Structure C4 has its $C_V \approx 61.89<73.5$ and $\xi \approx 4.23>3.0$ both fail to support the desired high flow rate.

The analysis of the conventional flow channel of Case B (i.e. Refinement 1 of Structure C4) is as below.

Figure 4B:
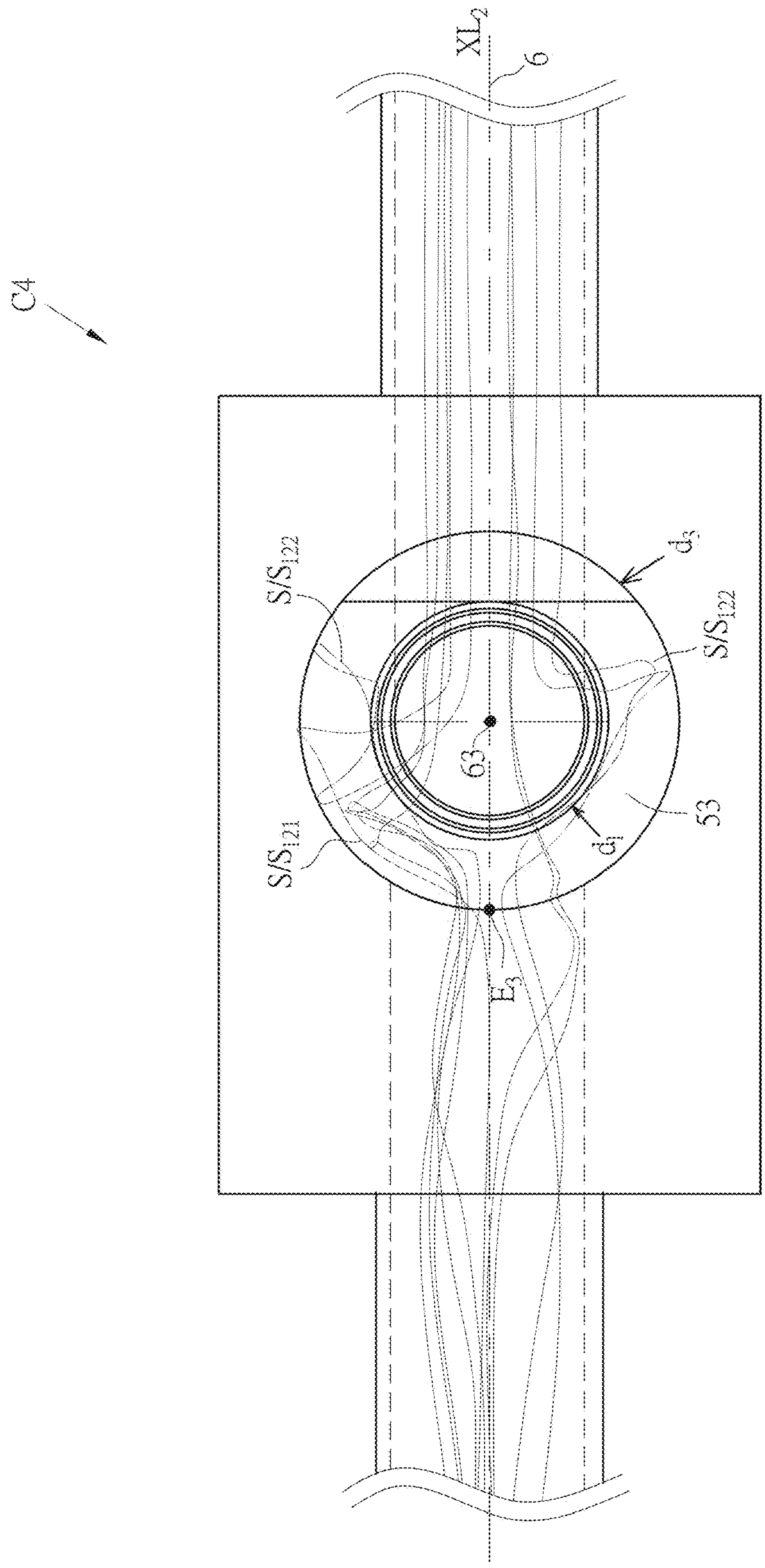
FIG. 4B is a top view of Refinement 1 of Structure C4 showing streamlines fanning out in the valve chamber.
Figure 4C:
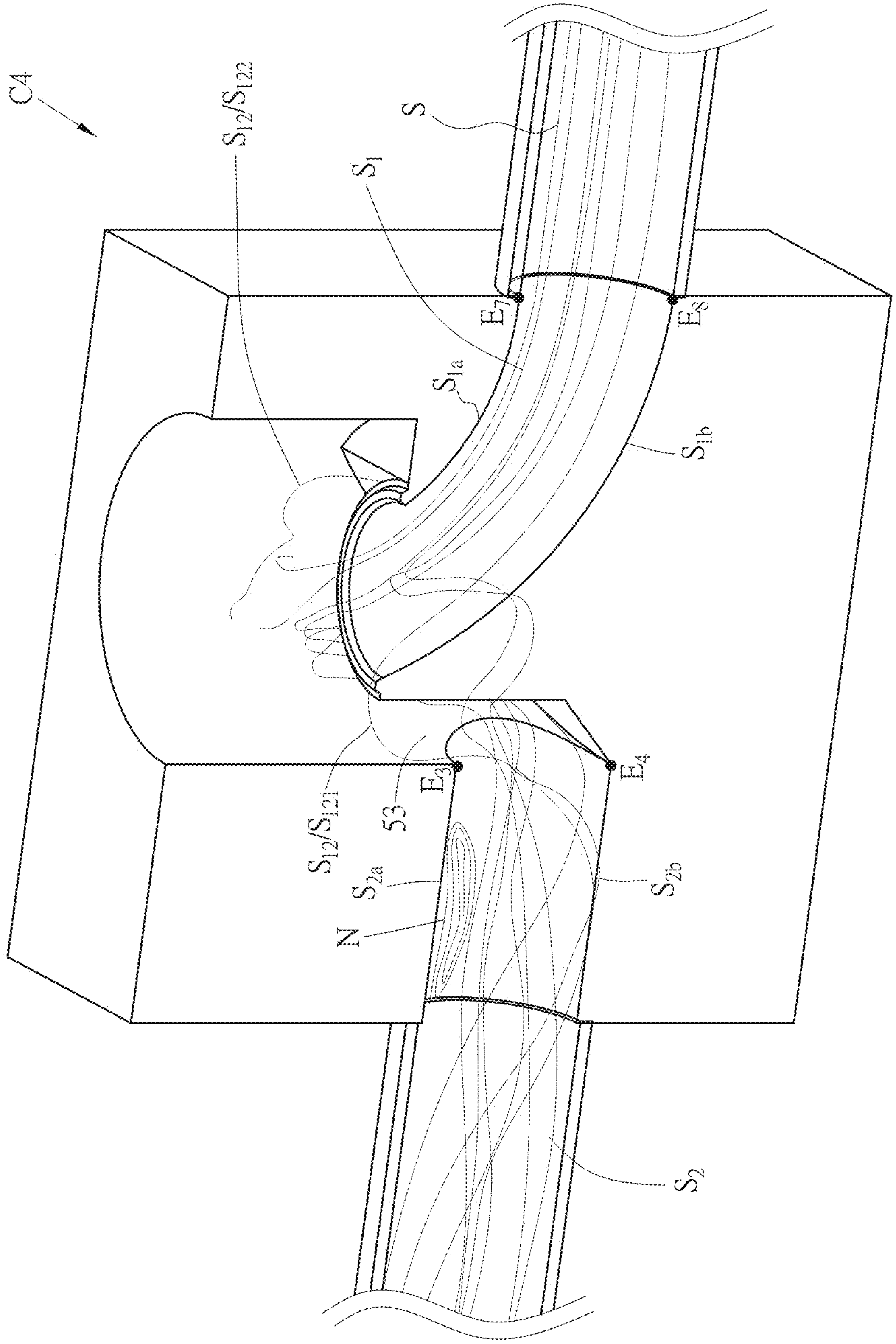
FIG. 4C is a 45-degree view of the flow channel of Refinement 1 of Structure C4.

FIG. 4A shows the cross-sectional structure and the streamline distribution of the conventional structure according to Refinement 1 of Structure C4. FIG. 4B is a top view of Refinement 1 of Structure C4, showing streamlines fanning out in the valve chamber 5. FIG. 4C is a 45-degree view of Refinement 1 of Structure C4 showing the radial streamline $S_{12}$ at the corner D by the internal outlet 82 (also referring to FIG. 1A through FIG. 1C).

$C_v$ value, $C_V \approx 69.88<73.5$, $\xi \approx 3.32>3.0$.

The inlet passage 6 is a curved pipe, guiding the fluid to flow upward at the corner A and flow out upward through the center hole of the valve seat 51. Therien, $LH_3=LH_1=59.34$ mm, $\gamma_1=23.2°$, and $d_0/a_x \approx 0.911$.

The ring-shaped ditch 53 is arranged between the outer diameter $d_1$ of the valve seat 51 and the inner diameter $d_3$ of the valve chamber 5, with the bottom of its bevel 531 at the same hight as the proximal point $E_4$.

The radial passage 7 is a ring-shaped, horizontally-diverging ditch that has a valve opening $B_1$.

The outlet passage 8 is a horizontal, straight pipe. The distal point $E_3$ of the internal outlet 82 is lower than the seal surface 510 of the valve seat 51. Therein, $$LH_4 < LH_3;\ LH_6 = 72.48\text{ mm},\ LL_2 = LL_{21} = 52.5\text{ mm},\ LH_4 = 26.25\text{ mm},$$
$$H_1 = -33.09\text{ mm},\ LH_2 = 0\text{ mm},\ LH_5 = -26.25\text{ mm},\ a_y = 52.5\text{ mm},$$
$$a_y^* = 52.5\text{ mm},\ \theta_{22} = 0°,\ \theta_{21} = 0°,\ \theta_{21}^* = 0°,\ \theta_2 = 0°,\ \theta_{22} = 0°.$$

As to the corner A and the inlet center line $S_1$, the shown inlet center line $S_1$ did not have any circumfluence zone N in the inlet passage 6 and the streamlines S spread smoothly. the center hole 63 of the inlet passage 6 had an included angle $\gamma_1$, where $\gamma_1 \neq 0°$. This also reduced the effective cross-sectional area of the flow channel but did not cause any circumfluence zone N and streamline cornering. Besides the effective cross-sectional area was still much larger than that shown in FIG. 3A.

As to the corner B, when the fluid flows out from the center hole 63, the streamlines S would make a turn at the corner B. As shown, the streamlines S spread smoothly. Their radius of curvature $R_c$ at the upper-edge line $S_{1a}$ was relatively small, so the flow rate was high and the streamlines S were concentrated. As shown in FIG. 4A, a large part of the streamlines S flowing along the upper-edge line $S_{1a}$ made a turn at the center hole 63 to flow toward the proximal point $E_2$ and enter the radial passage 7 as the rushing stream $S_{121}$. Another part of the streamlines S turned toward the distal point $E_1$ and flowed into the radial passage 7 as the tranquil stream $S_{122}$. This would slightly reduce the angle of corner B and smoothen the flow channel. Although the area of the flow channel was reduced due to the included angle $\gamma_1$, the smooth flow channel could only bring about some head loss.

As to the spread C, the radial streamline $S_{12}$, and fanning out, the height $LH_4$ of the distal point $E_3$ is lower than the height $LH_3$ of the seal surface 510 of the valve seat 51, i.e., $LH_4 < LH_3$. The rushing stream $S_{121}$ was hindered by the inner wall of the valve chamber 5 and prevented from rushing into the internal outlet 82. The streamlines S of the rushing stream $S_{121}$ fanned out at the radial passage 7 with an angle smaller than 180 degrees. The tranquil stream $S_{122}$ would fan out at the remaining circumferential angles. The annular space B2 of the radial gap $B_3$ caused two obvious vortexes, but no particle agglutination was observed.

As to the corner D and the corner E, the smoothen outlet passage 8 of the present case is similar to the outlet passage 8 of Case A, so there was flow interference both in the valve chamber 5 and at the internal outlet 82 and had a circumfluence zone N formed.

A summary of the conventional flow channel of Refinement 1 of Structure C4 is herein provided with reference to FIG. 4A. The corner A is a rounded corner that can significantly reduce local head loss. Any corner B that could reduce the area of the flow channel area but is free of any circumfluence zone N would have its angle somehow reduced, and this is a factor contributing to reduced local head loss. The outlet passage 8 is a horizontal, straight pipe, so the distal point $E_3$ is lower than the seal surface 510 of the valve seat 5. Consequently, when spreading in all directions at the radial passage 7, the streamlines of the rushing stream $S_{121}$ and tranquil stream $S_{122}$ would be hindered by the inner wall of the valve chamber 5 and have to turn downward for 90 degrees to flow into the ring-shaped ditch 53. This could reduce flow interference in the valve chamber 5 but the effect would be little. The first corner D1 and the corner D2 are also sources of head loss. The rushing stream $S_{121}$ when entering the internal outlet 82 had to make an almost 90-degree turn at the second corner D1. This would cause additional head loss. At last, the rushing stream $S_{121}$ and the tranquil stream $S_{122}$ had serious flow interference at the internal outlet 82 and this further increased head loss. As a result, the flow channel of Refinement 1 of Structure C4 had $C_V \approx 69.88 < 73.5$, and $\xi \approx 3.32 > 3.0$. While the $C_V$ value is 12.91% higher than that of the original version of Structure C4, i.e., Case A, Refinement 1 still fails to achieve a desired high flow rate due to the outlet passage.

The analysis of the conventional flow channel of Case C (i.e. Refinement 2 of Structure C4) is as below.

Figure 5B:
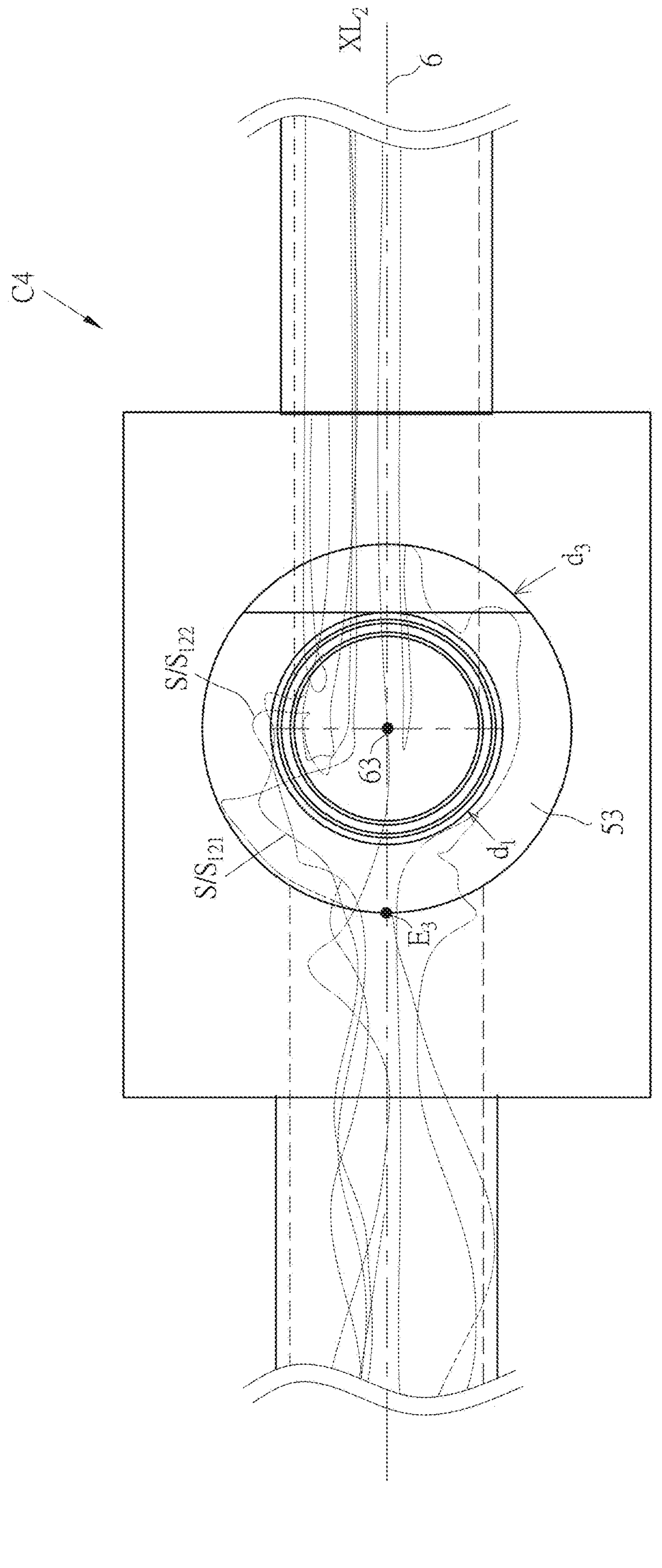
FIG. 5B is a top view of Refinement 2 of Structure C4, showing streamlines fanning out in the valve chamber.
Figure 5C:
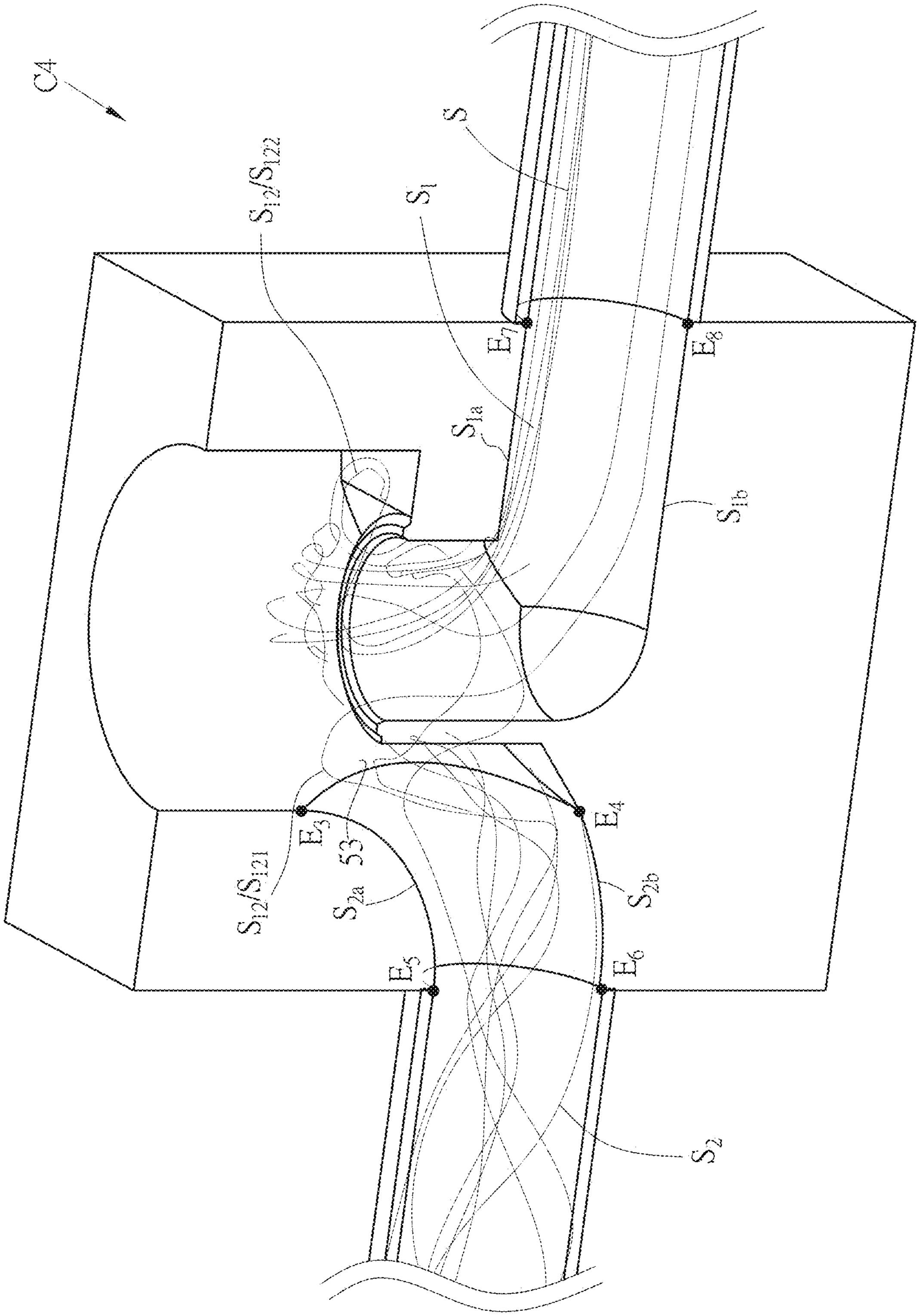
FIG. 5C is a 45-degree view of Refinement 2 of Structure C4, showing the flow channel.

FIG. 5A shows the conventional cross-sectional structure and the streamline distribution of Refinement 2 of Structure C4. FIG. 5B is a top view of Refinement 2 of Structure C4 showing streamlines fanning out in the valve chamber 5. FIG. 5C is a 45-degree view of Refinement 2 of Structure C4 showing the radial streamline $S_{12}$ by the corner D at the internal outlet 82 (also referring to FIG. 1A through FIG. 1C).

$C_v$ value, $C_V \approx 64.09 < 73.5$, $\xi \approx 3.94 > 3.0$.

The inlet passage 6 is a horizontal, straight pipe, and has a right-angle corner 60 to turn upward and go out at the center hole of the valve seat 51; $LH_3 = LH_1 = 59.34$ mm, $\gamma_1 = 0°$, $a_x = d_0$.

The ring-shaped ditch 53 is arranged between the outer diameter $d_1$ of the valve seat 51 and the inner diameter $d_3$ of the valve chamber 5, with the bottom of its bevel 531 at the same hight as the proximal point $E_4$.

The radial passage 7 is a ring-shaped, horizontally-diverging ditch that has a valve opening $B_1$.

The outlet passage 8 is a curved pipe, and the distal point $E_3$ of the internal outlet 82 has a height $LH_4$ higher than that of the seal surface 510 of the valve seat 51. Therein, $$LH_4 > LH_3 LH_6 = 72.48\text{ mm},\ H_1 \approx 19.41\text{ mm},$$
$$LH_2 = 20.05\text{ mm},\ LL_2 = LL_{21} = 52.5\text{ mm},\ LH_4 = 78.75\text{ mm},$$
$$LH_2 = 20.05\text{ mm},\ LH_5 = -12.18\text{ mm},\ a_y = 90.93\text{ mm},$$
$$a_y^* = 84.66\text{ mm},\ \theta_{21} = 45°,\ \theta_{21}^* = 41.36°,\ \theta_2 = 22.46°,\ \theta_{22} = 15.0°.$$

As to the corner A, the inlet center line $S_1$, and the corner B, the inlet passage 6 of the present case is similar to the inlet passage 6 of Case A. The circumfluence zone N in the inlet passage 6 close to the center hole 63 took up space in the flow channel and reduced the flow capacity of the inlet passage 6. It also prevented the fluid from flowing into the radial passage 7 with a reduced angle at the corner B.

As to the spread C, the radial center line $S_{12}$, and fanning out, the distal point $E_3$ is higher than the seal surface 510 of the valve seat 51, i.e., $LH_4 > LH_3$. The internal outlet 82 is a non-standard elliptic hole, with a ratio between its major axis $a_y$ and diameter $d_0$ of $a_y/d_0 = 1.732$. The proximal point E4 has a height $LH_5$, $LH_5 = -12.18$ mm. As affected by the circumfluence zone N close to the center hole 63, the streamlines S of the rushing stream $S_{121}$ performed just as those in Case A. However, the streamlines S of the rushing stream $S_{121}$ at the spread C in the present case could directly flow into the internal outlet 82 and the fan out in a range smaller than 180 degrees. The tranquil stream $S_{122}$ would fan out at the remaining circumferential angles. The annular space $B_2$ of the radial gap $B_3$ caused two obvious vortexes, but no particle agglutination was observed.

The corner D includes the corner D1 for the rushing stream $S_{121}$ and the corner D2 for the tranquil stream $S_{122}$. Since the distal point $E_3$ is higher than the seal surface 510 of the valve seat 51, the angle of the corner D at which the rushing stream $S_{121}$ and the tranquil stream $S_{122}$ turned downward to flow into the ring-shaped ditch 53 was reduced significantly. For the first corner D, $H_1 \approx 19.41$ mm and $B_1 \approx 13.14$ mm, which means the radial passage 7 was covered between the center point $P_3$ and the distal point $E_3$. The corner D at the center point $P_3$ has an angle $2\theta_2 = 44.91°$, and the line segment $$E_3^* E_4$$

of the mapping point $$E_3^*$$

forms a new major axis $$a_y^*,$$

where $$LH_6 = 72.465\text{ mm},\ a_y^*/d_0 = 1.612,\ \theta_{21}^* = 41.35°.$$

This means most of the rushing stream $S_{121}$ would flow into through the space of the internal outlet 82 between the mapping point $$E_3^*$$

and the center point $P_3$. Ine rushing stream $S_{121}$ when entering the internal outlet 82 passed the corner D at an angle, where 44.91°<Corner D<82.7°. The unduly high $H_1$ means the corner D would cause additional head loss.

As to the corner D and flow interference between the rushing stream $S_{121}$ and the tranquil stream $S_{122}$ in the valve chamber 5, the streamlines S of the rushing stream $S_{121}$ and tranquil stream $S_{121}$ could enter the ring-shaped ditch 53 by simply making a downward turn at the first corner D that is smaller than 90 degrees. Therein, a part of the streamlines S of the rushing stream $S_{121}$ would enter the internal outlet 82 with a smaller cornering angle and the shortest distance, while the remaining rushing stream $S_{121}$ would flow for a longer distance and have to make a downward turn at a larger angle by corner D. The tranquil stream $S_{122}$ would run the largest distance and have to turn downward at an even larger angle by the corner D, so that the rushing stream $S_{121}$ and the tranquil stream $S_{122}$ could achieve stratified flow in the space defined in the ring-shaped ditch 53. The rushing stream $S_{121}$ would flow along the upper-half space of the ring-shaped ditch 53, and the tranquil stream $S_{122}$ would flow in the lower-half space of the ring-shaped ditch 53 along the observed. bevel 531. The flow interference between the rushing stream and the tranquil stream in the valve chamber was significantly reduced.

As to the corner D and flow interference between the rushing stream $S_{121}$ and the tranquil stream $S_{122}$ at the internal outlet 82, the rushing stream $S_{121}$ would still flow along the upper-half space of the ring-shaped ditch 53 to turn at the second corner D1 and enter the upper-half space of the internal outlet 82 more easily. The proximal point $E_4$ of the internal outlet 82 has a height $LH_5$, where $LH_5 = -12.18$ mm. As a result, the oblique angle β of the bevel 531 at the bottom of the ring-shaped ditch 53 became smaller and the tranquil stream $S_{122}$ in the lower-half space of the ring-shaped ditch 53 would flow along the bevel 531 to turn at the second corner D2, so it would flow into the lower-half space of the internal outlet 82 more easily. the second corner D1 of the rushing stream $S_{121}$ and the outlet center line $S_2$ form an included angle $\alpha_1$, where $\alpha_1 \approx 22.455°\sim 39.285°$. The rushing stream $S_{121}$ would get a larger radius of curvature $R_C$ and could flow into the outlet passage 8. With such a radius of curvature $R_C$, only a few streamlines of the rushing stream $S_{121}$ would have to cross the channel axis $XL_2$ to flow into the lower-half space of the internal outlet 82. The flow interference between the rushing stream and the tranquil stream at the internal outlet significantly reduced. In addition, since there was not any circumfluence zone N formed at the inner periphery along the upper-edge line $S_{2a}$ in the outlet passage 8, no issues of particle agglutination generated.

As to the corner D, the streamlines of the tranquil stream $S_{122}$ would flow along the bevel 531 at the bottom of the ring-shaped ditch 53, where $e\alpha_2 \approx \beta$, and make a turn before the proximal point $E_4$ by following the second corner D2 so that its angle changed from the oblique angle β to the $E_4E_{46}$ placement angle $\theta_{22}$ and entered the lower-half space of the internal outlet 82. Since the rushing stream $S_{121}$ obtained a larger radius of curvature to smoothly enter the upper-half space of the internal outlet 82, and the tranquil stream smoothly entered the lower-half space of the internal outlet 82, only minor flow interference could happen between the rushing stream $S_{121}$ and the tranquil stream $S_{122}$, i.e., $\alpha_3 \approx \alpha_1 - \alpha_2$.

As to the corner E, the outlet passage 8 is a curved pipe installed at an angle E of $2\theta_2$, but the smoothly curved pipe would not cause high head loss. Although minor interference could happen between the rushing stream $S_{121}$ and the tranquil stream $S_{122}$, it would not add significant head loss in the outlet passage 8, not to mention generation of any circumfluence zone N and issues of particle agglutination.

As to the corner E, the outlet passage is a curved pipe installed at an angle E of $2\theta_2$, but the smoothly curved pipe would not cause high head loss. Although minor interference could happen between the rushing stream $S_{121}$ and the tranquil stream $S_{122}$, it would not add significant head loss in the outlet passage, not to mention generation of any circumfluence zone N and issues of particle agglutination.

A summary of the conventional flow channel of Refinement 2 of Structure C4 is herein provided with reference to FIG. 5A. The corner A has the right-angle corner 60 that is a major source of head loss and reduces the effective area of the flow channel. The flow interference generated in the circumfluence zone N at the center hole 63 can make the streamlines S pass the angle of corner B at angles all approximate to 90 degrees. This is also a source of head loss. The result is consistent with that of FIG. 3A, except that the flow interference in the valve chamber outside the circumfluence zones N in the flow channel was reduced significantly. The outlet passage 8 is a smoothly curved pipe. The distal point $E_3$ is higher than the valve seat 51 and the major axis $a_y$ is greater than the diameter $d_0$ of the center hole 63. when spreading in all directions at the radial passage 7, the streamlines of the rushing stream $S_{121}$ would only have to make a small downward turn at the first corner D1 to enter the upper-half space of the ring-shaped ditch 53. the flow interference between the rushing stream and the tranquil stream at the internal outlet was significantly reduced. This is also minor head loss. However, due to the problem of the inlet passage, the advantages related to stratified flow of the streamlines of the rushing stream and tranquil stream were not fully realized. The flow channel of Refinement 2 of Structure C4 had $C_V \approx 64.09 < 73.5$, and $\xi \approx 3.94 > 3.0$. The result of Refinement 2 still fails to meet the innovation objective. While the Cy value is 3.55% higher than that of Structure C4, it is slightly smaller than the Cy value of Refinement 1 of Structure C4, so the improving effect is inferior to that provided by Refinement 1 of Structure C4.

The analysis of the inventive flow channel of Case D (i.e. Preferred Mode A of Embodiment 1 of Structure C5) is as below.

Figure 6B:
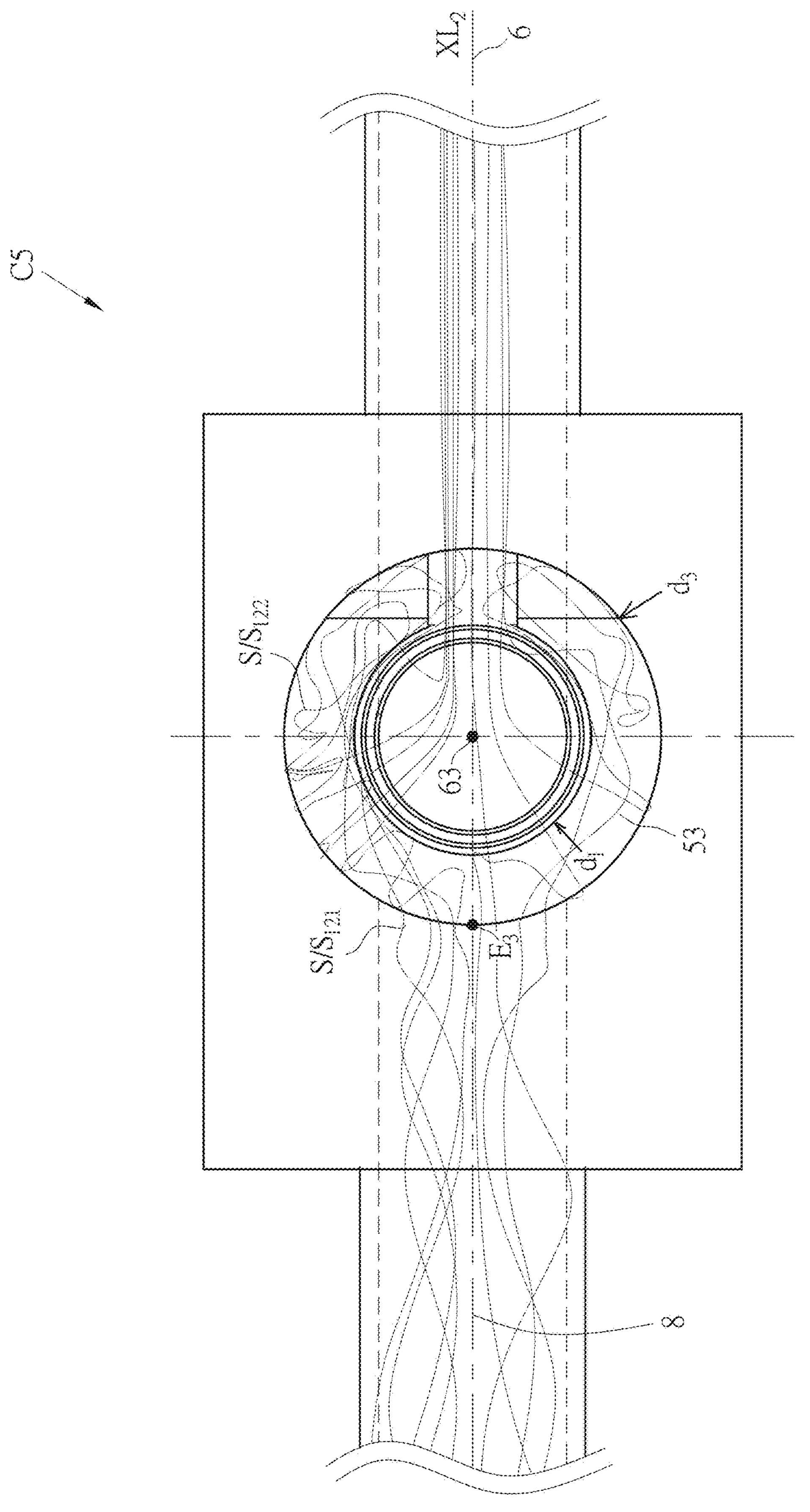
FIG. 6B is a top view of Preferred Mode A of Embodiment 1 of Structure C5 according to the present invention, showing streamlines fanning out in the valve chamber.
Figure 6C:
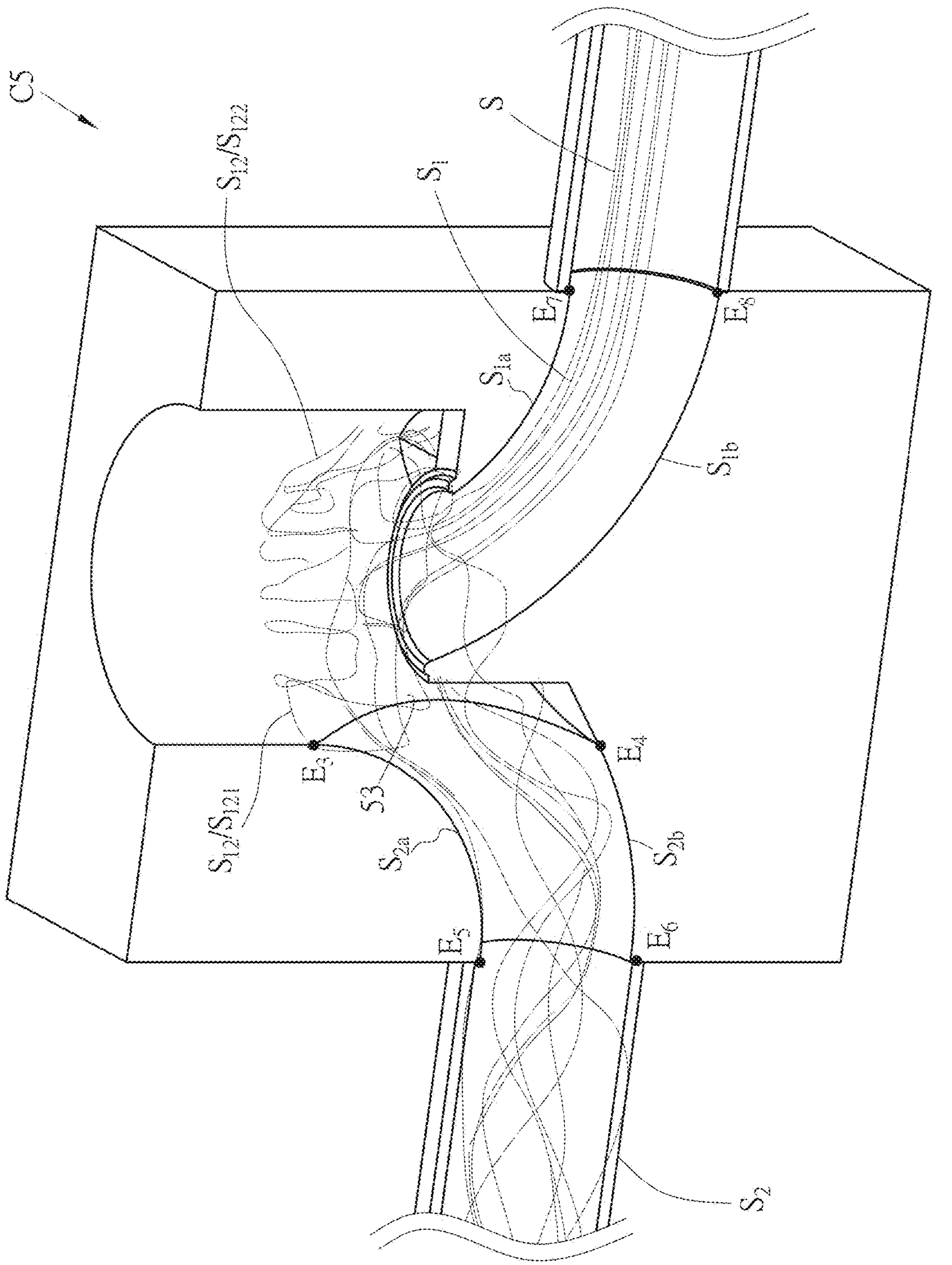
FIG. 6C is a 45-degree view of Preferred Mode A of Embodiment 1 of Structure C5 according to the present invention, showing the flow channel.

FIG. 6A shows the cross-sectional structure and the streamline distribution of Embodiment 1 of Structure C5 according to the present invention. FIG. 6B is a top view of Embodiment 1 of Structure C5 according to the present invention, showing the streamlines fanning out in the valve chamber 5. FIG. 6C is a 45-degree view of Embodiment 1 of Structure C5 according to the present invention, showing the radial center line $S_{12}$ in the internal outlet 82 at the corner D. (also referring to FIG. 1A through FIG. 1C, FIG. 2A).

This innovation is a flow channel combining advantages of Case B and Case C.

$C_v$ value, $C_V \approx 82.89 > 73.5$, $\xi \approx 2.36 \leq 3.0$.

The inlet passage 6 is a curved pipe, for guiding the fluid to flow upward at the corner A and flow out through the center hole 63 of the valve seat 51. Therein, $LH_3 = LH_1 = 59.34$ mm, $\gamma_1 \approx 23.2°$, and $d_0/a_x \approx 0.911$.

The ring-shaped ditch 53 is arranged between the outer diameter $d_1$ of the valve seat 51 and the inner diameter $d_3$ of the valve chamber 5, with the bottom of its bevel 531 at the same height as the proximal point $E_4$.

The radial passage 7 is a ring-shaped, horizontally-diverging ditch that has a valve opening $B_1$.

The outlet passage 8 is a curved pipe, and the distal point $E_3$ of the internal outlet 82 has a height $LH_4$ higher than that of the seal surface 510 of the valve seat 51. Therein, $$LH_4 > LH_3;\ LH_6 = 72.48 \text{ mm},\ LL_2 = LL_{21} = 68.25 \text{ mm},\ LH_4 = 94.5 \text{ mm},$$

$$H_1 = 35.16 \text{ mm},\ LH_2 = 29.14 \text{ mm},\ LH_5 = -5.12 \text{ mm},\ a_y = 99.61,$$

$$a_y^* = 77.59,\ \theta_{21} = 45°,\ \theta_{21}^* = 34.11°,\ \theta_2 = 25.273°, \text{ and } \theta_{22} = 17.21°.$$

As to the corner A, the inlet center line $S_1$, and the corner B, the inlet passage 6 of the present case is similar to the inlet passage 6 of Case B. The inlet passage 6 is a curved flow channel for guiding the fluid to flow upward at the corner A and flow out through the center hole 63 of the valve seat 51, where $\gamma_1 = 23.2°$, and $d_0/a_x \approx 0.911$. The fluid would flow into the radial passage 7 at a smaller angle of the corner B. The effective cross-sectional area of the flow channel could also be reduced but no circumfluence zones N and streamline cornering happened. Moreover, the effective cross-sectional area is still much higher than that of FIG. 3A.

As to the spread C, the radial streamline $S_{12}$, and fanning out, the distal point $E_3$ is higher than the seal surface 510 of the valve seat 51, i.e., $LH_4 > LH_3$. The internal outlet 82 is a non-standard elliptic hole with a major axis $a_y$ and a diameter $d_0$, where $a_y/d_0 = 1.8974$. The proximal point $E_4$ has a height $LH_5$, where $LH_5 = -5.12$ mm. The streamlines S of the rushing stream $S_{121}$ at the spread C could directly flow into the internal outlet 82 and fan out in a range smaller than 180 degrees. The tranquil stream $S_{122}$ would fan out at the remaining circumferential angles. The annular space $B_2$ of the radial gap $B_3$ caused two obvious vortexes, but no particle agglutination was observed.

The corner D includes the corner D1 for the rushing stream $S_{121}$ and the corner D2 for the tranquil stream $S_{122}$. Since the distal point $E_3$ is higher than the seal surface 510 of the valve seat 51, the angle of the corner D at which the rushing stream $S_{121}$ and the tranquil stream $S_{122}$ turned downward to flow into the ring-shaped ditch 53 was reduced significantly. as to the first corner D, the corner D at the center point $P_3$ is of an angle $2\theta_2 = 50.55°$, and the line segment $$E_3^* E_4$$

forms a new major axis $$a_y^*,$$

where $$a_y^*/d_0 = 1.48,\ LH_6 = 72.465 \text{ mm},\ a_y^* = 77.585 \text{ mm},\ \theta_{21}^* = 34.1°.$$

This means most fluid would flow into the space of the internal outlet 82 between the mapping point $$E_3^*$$

and the center point $P_3$. As a result, the fluid when entering the internal outlet 82 would turn at the corner D with an angle that 50.55°<Corner D<68.2°. The unduly high $H_1$ means the corner D would add head loss. The proximal point $E_4$ of the internal outlet 82 has a height $LH_5$, where $LH_5 = -5.12$ mm, so that the oblique angle $\beta$ of the bevel 531 at the bottom of the ring-shaped ditch 53 is reduced. A part of the streamlines of the rushing stream $S_{121}$ would turn at an even smaller cornering angle and travel for the shortest distance to enter the internal outlet 82. The remaining rushing stream $S_{121}$ would travel for the second longest distance and have to make a downward turn at the corner D with a larger angle. The tranquil stream $S_{122}$ would travel for the longest distance and have to turn downward at the corner D with an even larger angle, so that the rushing stream $S_{121}$ and the tranquil stream $S_{122}$ could perform stratified flow in the space defined in the ring-shaped ditch 53. The streamlines S of the tranquil stream $S_{122}$ would flow along the bevel 531 at the bottom of the ring-shaped ditch 53, where $\alpha_2 \approx B$, and make a turn at the second corner D2 before the proximal point $E_4$ to change from the oblique angle $\beta$ to the $E_4E_{46}$ placement angle $\theta_{22}$ to enter the lower-half space of the internal outlet 82. The rushing stream $S_{121}$ would flow along the upper-half space of the ring-shaped ditch 53, and the tranquil stream $S_{122}$ would flow along the laid bevel 531 in the lower-half space of the ring-shaped ditch 53, so that minor flow interference generated between the rushing stream $S_{121}$ and the tranquil stream $S_{122}$ in the valve chamber 5. The included angle $\alpha_1$ formed between the corner D1 of the rushing stream $S_{121}$ and the outlet center line $S_2$, where $\alpha_1 \approx 50.55°\sim68.2°$. The rushing stream $S_{121}$ would obtian a greater radius of curvature $R_C$ to flow into the outlet passage 8. With such a radius of curvature $R_C$, only a few streamlines of the rushing stream $S_{121}$ would have to cross the channel axis $XL_2$ to flow into the lower-half space of the internal outlet 82. In addition, since there was not any circumfluence zone N formed at the inner periphery along the upper-edge line $S_{2a}$ in the outlet passage 8, no issues of particle agglutination generated. Only minor flow interference generated between the rushing stream $S_{121}$ and the tranquil stream $S_{122}$ at the internal outlet 82.

As to the corner E, the outlet passage 8 of the present case is similar to the outlet passage of Case C. The outlet passage 8 is a curved pipe installed at an angle E of $2\theta_2$, but the smoothly curved pipe would not cause high head loss. Although minor interference could happen between the rushing stream $S_{121}$ and the tranquil stream $S_{122}$ it would not add significant head loss in the outlet passage 8, not to mention generation of any circumfluence zone N and issues of particle agglutination.

Figure 6D:
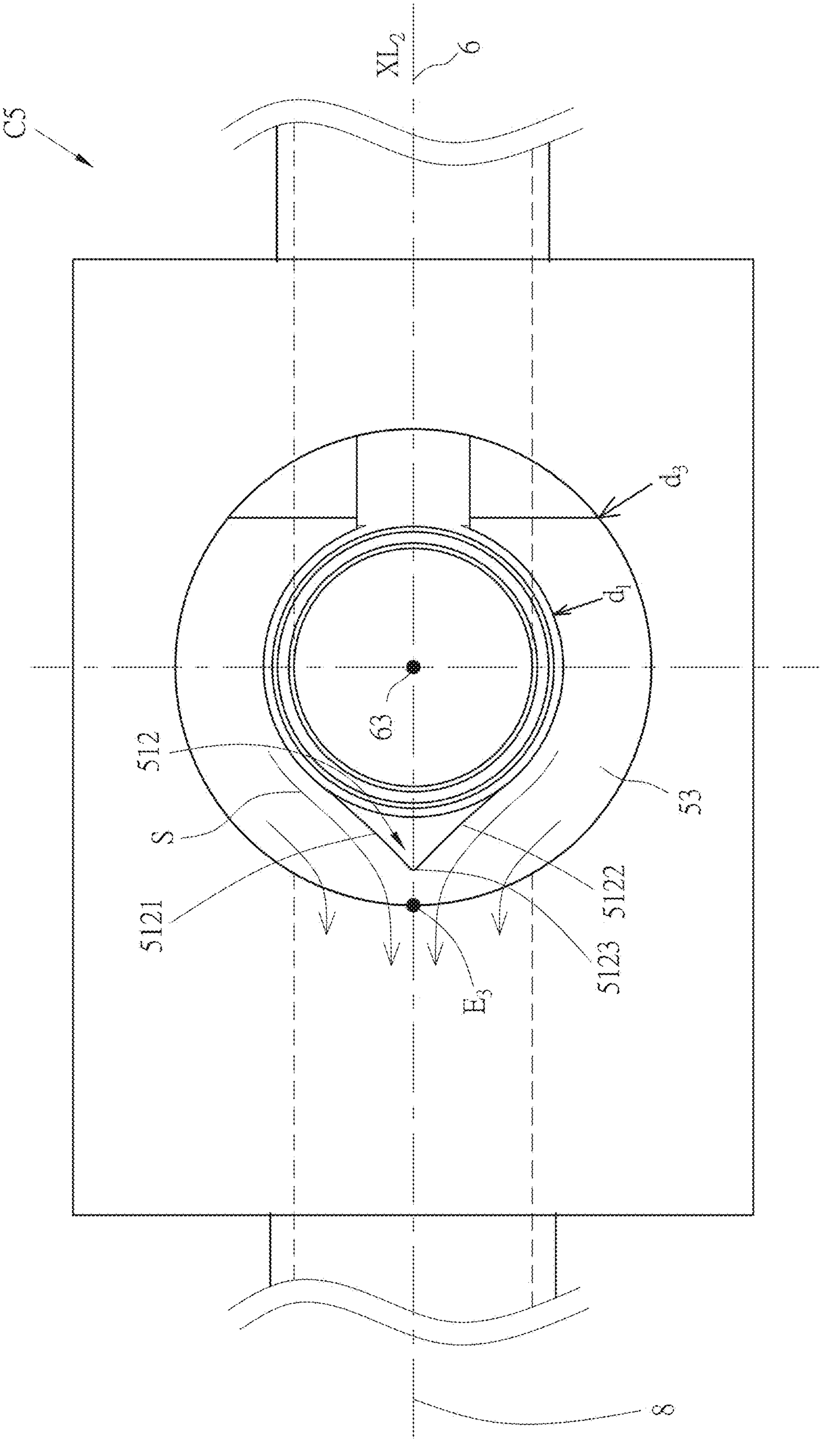
FIG. 6D shows a version of Preferred Mode A of Embodiment 1 of Structure C5 according to the present invention featuring a vertical rib plate installed around the outer periphery of the valve seat for increasing structural strength and guiding the streamlines to the internal outlet.

A summary of the inventive flow channel of Embodiment 1 of Structure C5 is herein provided. The corner A is a rounded corner for significantly reducing local head loss. Any corner B that could reduce the area of the flow channel area but is free of any circumfluence zone N would have its angle somehow reduced, and this is a factor contributing to reduced local head loss. The outlet passage 8 is a smoothly curved pipe. The distal point $E_3$ is higher than the seal surface 510 of the valve seat 51. The major axis $a_y$ is greater than the diameter $d_0$ of the center hole 63. When spreading in all directions at the radial passage 7, the streamlines of the rushing stream $S_{121}$ would only have to make a small downward turn at the first corner D1 to enter the upper-half space of the ring-shaped ditch 53. This is also minor head loss. The rushing stream $S_{121}$ when entering the internal outlet 82 would further have to make a small-angle trun at the second corner D1. This is also minor head loss. At last, the included angle $\alpha_3$ between the rushing stream $S_{121}$ and the tranquil stream $S_{122}$ at the internal outlet 82 is relatively small. The rushing stream $S_{121}$ and the tranquil stream $S_{122}$ flowed and rolled with each other in the outlet passage 8 and this eliminated the circumfluence caused by the corner E of $2\theta_2$. The inventive flow channel of Structure C5 had a $C_V$ value, where $C_V \approx 82.89 > 73.5$, $\xi \approx 2.36 \leq 3.0$, which is 11%~54% higher than those of Refinement 1 and Refinement 2 of Structure C4, thereby well meeting the requirement for high flow capacity. Referring to FIG. 6D, for further strengthening the valve seat 51, a vertical rib plate 512 could be optionally provided at the outer periphery of the valve seat 51. The vertical rib plate 512 is located near the internal outlet 82 with its lower end connected to the bottom of the ring-shaped ditch 53. The vertical rib plate 512 has two laterals each formed as a vertical, curved surface 5121 or 5122. Each of the lateral curved surfaces 5121, 5122 has one side tangent to the outer periphery of the wide bottom of the valve seat 51, and the other side connected mutually to form an end 5123 with a small rounded corner. The vertical rib plate 512 may also serve to guide the two streamlines S in the ring-shaped ditch 53 to flow toward the internal outlet 82.

The analysis of the inventive flow channel of Case E (i.e., Embodiment 2 of Structure C5) is as below.

Figure 7B:
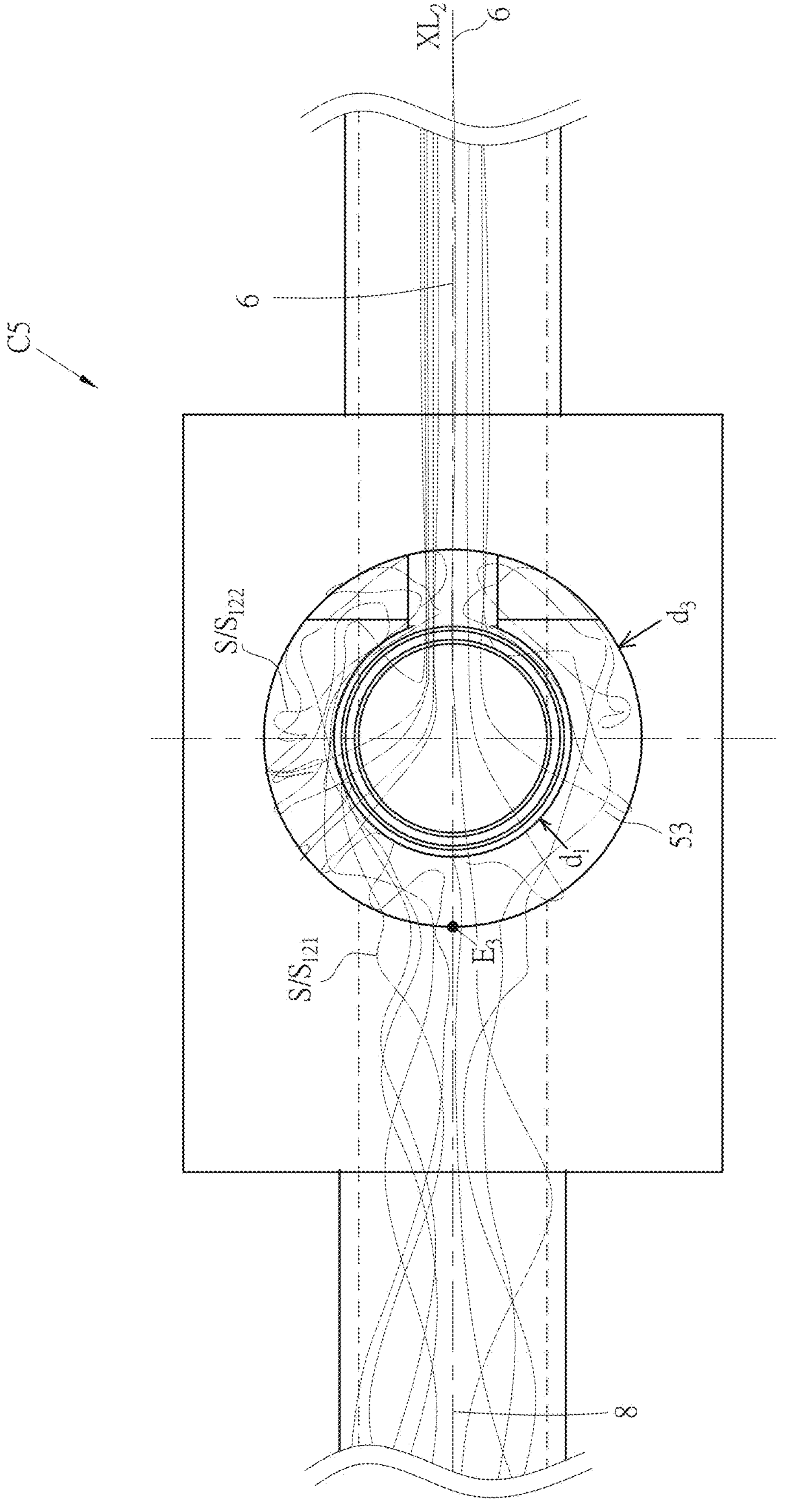
FIG. 7B is a top view of Embodiment 2 of Structure C5 according to the present invention, showing streamlines fanning out in the valve chamber.
Figure 7C:
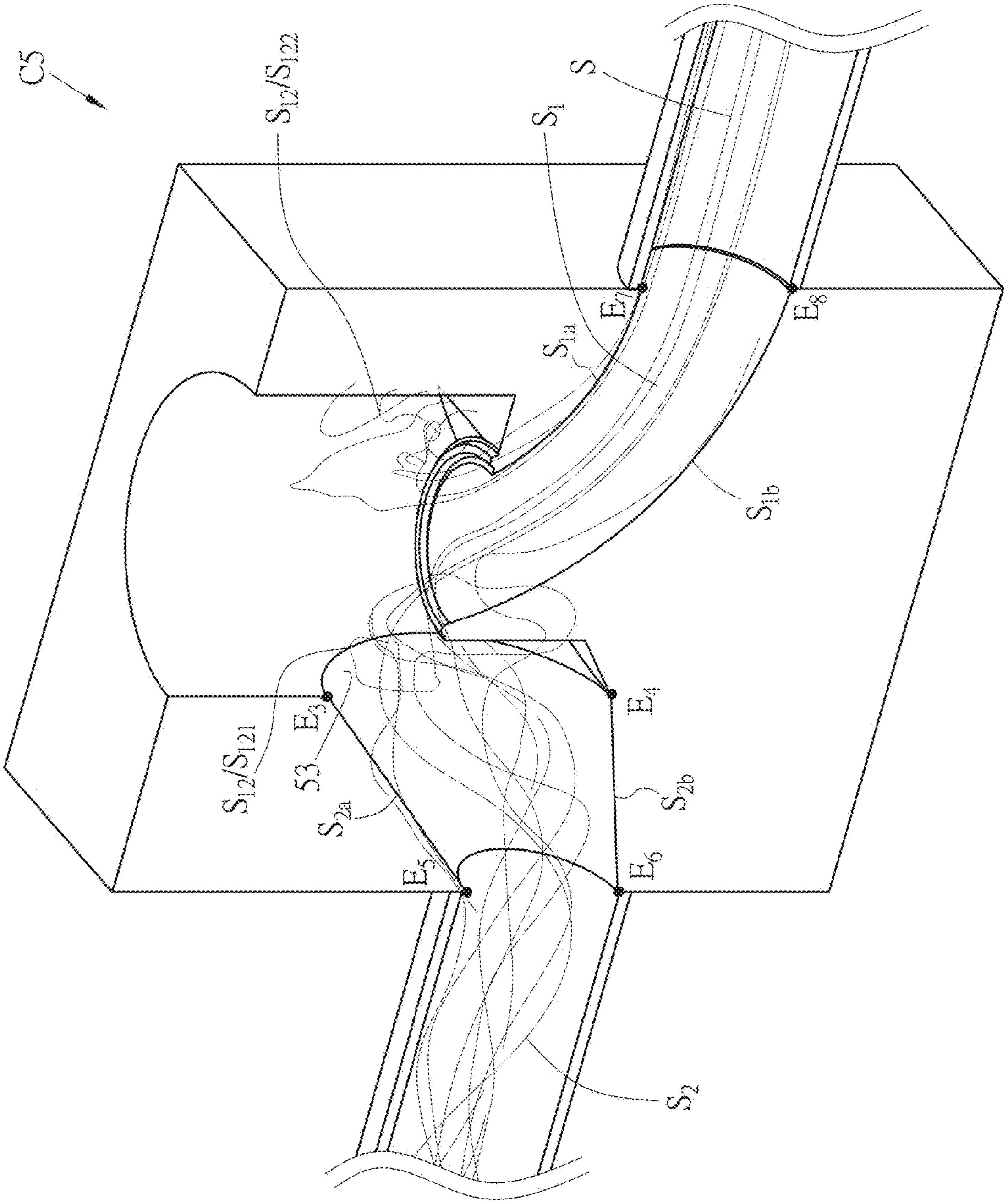
FIG. 7C is a 45-degree view of Embodiment 2 of Structure C5 according to the present invention, showing the flow channel.

FIG. 7A shows the inventive cross-sectional structure and the streamline distribution of Embodiment 2 of Structure C5. FIG. 7B is a top view of embodiment 2 of Structure C5, showing the streamlines fanning out in the valve chamber 5. FIG. 7C is a 45-degree view of Embodiment 2 of Structure C5, showing the radial streamline $S_{12}$ at the corner D in the internal outlet 82 (also referring to FIG. 1A through FIG. 1C, FIG. 2B).

$C_v$ value, $C_V \approx 81.32 > 73.5$, $\xi \approx 2.45 \leq 3.0$.

Embodiment 2 provides a flow channel structure that is constructed on the basis of Embodiment 1. Therein the outlet passage 8 has the same non-standard elliptical internal outlet 82. The upper-edge line $S_{2a}$ is replaced by the straight-line segment $E_3E_5$. The lower-edge line $S_{2b}$ is replaced by the straight-line segment $E_4E_6$.

The inlet passage 6 is a curved pipe, for guiding the fluid to flow upward at the corner A and flow out through the center hole 63 of the valve seat 51. Therein, $LH_3 = LH_1 = 59.34$ mm, $\gamma_1 \approx 23.2°$.

The ring-shaped ditch 53 is arranged between the outer diameter $d_1$ of the valve seat 51 and the inner diameter $d_3$ of the valve chamber 5, with the bottom of its bevel 531 at the same height as the proximal point $E_4$.

The radial passage 7 is a ring-shaped, horizontally-diverging ditch that has a valve opening $B_1$.

The outlet passage 8 is an oblique pipe. The height $LH_4$ of distal point $E_3$ of the internal outlet 82 is higher than the seal surface 510 of the valve seat 51, i.e., $$LH_4 > LH_3;\ LH_6 = 72.48\text{ mm},\ LL_2 = LL_{21} = 68.25\text{ mm},\ LH_4 = 94.5\text{ mm},\ H_1 = 35.16\text{ mm},\ LH_2 = 29.14\text{ mm},\ LH_5 = -5.12\text{ mm},\ a_y = 99.61,\ a_y^* = 77.59,\ \theta_{21} = 45°,\ \theta_{21}^* = 34.11°,\ \theta_2 = 25.27°,\ \theta_{22} = 17.21°.$$

The corner A, the inlet center line $S_1$, and the corner B are similar to the streamlines S and the corners A and B of FIG. 6A.

The spread C, the radial center line $S_{12}$, and the fanning-out pattern are similar to the streamlines S and the fanning-out pattern of FIG. 6B.

The corner D is $\theta_2$, where $25.27° < \text{Corner D} < 34.11°$, and is similar to the corner D for the height streamlines S of FIG. 6A. It also includes the corner D1 for the rushing stream $S_{121}$ and the corner D2 for the tranquil stream $S_{122}$. The rushing stream $S_{121}$ and the tranquil stream $S_{122}$ only had minor flow interference in the valve chamber 5. The rushing stream $S_{121}$ and the tranquil stream $S_{122}$ at the internal outlet 82 merely generated minor flow interference.

As to the corner E, referring to FIG. 7A, the outlet passage 8 is a straight pipe extending obliquely downward with an installation angle E of $\theta_2$ that is an elbow angle. The cornering at the relatively smooth elbow angle would not cause high head loss, and would also prevent generation of any circumfluence zone N and issues of particle agglutination.

A summary of the inventive flow channel of Embodiment 2 of Structure C5 is herein provided. the corner D is $\theta_2$, so the rushing stream $S_{121}$ and the tranquil stream $S_{122}$ could enter the upper-half space and lower-half space of the ring-shaped ditch 53 at lower angles, respectively. The rushing stream $S_{121}$ and the tranquil stream $S_{122}$ flowed and rolled with each other in the outlet passage 8 and this eliminated the circumfluence in the elbow-angle region caused by the corner E of $\theta_2$. This at last led to a $C_V$ value of the inventive flow channel of Structure C5, where $C_V \approx 81.32 > 73.5$, $\xi \approx 2.45 \leq 3.0$. This is 11%~54% higher than those of Refinement 1 and Refinement 2 of Structure C4, thereby well meeting the requirement for high flow capacity.

The analysis of the inventive flow channel of Case F (i.e. embodiment 3 of Structure C5) is as below.

Figure 8B:
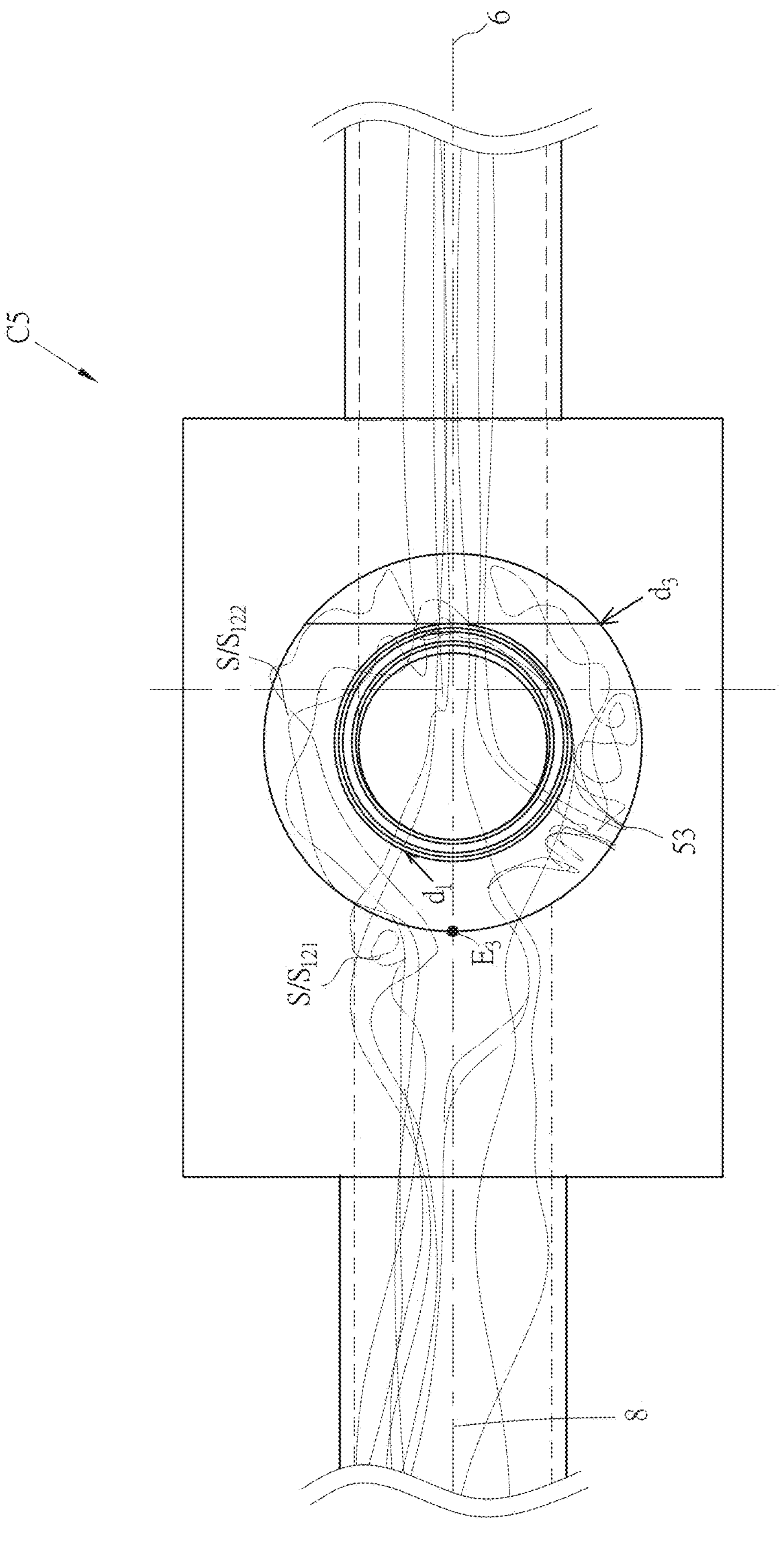
FIG. 8B is a top view of Embodiment 3 of Structure C5 according to the present invention, showing streamlines fanning out in the valve chamber.
Figure 8C:
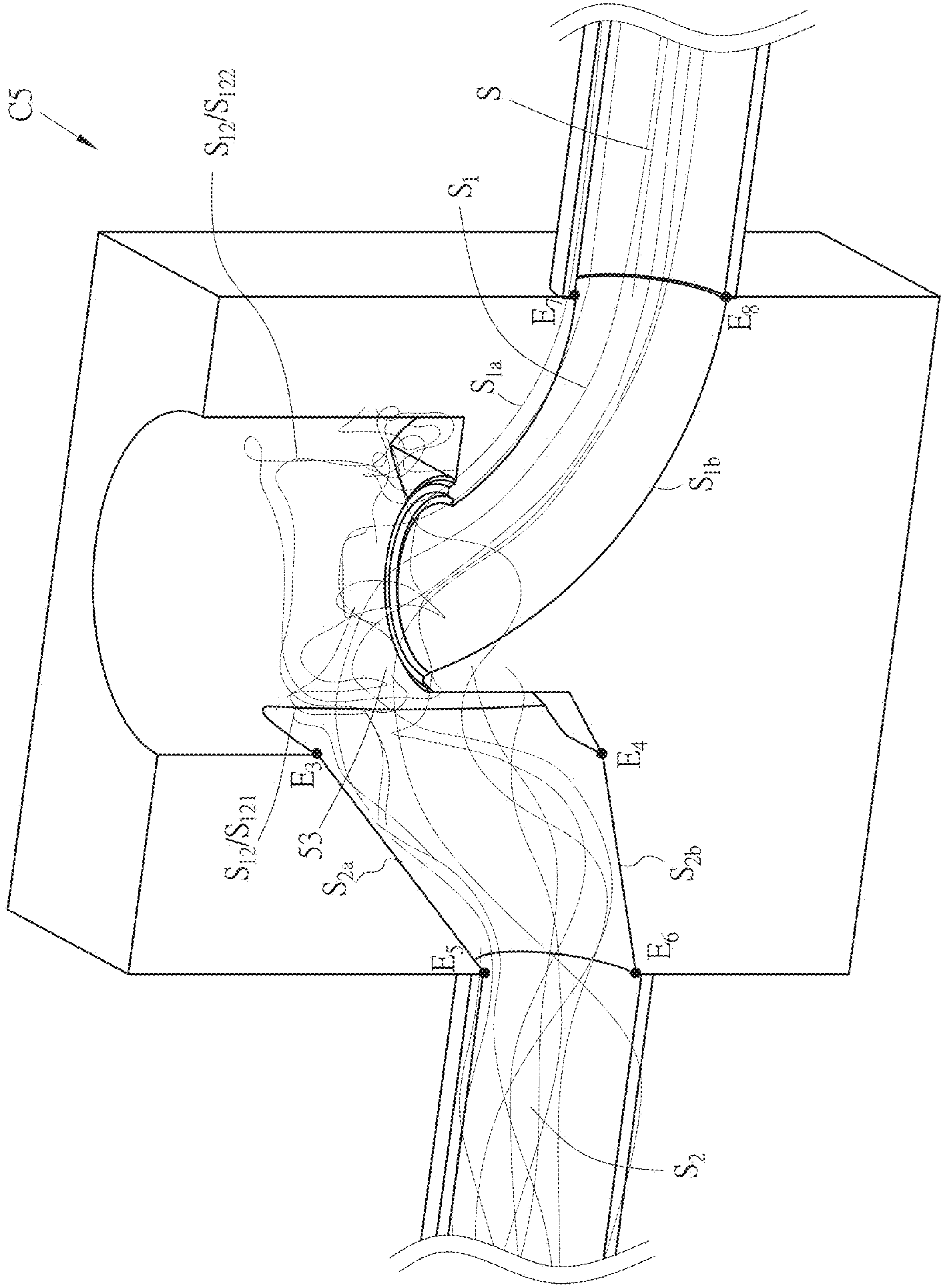
FIG. 8C is a 45-degree view of Embodiment 3 of Structure C5 according to the present invention, showing the flow channel.

FIG. 8A shows the inventive cross-sectional structure and the streamline distribution of Embodiment 3 of Structure C5. FIG. 8B is a top view of Embodiment 3 of Structure C5, showing the streamlines fanning out in the valve chamber 5. FIG. 8C is a 45-degree view of Embodiment 3 of Structure C5, showing the radial streamline $S_{12}$ at the corner D in the internal outlet 82 (also referring to FIG. 1A through FIG. 1C, FIG. 2C).

$d_0$=52.5 mm, the $C_v$ value, $C_V \approx 84.6 > 73.5$, $\xi \approx 2.26 \leq 3.0$.

Embodiment 3 provides a flow channel structure that is constructed on the basis of Embodiment 1. Therein the outlet passage 8 has the same non-standard elliptical internal outlet 82. The upper-edge line $S_{2a}$ is replaced by the straight-line segment $E_3E_5$. The lower-edge line $S_{2b}$ is replaced by the straight-line segment $E_4E_6$. The shape of the internal outlet 82 is a rectangle with a non-standard oval inscribed in it. The two have the same major axis $a_y$ and minor axis $b_z$, and have the same distal point $E_3$ and proximal point $E_4$. The four right-angle corners are replaced by four small rounded corners. The rectangle is greater than the non-standard ellipse in area, and better facilitates flowing in of the rushing stream $S_{121}$ and the tranquil stream $S_{122}$. Particularly, the lower-half space of the internal outlet 82 could be connected to the ring-shaped ditch 53 more smoothly.

The inlet passage 6 is a curved pipe, for guiding the fluid to flow upward at the corner A and flow out through the center hole 63 of the valve seat 51. Therein, $LH_3 = LH_1 = 59.34$ mm, $\gamma_1 \approx 23.2.0°$, and $d_0/a_x \approx 0.911$.

The ring-shaped ditch 53 is arranged between the outer diameter $d_1$ of the valve seat 51 and the inner diameter $d_3$ of the valve chamber 5, with the bottom of its bevel 531 at the same hight as the proximal point $E_4$.

The radial passage 7 is a ring-shaped, horizontally-diverging ditch that has a valve opening $B_1$.

The outlet passage 8 is an oblique pipe having a rectangular cross-section. The distal point $E_3$ of the internal outlet 82 has a height $LH_4$ higher than the seal surface 510 of the valve seat 51, i.e., $LH_3 < LH_4$. Therein, $$LH_6 = 72.48 \text{ mm}, LL_2 = LL_{21} = 68.25 \text{ mm}, LH_4 = 94.5 \text{ mm}, H_1 = 35.16 \text{ mm}, LH_2 = 29.14 \text{ mm}, LH_5 = -5.12 \text{ mm}, a_y = 99.61, a_y^* = 77.59, \theta_{21} = 45°, \theta_{21}^* = 34.11°, \theta_2 = 25.273°, \theta_{22} = 17.21°.$$

The corner A, the inlet center line $S_1$, and the corner B are similar to the streamlines S and the corners A and B of FIG. 6A.

The spread C, radial center line $S_{12}$ and the fanning-out pattern are similar to the streamlines S and the fanning-out pattern of FIG. 6B.

The corner D is similar to the corner D for the streamline S of FIG. 6A. The corner D is $\theta_2$, where 25.27°<corner D<34.11°, and includes a corner D1 for the rushing stream $S_{121}$ and a corner D2 for the tranquil stream $S_{122}$. the rushing stream $S_{121}$ and the tranquil stream $S_{122}$ only had minor flow interference in the valve chamber 5. The rushing stream $S_{121}$ and the tranquil stream $S_{122}$ at the internal outlet 82 merely generated minor flow interference.

As to the corner E, referring to FIG. 8A, the outlet passage 8 is a straight pipe extending obliquely downward and installed at an angle E of $\theta_2$ that is an elbow angle. The cornering at the relatively smooth elbow angle would not cause high head loss, and would also prevent generation of any circumfluence zone N and issues of particle agglutination.

A summary of the inventive flow channel of Embodiment 3 of Structure C5 is herein provided. The result of the inventive flow channel is similar to the result of Embodiment 2. However, when the internal outlet 82 is rectangular, it would provide more spaces for the streamlines than when it is elliptical. The outlet passage 8 smoothly narrows from the internal outlet 82 to the valve outlet to have a higher $C_V$ value. The rushing stream $S_{121}$ and the tranquil stream $S_{122}$ flowed and rolled with each other in the outlet passage 8 and this eliminated the circumfluence in the elbow-angle region caused by the corner E of $\theta_2$. This at last led to a $C_V$ of the inventive flow channel of Structure C5, where $C_V \approx 84.6 > 73.5$, $\xi = 2.26 \leq 3.0$. It is 11%~54% higher than those of Refinement 1 and Refinement 2 of Structure C4, thereby well meeting the requirement for high flow capacity.

The analysis of the inventive flow channel of Case G (i.e. Embodiment 4 of Structure C5) is as below.

Figure 9B:
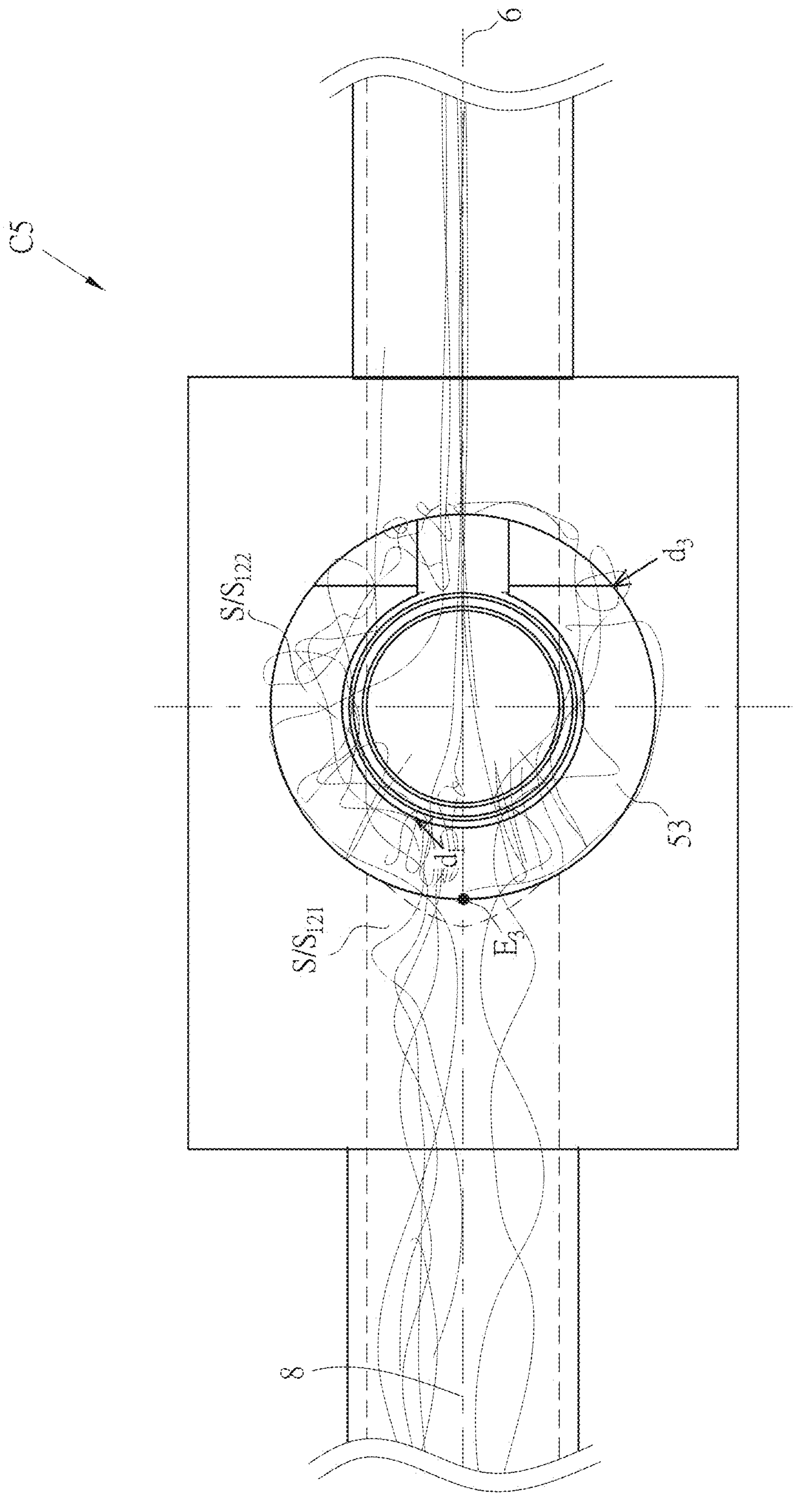
FIG. 9B is a top view of Embodiment 4 of Structure C5 according to the present invention, showing streamlines fanning out in the valve chamber.
Figure 9C:
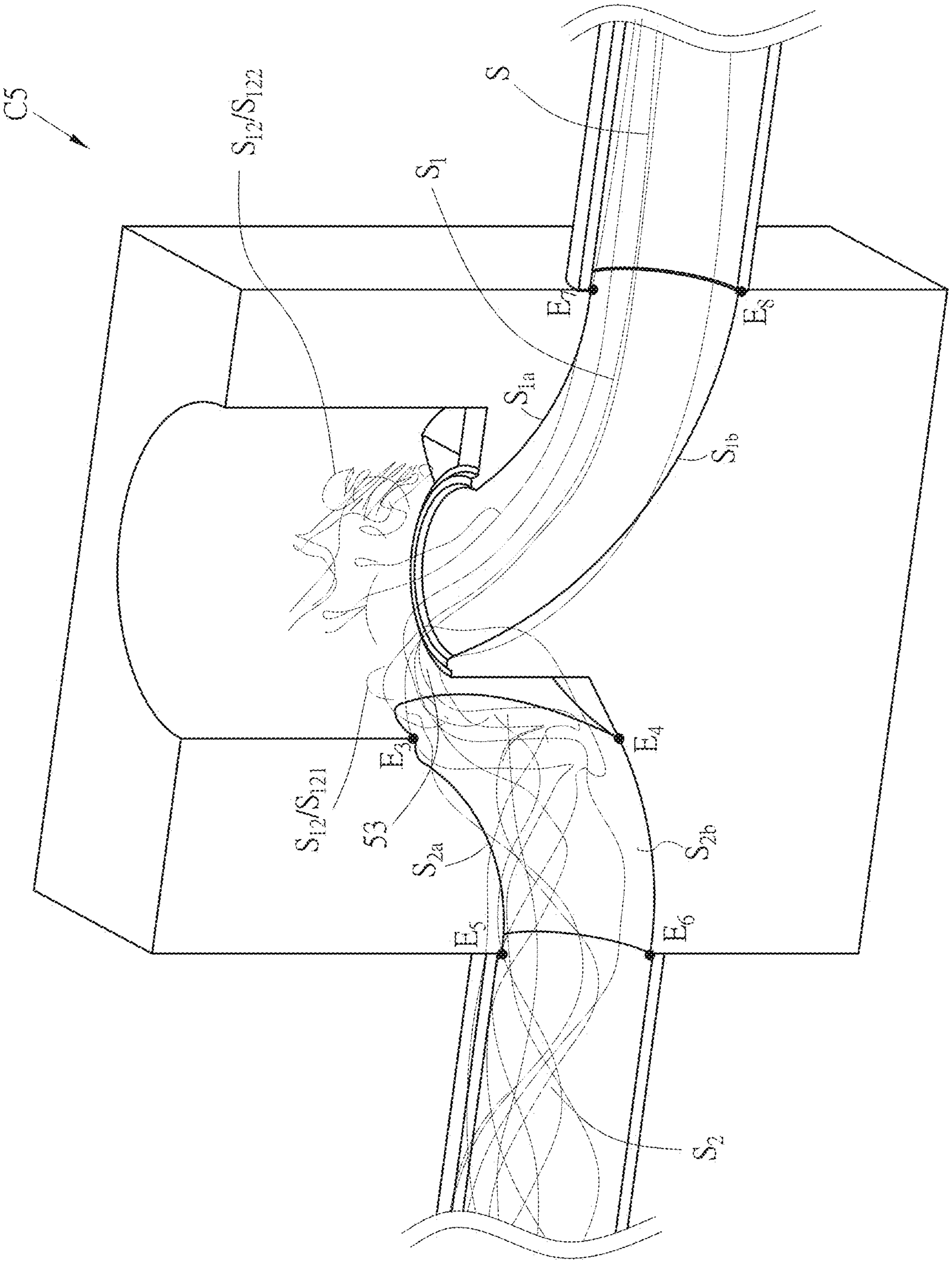
FIG. 9C is a 45-degree view of Embodiment 4 of Structure C5 according to the present invention, showing the flow channel.

FIG. 9A shows the inventive cross-sectional structure and the streamline distribution of Embodiment 4 of Structure C5. FIG. 9B is a top view of Embodiment 4 of Structure C5, showing the streamlines fanning out in the valve chamber 5. FIG. 9C is a 45-degree view of Embodiment 4 of Structure C5, showing the radial streamline $S_{12}$ at the corner D in the internal outlet 82 (also referring to FIG. 1A through FIG. 1C, FIG. 2D).

$C_v$ value, $C_V \approx 80.89 > 73.5$, $\xi \approx 2.48 \leq 3.0$.

Embodiment 4 provides a flow channel structure that is constructed on the basis of Embodiment 1.

The inlet passage 6 is a curved pipe, for guiding the fluid to flow upward at the corner A and flow out through the center hole 63 of the valve seat 51. Therein, $LH_3 = LH_1 = 59.34$ mm, $\gamma_1 \approx 23.2°$, $d_0/a_x \approx 0.911$.

The ring-shaped ditch 53 is arranged between the outer diameter $d_1$ of the valve seat 51 and the inner diameter $d_3$ of the valve chamber 5, with the bottom of its bevel 531 at the same hight as the proximal point $E_4$.

The radial passage 7 is a ring-shaped, horizontally-diverging ditch that has a valve opening $B_1$.

The outlet passage 8 is a curved pipe, and the distal point $E_3$ of the internal outlet 82 has a height $LH_4$ higher than that of the seal surface 510 of the valve seat 51. Therein, $$LH_4 > LH_3; LH_6 = 72.48 \text{ mm}, LL_2 = LL_{21} = 52.5 \text{ mm}, LH_4 = 78.75 \text{ mm}, H_1 = 19.41 \text{ mm}, LH_2 = 20.05 \text{ mm}, LH_5 = -12.18 \text{ mm}, a_y = 90.93, a_y^* = 84.66, \theta_{21} = 45°, \theta_{21}^* = 0.0°, \theta_2 = 22.46°, \theta_{22} = 15°.$$

A tangent curve $S_3$ made in the upper-edge line $S_{21}$ in the outlet passage 8 intersect a vertical line $YL_3$ at a new distal point $$E_3^{**}.$$

This curve $S_3$ is a concave curve. In other words, the new distal point $$E_3^{**}$$

is made on the major axis $a_y$, and a curve $S_3$ tangent to the upper-edge line $S_{2a}$ is made from thje distal point $$E_3^{**}.$$

The height difference $$H_1^{**}$$

exists between the distal point $$E_3^{**}$$

and the valve seat 51, where $$H_1^{**} \geq B_1, HL_6 = 72.48 \text{ mm}.$$

The line segment $$E_3^{**}E_4$$

forms the new major axis $$a_y^{**}.$$

Then a tangent curved surface SS is made along curve $S_3$ tangent to the inner periphery of the outlet passage 8, so that the included angle $$\gamma_{21}^{**}$$

between the curve $S_3$ and the vertical line $YL_3$ is relatively large, where $$30° \leq \gamma_{21}^{**} \leq 90°.$$

The corner D at the distal point $$E_3^{**}$$

has an angle $$\theta_{21}^{**},$$

where $$0° \leq \theta_{21}^{**} \leq 60°.$$

The new major axis of the ellipse is $$a_y^{**},$$

where $$a_y^{**} \approx 1.61 d_0.$$

The purpose of this structure is to improve the upper-edge line $S_{2a}$ of the outlet passage by obtaining a suitable height of the valve chamber 5 and eliminating the large corner D at the spread C at the distal point $E_3$ while maintaining high flow capacity of the flow channel.

The corner A, the inlet center line $S_1$, and the corner B are similar to the streamline S and the corners A and B of FIG. 6A.

The spread C, the radial streamline $S_{12}$, and the fanning-out pattern are similar to the streamlines S and the fanning-out pattern of FIG. 6B.

The corner D leads both of the rushing stream $S_{121}$ and the tranquil stream $S_{122}$. The corner D at the distal point $$E_3^{**}$$

is of the angle $$\theta_{21}^{**},$$

where $$\theta_{21}^{**} = 0°, 25.27° < \text{corner } D < 34.11°,$$

so that the angle of the corner D at which the rushing stream $S_{121}$ and the tranquil stream $S_{122}$ turn downward and flow into the ring-shaped ditch 53 is reduced significantly. The is the first corner D.

The corner D is similar to the corner D for the streamlines of FIG. 6A and includes the corner D1 for the rushing stream $S_{121}$ and the corner D2 for the tranquil stream $S_{122}$. The rushing stream $S_{121}$ and the tranquil stream $S_{122}$ only had minor flow interference in the valve chamber 5. The rushing stream $S_{121}$ and the tranquil stream $S_{122}$ at the internal outlet 82 merely generated minor flow interference.

As to the corner E, referring to FIG. 9A, the outlet passage 8 is a curved pipe installed at an angle E of $2\theta_{22}$, but the smoothly curved pipe would not cause high head loss. Although minor flow interference happened between the rushing stream $S_{121}$ and the tranquil stream $S_{122}$, it would not add significant head loss in the outlet passage 8, not to mention generation of any circumfluence zone N and issues of particle agglutination. As to interference between the rushing stream $S_{121}$ and the tranquil stream $S_{122}$ in the valve chamber 5, there was no obvious interference between the streamlines of the rushing stream $S_{121}$ and the tranquil stream $S_{122}$ in the valve chamber 5.

A summary of the inventive flow channel of embodiment 4 of Structure C5 is herein provided. A part of the streamlines of the rushing stream $S_{121}$ when directly flowing into the internal outlet 82 was benefited from the curve $S_3$ and the tangent curved surface SS and had a desirable angle $$\theta_{21}^{**}$$

of its corner D, where $$\theta_{21}^{**} = 0°, 25.27° < \text{corner } D < 34.11°.$$

At last, the rushing stream $S_{121}$ and the tranquil stream $S_{122}$ induced an angle $\alpha_3$ at the internal outlet 82 that was relatively small. The rushing stream $S_{121}$ and the tranquil stream $S_{122}$ flowed and rolled with each other in the outlet passage 8 and this eliminated the circumfluence caused by the corner E of $2\theta_2$. the inventive flow channel of Structure C5 thus had $C_V \approx 80.89 > 73.5$, and $\xi = 2.48 \leq 3.0$. The Cy value is 11%~54% higher than those of Refinement 1 and Refinement 2 of Structure C4, thereby well meeting the requirement for high flow capacity. In the embodiment, when the curve $S_3$ is replacedby other curved lines, significant improvement in the $C_V$ value is still expected.

The analysis of the inventive flow channel of Case H (i.e. Embodiment 5 of Structure C5) is as below.

Figure 10B:
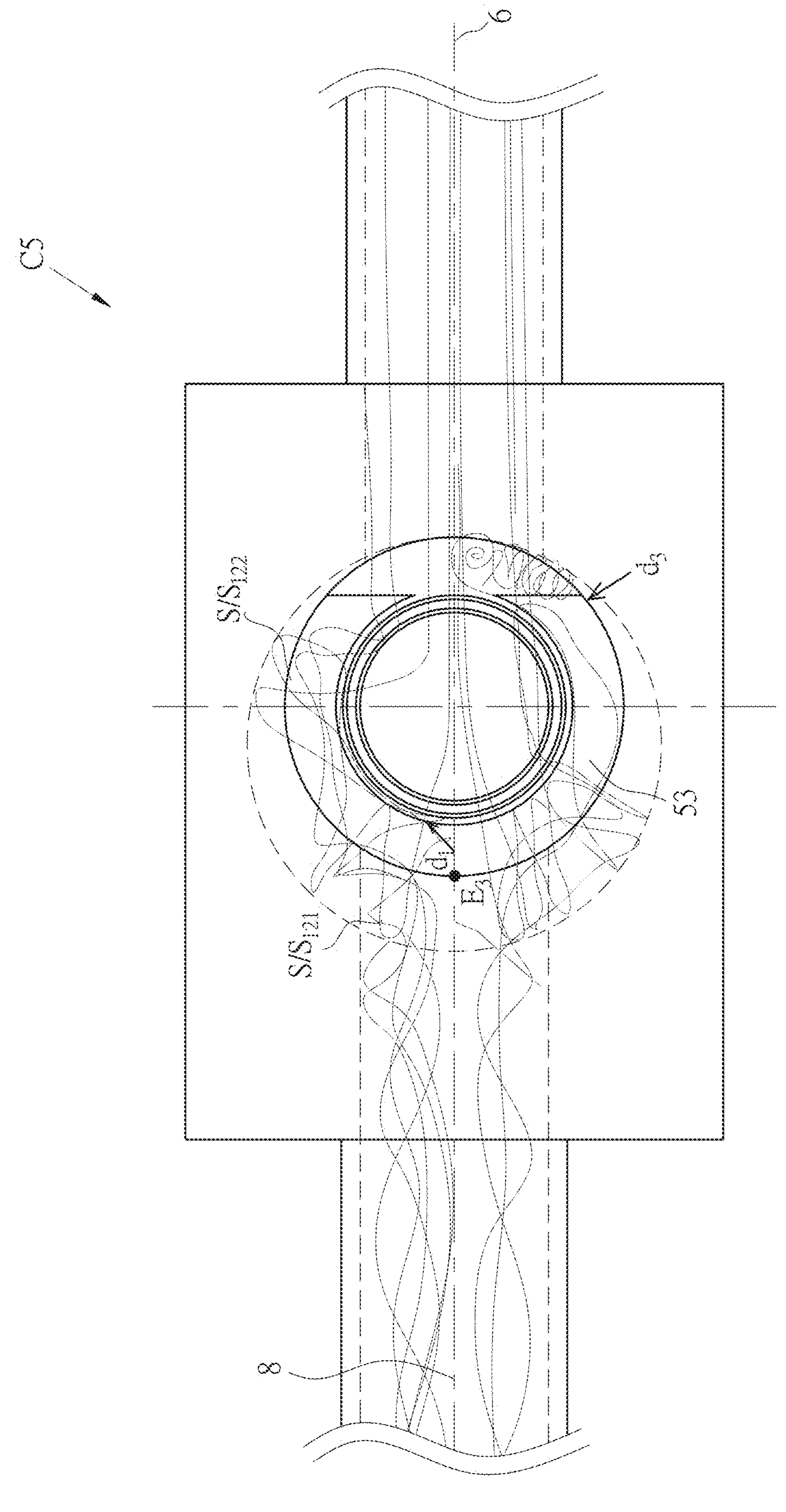
FIG. 10B is a top view of Embodiment 5 of Structure C5 according to the present invention, showing streamlines fanning out in the valve chamber.
Figure 10C:
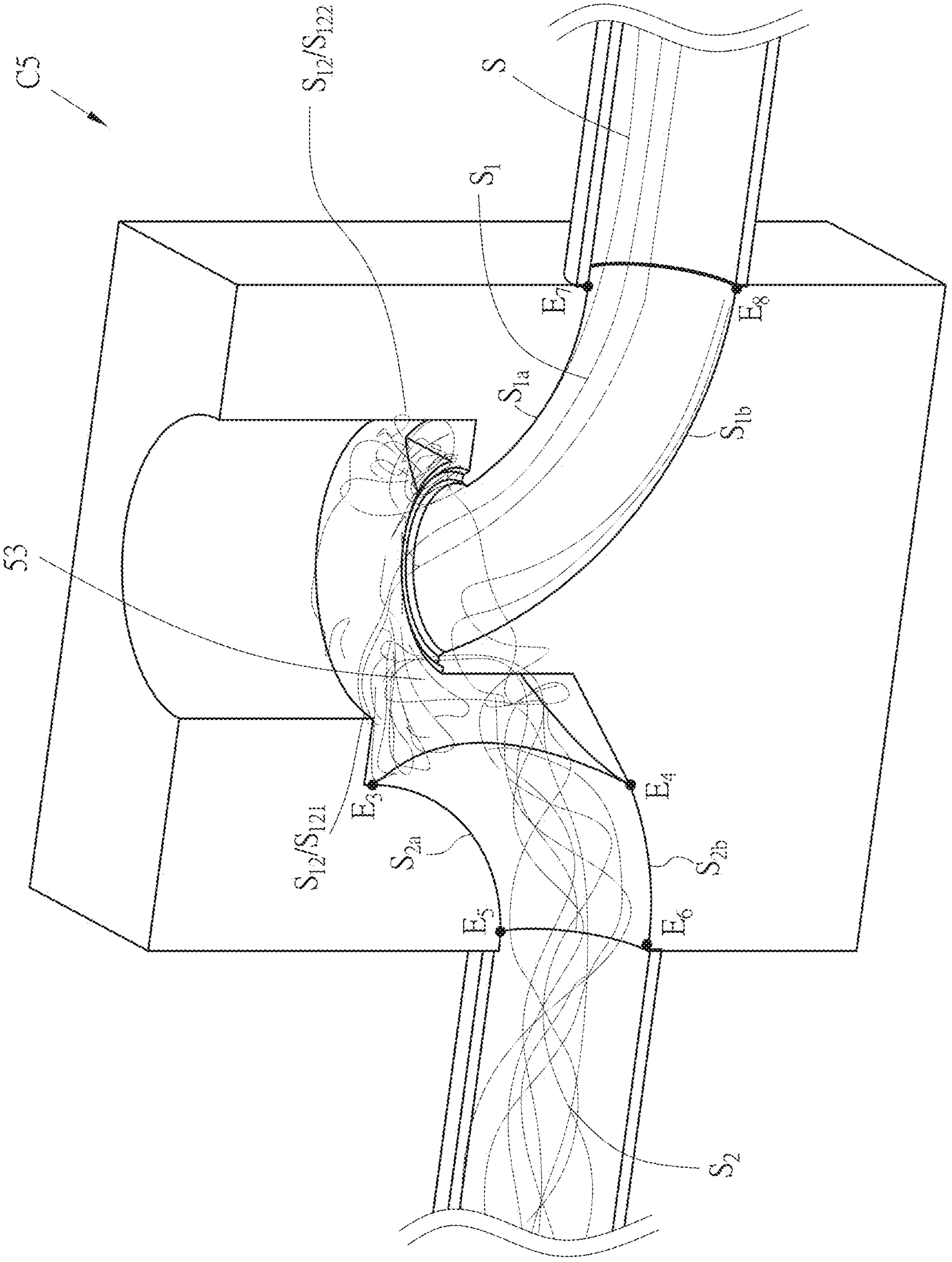
FIG. 10C is a 45-degree view of Embodiment 5 of Structure C5 according to the present invention, showing the flow channel.

FIG. 10A shows the inventive cross-sectional structure and the streamline distribution of Embodiment 5 of Structure C5. FIG. 10B is a top view of Embodiment 5 of Structure C5, showing the streamlines fanning out in the valve chamber 5 FIG. 10C is a 45-degree view of embodiment 5 of Structure C5, showing the radial streamline $S_{12}$ at the corner D in the internal outlet 82 (also referring to FIG. 1A through FIG. 1C, FIG. 2E).

Embodiment 5 provides a flow channel structure that is constructed on the basis of Embodiment 1.

$d_0$=52.5 mm, its $C_v$ value, $C_V \approx 83.23 > 73.5$, $\xi \approx 2.34 \leq 3.0$.

The inlet passage 6 is a curved pipe, for guiding the fluid to flow upward at the corner A and flow out through the center hole 63 of the valve seat 51. Therein, $LH_3 = LH_1 = 59.34$ mm, $\gamma_1 \approx 23.2°$, $d_0/a_x \approx 0.911$.

The ring-shaped ditch 53 is arranged between the outer diameter $d_1$ of the valve seat 51 and the inner diameter $d_3$ of the valve chamber 5, with the bottom of its bevel 531 at the same hight as the proximal point $E_4$.

The radial passage 7 is a ring-shaped, horizontally-diverging ditch that has a valve opening $B_1$.

The valve chamber 5 is a hollow ball with an eccentric structure. The valve chamber 5 structurally comprises a valve plug room 55 with a diameter of $1.8d_0$ and an annular chamber 56 with a diameter of $2.2d_0$. The valve plug room 55 and the annular chamber 56 have their centers of circle off from each other by $0.2d_0$. The annular chamber 56 has a ceiling at a height $LH_7$. A vertical line $YL_1$ passes through the valve plug room 55 and the valve seat 51 concentrically. The valve plug room 55 is for receiving the valve plug 54. The center point $P_1$ of the valve seat 51 near the valve inlet and the inner wall of the annular chamber 56 have a horizontal distance of $0.9d_0$. The center point $P_1$ of the valve seat 51 near the internal outlet 82 and the inner wall of the annular chamber 56 have a horizontal distance of $1.3d_0$. The annular chamber 56 contains the annular space $B_2$ and the ring-shaped ditch 53. The ring-shaped ditch 53 has a width $B_2$ with its maximum near the internal outlet due to the eccentric design.

The outlet passage 8 is a curved pipe, and the distal point $E_3$ of the internal outlet 82 has a height $LH_4$ higher than that of the seal surface 510 of the valve seat 51. Therein, $$LH_4 > LH_3;\ LH_6 = 72.48 \text{ mm},\ LH_7 = 81.61 \text{ mm},\ LL_2 = LL_{21} = 52.5 \text{ mm},$$

$$LH_4 = 78.75 \text{ mm},\ H_1 = LH_2 = 20.05 \text{ mm},\ LH_5 = -12.18 \text{ mm},$$

$$a_y = 90.93,\ a_y^* = 84.66,\ \theta_{21} = 45°,\ \theta_{21}^* = 41.37°,\ \theta_2 = 22.46°,\ \theta_{22} = 15°.$$

When the distal point $E_3$ of the internal outlet 82 is higher than the top of the annular chamber 56, $LH_4 > LH_7$. a curve $S_3$ tangent to the upper-edge line $S_{2a}$ is made from the distal point $$E_3^{**}$$

so that the distal point $$E_3^{**}$$

and the seal surface 510 of the valve seat 51 have a height difference $$H_1^{**} = 13.14 \text{ mm}.$$

The line segment $$E_3^{**}E_4$$

thus forms a new major axis $$a_y^{**}.$$

Then a curved surface SS tangent to the inner periphery of the outlet passage 8 is made along the curve $S_3$. The curve $S_3$ at the distal point $$E_3^{**}$$

and the vertical line $YL_3$ include a relatively large angle $$\gamma_{21}^{**},$$

where $$\gamma_{21}^{**} = 90\cdot.$$

The corner D at the distal point $$E_3^{**}$$

has an angle $$\theta_{21}^{**},$$

where $$\theta_{21}^{**} = 0\cdot.$$

The ellipse thus has a new major axis $$a_y^{**},$$

where $$a_y^{**} = 1.54d_0$$

(also referring Embodiment 4).

The corner A, the inlet center line $S_1$, and the corner B are similar to the streamline S and the corners A and B of FIG. 6A.

The spread C, the radial streamline $S_{12}$, and the fanning-out pattern are similar to the streamlines S and the fanning-out pattern of FIG. 6B. the horizontal distance between the center point $P_1$ of the valve seat 51 and the center point $P_3$ of the internal outlet 82 is $1.3d_0$, which means the width $B_2$ of the ring-shaped ditch 53 comes to its greatest value at the side of the internal outlet 82. This allows more streamlines S of the rushing stream $S_{121}$ to flow into the internal outlet 82 directly and fan out in a narrowed range with an angle smaller than 180 degrees. The tranquil stream $S_{122}$ would fan out at the remaining circumferential angles.

The corner D is similar to the corner D for the streamlines of FIG. 6C and includes the corner D1 for the rushing stream $S_{121}$ and the corner D2 for the tranquil stream $S_{122}$. The horizontal distance $P_1P_3$ is of $1.3d_0$, so the rushing stream $S_{121}$ and the tranquil stream $S_{122}$ could each form a longer spread C and have their streamlines S turning with larger radiuses of curvature $R_C$. As a result, the rushing stream $S_{121}$ and the tranquil stream $S_{122}$ only had minor flow interference in the valve chamber 5. The rushing stream $S_{121}$ and the tranquil stream $S_{122}$ merely generated minor flow interference at the internal outlet.

As to the corner E, the outlet passage 8 is a curved pipe extending obliquely downward and installed at an angle E of $2\theta_2$. It is relatively smooth and would not generate high head loss. Although minor interference could happen between the rushing stream $S_{121}$ and the tranquil stream $S_{122}$ it would not add significant head loss in the outlet passage 8, not to mention generation of any circumfluence zone N and issues of particle agglutination.

A summary of the inventive flow channel of Embodiment 5 of Structure C5 is herein provided. Referring to FIG. 10A, the corner A is a rounded corner for significantly reducing local head loss. Any corner B that could reduce the area of the flow channel area but is free of any circumfluence zone N would have its angle somehow reduced. This is another factor that reduces local head loss. The horizontal distance $P_1P_3$ is of $1.3d_0$, so the rushing stream $S_{121}$ and the tranquil stream $S_{122}$ could each form a longer spread C and have their streamlines S turning with larger radiuses of curvature $R_C$. The outlet passage 8 is a smoothly curved pipe. The distal point $E_3$ is higher than the seal surface 510 of the valve seat 51. The major axis $a_y$ is greater than the diameter $d_0$ of the center hole 63. When spreading in all directions at the radial passage 7, the streamlines of the rushing stream $S_{121}$ would only have to make a small downward turn at the first corner D1 to enter the upper-half space of the ring-shaped ditch 53. This is also minor head loss. The rushing stream $S_{121}$ when entering the internal outlet 82 would further have to make a small-angle trun at the second corner D1. This is also minor head loss. At last, the rushing stream $S_{121}$ and the tranquil stream $S_{122}$ include a relatively small angle $\alpha_3$ at the internal outlet 82. The inventive flow channel of Structure C5 thus have $C_V \approx 83.23 > 73.5$, and $\xi \approx 2.34 \leq 3.0$, The $C_V$ value is 11%~54% higher than those of Refinement 1 and Refinement 2 of Structure C4, thereby well meeting the requirement for high flow capacity.

The analysis of the inventive flow channel of Case I (i.e. Embodiment 6 of Structure C5) is as below.

Figure 11B:
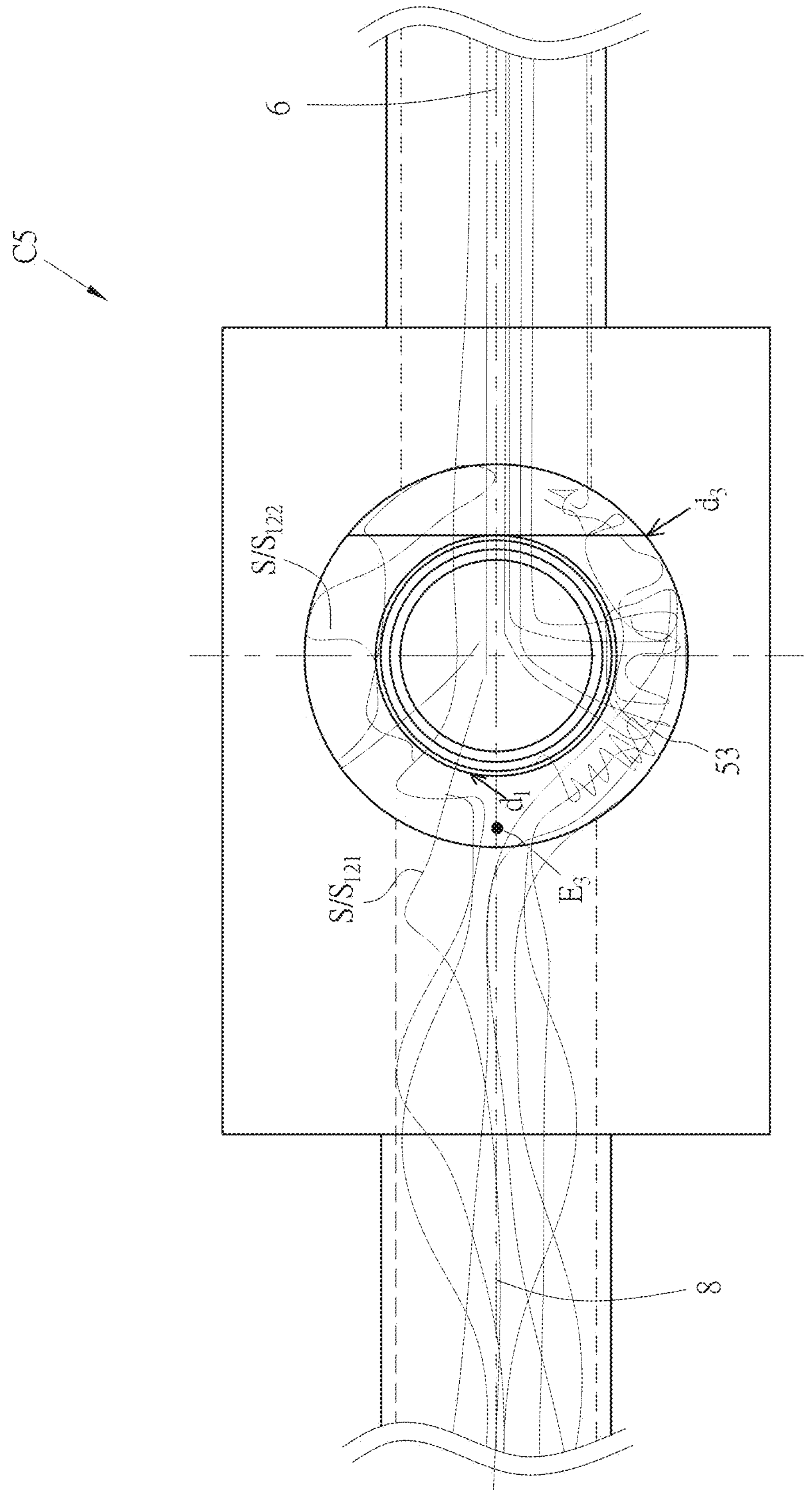
FIG. 11B is a top view of embodiment 6 of Structure C5 according to the present invention, showing streamlines fanning out in the valve chamber.
Figure 11C:
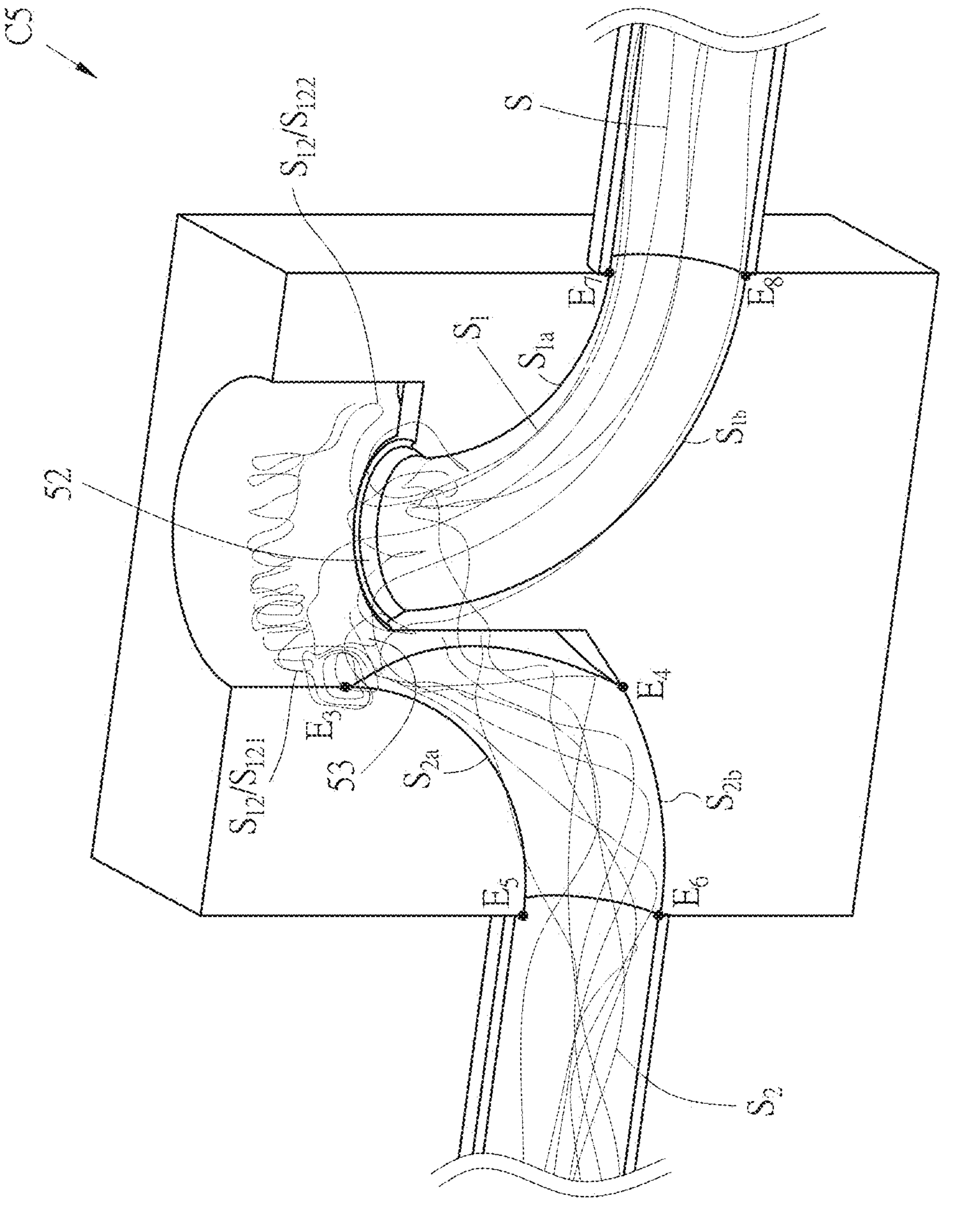
FIG. 11C is a 45-degree view of Embodiment 6 of Structure C5 according to the present invention, showing the flow channel.

FIG. 11A shows the inventive cross-sectional structure and the streamline distribution of Embodiment 6 of Structure C5. FIG. 11B is a top view of Embodiment 6 of Structure C5, showing the streamlines fanning out in the valve chamber 5. FIG. 11C is a 45-degree view of Embodiment 6 of Structure C5, showing the radial streamline $S_{12}$ at the corner D in the internal outlet 82 (also referring to FIG. 1A through FIG. 1C, FIG. 2F).

Embodiment 6 provides a flow channel structure that is constructed on the basis of Embodiment 1.

$C_v$ value, $C_V \approx 97.98 > 73.5$, $\xi \approx 1.69 \leq 3.0$.

The inlet passage 6 is a curved pipe, for guiding the fluid to flow upward at the corner A and flow out through the center hole 63 of the valve seat 51. Therein, the seal surface 510 of the valve seat 51 is located above the center hole 63. A conical pipe 52 coaxial with the vertical line $YL_1$ is provided to connect the center hole 63. The conical pipe 52 has the height h with a conical angle $\phi$ and has a center point $P_{DP}$. the seal surface 510 of the valve seat 51 has a height $LH_3$, $LH_3 = LH_1 + h_1$; $LH_1 = 86.88$ mm, $h = 5$ mm, $\phi = 60$, $LH_3 = 91.88$ mm, $\gamma_1 \approx 2.02°$, $d_0/a_x \approx 0.999$.

The ring-shaped ditch 53 is arranged between the outer diameter $d_1$ of the valve seat 51 and the inner diameter $d_3$ of the valve chamber 5, with the bottom of its bevel 531 at the same hight as the proximal point $E_4$.

The radial passage 7 is a ring-shaped, horizontally-diverging ditch that has a valve opening $B_1$.

The outlet passage 8 is a curved pipe, and the distal point $E_3$ of the internal outlet 82 has a height $LH_4$ higher than that of the seal surface 510 of the valve seat 51. Therein, $$LH_4 > LH_3; LH_6 = 105.02 \text{ mm}, LL_2 = LL_{21} = 78.75 \text{ mm},$$

$$LH_4 = 105 \text{ mm}, H_1 = 13.12 \text{ mm}, LH_2 = 35.55 \text{ mm}, LH_5 = 0.0 \text{ mm},$$

$$a_y = 105, a_y^* = 105.02, \theta_{21} = 45°, \theta_{21}^* = 45°, \theta_2 = 26.83°, \theta_{22} = 18.43°.$$

The corner A, the inlet center line $S_1$, and the corner B are similar to the streamline S and the corners A and B of FIG. 6A. The conical pipe 52 serves to facilitate the spread of the fluid, particularly at the inlet center line $S_1$, so as to allow the fluid to turn at the corner B more smoothly to enter the radial passage 7. This can further reduce head loss. Besides, the conical pipe 52 enhances the structural strength of the valve seat 51 and thereby improves the reliability of sealing performance.

The spread C, the radial center line $S_{12}$, and the fanning-out pattern are similar to the streamlines S and the fanning-out pattern of FIG. 6B. The conical pipe 52 enables the spread at the inlet center line $S_1$, so that more streamlines S of the rushing stream $S_{121}$ could flow into the internal outlet 82 directly and fan out in a range with an angle smaller than 180 degrees. The tranquil stream $S_{122}$ would fan out at the remaining circumferential angles.

The corner D includes the corner D1 for the rushing stream $S_{121}$ and the corner D2 for the tranquil stream $S_{122}$. Since the distal point $E_3$ is higher than the seal surface 510 of the valve seat 51, and the conical pipe 52 promote spreading of the fluid, the angle of the corner D at which the rushing stream $S_{121}$ and the tranquil stream $S_{122}$ turn downward and flow into the ring-shaped ditch 53 is reduced significantly. The is the first corner D.

The corner D is similar to the corner D for the streamlines of FIG. 6A and includes the corner D1 for the rushing stream $S_{121}$ and the corner D2 for the tranquil stream $S_{122}$. Due to the spread-promoting effect of the conical pipe 52, the rushing stream $S_{121}$ and the tranquil stream $S_{122}$ in the valve chamber 5 would only have minor flow interference. The rushing stream $S_{121}$ and the tranquil stream $S_{122}$ at the internal outlet 82 would also have minor flow interference.

As to the corner E, the outlet passage 8 is a curved pipe extending obliquely downward and installed at an angle E of $2\theta_2$. It is relatively smooth and would not cause high head loss. Although minor interference could happen between the rushing stream $S_{121}$ and the tranquil stream $S_{122}$ it would not add significant head loss in the outlet passage 8, not to mention generation of any circumfluence zone N and issues of particle agglutination.

A summary of the inventive flow channel of Embodiment 6 of Structure C5 is herein provided. Referring to FIG. 11A, the spread-promoting effect of the conical pipe 52 helps reduce the angle of the corner B. This in turn allows a larger part of the rushing stream $S_{121}$ to flow into the internal outlet 82 directly, and the reduced cornering angle of the first corner D1 allows the fluid to enter the upper-half space of the ring-shaped ditch 53 smoothly. The rushing stream $S_{121}$ when entering the internal outlet 82 would further have to make a small-angle trun at the second corner D1. At last, the rushing stream $S_{121}$ and the tranquil stream $S_{122}$ included a relatively small angle $\alpha_3$ at the internal outlet 82. The rushing stream $S_{121}$ and the tranquil stream $S_{122}$ flowed and rolled with each other in the outlet passage 8 and this eliminated the circumfluence caused by the corner E of $2\theta_2$. the inventive flow channel of Structure C5 thus had $C_V \approx 97.98 > 73.5$, and $\xi = 1.69 \leq 3.0$. The $C_V$ value is 11%~54% higher than those of Refinement 1 and Refinement 2 of Structure C4, thereby well meeting the requirement for high flow capacity.

TABLE 1

Reference Data (Unit: mm, %, °, $d_0$ = 52.5, $d_3$ = 105)

| Case | Structure C4 | | | Inventive Structure | | | | | |
|---|---|---|---|---|---|---|---|---|---|
| Parameters | A | B | C | D | E | F | G | H | I |
| $B_1$ | | | | | 13.14 | | | | |
| $L_{12}$ | | | | | 90 | | | | |
| $LH_1$ | 36 | | | | 59.34 | | | | 86.88 |
| $LH_3$ | | | | | | | | | 91.88 |
| $\gamma_1$ | 0 | 23.2 | 0 | | | 23.2 | | | 2.02 |
| $d_0/a_x$ | 1.0 | 0.911 | 1.0 | | | 0.911 | | | 0.999 |
| $LH_6$ | 49.14 | | | | 72.48 | | | | 105.02 |
| $LL_{21}$ | 78.75 | 52.5 | | | 68.25 | | 52.5 | | 78.75 |
| $LH_4$ | | 26.25 | 78.75 | | 94.50 | | 78.75 | | 105 |
| $H_1$ | −9.75 | −33.09 | 19.41 | | 35.16 | | 19.41 | | 13.12 |
| $LH_2$ | 0 | 0 | 20.05 | | 29.14 | | 20.05 | | 35.55 |
| $LH_5$ | | −26.25 | −12.18 | | −5.11 | | −12.18 | | 0.00 |
| $B_1$ | | | | | 13.14 | | | | |
| $L_{12}$ | | | | | 90 | | | | |
| $LH_1$ | 36 | | | | 59.34 | | | | 86.88 |
| $LH_3$ | | | | | | | | | 91.88 |
| $\gamma_1$ | 0 | 23.2 | 0 | | | 23.2 | | | 2.02 |
| $d_0/a_x$ | 1.0 | 0.911 | 1.0 | | | 0.911 | | | 0.999 |
| $LH_6$ | 49.14 | | | | 72.48 | | | | 105.02 |
| $LL_{21}$ | 78.75 | 52.5 | | | 68.25 | | 52.5 | | 78.75 |
| $LH_4$ | | 26.25 | 78.75 | | 94.50 | | 78.75 | | 105 |
| $a_y$ | | 52.5 | 90.93 | | 99.61 | | 90.93 | | 105.00 |
| $a^*_y$ | | 52.5 | 84.66 | | 77.59 | | — | | 105.02 |
| $a^{**}_y$ | | — | — | | — | | 84.66 | | — |
| $\theta_{21}$ | 0 | 0 | | | | 45 | | | |
| $\theta^*_{21}$ | 0 | 0 | 41.37 | | 34.11 | | — | 41.37 | 45 |
| $B_1$ | | | | | 13.14 | | | | |
| $L_{12}$ | | | | | 90 | | | | |
| $LH_1$ | 36 | | | | 59.34 | | | | 86.88 |

TABLE 1-continued

| Reference Data (Unit: mm, %, °, $d_0$ = 52.5, $d_3$ = 105) | | | | | | | | | |
|---|---|---|---|---|---|---|---|---|---|
| Case | Structure C4 | | | Inventive Structure | | | | | |
| Parameters | A | B | C | D | E | F | G | H | I |
| $LH_3$ | | | | | | | | | 91.88 |
| $\gamma_1$ | 0 | 23.2 | 0 | | | 23.2 | | | 2.02 |
| $d_0/a_x$ | 1.0 | 0.911 | 1.0 | | | 0.911 | | | 0.999 |
| $LH_6$ | 49.14 | | | | 72.48 | | | | 105.02 |
| $LL_{21}$ | 78.75 | 52.5 | | | 68.25 | | 52.5 | | 78.75 |
| $LH_4$ | | 26.25 | 78.75 | | 94.50 | | 78.75 | | 105 |
| $\theta^{**}_{21}$ | — | — | — | | — | | 0.0 | — | — |
| $\theta_2$ | 0 | 0 | 22.46 | | 25.27 | | 22.46 | | 26.83 |
| $\theta_{22}$ | 0 | 0 | 15 | | 17.21 | | 15 | | 18.43 |
| $C_V$ | 61.89 | 69.88 | 64.09 | 82.89 | 81.32 | 84.6 | 80.89 | 83.23 | 97.98 |
| $\xi$ | 4.23 | 3.32 | 3.94 | 2.36 | 2.45 | 2.26 | 2.48 | 2.34 | 1.69 |

TABLE 2

| Reference Data (Unit: mm, %, °) | | | | | |
|---|---|---|---|---|---|
| Case | Innovative Structure | | | | |
| Parameters | D1 | D2 | D3 | D4 | D5 |
| $d_0$ | 52.5 | 52.5 | 22.2 | 33.7 | 33.7 |
| $d_3$ | 94.5 | 84 | 41.74 | 67.4 | 63 |
| $d3/d_0$ | 1.8 | 1.6 | 1.88 | 2.0 | 1.87 |
| $B_1$ | 13.14 | 13.14 | 5.55 | 8.43 | 8.43 |
| $L_{12}$ | 80 | 60 | 45 | 72.6 | 64.15 |
| $2\theta_1$ | 70 | 80 | 80 | 70 | 70 |
| $LH_1$ | 56.02 | 50.35 | 37.7 | 50.84 | 44.92 |
| $LH_3$ | | | | | 46.22 |
| $d_0/a_x$ | 0.932 | 0.984 | 0.984 | 0.936 | 0.935 |
| $LH_6$ | 69.16 | 63.47 | 43.31 | 59.26 | 54.62 |
| $LL_{21}$ | 47.75 | 40.5 | 32.62 | 52.3 | 44.69 |
| $LH_4$ | 74 | 66.75 | 42.91 | 65.96 | 28.82 |
| $H_1$ | 17.98 | 16.4 | 5.96 | 15.13 | −17.39 |
| $LH_2$ | 17.47 | 13.69 | 14.61 | 23.86 | 9.86 |
| $LH_5$ | −14.15 | −16.96 | −0.34 | 0.85 | −8.45 |
| $a_y$ | 88.15 | 83.72 | 44.06 | 65.11 | 37.27 |
| $a^*_y$ | 83.30 | 80.44 | 43.62 | 58.41 | 37.27 |
| $\theta_{21}$ | | 45 | | 43.2 | 30 |
| $\theta^*_{21}$ | 42.10 | 42.69 | 44.64 | 39.59 | 30 |
| $\theta_2$ | 21.46 | 19.76 | 26.61 | 27.14 | 12.74 |
| $\theta_{22}$ | 14.22 | 12.91 | 18.26 | 18.7 | 10.65 |
| $C_V$ | 81.37 | 68.26 | 15.06 | 37.5 | 33.79 |
| $\xi$ | 2.43 | 3.48 | 2.29 | 1.95 | 2.41 |

The following discussion of the results of the flow-field analysis result is based on the data as provided in Table 1 and Table 2.

1. Comparison is first made among Case A as shown FIG. 3A, Case B as shown FIG. 4A, and Case C as shown FIG. 5A. Each of these conventional structures have the inlet passage 6 and the outlet passage 8 formed with 90-degree corners. As proven by the simulated $C_V$ values, the right-angle structure of the inlet passage 6 showed the greatest impact on the flow field. As a proof, Refinement 1 improved the $C_V$ value from 61.89 to 69.88 by simply changing the inlet passage 6 in to a curved pipe. Refinement 2 merely changed the outlet passage 6 into a curved structure and obtained the $C_V$ value of 64.09. It is obvious that the circumfluence zone N caused by the inlet passage 6 having the right-angle corner is the number-one issue to be addressed. Then is the flow interference at the internal outlet 82. The third is the flow interference in the valve chamber 5.
2. Comparison is then made among the conventional structure, Refinement 1, and Refinement 2 shown in the top views of FIG. 3B, FIG. 4B, and FIG. 5B. illustrating the valve chamber 5. Since the valve seat 51 is higher than the internal outlet 82, the fluid when flowing out the center hole 63 would be hindered by the inner wall of the valve chamber 5 and fan out. Therein, the fanning-out angle of the rushing stream $S_{121}$ would always be greater than 180 degrees.
3. Comparison is now made among Case B as shown in FIG. 4A, Case C as shown in FIG. 5A, and Case D as shown in FIG. 6A for their Cy values, which are 69.88, 64.09, and 82.89, respectively. Only Embodiment 1 whose inlet passage 6 and outlet passage 8 are both curved pipes reached a $C_V$ value that is higher than 73.5. In Embodiment 1, the flow interference in the valve chamber 5 and the flow interference in the internal outlet 82 were both significantly reduced. However, the inlet passage 6 in Embodiment 1 has reduced area, with a $d_0/a_x \approx 0.911$, and this limits its $C_V$ value from being further improved.
4. Comparison is made between Case D as shown in FIG. 6A and Case E as shown FIG. 7A. Embodiment 2 changes the outlet passage 8 of Embodiment 1 into an oblique pipe but preserves the non-standard elliptical internal outlet 82 with the same size. The resulting $C_V$ value is 81.32. As to the elbow-angle structure having the corner E, the result shows that the oblique-pipe structure might benefit the rushing stream $S_{121}$ by significantly reducing the angle of the first corner D. However, circumfluence in the elbow angle brought about additional loss. The circumfluence zone in the elbow angle would not cause particle agglutination, but the overall $C_V$ value was decreased by 1.57.
5. Comparison is made among Case D as shown in FIG. 6A, Case E as shown in FIG. 7A, Case F as shown in FIG. 8A. Embodiment 3 changes the outlet passage 8 of Embodiment 2 into the oblique-pipe structure. The internal outlet 82 is rectangular and has the same major axis $a_y$ and minor axis $b_z$, resulting a $C_V$ value of 84.6. Since the rectangular internal outlet 82 has an increased area, a larger part of the rushing stream $S_{121}$ could flow into the internal outlet 82 smoothly. As a result, the overall $C_V$ value is 3.28 higher than that achieved by Embodiment 2.
6. Comparison is further made between Case D as shown in FIG. 6A and Case G as shown in FIG. 9A. Embodiment 4 shortens the length $LL_{21}$ of the outlet passage 8. In Embodiment 1, the length $LL_{21}$=68.25 mm, and in Embodiment 4 the length $LL_{21}$=52.25 mm. Another change is at the internal outlet 82. This is particularly about selecting a distal point $$E_3^{**}$$

in the major axis $a_y$ and incorporating the concave line $S_3$ and the concave surface SS, $$\theta_{21}^{**} = 0°$$

to alter the corner D and reduce head loss. Embodiment 4 has the overall $C_V$ value of 80.89, which is 2.0 lower than that of Embodiment 1. The shortened $LL_{21}$ leads to a shortened $a_y$ value. Although the length of $$a_y^*$$

was remined at 84.66 mm, the unduly low $LH_5$=−12.18 mm was still against smooth flowing of the fluid and cancelled out the advantage caused by $$\theta_{21}^{**} = 0°,$$

yet maintains the high $C_V$ value.

7. Comparison is made between Case G as shown in FIG. 9A and Case H as shown in FIG. 10A. Embodiment 5 is about making the valve chamber 5 of Embodiment 4 into an eccentric structure, with the internal outlet 82 unchanged. The horizontal distance between the center point $P_1$ of the valve seat 51 near the internal outlet 82 and the inner wall of the annular chamber 56 is 1.3 $d_0$, so the width $B_2$ of the ring-shaped ditch 53 would come to its maximum at the side of the internal outlet 82 depending on the exact eccentric design. Therein, the eccentric structure provided more space for the rushing stream $S_{121}$ to spread, so the corner D at the spread C had a smoother angle. In Embodiment 5, the overall $C_V$ value is 83.23, which is 2.34 higher than that of Embodiment 4.
8. Comparison is made between Case D as shown in FIG. 6A and Case I as shown in FIG. 11A. Embodiment 6 lengthens the length $LL_{21}$ of the outlet passage 8 of Embodiment 1 and further elevates the valve seat 51. In Embodiment 6, $LL_{21}$=78.75 mm, $LH_3$=91.88 mm, $LH_1$=86.88 mm, and $d_0/a_x$=0.999. A conical pipe 52 above the center hole 63 has a height h. It has a conical angle ϕ that allows the fluid to better spread at the corner B, and makes the angle of the corner D for the rushing stream $S_{121}$ to enter the spread C smoother. In Embodiment 6, the overall $C_v$ value is 97.98, which is 15.09 higher than that of Embodiment 1.
9. Referring to Table 2, Case D1 and Case D2 are cases based on the structure of Case D and made with the pipe diameter $d_0$ of 52.5 mm but have the inner diameter $d_3$ of the valve chamber further contracted. Their inner diameters $d_3$ are 94.5 mm and 84 mm and inner diameter ratios $$\frac{d_3}{d_0}$$

are 1.8 and 1.6, respectively. Their $C_V$ values are 81.37 and 68.26, respectively. Their head loss coefficients ξ are 2.43 and 3.48, respectively. It is clear that the unduly small inner diameter $d_3$ of the valve chamber would significantly decrease the width of the ring-shaped ditch 53 and force the rushing stream $S_{121}$ to flow into the ring-shaped ditch 53 at a large corner D, leading to increased head loss. This also increased the flow interference in the valve chamber 5 and the flow interference at the internal outlet 82. They merely provided a result commensurate with Case B. Case D2 has the inner diameter ratio $$\frac{d_3}{d_0}$$

of 1.6, which is unduly small.
10. Referring to Table 2, Case D3 is a case that has a pipe diameter $d_0$ (i.e., the diameter of the valve inlet/the diameter of the valve outlet/the diameter of the center hole) of 22.2 mm, and the inner diameter $d_3$ of the valve chamber is 41.74 mm, so the inner diameter ratio $$\frac{d_3}{d_0}$$

is 1.88. Its head loss coefficient ξ is 2.29. The result of the flow-field analysis result of this case shows that even the pipe diameter $d_0$ is as small as 22.2 mm, a good $C_V$ value of 15.06 and a good head loss coefficient ξ of 2.29 can be achieved as long as the inner diameter ratio $$\frac{d_3}{d_0}$$

is not unduly low.
11. Reliability of data of flow-field analysis:

| Model | KH200-19P | KH200-25P | KH200-40P |
|---|---|---|---|
| Pipe Diameter $d_0$ | 16 | 22 | 33.7 |
| Valve-chamber inner diameter $d_3$ | 33.44 | 41.74 | 63.02 |
| Inner Diameter Ratio $\frac{d_3}{d_0}$ | 2.09 | 1.88 | 1.87 |
| Measured $C_V$ | 5.2 | 9.1 | 20.9 |
| Head Loss Coefficient ξ | 5.18 | 6.04 | 6.3 |
| Simulated $C_V$ | 5.08 | 9.24 | 22.7 |
| Head Loss Coefficient ξ | 5.4 | 5.4 | 5.33 |

Therein, the data of Reference 7 are flow coefficient values measured from products of Structure C4, i.e., KH200-19P, KH200-25P, and KH200-40P. The model in the flow-field analysis software is unable to fully reflect real-world flows in the valve body. Although the values obtained from analysis would be slightly higher than the measured values, the analysis result is still a valuable source of reference.

12. Regarding Reference 7, Case D4 has a pipe diameter $d_0$ of 33.7 mm, an inner diameter $d_3$ of the valve chamber of 66.34 mm, an inner diameter ratio $$\frac{d_3}{d_0}$$

of 2.0, a flow coefficient $C_V$ value, as obtained through flow-field analysis, of 37.5, and a head loss coefficient $\xi$ of 1.95. The flow channel of Case D4 was made using rapid prototyping (3D printing). The obtained product has a pipe diameter $d_0$ of 33.1 mm. Its measured value flow coefficient $C_V$ value is 31.8 and its head loss coefficient $\xi$ is 2.53. The value measured from Case D4 as compared to that of a product of Structure C4 having the same diameter showed obvious and huge improvement. The ratio of the head loss coefficient values $\xi$ is 2.53: 6.30, (6.3−2.53)/6.3=0.598, meaning an improvement of 59.8%. The comparison results well prove the advancement of the inventive flow channel of C5.

Figure 12B:
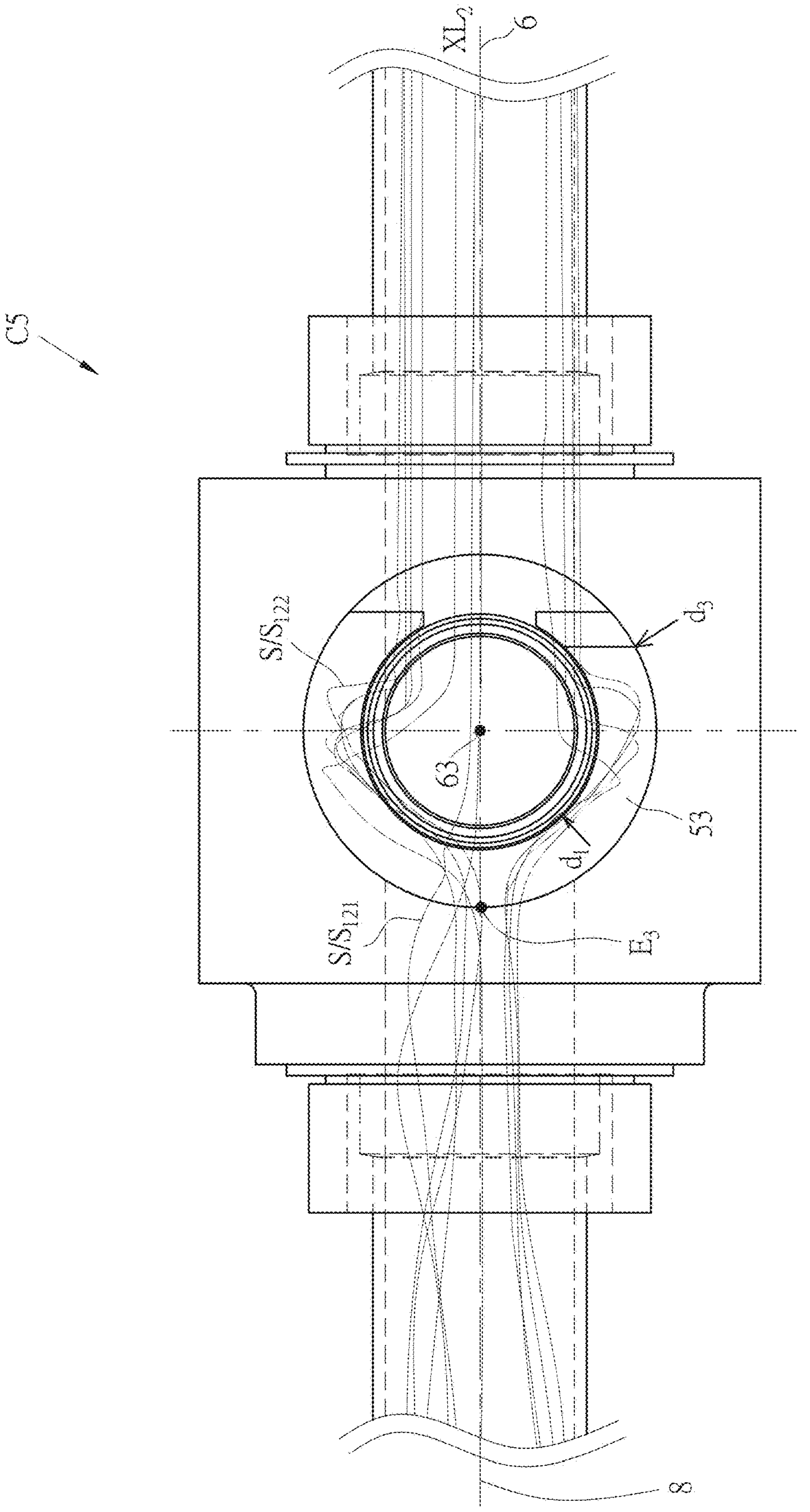
FIG. 12B is a top view of Preferred Mode B of Embodiment 1 of Structure C5 according to the present invention, showing streamlines fanning out in the valve chamber.
Figure 12C:
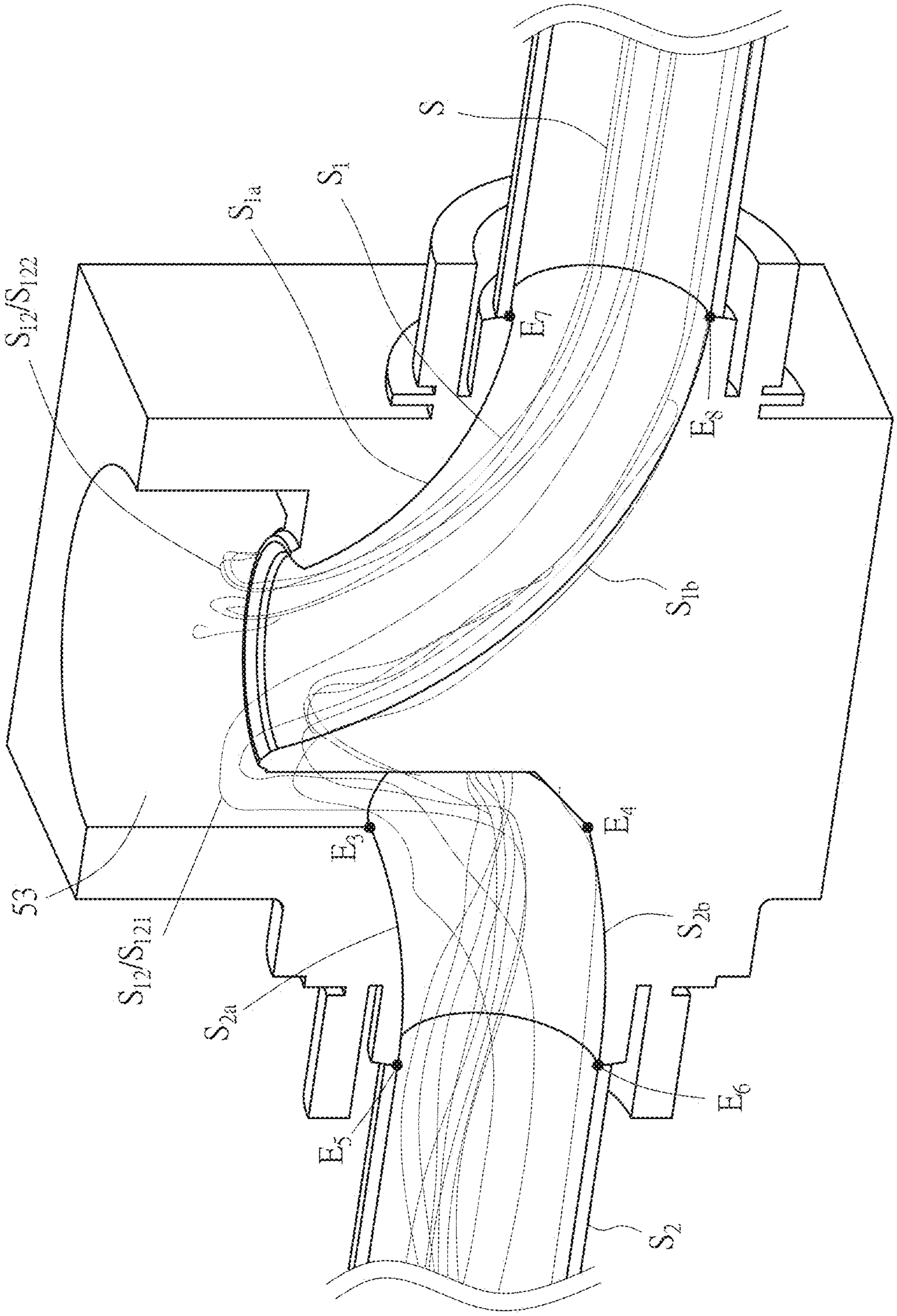
FIG. 12C is a 45-degree view of Preferred Mode B of Embodiment 1 of Structure C5 according to the present invention, showing the flow channel.
Figure 13A:
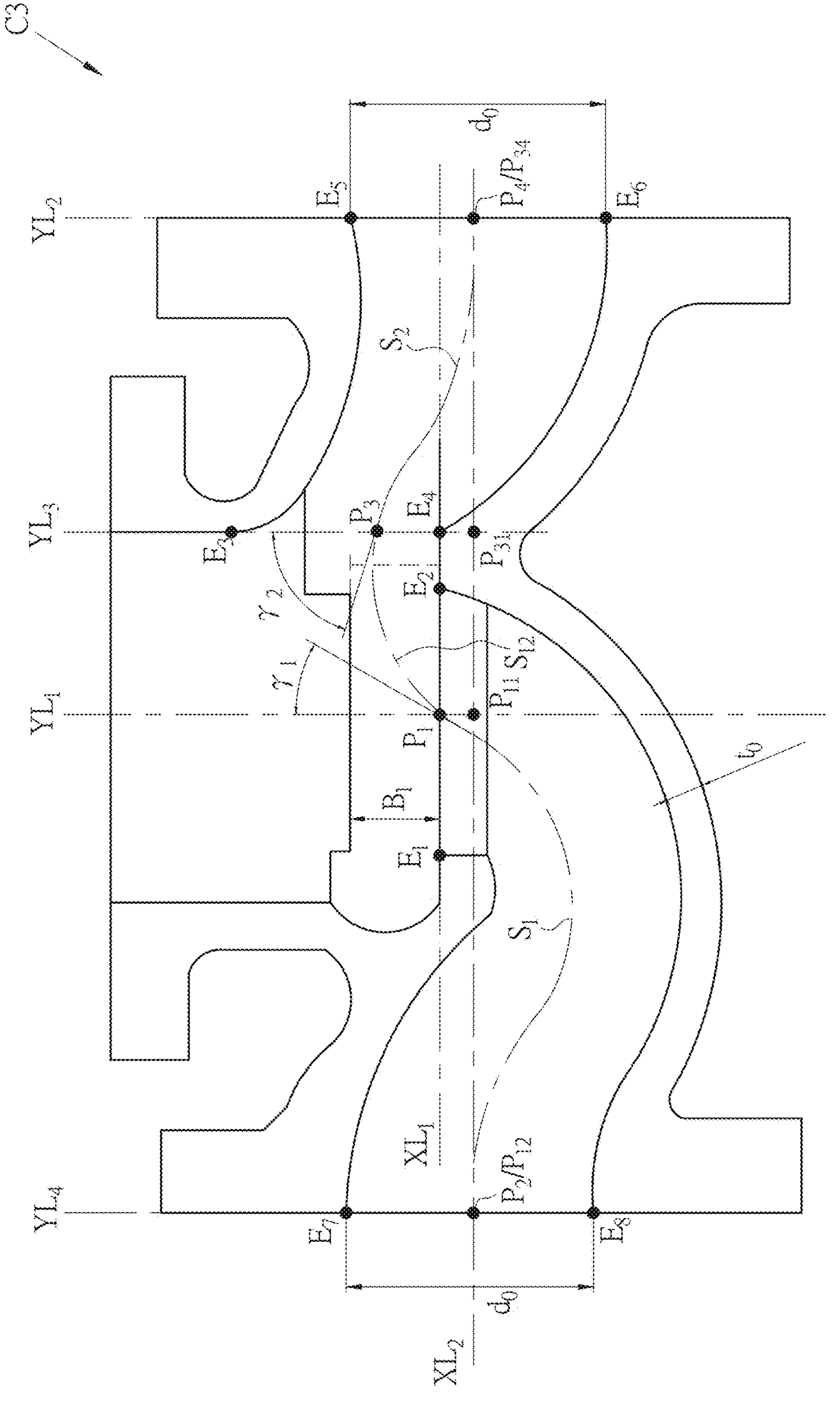
FIG. 13A (PRIOR ART)
FIG. 13A schematically illustrates the flow channel of Structure C3 as a prior art, showing its coordinate axes, coordinate points, and streamlines $S_1$, $S_{12}$, $S_{121}$, $S_{122}$, $S_2$.
Figure 13B:
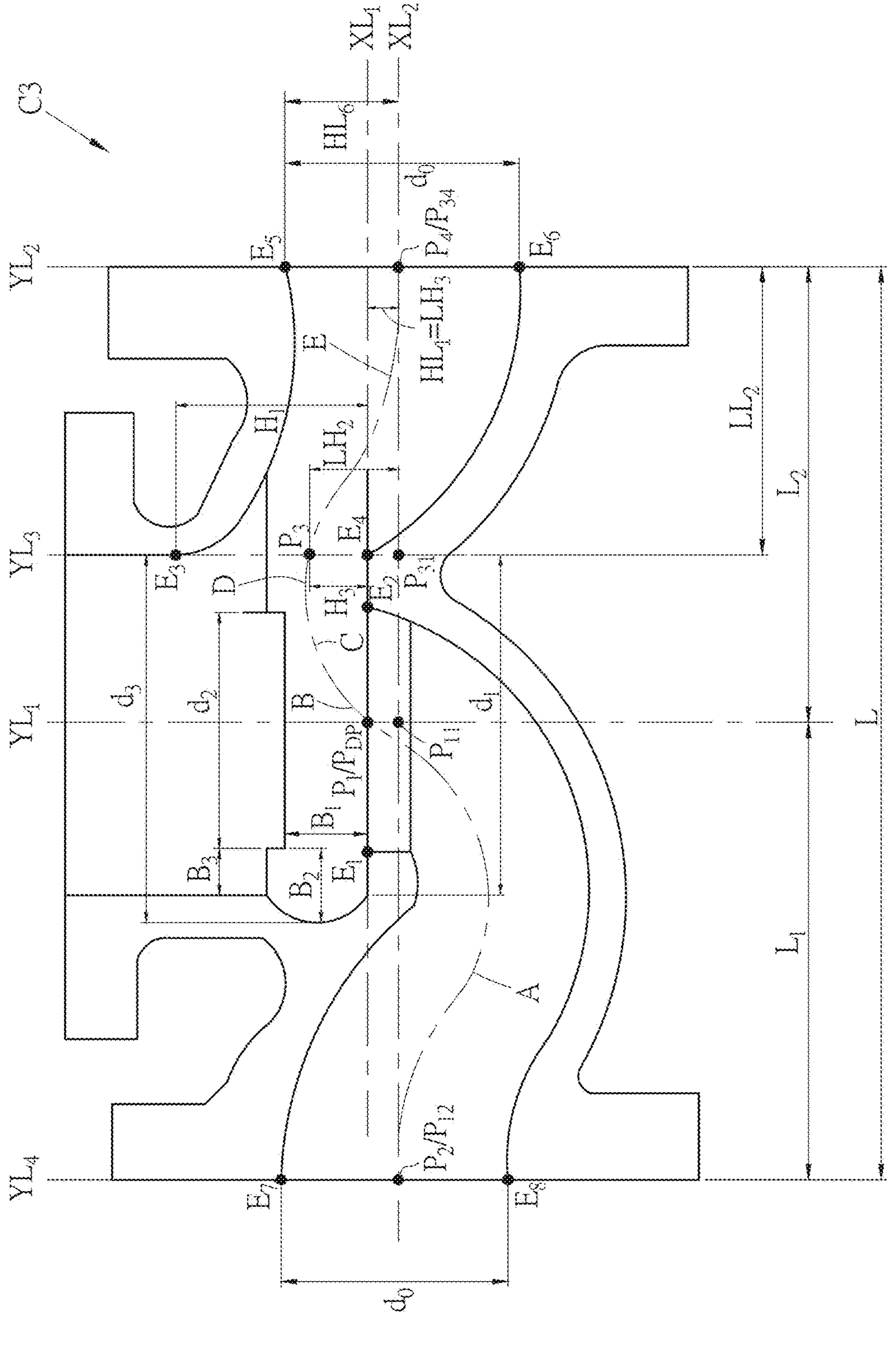
FIG. 13B (PRIOR ART)
FIG. 13B schematically illustrates the flow channel of Structure C3 as a prior art, showing the placement angle, bends A, B, D, E, and the spread C.
Figure 14A:
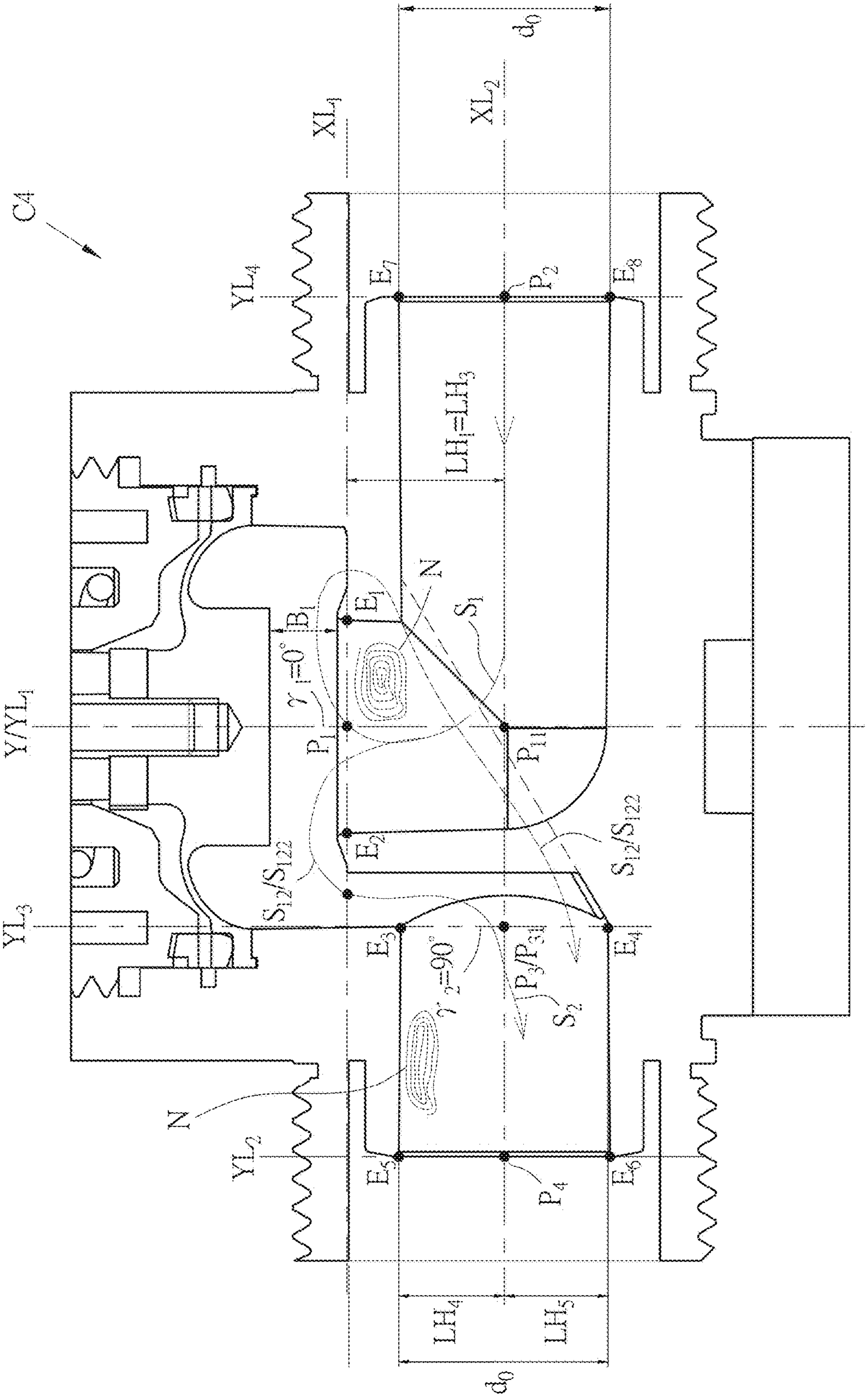
FIG. 14A (PRIOR ART)
FIG. 14A schematically illustrates the flow channel of Structure C4 as a prior art, showing its coordinate axes, coordinate points, and streamlines $S_1$, $S_{12}$, $S_{121}$, $S_{122}$, $S_2$.
Figure 14B:
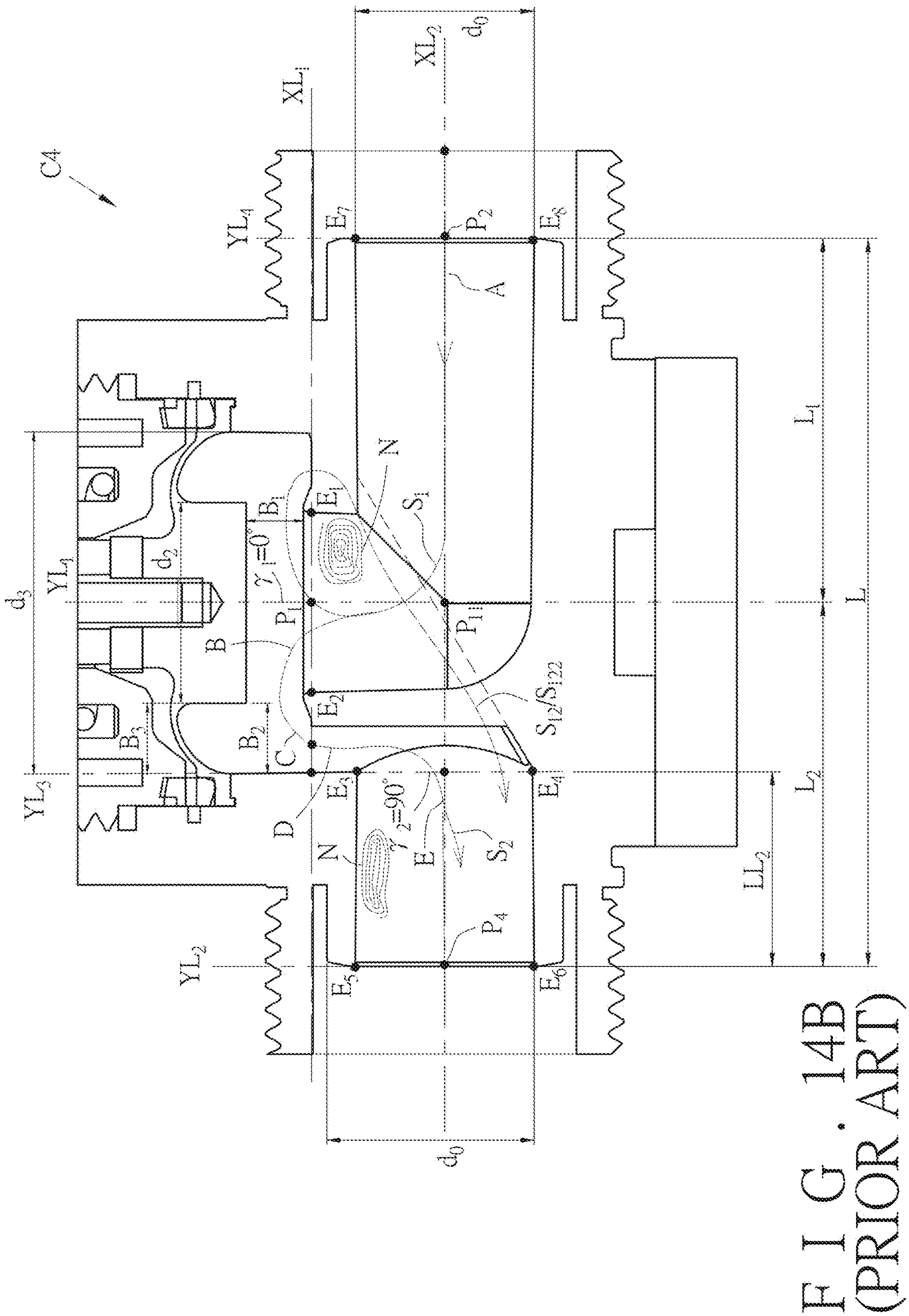
FIG. 14B (PRIOR ART)
FIG. 14B schematically illustrates the flow channel of Structure C4 as a prior art, showing its corner A, corner B, spread C, corner D, and corner E.

13. Regarding Reference 7, Case D5 is Preferred Mode B of Embodiment 1. The details of its flow channel structure and flow field have been provided in FIG. 12A, FIG. 12B, and FIG. 12C. Case D5 has a pipe diameter do of 33.7 mm, an inner diameter $d_3$ of the valve chamber of 63 mm, and an inner diameter ratio $$\frac{d_3}{d_0}$$

of 1.87. The second corner D1 for the rushing stream $S_{21}$ to turn when flowing downward and passing the distal point $E_3$ was reduced to 60°, and its flow coefficient $C_V$ value as obtained through flow-field analysis is of 33.79, and its head loss coefficient $\xi$ is 2.41. It is thus proven that the angle of the second corner D1 could effectively reduce the flow interference at the internal outlet.

14. As to derivative applications of the present invention, both Case F and Case I are based on Case D and built with better performance in term of flow coefficient $C_V$. Of course, it is contemplated that the rectangular internal outlet 82 of Case F may be integrated into Case I for an even better value of the flow coefficient $C_V$, but the feasibility is subject to the casting technology. Case D, Case E, Case F, Case G, Case H, and Case I in Table 1, as well as Case D1, Case D2, Case D3, Case D4, and Case D5 in Table 2 are some examples. The local features and the structural characteristics of the inventive flow channel structure may be scaled and combined in various ways for better performance in terms of flow coefficient $C_V$. All these modifications and combinations shall be deemed falling within the scope of the present invention.

What is claimed is:

1. An improved flow channel for a globe valve, which features high eco-friendliness and low head loss, the improved flow channel comprising: a valve chamber, a ring-shaped ditch, a valve seat, a valve plug, a seal surface, a valve inlet, an inlet passage, a center hole, a valve outlet, an outlet passage, and an internal outlet;

the improved flow channel defining a valve-chamber inner diameter, a valve-plug outer diameter, a valve-seat outer diameter, a valve-inlet diameter, a valve-outlet diameter, and a center-hole diameter;

the seal surface of the valve seat being located at an outer side of the center hole, the center hole having a center point ($P_1$) that has a height ($LH_1$), the internal outlet having a center point ($P_3$) that has a height ($LH_2$), the seal surface having a height ($LH_3$), the valve inlet having a center point ($P_2$), and the valve outlet having a center point ($P_4$);

a horizontal line ($XL_1$) passing through the center point ($P_1$) of the center hole and intersecting a circumference of the center hole at a distal point ($E_1$) and a proximal point ($E_2$), wherein the distal point ($E_1$) is located near the valve inlet, and the proximal point ($E_2$) is located near the valve outlet;

a channel axis ($XL_2$) (or an X axis) horizontally passing through the center point ($P_2$) and the center point ($P_4$), wherein the channel axis ($XL_2$) defines a coordinates zero point of a Y axis that is perpendicular to the channel axis and forms a baseline that represents 0 in terms of height so that any point in the improved flow channel is located by a positive value, a zero value, or negative value depending on whether the point is above, on, or below the channel axis ($XL_2$);

a vertical line ($YL_1$) passing through the center point ($P_1$) and intersecting the channel axis ($XL_2$) at a point ($P_{11}$);

a vertical line ($YL_2$) passing through the center point ($P_4$), and intersecting a circumference of the valve outlet at a distal point ($E_5$) and a proximal point ($E_6$), the proximal point ($E_6$) being a nadir of the outlet passage;

a vertical line ($YL_3$) passing through the center point ($P_3$) of the internal outlet, intersecting the channel axis ($XL_2$) at a point ($P_{31}$), and intersecting a circumference of the internal outlet at a distal point ($E_3$) and a proximal point ($E_4$), the distal point ($E_3$) having a height ($LH_4$) and the proximal point ($E_4$) having a height ($LH_5$);

a vertical line ($YL_4$) passing through the center point ($P_2$) and intersecting a circumference of the valve inlet at a distal point ($E_7$) and a proximal point ($E_8$), the proximal point ($E_8$) being a nadir of the inlet passage;

the center point ($P_1$) and the center point ($P_2$) being spaced apart from each other by a horizontal distance ($L_1$); the center point ($P_4$) and the center point ($P_1$) being spaced apart from each other by a horizontal distance ($L_2$); and the center point ($P_2$) and the center point ($P_4$) being spaced apart from each other by a horizontal distance (L), where $L=L_1+L_2$;

the center point ($P_4$) and the center point ($P_3$) being spaced apart from each other by a horizontal distance ($LL_2$), where $$LL_2 = L_2 - \frac{d_3}{2};$$

wherein $d_3$ is the valve-chamber inner diameter;

the valve chamber being provided therein with the ring-shaped ditch and the valve seat, and being provided with the valve plug, a valve stem, and the seal surface, in which the valve plug, the valve stem, and the seal surface are concentric; the valve chamber connecting the inlet passage and the outlet passage; the inlet passage extending from the valve inlet horizontally and then turning upward and having an outlet end that is right on the center hole of the valve seat; the internal outlet being installed on an inner periphery of the valve chamber and being used to connect the outlet passage; the valve inlet and the valve outlet being installed at two sides of the valve body, respectively;

the ring-shaped ditch being located on an inner wall of the valve chamber and encircling an outer periphery of the valve seat, the ring-shaped ditch having a bottom that is formed with a bevel at an oblique angle (β), the bevel having a higher side located near the inlet passage and having a lower side located near the outlet passage to be connected to the proximal point ($E_4$) of the internal outlet;

the valve seat being installed at the outlet end of the inlet passage and provided with the seal surface;

the valve plug being cylindrical in shape and having a bottom formed with a plane, when the globe valve is closed, the valve plug being engaged with and sealing the seal surface; when the valve is fully open, a bottom surface of the valve plug and the seal surface jointly forming a radial passage that has an opening having a diameter ($B_1$), where $$0.125 \leq \frac{B_1}{d_0} \leq 0.5;$$

the inlet passage having the valve inlet, an inlet center line ($S_1$), the center hole, an upper-edge line ($S_{1a}$), and a lower-edge line ($S_{1b}$); the inlet center line ($S_1$) connecting the center point ($P_1$), a center point ($P_{DP}$), and the center point ($P_2$), and forming an included angle ($\gamma_1$) with the vertical line ($YL_1$) at the center point ($P_1$); wherein, when the included angle $\gamma_1 \neq 0°$, the center hole being a non-standard elliptical hole that has a major axis having a length of $a_x$ in an X-axis direction, wherein the length $a_x$ exceeds or is equal to $d_0$; wherein the included angle $\gamma_1=0°$, wherein the do is a diameter of the center hole, wherein the length $a_x$ corresponds to a distance between the distal point (E1) and the proximal point (E2), wherein the distance between the distal point (E1) and the center point (P1) is more or equal to a distance between the center point (P1) and proximal point (E2), and wherein a minor axis having a length ($b_z$) extends in a Z-axis direction that is a direction of a Z axis perpendicular to both of the X axis and the Y axis, where the minor axis length ($b_z$) equals the center hole diameter ($d_0$);

the upper-edge line ($S_{1a}$) connecting the distal point ($E_1$) and the distal point ($E_7$), the lower-edge line ($S_{1b}$) connecting the proximal point ($E_2$) and the proximal point ($E_8$);

the radial passage having a radial center line ($S_{12}$) and the opening having a diameter ($B_1$), when the valve plug is open, the bottom surface of the valve plug and the seal surface jointly forming the radial passage that has the opening diameter ($B_1$), the radial passage being a channel encircling the center hole, the radial passage having a height ($LH_6$), where the radial passage height ($LH_6$) is equal to the sum of the opening diameter ($B_1$) and the seal surface height ($LH_3$);

the radial center line ($S_{12}$) connecting the center point ($P_1$) and the center point ($P_3$), and the radial passage extending radially from the center point ($P_1$) toward the center point ($P_3$) in various directions;

the outlet passage having the internal outlet, the valve outlet, an outlet center line ($S_2$) an upper-edge line ($S_{2a}$), and a lower-edge line ($S_{2b}$); the outlet center line ($S_2$) connecting the center point ($P_3$) and the center point ($P_4$), and forming an included angle ($\gamma_2$) with the vertical line ($YL_3$) at the center point ($P_3$), where $0° \leq \gamma_2 < 90°$, when the internal outlet is a non-standard elliptical hole, the internal outlet having a major axis having a length ($a_y$) in the Y-axis direction, where the length ($a_y$) exceeds or is equal to the diameter of the do of the center hole, wherein the length $a_y$ corresponds to the distance between the distal point (E3) and proximal point (E4), wherein the distance between the distal point (E3) and the center point (P3) exceeds or equal to the distance between the center point (P3) and the proximal point (E4), and where the internal outlet includes a minor axis having the length ($b_z$) in the Z-axis direction, where the minor axis length ($b_z$) equals the center hole diameter ($d_0$); wherein, when the included angle dimension $\gamma_2=90°$, the outlet passage is a horizontal, straight pipe, and the length $a_y=d_0$; the upper-edge line ($S_{2a}$) connecting the distal point ($E_3$) and the distal point ($E_5$), the lower-edge line ($S_{2b}$) connecting the proximal point ($E_4$) and the proximal point ($E_6$); the distal point ($E_3$) having a height difference $H_1$ with respect to the seal surface, when the distal point ($E_3$) is located higher than the seal surface, then the height difference $H_1 \geq 0$; otherwise, $H_1 \leq 0$; the internal outlet center point ($P_3$) having a height difference $H_3$ with respect to the seal surface, when the center point ($P_3$) is located higher than the seal surface, then the height difference $H_3 \geq 0$; otherwise, $H_3 \leq 0$;

a radial gap ($B_3$) being defined between the valve-plug outer diameter $d_2$ and the valve-chamber inner diameter $d_3$, where the radial gap $$(B_3) \text{ is equal to } (d_3 - d_2)/2,\ 0.2 \leq \frac{B_3}{d_0} \leq 0.4;$$

an annular space ($B_2$) being defined between the valve-seat outer diameter ($d_1$) and valve-chamber inner diameter ($d_3$), where a dimension $$(B_2) \text{ of the annular space is equal to } (d_3 - d_1)/2,\ 0.25 \leq \frac{B_2}{d_0} \leq 0.4;$$

an inner diameter ratio $$\frac{d_3}{d_0}$$

being a ratio between the valve-chamber inner diameter ($d_3$) and the valve-inlet diameter ($d_0$), where $$1.75 \leq \frac{d_3}{d_0} \leq 2.8;$$

through the inlet center line ($S_1$), the radial center line ($S_{12}$) and outlet center line ($S_2$), a fluid flowing in the improved flow channel as streamlines, wherein:

the inlet center line ($S_1$) being a single line segment or a combination of different line segments, including: any one or more of curved lines, vertical line segments, oblique line segments, and horizontal line segments, the vertical line segment being coaxial with the vertical line ($YL_1$), the horizontal line segment being coaxial with the channel axis ($XL_2$), a corner (A) being a corner along which the inlet center line ($S_1$) turns from the valve inlet to the center hole;

all of the streamlines of the fluid coming out the center hole flowing radially in the various directions in the radial passage, a corner (B) being a corner along which the fluid turns from the inlet center line ($S_1$) to the radial center line ($S_{12}$), all of the streamlines horizontally, radially passing through a spread (C) with turns while flowing toward the internal outlet; the fluid in the spread (C) having a flowing rate that decreases after the corner (B) due to increase in an area of the radial passage and increases as the area decreases while the fluid makes the turns and flows toward the internal outlet; the radial center line ($S_{12}$) being a straight line or a curved line or a multi-curve line depending on relative positions of the seal surface and the internal outlet;

driven by a pressure difference formed between the valve inlet and the valve outlet, the streamlines of fluid at the spread (C) in the radial center line ($S_{12}$) splitting up into a rushing stream ($S_{121}$) and a tranquil stream ($S_{122}$), wherein the rushing stream ($S_{121}$) is formed by some of the streamlines that are affected by a relatively high pressure-difference gradient to have a relatively high streamline density and has a relatively high flow rate, and the tranquil stream is formed by some of the streamlines that are affected by a relatively low pressure-difference gradient to have a relatively low streamline density and has a relatively low flow rate; the streamlines fanning out across of the spread (C), and, due to the corner (B), the rushing stream ($S_{121}$) fanning out at a circumferential angle toward the internal outlet, and the tranquil stream ($S_{122}$) fanning out at circumferential angles other than the circumferential angle at which the rushing stream fans out; the rushing stream ($S_{121}$) and the tranquil stream ($S_{122}$) making turns at a corner (D), respectively, before flowing into the internal outlet, where the rushing stream ($S_{121}$) turns at a corner (D1), and the tranquil stream ($S_{122}$) turns at a corner (D2);

the outlet center line ($S_2$) being a single line segment or a combination of different line segments, including: any one or more of curved lines, vertical line segments, oblique line segments, and horizontal line segments, the horizontal line segment being coaxial with channel axis ($XL_2$); the corner (D) being a bend connecting the radial center line ($S_{12}$) and the outlet center line ($S_2$), the fluid passing through the internal outlet and the outlet passage and then turning at a corner (E) to flow out the valve outlet;

the improved flow channel being characterized in that:

in a 3D surface plot of an inner wall of the inlet passage covering a range that starts from the circumference of the valve inlet and ends at the round center hole having the diameter do through the inlet center line ($S_1$), there are an upper-edge line ($S_{1a}$) and a lower-edge line ($S_1$b);

the inlet center line ($S_1$) including a straight line segment and a curved line; the curved line having one end point that is at the center point ($P_1$) and an opposite end point that is at the tangent point ($P_{12}$), wherein the tangent point ($P_{12}$) is a tangent point between the curved line and the channel axis ($XL_2$), so that the curved line extends for a horizontal distance ($L_{11}$), wherein the horizontal distance ($L_{11}$) is equal to a distance between the center point ($P_2$) and the tangent point ($P_{12}$), the straight line segment having one end at the tangent point ($P_{12}$) and an opposite end at the center point ($P_1$), wherein ($P_{12}$) and ($P_2$) are spaced apart from each other by a horizontal distance which equals to a difference between the horizontal distance ($L_1$) and the horizontal distance ($L_{11}$); a center of circle point ($P_0$) being located on a vertical line ($YL_6$) passing through the point ($P_{12}$) so that a line segment ($P_0P_{12}$) extending between the point ($P_0$) and the point ($P_{12}$) and a line segment ($P_0P_1$) extending between the point ($P_0$) and the point ($P_1$) are isometric in length, and an included angle ($2\theta_1$) between the line segment ($P_0P_{12}$) and the line segment ($P_0P_1$) has a dimension equal to a dimension of the corner (A), wherein a dimension of a placement angle ($\theta_1$) is equal to a dimension of an angle of a line segment ($P_1P_{12}$) with respect to the horizon; and the curved line and vertical line ($YL_1$) including an included angle having a dimension ($\gamma_1$) at the center point ($P_1$) of the center hole, where $\gamma_1=90°-2\theta_1$;

when the dimension of the included angle $\gamma_1\neq 0°$, the center hole is a round hole having the diameter ($d_0$) by reduction of the major axis ($a_x$), wherein the reduction of the major axis ($a_x$) is achieved by replacing the distal point ($E_1$) with a distal point $$E_1^*$$

on the major axis and replacing the proximal point ($E_2$) with a proximal point $$E_2^*$$

on the major axis;

the distal point ($E_3$) having the height ($LH_4$), the distal point ($E_3$) having the height difference ($H_1$) with respect to the the seal surface, the proximal point ($E_4$) having the height ($LH_5$); ($LH_5$); a line segment ($E_3E_4$) extending between the distal point ($E_3$) and the proximal point ($E_4$) being the major axis ($a_y$) of the internal outlet in the Y-axis direction, where ($a_y$) equals a distance between the distal point ($E_3$) and the proximal point ($E_4$);

the outlet center line ($S_2$) including a straight line segment and a curved line; the curved line having one end point that is at the center point ($P_3$) and an opposite end point that is a tangent point ($P_{34}$), wherein the tangent point ($P_{34}$) is a tangent point between the curved line and channel axis ($XL_2$), so that the curved line extends for a horizontal distance ($LL_{21}$) which is equal to a distance between the center point ($P_3$) and the tangent point ($P_{34}$), the straight line segment ($P_{34}P_4$) having one end at the tangent point ($P_{34}$) and an opposite end point at the center point ($P_4$), with a horizontal distance between the tangent point ($P_{34}$) and the center point ($P_4$) equal to $LL_2-LL_{21}$; a center of circle point ($P_5$) being located on a vertical line ($YL_5$) that passes through the point ($P_{34}$) so that a line segment ($P_5P_{34}$) extending between the point ($P_5$) and the point ($P_{34}$) and a line segment ($P_5P_3$) extending between the point ($P_5$) and the point ($P_3$) are isometric in length, and an included angle dimension ($2\theta_1$) between the line segment ($P_5P_{34}$) and a line segment ($P_5P_3$) is equal to a dimension of the corner (E), wherein a dimension of a placement angle ($\theta_2$) is equal to an angle of a line segment ($P_3P_{34}$) with respect to the horizon, and wherein the curved line and vertical line ($YL_3$) include an included angle having a dimension ($\gamma_2$) at the center point ($P_3$) of the center hole, where $\gamma_2=90°-2\theta_2$;

wherein the outlet center line ($S_2$) includes a straight line segment and a curved line, wherein the outlet passage has a constant diameter and a constant cross-sectional area throughout a length thereof, where in the upper-edge line ($S_{2a}$), the lower-edge line ($S_{2b}$), and the outlet center line ($S_2$) are parallel to each other and the three curved lines share the same center of the circle point ($P_5$), the internal outlet being an oval hole having the major axis length ($a_y$) equal to a distance ($E_3E_4$) between the between the distal point ($E_3$) and the proximal point ($E_4$), where the distance between the point ($E_3$) and the point ($P_s$) exceeds the distance between the point ($P_3$) and the point ($E_4$), and has the minor axis length ($b_z$), where $b_z=d_0$;

the upper-edge line ($S_{2a}$) intersecting the vertical line ($YL_5$) at a tangent point ($E_{35}$), which has a height of $d_0/2$, a line segment ($P_5P_{35}$) extending between the point ($P_5$) and the point ($E_{35}$) and a line segment ($P_5E_3$) extending between the point ($P_5$) and the point ($E_3$) forming therebetween an included angle having a dimension ($2\theta_{21}$), and wherein the curved line and vertical line ($YL_3$) including form therebetween an included angle having a dimension ($\gamma_{21}$) at the distal point ($E_3$), where $\gamma_{21}=90°-2\theta_{21}$, a value of the height ($LH_4$) of the distal point ($E_3$) being obtainable using the upper-edge line ($S_{2a}$);

the lower-edge line ($S_{2b}$) intersecting the vertical line ($YL_5$) at a tangent point ($E_{46}$) which has a height of $$-\frac{d_0}{2},$$

a line segment ($P_5E_{46}$) extending between the point ($P_5$) and the point ($E_{46}$) and a line segment ($P_5E_4$) extending between the point ($P_5$) and the point ($E_4$) including therebetween an included angle having a dimension of ($2\theta_{22}$), and the lower-edge line ($S_{2b}$) and the vertical line ($YL_3$) including therebetween an included angle having a dimension of ($\gamma_{22}$) at the proximal point ($E_4$), where $\gamma_{22}=90°-2\theta_{22}$; a value of the height ($LH_5$) of the proximal point ($E_4$) being obtainable using the passage and lower-edge line ($S_{2b}$);

whereby the rushing stream ($S_{121}$) and the tranquil stream ($S_{122}$) separate and flow at the ring-shaped ditch to minimize flow interference in the valve chamber and flow interference at the internal outlet, and the corner (E) of the upper-edge line ($S_{2a}$) of the outlet passage has a dimension angle of ($2\theta_{21}$), where $30°\leq 2\theta_{21}\leq 90°$.

2. The improved flow channel of claim 1, wherein the center point of the center hole has the height ($LH_1$) with respect to the channel axis ($XL_2$), and the corner (A) is of an angle of ($2\theta_1$), where $55°\leq 2\theta_1\leq 105°$.

3. The improved flow channel of claim 1, wherein the rushing stream ($S_{121}$) at the spread (C) when flowing to the ring-shaped ditch corners for turns at the corner ($D_1$) for the first time, and when passing through the distal point ($E_3$) corners for turns at the corner ($D_1$) for a second time at the angle ($\gamma_{21}$), where $0°\leq\gamma_{21}\leq 60°$.

4. The improved flow channel of claim 1, wherein the proximal point ($E_4$) has the height ($LH_5$) and is connected to a bottom of the bevel of the ring-shaped ditch, where $$-0.4\leq\frac{LH_5}{d_0}\leq 0.4.$$

5. The improved flow channel of claim 1, wherein the corner (E) of the lower-edge line ($S_{2b}$) of the outlet passage is of an angle ($2\theta_{22}$), where $14°\leq 2\theta_{22}\leq 54°$.

6. The improved flow channel of claim 1, wherein when a height difference ratio $H_1/d_0\leq 0.5$, reduction of a height of the distal point ($E_3$) is ineffective in reduction of head loss, and a larger major axis ratio $a_y/d_0$ is more effective in reducing head loss but also cause bulkiness of the valve body, and wherein since the rushing stream ($S_{121}$) flows out the radial passage horizontally, a mapping point $$E_3^*$$

on the major axis ($a_y$) corresponds to the height ($LH_6$) of the passage and radial passage, wherein the mapping point ($E^*_3$) and the valve seat have a height difference $$H_1^*,$$

and the rushing stream ($S_{121}$) flows into the internal outlet between the mapping point $$E_3^*$$

and the center point $$E_3^*$$

wherein a placement angle $$\theta_{21}^*$$

of the mapping point $$E_3^*$$

is equal to an angle of a line segment $$E_3^*E_{35}$$

with respect to the horizon, $$2\theta_{21}^{*} \leq 2\theta_{21},$$

so that when the relatively small placement angle $$\theta_{21}^{*}$$

is used to describe the rushing stream ($S_{121}$), the angle ($\alpha_1$) is further reduced, wherein the head loss is also reduced.

7. The improved flow channel of claim 1, wherein the oblique angle having a dimension (β) of the bevel of the ring-shaped ditch is approximately equal to the included angle ($\theta_{22}$), where $8° \leq \beta \leq 20°$.

8. The improved flow channel of claim 1, wherein the radial passage is formed by a concave surface at a bottom of the valve plug and the seal surface of the valve seat and has a flow channel height ($B_1$).

9. The improved flow channel of claim 1, wherein in order to adjust the height ($H_1$) of the elliptical distal point ($E_3$), a new distal point $$E_3^{**}$$

as an intersect between a curve ($S_3$) that is tangent to the upper-edge line ($S_{21}$) of the outlet passage and the vertical line ($YL_3$) is located, so that the included angle $$\gamma_{21}^{**}$$

of the curve ($S_3$) at the distal point $$E_3^{**}$$

has a relatively large angle, where $$30° \leq \gamma_{21}^{**} \leq 90°,$$

and a tangent curved surface (SS) between the curve ($S_3$) and a curved upper-edge surface of the inner wall of the outlet passage is made, so that a part of the rushing stream ($S_{121}$) entering the internal outlet directly flows along the tangent curved surface SS so as to reduce the angle $$\theta_{21}^{**}$$

of the corner ($D_1$) where $$0° \leq \theta_{21}^{**} \leq 60°.$$

10. The improved flow channel of claim 1, wherein the distal point $$E_3^{**}$$

and the valve seat have a height difference $$H_1^{**},$$

and $$0.5 \geq \frac{H_1^{**}}{d_0} \geq 0.25,$$

and a new elliptical major axis is $$a_y^{**},$$

where $$2d_0 \geq a_y^{**} \geq 1.3d_0.$$

11. The improved flow channel of claim 1, wherein the internal outlet of the outlet passage is non-standard elliptical in shape, and the outlet center line ($S_2$), the upper-edge line ($S_{2a}$), and the lower-edge line ($S_{2b}$) of the outlet passage are each formed as a straight line segment; the line segment ($P_3P_{34}$) connecting the center point ($P_3$) and the tangent point ($P_{34}$), the line segment ($E_3E_{35}$) connecting the distal point ($E_3$) and the tangent point ($E_{35}$), the line segment ($E_4E_{46}$) connecting the proximal point ($E_4$) and the tangent point ($E_{46}$); in the 3D surface plot of the inner wall of the inlet passage covering the range that starts from the circumference of the valve inlet and ends at the round center hole through the inlet center line ($S_1$), there being the upper-edge line ($S_{2a}$) and the lower-edge line ($S_{2b}$); the center of circle point ($P_5$) being located on the vertical line ($YL_5$) that passes through the point ($P_{34}$) so that the line segment ($P_5P_{34}$) and the line segment ($P_5P_3$) are isometric in length, and the included angle dimension ($2\theta_2$) formed between the line segment ($P_5P_{34}$) and the line segment ($P_5P_3$) is equal to the dimension of the corner (E) of the line segment ($P_3P_{34}$), in which the placement angle ($\theta_2$) is equal to the angle of the line segment ($P_3P_{34}$) with respect to the horizon.

12. The improved flow channel of claim 11, wherein the line segment ($P_3P_{34}$) has the placement angle having a dimension ($\theta_2$) relative to the horizontal line, wherein the corner (D) is formed at the center point $P_3$ and has a dimension of ($\theta_2$), where $$\theta_2 = A\tan\left(\frac{LH_2}{LL_{21}}\right);$$

wherein the line segment ($E_3E_{35}$) has the placement angle having a dimension of ($\theta_{21}$) relative to the horizontal line, and wherein has the corner (D) is formed at the distal point ($E_3$) and has a dimension of ($\theta_{21}$), where $$\theta_{21} = A\tan\left(\frac{LH_4 - \frac{d_0}{2}}{LL_{21}}\right);$$

wherein the line segment ($E_4E_{46}$) has the placement angle having a dimension of ($\theta_{22}$) relative to the horizontal line, and wherein the corner (D) is formed at the proximal point (E4) and has a dimension of ($\theta_{22}$), where $$\theta_{22} = A\tan\left(\frac{LH_5 + \frac{d_0}{2}}{LL_{21}}\right);$$

wherein the outlet center line ($S_2$) turns at the corner (E) for once at the tangent point ($P_{34}$), where a dimension of the corner $E=\theta_2$;

wherein the upper-edge line ($S_{2a}$) turns at the corner (E) for once at the tangent point ($E_{35}$), where the dimension of the corner $E=\theta_{21}$;

wherein the lower-edge line ($S_{2b}$) turns by the corner (E) for once at the tangent point ($E_{46}$), where the dimension of the corner $E=\theta_{22}$;

wherein at the distal point ($E_3$) there is the corner (D) having a dimension $D=\theta_{21}$, where $14°\leq\theta_{21}\leq45°$;

wherein at the tangent point ($E_{35}$) there is the corner (E) having a dimension $E=\theta_{21}$, where $14°\leq\theta_{21}\leq45°$;

wherein at the proximal point ($E_4$) there is the corner (D) having a dimension $D=\theta_{22}$, where $7°\leq\theta_{22}\leq20°$; and wherein at the tangent point ($E_{46}$) there is the corner (E) having a dimension $E=\theta_{22}$, where $7°\leq\theta_{22}\leq20°$.

13. The improved flow channel of claim 1, wherein the internal outlet is modified from a non-standard ellipse to a rectangle in shape, in which the non-standard ellipse is inscribed to the rectangular, and the ellipse and the rectangle share the same said major axis ($a_y$) and said minor axis ($b_z$) and share the same said distal point ($E_3$) and said proximal point ($E_4$), four right-angle corners of the rectangle being modified into four small rounded corners; the outlet center line ($S_2$), the upper-edge line ($S_{2a}$), and the lower-edge line ($S_{2b}$) of the outlet passage each being a straight line segment; the line segment ($P_3P_{34}$) connecting the center point ($P_3$) and the tangent point ($P_{34}$), the line segment ($E_3E_{35}$) connecting the distal point ($E_3$) and the tangent point ($E_{35}$), the line segment ($E_4E_{46}$) connecting the proximal point ($E_4$) and the tangent point ($E_{46}$); in the 3D surface plot of the inner wall of the inlet passage covering the range that starts from the rectangular circumference of the rectangular and ends at the round valve outlet through the connecting outlet center line ($S_2$), there being the upper-edge line ($S_{2a}$) and the lower-edge ($S_{2b}$); the center of circle point ($P_5$) being located on the vertical line ($YL_5$) that passes through the point ($P_{34}$) so that the line segment ($P_5P_{34}$) and the line segment ($P_5P_3$) are isometric in length, and the included angle dimension ($2\theta_2$) between the line segment ($P_5P_{34}$) and the line segment ($P_5P_3$) is equal to the dimension of the corner (E) of the line segment ($P_3P_{34}$) in which the placement angle ($\theta_2$) is equal to the angle of the line segment ($P_3P_{34}$) with respect to the horizon.

14. The improved flow channel of claim 13, wherein the line segment ($P_3P_{34}$) has the placement angle having a dimension of ($\theta_2$) relative to the horizontal line, and wherein the corner (D) is formed at the center point ($P_3$) and has a dimension of ($\theta_2$), where $$\theta_2 = A\tan\left(\frac{LH_2}{LL_{21}}\right);$$

wherein the line segment ($E_3E_{35}$) has the placement angle having a dimension ($\theta_{21}$) relative to the horizontal line, and wherein the corner (D) is formed at the distal point ($E_3$) and has a dimension of ($\theta_{21}$), where $$\theta_{21} = A\tan\left(\frac{LH_4 - \frac{d_0}{2}}{LL_{21}}\right);$$

wherein the line segment ($E_4$)($E_{46}$) has the placement angle having a dimension of ($\theta_{22}$) relative to the horizontal line, and wherein the corner (D) is formed at the proximal point ($E_4$) and has a dimension of ($\theta_{22}$), where $$\theta_{22} = A\tan\left(\frac{LH_5 + \frac{d_0}{2}}{LL_{21}}\right);$$

wherein the outlet center line ($S_2$) turns at the corner (E) for once at the tangent point ($P_{34}$), where the dimension of the corner $E=\theta_2$;

wherein the upper-edge line ($S_{2a}$) turns at the corner (E) for once at the tangent point ($E_{35}$), where the dimension of the corner $E=\theta_{21}$;

wherein the lower-edge line ($S_{2b}$) turns at the corner (E) for once at the tangent point ($E_{46}$), where the dimension of the corner $E=\theta_{22}$;

wherein the corner (D) is formed at the distal point ($E_3$), the corner (D) having a dimension $D=\theta_{21}$, where $14°\leq\theta_{21}\leq45°$;

wherein the corner (D) is formed at the tangent point ($E_{35}$), the corner (E) having a dimension $E=\theta_{21}$, where $14°\leq\theta_{21}\leq45°$;

wherein the corner (D) is formed at the proximal point ($E_4$), the corner (D) having a dimension $D=\theta_{22}$, where $7°\leq\theta_{22}\leq20°$; and wherein the corner (E) is formed at the tangent point ($E_{46}$), the corner (E) having a dimension $E=\theta_{22}$, where $7°\leq\theta_{22}\leq20°$.

15. The improved flow channel of claim 1, wherein the internal outlet remains non-standard elliptical, and the inner diameter ($d_3$) of the valve chamber and the outer diameter ($d_1$) of the valve seat are of an eccentric design, so that the valve chamber is formed as a hollow, eccentric round structure, in which the valve chamber includes a valve plug room that has a diameter of $1.8d_0$ and an annular chamber that has a diameter of $2.2d_0$, the valve plug room and the annular chamber having their centers of circle off from each other by $0.2d_0$, the annular chamber having ceiling that has a height ($LH_7$); the valve plug room and the valve seat being concentric and a vertical line ($YL_1$) passing therethrough, the valve plug room being used to receive the valve plug, the center point ($P_1$) of the valve seat near the valve inlet and an inner wall of the annular chamber having a horizontal distance of $0.9d_0$, the center point ($P_1$) of the valve seat and the inner wall of the flows annular chamber near the internal outlet having a horizontal distance of $1.3d_0$; the annular chamber receiving the annular space and the ring-shaped ditch, the ring-shaped ditch having a width ($B_2$) that is at its maximum near the internal outlet due to the eccentric design, the annular chamber ceiling and the valve seat seal surface having the height difference $$(H_5),\text{ where } H_5 = LH_7 - LH_3,\text{ and } 0.6 \geq \frac{H_5}{d_0} \geq 0.25.$$

16. The improvement of claim 15, wherein when the height ($LH_4$) of the distal point ($E_3$) is higher than height ($LH_7$), $H_1>H_5$, and $LH_4>LH_7$, a new distal point $$E_3^{**}$$

on the major axis ($a_y$) is made and a curve ($S_3$) is made from the distal point $$E_3^{**}$$

to be tangent to the upper-edge line ($S_{21}$) is made so that the distal point $$E_3^{**}$$

and the seal surface of the valve seat have a height difference $$H_1^{**},$$

where $$0.25d_0 \leq H_1^{**} \leq 0.5d_0,$$

and a line segment $$E_3^{**}E_4$$

extending between the point ($E^{}_3$) and the point ($E_4$) forms a new major axis $$a_y^{},$$

and a tangent curved surface (SS) between the curve ($S_3$) and an inner periphery of the outlet passage is made, so that an included angle having a dimension $$\gamma_{21}^{**}$$

between the curve ($S_3$) and the vertical line ($YL_3$) at the distal point $$E_3^{**}$$

has a relatively large angle, where $$30° \leq \gamma_{21}^{**} \leq 90°,$$

in which the corner (D) at the distal point $$E_3^{**}$$

has an angle dimension $$\theta_{21}^{**},$$

where $$0° \leq \theta_{21}^{**} \leq 60°,$$

and a new elliptical major axis is $$a_y^{**},$$

where $$2.0d_0 \geq a_y^{**} \geq 1.3d_0.$$

17. The improved flow channel of claim 1, wherein the seal surface of the valve seat is located outside the center hole, and a conical pipe is installed above the center hole, wherein the conical pipe is coaxial with the vertical line ($YL_1$) and has the center point ($P_{DP}$), in which the seal surface of the valve seat is at the height ($LH_3$) and the center hole is at the height ($LH_1$), the conical pipe having a height (h) that has a conical angle (ϕ), where $LH_3=LH_1+h$; the conical pipe serving to help the fluid and the inlet streamline ($S_1$) to spread and its make the corner (β) smoothly to enter the radial passage, thereby further lowering head loss, in which the conical pipe structurally reenforces the valve seat and enhances sealing reliability.

18. The improved flow channel of claim 17, wherein the conical pipe has a height (h), where $$0.06 \leq \frac{h}{d_0} \leq 0.2,$$

and has a conical angle (ϕ), where $15° \leq \phi \leq 60°$.

19. The improved flow channel of claim 17, wherein for further strengthening the valve seat, a vertical rib plate is provided at the outer periphery of the valve seat, the vertical rib plate being located near the internal outlet and having a lower end connected to the bottom of the ring-shaped ditch, the vertical rib plate having two laterals each formed as a vertical, curved surface, each of the vertical curved surfaces having one side tangent to the outer periphery of the wide bottom of the valve seat, and an opposite side connected mutually to form an end with a small rounded corner, the vertical rib plate serving to guide the two streamlines in the ring-shaped ditch to flow toward the internal outlet.

* * * * *